United States Patent
Weinstock et al.

(10) Patent No.: US 7,899,690 B1
(45) Date of Patent: Mar. 1, 2011

(54) EXTENDED WEB ENABLED BUSINESS TO BUSINESS COMPUTER SYSTEM FOR RENTAL VEHICLE SERVICES

(75) Inventors: Timothy Robert Weinstock, St. Charles, MO (US); Kimberly Ann DeVallance, Maryland Heights, MO (US); Randall Allan Haselhorst, Imperial, MO (US); Craig Stephen Kennedy, St. Louis, MO (US); David Gary Smith, Wildwood, MO (US); William T. Tingle, Eureka, MO (US); Anita K. Klopfenstein, O'Fallon, IL (US)

(73) Assignee: The Crawford Group, Inc., St. Louis, MO (US)

( * ) Notice: Subject to any disclaimer, the term of this patent is extended or adjusted under 35 U.S.C. 154(b) by 1403 days.

(21) Appl. No.: 09/694,050

(22) Filed: Oct. 20, 2000

Related U.S. Application Data

(63) Continuation-in-part of application No. 09/641,820, filed on Aug. 18, 2000, now Pat. No. 7,275,038.

(51) Int. Cl.
*G06Q 10/00* (2006.01)
*G06Q 40/00* (2006.01)
*G01C 21/34* (2006.01)

(52) U.S. Cl. .................................. 705/5; 705/4; 705/6

(58) Field of Classification Search ................. 705/4–6, 705/26; 709/203
See application file for complete search history.

(56) References Cited

U.S. PATENT DOCUMENTS

| | | |
|---|---|---|
| 4,714,989 A | 12/1987 | Billings |
| 4,757,267 A | 7/1988 | Riskin |
| 4,774,663 A | 9/1988 | Musmanno et al. |
| 4,788,643 A | 11/1988 | Trippe et al. ................... 705/6 |
| 4,797,818 A | 1/1989 | Cotter |

(Continued)

FOREIGN PATENT DOCUMENTS

JP  2002074126 A  9/2000

(Continued)

OTHER PUBLICATIONS

Copyright Chronicle Publishing Company, May 2, 1997, Booking a room, vehicle for vacation via the 'Net, Pantagraph, C1.*

(Continued)

*Primary Examiner*—Robert W Morgan
(74) *Attorney, Agent, or Firm*—Thompson Coburn LLP

(57) ABSTRACT

An Internet enabled, business-to-business computerized transaction system is disclosed in its preferred embodiment for use in providing rental car services for high volume users and comprises an Internet web portal through which the high volume user may access a plurality of service providers including an integrated business computer network for at least one rental vehicle service provider. The rental vehicle services provider computer network is configured to interconnect a geographically diverse plurality of branch offices, cataloguing their available rental vehicles and schedules for same as well as handling all transactional data relating to its business. The Internet web portal provides ubiquitous connectivity and portability for a multi-level business organization who regularly places high volumes of rental purchases with its business partner and also those other service providers who may or may not have the same integrated business computer system and software. Utilizing the method and apparatus of the present invention large volumes of rental transactions may be placed, monitored, altered during performance, and closed out with financial accounting and payment being made virtually without human intervention.

41 Claims, 204 Drawing Sheets

U.S. PATENT DOCUMENTS

| | | | |
|---|---|---|---|
| 4,799,156 A | 1/1989 | Shavit et al. | |
| 4,831,526 A | 5/1989 | Luchs et al. | |
| 4,858,121 A | 8/1989 | Barber et al. | |
| 4,891,785 A | 1/1990 | Donohoo | |
| 4,897,867 A | 1/1990 | Foster et al. | |
| 4,899,292 A | 2/1990 | Montagna et al. | |
| 4,916,611 A | 4/1990 | Doyle, Jr. et al. | |
| 4,931,932 A | 6/1990 | Dalnekoff et al. | |
| 4,951,196 A | 8/1990 | Jackson | |
| 4,984,155 A | 1/1991 | Geier et al. | |
| 5,058,044 A | 10/1991 | Stewart et al. | |
| 5,063,506 A | 11/1991 | Brockwell et al. | |
| 5,182,705 A * | 1/1993 | Barr et al. | 705/11 |
| 5,210,687 A | 5/1993 | Wolfberg et al. | 705/36 |
| 5,216,592 A | 6/1993 | Mann et al. | 705/8 |
| 5,218,697 A | 6/1993 | Chung | |
| 5,224,034 A | 6/1993 | Katz et al. | |
| 5,237,499 A | 8/1993 | Garback | 705/5 |
| 5,253,165 A | 10/1993 | Leiseca et al. | |
| 5,270,922 A | 12/1993 | Higgins | |
| 5,289,369 A | 2/1994 | Hirshberg | |
| 5,309,355 A | 5/1994 | Lockwood | 705/6 |
| 5,311,425 A | 5/1994 | Inada | 705/6 |
| 5,319,542 A | 6/1994 | King, Jr. et al. | |
| 5,355,474 A | 10/1994 | Thuraisngham et al. | |
| 5,361,199 A | 11/1994 | Shoquist et al. | |
| 5,369,570 A | 11/1994 | Parad | 705/8 |
| 5,375,207 A | 12/1994 | Blakely et al. | |
| 5,390,314 A | 2/1995 | Swanson | |
| 5,396,600 A | 3/1995 | Thompson et al. | 705/28 |
| 5,406,475 A | 4/1995 | Kouchi et al. | 705/8 |
| 5,422,809 A | 6/1995 | Griffin et al. | |
| 5,432,904 A | 7/1995 | Wong | |
| 5,465,206 A | 11/1995 | Hilt et al. | |
| 5,471,615 A | 11/1995 | Amatsu et al. | |
| 5,475,585 A | 12/1995 | Bush | |
| 5,504,674 A | 4/1996 | Chen et al. | |
| 5,506,897 A | 4/1996 | Moore et al. | |
| 5,515,268 A | 5/1996 | Yoda | |
| 5,528,490 A | 6/1996 | Hill | |
| 5,530,844 A | 6/1996 | Phillips et al. | |
| 5,544,040 A | 8/1996 | Gerbaulet | |
| 5,544,320 A | 8/1996 | Konrad | |
| 5,550,734 A | 8/1996 | Tarter et al. | 705/2 |
| 5,557,518 A | 9/1996 | Rosen | |
| 5,570,283 A | 10/1996 | Shoolery et al. | 705/5 |
| 5,581,461 A | 12/1996 | Coll et al. | 705/5 |
| 5,586,313 A | 12/1996 | Schnittker et al. | |
| 5,588,048 A | 12/1996 | Neville | |
| 5,592,375 A | 1/1997 | Salmon et al. | |
| 5,592,378 A | 1/1997 | Cameron et al. | |
| 5,640,505 A | 6/1997 | Hearn et al. | 714/4 |
| 5,644,721 A | 7/1997 | Chung et al. | 705/6 |
| 5,664,207 A | 9/1997 | Crumpler et al. | |
| 5,666,493 A | 9/1997 | Wojcik et al. | |
| 5,694,551 A | 12/1997 | Doyle et al. | |
| 5,696,901 A | 12/1997 | Konrad | |
| 5,696,965 A | 12/1997 | Dedrick | |
| 5,710,887 A | 1/1998 | Chelliah et al. | |
| 5,710,889 A | 1/1998 | Clark et al. | |
| 5,712,989 A | 1/1998 | Johnson et al. | 705/28 |
| 5,721,832 A | 2/1998 | Westrope et al. | |
| 5,721,913 A | 2/1998 | Ackroff et al. | 707/103 R |
| 5,724,520 A | 3/1998 | Goheen | |
| 5,726,885 A | 3/1998 | Klein et al. | |
| 5,732,398 A | 3/1998 | Tagawa | |
| 5,734,823 A | 3/1998 | Saigh et al. | |
| 5,754,772 A | 5/1998 | Leaf | |
| 5,754,830 A | 5/1998 | Butts et al. | |
| 5,757,925 A | 5/1998 | Faybishenko | |
| 5,758,329 A | 5/1998 | Wojcik et al. | |
| 5,758,341 A | 5/1998 | Voss | 707/10 |
| 5,764,981 A | 6/1998 | Brice et al. | 709/101 |
| 5,768,510 A | 6/1998 | Gish | |
| 5,768,511 A | 6/1998 | Galvin et al. | |
| 5,774,873 A | 6/1998 | Berent et al. | |
| 5,778,178 A | 7/1998 | Arunachalam | |
| 5,781,892 A | 7/1998 | Hunt et al. | 705/5 |
| 5,784,565 A | 7/1998 | Lewine | |
| 5,793,966 A | 8/1998 | Amstein et al. | |
| 5,794,207 A * | 8/1998 | Walker et al. | 705/1 |
| 5,796,634 A | 8/1998 | Craport et al. | |
| 5,796,967 A | 8/1998 | Filepp et al. | |
| 5,797,126 A | 8/1998 | Helbling et al. | |
| 5,799,157 A | 8/1998 | Escallon | |
| 5,799,289 A | 8/1998 | Fukushima et al. | |
| 5,802,293 A | 9/1998 | van der Sijpt | |
| 5,802,530 A | 9/1998 | Van Hoff | |
| 5,805,689 A | 9/1998 | Neville | |
| 5,805,829 A | 9/1998 | Cohen et al. | |
| 5,808,894 A | 9/1998 | Wiens et al. | |
| 5,809,478 A | 9/1998 | Greco et al. | 705/4 |
| 5,818,715 A | 10/1998 | Marshall et al. | 705/4 |
| 5,819,274 A | 10/1998 | Jackson, Jr. | 705/8 |
| 5,832,451 A | 11/1998 | Flake et al. | 707/10 |
| 5,832,452 A | 11/1998 | Schneider et al. | |
| 5,832,454 A | 11/1998 | Jafri et al. | 705/5 |
| 5,835,724 A | 11/1998 | Smith | |
| 5,838,910 A | 11/1998 | Domenikos et al. | |
| 5,838,916 A | 11/1998 | Domenikos et al. | |
| 5,839,112 A | 11/1998 | Schreitmueller et al. | |
| 5,839,114 A | 11/1998 | Lynch et al. | |
| 5,842,176 A | 11/1998 | Hunt et al. | 705/6 |
| 5,847,957 A | 12/1998 | Cohen et al. | |
| 5,848,131 A | 12/1998 | Shaffer et al. | |
| 5,848,241 A | 12/1998 | Misinai et al. | |
| 5,850,446 A | 12/1998 | Berger et al. | |
| 5,857,191 A | 1/1999 | Blackwell, Jr. et al. | |
| 5,862,346 A | 1/1999 | Kley et al. | |
| 5,864,818 A | 1/1999 | Feldman | |
| 5,864,827 A | 1/1999 | Wilson | |
| RE36,111 E | 2/1999 | Neville | |
| 5,870,719 A | 2/1999 | Maritzen et al. | |
| 5,870,733 A | 2/1999 | Bass et al. | 707/2 |
| 5,875,110 A | 2/1999 | Jacobs | 700/232 |
| 5,877,765 A | 3/1999 | Dickman et al. | 345/738 |
| 5,881,230 A | 3/1999 | Christensen et al. | |
| 5,889,863 A | 3/1999 | Weber | |
| 5,889,942 A | 3/1999 | Orenshteyn | |
| 5,890,129 A | 3/1999 | Spurgeon | 705/4 |
| 5,890,140 A | 3/1999 | Clark et al. | |
| 5,892,905 A | 4/1999 | Brandt et al. | |
| 5,893,904 A | 4/1999 | Harris et al. | 705/27 |
| 5,897,620 A | 4/1999 | Walker et al. | 705/5 |
| 5,898,835 A | 4/1999 | Truong | |
| 5,901,214 A | 5/1999 | Shaffer et al. | |
| 5,903,873 A | 5/1999 | Peterson et al. | |
| 5,907,608 A | 5/1999 | Shaffer et al. | |
| 5,909,542 A | 6/1999 | Paquette et al. | |
| 5,909,570 A | 6/1999 | Webber | |
| 5,910,982 A | 6/1999 | Shaffer et al. | |
| 5,915,241 A | 6/1999 | Giannini | |
| 5,918,215 A | 6/1999 | Yoshioka et al. | 705/30 |
| 5,920,696 A | 7/1999 | Brandt et al. | |
| 5,923,552 A | 7/1999 | Brown et al. | 700/100 |
| 5,926,793 A | 7/1999 | de Rafael et al. | 705/5 |
| 5,926,798 A | 7/1999 | Carter | 705/26 |
| 5,930,474 A | 7/1999 | Dunworth et al. | |
| 5,931,878 A | 8/1999 | Chapin, Jr. | |
| 5,931,917 A | 8/1999 | Nguyen et al. | |
| 5,933,810 A | 8/1999 | Okawa | 705/5 |
| 5,944,784 A | 8/1999 | Simonoff et al. | |
| 5,946,660 A | 8/1999 | McCarty et al. | 705/5 |
| 5,946,687 A | 8/1999 | Gehani et al. | |

| Patent No. | Date | Inventor | | Patent No. | Date | Inventor |
|---|---|---|---|---|---|---|
| 5,948,040 A | 9/1999 | DeLorme et al. | | 6,125,391 A | 9/2000 | Meltzer et al. |
| 5,950,169 A | 9/1999 | Borghesi et al. ............... 705/4 | | 6,144,944 A | 11/2000 | Kurtzman, II et al. |
| 5,953,706 A | 9/1999 | Patel | | 6,144,990 A | 11/2000 | Brandt et al. |
| 5,956,397 A | 9/1999 | Shaffer et al. | | 6,148,289 A | 11/2000 | Virdy |
| 5,956,487 A | 9/1999 | Venkatraman et al. | | 6,148,290 A | 11/2000 | Dan et al. |
| 5,956,509 A | 9/1999 | Kevner | | 6,154,172 A | 11/2000 | Piccionelli et al. |
| 5,961,569 A | 10/1999 | Craport et al. | | 6,163,772 A | 12/2000 | Kramer et al. |
| 5,961,572 A | 10/1999 | Craport et al. | | 6,175,832 B1 | 1/2001 | Luzzi et al. |
| 5,963,915 A | 10/1999 | Kirsch | | 6,178,409 B1 | 1/2001 | Weber et al. |
| 5,966,451 A | 10/1999 | Utsumi | | 6,185,290 B1 | 2/2001 | Shaffer et al. |
| 5,970,475 A | 10/1999 | Barnes et al. | | 6,189,003 B1 | 2/2001 | Leal |
| 5,973,619 A | 10/1999 | Paredes | | 6,192,415 B1 | 2/2001 | Haverstock et al. |
| 5,974,444 A | 10/1999 | Konrad | | 6,205,482 B1 | 3/2001 | Navarre et al. |
| 5,977,966 A | 11/1999 | Bogdan ....................... 345/800 | | 6,223,094 B1 | 4/2001 | Muehleck et al. |
| 5,978,577 A | 11/1999 | Rierden et al. | | 6,226,654 B1 | 5/2001 | Van Hoff |
| 5,978,747 A | 11/1999 | Craport et al. | | 6,226,675 B1 | 5/2001 | Meltzer et al. |
| 5,978,817 A | 11/1999 | Giannandrea et al. .... 707/501.1 | | 6,229,534 B1 | 5/2001 | Gerra et al. |
| 5,978,834 A | 11/1999 | Simonoff et al. | | 6,230,117 B1 | 5/2001 | Lymer et al. |
| 5,978,840 A | 11/1999 | Nguyen et al. | | 6,233,329 B1 | 5/2001 | Urban et al. |
| 5,982,867 A | 11/1999 | Urban et al. | | 6,233,609 B1 | 5/2001 | Mittal |
| 5,982,868 A | 11/1999 | Shaffer et al. | | 6,240,365 B1 * | 5/2001 | Bunn ......................... 701/213 |
| 5,983,200 A | 11/1999 | Slotznick ...................... 705/26 | | 6,253,188 B1 | 6/2001 | Witek et al. |
| 5,983,208 A | 11/1999 | Haller et al. | | 6,272,528 B1 | 8/2001 | Cullen et al. |
| 5,987,423 A | 11/1999 | Arnold et al. ................. 705/14 | | 6,272,675 B1 | 8/2001 | Schrab et al. |
| 5,991,739 A | 11/1999 | Cupps et al. | | 6,275,843 B1 | 8/2001 | Chorn |
| 5,995,939 A | 11/1999 | Berman et al. | | 6,282,489 B1 | 8/2001 | Bellesfield et al. |
| 5,996,017 A | 11/1999 | Cipiere | | 6,282,517 B1 | 8/2001 | Wolfe et al. |
| 6,002,767 A | 12/1999 | Kramer | | 6,282,568 B1 | 8/2001 | Sondur et al. |
| 6,005,568 A | 12/1999 | Simonoff et al. ............. 345/744 | | 6,286,028 B1 | 9/2001 | Cohen et al. |
| 6,006,148 A | 12/1999 | Strong | | 6,292,185 B1 | 9/2001 | Ko et al. |
| 6,006,201 A | 12/1999 | Berent et al. .................. 705/27 | | 6,304,892 B1 | 10/2001 | Bhoj et al. |
| 6,009,464 A | 12/1999 | Hamilton et al. | | 6,308,120 B1 | 10/2001 | Good |
| 6,012,083 A | 1/2000 | Savitzky et al. | | 6,308,160 B1 | 10/2001 | Rex |
| 6,014,673 A | 1/2000 | Davis et al. ................. 707/202 | | 6,311,207 B1 | 10/2001 | Mighdoll et al. |
| 6,014,702 A | 1/2000 | King et al. | | 6,311,213 B2 | 10/2001 | Dawson et al. |
| 6,016,496 A | 1/2000 | Roberson | | 6,324,568 B1 | 11/2001 | Diec |
| 6,018,627 A * | 1/2000 | Iyengar et al. ............... 717/103 | | 6,327,574 B1 | 12/2001 | Kramer et al. |
| 6,021,406 A | 2/2000 | Kuznetsov | | 6,332,163 B1 | 12/2001 | Bowman-Amuah |
| 6,023,679 A | 2/2000 | Acebo et al. .................... 705/5 | | 6,334,146 B1 | 12/2001 | Parasnis et al. |
| 6,026,379 A | 2/2000 | Haller et al. | | 6,336,100 B1 | 1/2002 | Yamada |
| 6,031,533 A | 2/2000 | Peddada et al. ............. 345/733 | | 6,339,773 B1 | 1/2002 | Rishe |
| 6,043,815 A | 3/2000 | Simonoff et al. ............. 345/744 | | 6,343,290 B1 | 1/2002 | Cossins et al. |
| 6,044,382 A | 3/2000 | Martino | | 6,351,738 B1 | 2/2002 | Clark |
| 6,049,774 A | 4/2000 | Roy ............................... 705/8 | | 6,363,388 B1 | 3/2002 | Sprenger et al. |
| 6,049,832 A | 4/2000 | Brim et al. | | 6,370,523 B1 | 4/2002 | Anderson |
| 6,054,983 A | 4/2000 | Simonoff et al. ............. 345/738 | | 6,381,324 B1 | 4/2002 | Shaffer et al. |
| 6,058,179 A | 5/2000 | Shaffer et al. | | 6,381,603 B1 | 4/2002 | Chan et al. |
| 6,058,378 A | 5/2000 | Clark et al. | | 6,385,312 B1 | 5/2002 | Shaffer et al. |
| 6,061,665 A | 5/2000 | Bahreman | | 6,393,415 B1 | 5/2002 | Getchius et al. |
| 6,061,691 A | 5/2000 | Fox ........................ 707/104.1 | | 6,393,471 B1 | 5/2002 | Kobata |
| 6,064,973 A | 5/2000 | Smith et al. ..................... 705/7 | | 6,397,191 B1 | 5/2002 | Notani et al. |
| 6,070,142 A | 5/2000 | McDonough et al. .......... 705/7 | | 6,397,208 B1 | 5/2002 | Lee |
| 6,072,870 A | 6/2000 | Nguyen et al. | | 6,397,219 B2 | 5/2002 | Mills |
| 6,073,163 A | 6/2000 | Clark et al. | | 6,401,094 B1 | 6/2002 | Stemp et al. |
| 6,076,067 A | 6/2000 | Jacobs et al. ................... 705/7 | | 6,418,400 B1 | 7/2002 | Webber |
| 6,078,321 A | 6/2000 | Simonoff et al. | | 6,477,452 B2 | 11/2002 | Good |
| 6,078,322 A | 6/2000 | Simonoff et al. | | 6,542,912 B2 | 4/2003 | Meltzer et al. |
| 6,084,585 A | 7/2000 | Kraft et al. .................... 705/26 | | 6,567,783 B1 | 5/2003 | Notani et al. |
| 6,085,169 A | 7/2000 | Walker et al. | | 6,694,234 B2 | 2/2004 | Lockwood et al. |
| 6,085,170 A | 7/2000 | Tsukuda ...................... 345/733 | | 7,020,620 B1 | 3/2006 | Bargnes et al. |
| 6,088,677 A | 7/2000 | Spurgeon | | 7,050,986 B1 | 5/2006 | Vance et al. |
| 6,091,409 A | 7/2000 | Dickman et al. ............. 345/847 | | 7,136,821 B1 | 11/2006 | Kohavi et al. |
| 6,091,412 A | 7/2000 | Simonoff et al. ............. 345/749 | | 7,275,038 B1 | 9/2007 | Weinstock et al. |
| 6,091,810 A | 7/2000 | Shaffer et al. | | 7,328,166 B1 | 2/2008 | Geoghegan et al. |
| 6,094,640 A | 7/2000 | Goheen | | 2001/0005831 A1 | 6/2001 | Lewin et al. |
| 6,097,802 A | 8/2000 | Fleischer, III et al. | | 2001/0008998 A1 | 7/2001 | Tamaki et al. |
| 6,101,496 A | 8/2000 | Esposito | | 2001/0010058 A1 | 7/2001 | Mittal |
| 6,108,650 A | 8/2000 | Musk et al. | | 2001/0011222 A1 | 8/2001 | McLauchlin et al. |
| 6,112,185 A | 8/2000 | Walker et al. | | 2001/0011246 A1 | 8/2001 | Tammaro |
| 6,119,105 A | 9/2000 | Williams | | 2001/0014907 A1 | 8/2001 | Brebner |
| 6,119,149 A | 9/2000 | Notani | | 2001/0016825 A1 | 8/2001 | Pugliese, III et al. |
| 6,122,642 A | 9/2000 | Mehovic | | 2001/0016868 A1 | 8/2001 | Nakamura et al. |
| 6,125,384 A * | 9/2000 | Brandt et al. ................. 709/203 | | 2001/0018661 A1 | 8/2001 | Sato et al. |

| | | |
|---|---|---|
| 2001/0021912 A1 | 9/2001 | DeMarcken et al. |
| 2001/0027420 A1 | 10/2001 | Boublik et al. |
| 2001/0027483 A1 | 10/2001 | Gupta et al. |
| 2001/0029459 A1 | 10/2001 | Fujiwara |
| 2001/0032113 A1 | 10/2001 | Rudnick |
| 2001/0032273 A1 | 10/2001 | Cheng |
| 2001/0037224 A1 | 11/2001 | Eldridge et al. |
| 2001/0037255 A1 | 11/2001 | Tambay et al. |
| 2001/0037298 A1 | 11/2001 | Ehrman et al. |
| 2001/0037331 A1 | 11/2001 | Lloyd |
| 2001/0044811 A1 | 11/2001 | Ballantyne et al. |
| 2001/0056361 A1 | 12/2001 | Sendouda |
| 2002/0004796 A1 | 1/2002 | Vange et al. |
| 2002/0007289 A1 | 1/2002 | Malin et al. |
| 2002/0010781 A1 | 1/2002 | Tuatini |
| 2002/0019821 A1 | 2/2002 | Rosenbluth |
| 2002/0022979 A1 | 2/2002 | Whipp et al. |
| 2002/0026337 A1 | 2/2002 | Sasaki |
| 2002/0032626 A1 | 3/2002 | DeWolf et al. |
| 2002/0032790 A1 | 3/2002 | Linderman |
| 2002/0035488 A1 | 3/2002 | Aquila et al. |
| 2002/0040352 A1 | 4/2002 | McCormick |
| 2002/0042843 A1 | 4/2002 | Diec |
| 2002/0042849 A1 | 4/2002 | Ho et al. |
| 2002/0046213 A1 | 4/2002 | Vinati et al. |
| 2002/0046294 A1 | 4/2002 | Brodsky et al. |
| 2002/0046301 A1 | 4/2002 | Shannon et al. |
| 2002/0049603 A1 | 4/2002 | Mehra et al. |
| 2002/0062262 A1 | 5/2002 | Vasconi et al. |
| 2002/0069123 A1 | 6/2002 | Soderlind et al. |
| 2002/0072937 A1 | 6/2002 | Domenick et al. |
| 2002/0072938 A1 | 6/2002 | Black et al. |
| 2002/0073012 A1 | 6/2002 | Lowell et al. |
| 2002/0073236 A1 | 6/2002 | Helgeson et al. |
| 2002/0076029 A1 | 6/2002 | Shaffer et al. |
| 2002/0077871 A1 | 6/2002 | Udelhoven et al. |
| 2002/0082912 A1 | 6/2002 | Batachia et al. |
| 2002/0083095 A1 | 6/2002 | Wu et al. |
| 2002/0083099 A1 | 6/2002 | Knauss et al. |
| 2002/0091533 A1 | 7/2002 | Ims et al. |
| 2002/0095319 A1 | 7/2002 | Swart et al. |
| 2002/0099562 A1 | 7/2002 | Bruce, Sr. et al. |
| 2002/0099575 A1 | 7/2002 | Hubbard et al. |
| 2002/0099613 A1 | 7/2002 | Swart et al. |
| 2002/0099735 A1 | 7/2002 | Schroeder et al. |
| 2002/0099738 A1 | 7/2002 | Grant |
| 2002/0106069 A1 | 8/2002 | Shaffer et al. |
| 2002/0107918 A1 | 8/2002 | Shaffer et al. |
| 2002/0111846 A1 | 8/2002 | Singer |
| 2002/0111876 A1 | 8/2002 | Rudraraju et al. |
| 2002/0116205 A1 | 8/2002 | Ankireddipally et al. |
| 2002/0116454 A1 | 8/2002 | Dyla et al. |
| 2002/0120459 A1 | 8/2002 | Dick et al. |
| 2002/0120776 A1 | 8/2002 | Eggebraaten et al. |
| 2002/0129021 A1 | 9/2002 | Brown |
| 2002/0133359 A1 | 9/2002 | Brown |
| 2002/0133517 A1 | 9/2002 | Carlson et al. |
| 2002/0136381 A1 | 9/2002 | Shaffer et al. |
| 2002/0143644 A1 | 10/2002 | Tosun et al. |
| 2002/0152100 A1 | 10/2002 | Chen et al. |
| 2002/0156693 A1 | 10/2002 | Stewart et al. |
| 2002/0156865 A1 | 10/2002 | Rajarajan et al. |
| 2002/0169842 A1 | 11/2002 | Christensen et al. |
| 2002/0178087 A1 | 11/2002 | Henderson et al. |
| 2002/0184054 A1 | 12/2002 | Cox et al. |
| 2002/0184266 A1 | 12/2002 | Blessin |
| 2002/0188761 A1 | 12/2002 | Chikirivao et al. |
| 2002/0194219 A1 | 12/2002 | Bradley et al. |
| 2002/0198743 A1 | 12/2002 | Ariathurai et al. |
| 2003/0004822 A1 | 1/2003 | Shorter et al. |
| 2003/0009545 A1 | 1/2003 | Sahai et al. |
| 2003/0014270 A1 | 1/2003 | Qureshi et al. |
| 2003/0014295 A1 | 1/2003 | Brookes et al. |
| 2003/0018666 A1 | 1/2003 | Chen et al. |
| 2003/0023450 A1 | 1/2003 | Casati et al. |
| 2003/0028404 A1 | 2/2003 | Herron et al. |
| 2003/0028533 A1 | 2/2003 | Bata et al. |
| 2003/0036917 A1 | 2/2003 | Hite et al. |
| 2003/0036930 A1 | 2/2003 | Matos et al. |
| 2003/0036966 A1 | 2/2003 | Amra et al. |
| 2003/0041180 A1 | 2/2003 | Schlussman |
| 2003/0114967 A1 | 6/2003 | Good |
| 2003/0125992 A1 | 7/2003 | Rogers et al. |
| 2003/0149600 A1 | 8/2003 | Williams |
| 2003/0154111 A1 | 8/2003 | Dutra et al. |
| 2004/0054600 A1 | 3/2004 | Shike et al. |
| 2005/0021378 A1 | 1/2005 | Weinstock et al. |
| 2005/0091087 A1 | 4/2005 | Smith et al. |
| 2005/0187833 A1 | 8/2005 | Royer et al. |
| 2005/0246206 A1 | 11/2005 | Obora et al. |
| 2007/0174081 A1 | 7/2007 | Smith et al. |
| 2007/0198311 A1 | 8/2007 | Menendez et al. |
| 2007/0260496 A1 | 11/2007 | Weinstock et al. |
| 2007/0271124 A1 | 11/2007 | Weinstock et al. |
| 2007/0271125 A1 | 11/2007 | Weinstock et al. |
| 2008/0010105 A1 | 1/2008 | Rose et al. |
| 2008/0097798 A1 | 4/2008 | DeVallance et al. |
| 2008/0133281 A1 | 6/2008 | Bolt et al. |
| 2008/0140460 A1 | 6/2008 | Smith et al. |
| 2008/0162199 A1 | 7/2008 | Smith et al. |
| 2008/0243562 A1 | 10/2008 | Weinstock et al. |
| 2008/0243563 A1 | 10/2008 | Weinstock et al. |
| 2008/0249814 A1 | 10/2008 | Weinstock et al. |
| 2009/0030747 A1 | 1/2009 | Smith et al. |
| 2010/0023352 A1 | 1/2010 | Smith et al. |

FOREIGN PATENT DOCUMENTS

| | | |
|---|---|---|
| JP | 02001344490 A | 12/2001 |
| WO | WO 99/66738 | 12/1999 |
| WO | 0052601 A1 | 9/2000 |
| WO | WO 01/97072 | 12/2001 |
| WO | 0221314 A2 | 3/2002 |
| WO | WO 02/29675 | 4/2002 |
| WO | 02057873 | 7/2002 |
| WO | 02067079 | 8/2002 |
| WO | 02080646 | 10/2002 |

OTHER PUBLICATIONS

James T. Yenckel, Feb. 11, 1996, For This Cyberspace Visitor, Once Is More Than Enough, The Washington Post (Pre-1997 Fulltext), ISSN 01908286, p. E.01.*

Business Wire, May 7, 1998; "Cendent's Real Estate Subsidiaries Create On-line Cross-Marketing Alliance With Rent Net; Coldwell Banker, Century 21 and ERA Join Forces With Sister Company, Rent Net" pp. 1-3.*

Matt Darrah, Feb. 1999, Hi-tech streamlines car rental process, vol. 66, Iss. 2, p. 29.*

10K Report, Jan. 31, 1994, Agency Rent-a-car Inc, Report No. 0127651, p. 4 or 54, Section Heading: Part I, Item 1. Business.*

Travel Agent, Oct. 2, 1995, Many Ways to Sell, vol. 0, No. 0, p. 36.*

Car Temps MPOWERENT Instruction Manual; publication date unknown.

Car Temps DIRECT Information; publication date unknown.

CarTemps Rent-A-Car; "MPOWERENT Management System"; Copyright 2000; publication date unknown.

St. Louis Business Journal; "E-commerce Department Director Answers Questions about TWA.com"; Aug. 28, 2000; St. Louis, Missouri.

Reeves; Travel Web Site Expedia's Shares Take Off During Initial Offering; Denver Post; Nov. 11, 1999; p. C-02, entire document.

U.S. Appl. No. 09/596,024, filed Jun. 15, 2000, Shaffer et al.

U.S. Appl. No. 09/678,752, filed Oct. 3, 2000, Shaffer et al.

"Information on Hertz Corporation"; Sep. 24, 2002; pp. 1-61.

"Welcome to the Hertz Interactive Reservation Process"; Mar. 3, 2000; pp. 62-27.

"All Open Orders for Customer No. 218556"; Motorola Corporation; Nov. 23, 1999.
Nelson, Stephen L.; Quicken 99 for Windows for Dummies; IDG Books Worldwide, Inc.; 1998; pp. 114, 122-124.
U.S. Appl. No. 60/194,128, Aquila.
Enterprise Computer Assisted Rental System Workbook, Sep. 1997.
Enterprise Computer Assisted Rental System Workbook, Dec. 1996.
Enterprise Rent-A-Car Company, ECARS Workbook, Dec. 1996.
ECARS—Enterprise Computer Assisted Rental System, AACJ01 Callbacks, pp. 1-9, Jul. 1, 1997.
ARMS/400 Update, p. 1-7, Jan. 7, 2000.
Enterprise Rent-A-Car Company, Automated Rental Management System (ARMS), Version 1.1, Jan. 5, 1994.
Enterprise Rent-A-Car Company, Automated Rental Management System (ARMS), Version 1, Apr. 12, 1993.
ARMS Electronic Callback System Demonstration, pp. 1-22, 1998.
PC/ARMS Demonstration, pp. 1-45, 1995.
ARMS/400 User Manual, 1999.
Enterprise Rent-A-Car Company, ARMS, Automated Rental Management System, pp. 1-36.
1997 Rental Systems Manual, 1997.
A Call to ARMS, 1996.
AACB35 Fax Display, pp. 1-5.
AACM07, Customer Add/Update, Revised Documentation, pp. 1-12, Sep. 17, 2001.
AAGP12, Group/Branch Name and Address Add/Update, pp. 1 through 2-8, Nov. 19, 1999.
AAPW01 Update Code Maintenance, Jul. 1, 1999, pp. 1-25.
ABC Insurance Company/EngineRoar, pp. 1-2.
ARMS 400 Demonstration, p. 1-67.
ARMS Claims Internet Quick Reference Guide, Oct. 1999.
ARMS Overview, pp. 1-10.
ARMS Technology, Jul. 2000.
ARMS/400—Automated Rental Management System, pp. 1-8, 1995.
ARMS/400—ERAC Employee Reference, pp. 1-10.
ARMS/400 Main Menu Flow, pp. 1-20.
ARMS/400 Manual.
ARMS/400 Training System Document, Nov. 16, 1998.
ARMS/400 Update, Mar. 15, 2000, pp. 1-4.
ARMS/400 Update, pp. 1-6.
ARMS/400 User Training, Jul. 2000, pp. 1-26.
ARMS/ECARS Handbook for Arms/Claims Developers, pp. 1-19.
ARMS/Web User Training, pp. 1-38, Jul. 18, 2000.
ARMS/Web Using Jacada, Oct. 13, 1999, pp. 1-13.
Automated Rentals, Unwrapped, pp. 1-7, Oct. 1995.
Bluebird Auto Rental Systems, "Are You Buried Under an Evergrowing Mountain of Paper?".
Bluebird Auto Rental Systems, Business Description & Products.
Car Rental Insider, May 1997, pp. 1-4.
Close Pending Ticket Report (All Tickets pended for 5 days or more), Job #579, DR0018, Apr. 3, 1996, pp. 1-2.
CST, May 6, 1999, pp. 1-18.
Customer Account Services, AACB45.
D.P. General Use Programs, AACB10 Consolidated Callback Maintenance, Apr. 1994, pp. 1-4.
D.P. General Use Programs, AACM12, ECARS—Special Instructions/Rates/Rate Rules, Jun. 1993, pp. 1-5.
Data Warehouse & Analyzer Quick Sheet, Jun. 2000, pp. 1-2.
Dollar Rent a Car Systems, Inc., pp. 1-5, 1998.
ECARS 2000 Customer Profile, Chapters 1-16.
ECARS Backdated Ticket Report, Job #043/DR0099, Mar. 1996, pp. 1-2.
eINFO, Data Warehouse, Oct. 1999.
Email exchange between Ken Keller and David Smith, Jun. 4, 1997.
EngineRoar.com, pp. 3-76.
Enterprise Network and Physical Connections Overview, 1995, pp. 1-5.
Enterprise Rent-A-Car Company, AACM27/AACM28, Overview, pp. 1-8, Nov. 22, 1999.
Enterprise Rent-A-Car Company, ARMS Basics and Concepts, vol. 1, Chapter 1-4, Feb. 24, 1998.
Enterprise Rent-A-Car Company, ARMS Basics and Concepts, vol. 1, Chapters 1-4, Jun. 10, 1998.
Enterprise Rent-A-Car Company, ARMS Technical Document (ATD Internal), pp. 1-40, Aug. 2, 1993.
Enterprise Rent-A-Car Company, Functional Specification, pp. 1-2, Nov. 1999.
Enterprise Rent-A-Car Customer Profile Data Form, pp. 1-14.
Enterprise Rent-A-Car, ARMS Online Reporting, Project Charter, Version 1.0, Aug. 20, 1999, pp. 1-7.
Everything You Need to Know About ARMS Automotive, 2000, pp. 1-8.
Future State Summary, Jun. 1999, pp. 1-8.
http://www.eautoclaims.com, pp. 1-11, Apr. 8, 2000.
http://www.hertz.com/InteractionRes/htm/isexckge.htm, pp. 1-2, Mar. 20, 1997.
Introducing ARMS Claims, Jun. 2000, pp. 1-6.
IS General Use Programs—Section 15, AACB40, Overview, pp. 1-16, Jun. 22, 2000.
IS General Use Programs—Section 19, AACB34 Callback Fax Customization, Mar. 5, 1998.
Jacada Implementation Methodology, pp. 1-10, May 12, 1999.
Jacada, Chicago Executive Briefing, Nov. 4, 1999, pp. 1-13.
Kenyon, Stephanie, "20 Tips for an Effective Web Site", ASTA Agency Management, Jan. 1999.
Lone Star Rental Systems, EZ Traker™, Your Complete Auto Rental Management Solution.
Lorentz, Jeff, Functional Specification, Internet Application Development, ARMS Automotive, pp. 1-3.
Marino, Donna, "Internet Experts Urge Development of E-Commerce Models", ASTA Agency Management, Jan. 1999, pp. 32-34.
McKeown, Rosemary, "The Right Computer System Adds to Your Revenue", Computer Systems, pp. 1-4.
Memorandum re Sabre Meeting, Rob Hibbard to Scott Shuler, Sep. 21, 1998.
Milligan, Michael, "OTA targets mid-January to release e-commerce protocol", Travel Weekly, Jan. 10, 2000.
Net rentacar.com User Guide, pp. 1-19.
Open Travel Alliance, "ebXML Uses Opentravel Alliance Specification for Early Tests", May 10, 2000.
Open Travel Alliance, "Open Travel Alliance Joins Forces with DISA", Sep. 9, 1999.
Open Travel Alliance, "Open Travel Alliance Names Board Officers", Sep. 2, 1999.
Open Travel Alliance, "OpenTravel Alliance's New XML Specification Creates a Common Customer Profile for Travelers", Feb. 29, 2000.
Open Travel Alliance, "White Paper", pp. 1-20, Feb. 2000.
Orion Systems, Ltd., pp. 1-36.
Orion Systems, Ltd., System Overview and Handheld Terminals, downloaded from www.orsys.com on Dec. 1, 1997, pp. 1-5.
Orion Systems, Ltd., System Overview with Screens and Reports, May 1996.
Our Packages Come in All Sizes!, Nov. 1999, pp. 1-2.
PGMR, ECARS—Enterprise Computer Assisted Rental System, pp. 1-4.
Preview Travel, Inc., Car Reservations, 1999.
Rental 101, pp. 1-30.
Rental Redesign Requirements—Contract Process, pp. 1-5, Feb. 16, 2000.
Rental Redesign Requirements Contract, pp. 1-56, Feb. 15, 2000.
Rental Redesign, Rental Management, RMS (Rental Management Services), Sep. 30, 1998, pp. 1-2.
Rosen, Cheryl, "OTA Debuts Data Protocol", Business Travel News, Jan. 10, 2000.
Rosen, Cheryl, "OTA Publishes XML Data Standard", Business Travel News, pp. 1-2, Mar. 20, 2000.
The ARMS Connection, Safeco/Enterprise Rent-A-Car, pp. 1-4.
The Connection, State Farm Insurance/Enterprise Rent-A-Car, Rental Process Automation and Procedures, pp. 1-3.
The Hertz Corporation, 1998.
TSD Brochure, "Are You Comparing Apples to Apples When Choosing Rental Software",p. 1-3.

TSD Brochure, RENT 2000 from TSD, Rental Management Software, Revolutionize the Way You Do Business, p. 1-29.
TSD Brochure, Rent 2000 from TSD, Rental Management Software, Revolutionize the Way You Do Business with the Proven Solution, p. 1-2.
Warner, Fara, "Car Race in Cyberspace".
Welcome to ARMS/400, New York State Rollout and Implementation Session, Oct. 28, 1999, pp. 1-51.
Welcome to the Data Warehouse, Jun. 2000, pp. 1-2.
Interactions, vol. 1, No. 3, Jul. 1992.
Interactions, Special Edition, vol. 1, No. 4, Aug. 1992.
Interactions, vol. 1, No. 5, Sep. 1992.
Interactions, Special Edition, Nov. 1992.
Interactions, vol. 1, No. 8, Dec. 1992.
Interactions, vol. 2, No. 1, Jan. 1993.
Interactions, vol. 2, No. 5, May 1993.
Interactions, vol. 2, No. 7, Jul. 1993.
Interactions, vol. 2, No. 8, Aug. 1993.
Interactions, vol. 2, No. 11, Oct. 1, 1993.
Interactions, vol. 2, No. 13, Nov. 1, 1993.
Interactions, vol. 2, No. 14, Nov. 15, 1993.
Interactions, Published especially for our Farmers adjusters, 1994.
Interactions, vol. 3, No. 1, Jan. 1, 1994.
Interactions, vol. 3, No. 1, Jan. 15, 1994.
Interactions, ARMS, vol. 3, No. 6, Mar. 15, 1994.
Interactions, vol. 3, No. 8, Apr. 15, 1994.
Interactions, vol. 3, No. 10, May 15, 1994.
Interactions, vol. 3, No. 11, Jun. 1, 1994.
Interactions, vol. 3, No. 12, Jun. 15, 1994.
Interactions, vol. 3, No. 14, Jul. 15, 1994.
Interactions, vol. 3, No. 15, Aug. 1, 1994.
Interactions, vol. 3, No. 16, Aug. 15, 1994.
Interactions, vol. 3, No. 21, Nov. 1, 1994.
Interactions, vol. 3, No. 23, Dec. 1, 1994.
Interactions, vol. 4, No. 3, Feb. 1, 1995.
Interactions, "Electronic Connections", p. 3, Mar. 15, 1995.
Interactions, vol. 4, No. 6, Mar. 15, 1995.
Interactions, vol. 4, No. 9, May 1, 1995.
Interactions, vol. 4, Issue 14, Jul. 15, 1995.
Interactions, vol. 4, Issue 16, Aug. 15, 1995.
Interactions, vol. 4, Issue 19, Oct. 1, 1995.
Interactions, vol. 4, Issue 21, Nov. 1, 1995.
Interactions, vol. 4, Issue 24, Dec. 15, 1995.
Interactions, vol. 5, Issue 1, Jan. 1, 1996.
Interactions, vol. 5, Issue 2, Jan. 15, 1996.
Interactions, vol. 5, Issue 4, Feb. 15, 1996.
Interactions, vol. 5, Issue 13, Oct. 1, 1996.
Interactions, vol. 5, Issue 14, Nov. 1, 1996.
Interactions, ARMS Update, vol. 6, Issue 2, Feb. 1997.
Interactions, vol. 6, Issue 8, Aug. 1997.
Interactions, vol. 6, Issue 12, Dec. 1997.
Interactions, vol. 7, Issue 1, Jan. 1998.
Interactions, vol. 7, Issue 5, May 1998.
Interactions, vol. 7, Issue 7, Jul. 1998.
Interactions, vol. 7, Issue 8, Aug. 1998.
Interactions, vol. 7, Issue 12, Dec. 1998.
Interactions, vol. 8, Issue 7, Jul. 1999.
Interactions, vol. 8, Issue 8, Aug. 1999.
Interactions, vol. 8, Issue 9, Sep. 1999.
Interactions, vol. 9, Issue 2, Feb. 2000.
Interactions, vol. 9, Issue 3, Mar. 2000.
Interactions, vol. 9, Issue 5, May 2000.
Internet Networking Architecture, 1999.
Enterprise Rent-A-Car Arms—Vehicle Messaging System, Project Charter, Oct. 15, 1998, pp. 1-7.
GUI ARMS/400 Development, pp. 1-2, 1999.
CIO Magazine 2002 Enterprise Value Awards Application, pp. 4-10, 2002.
Weinstock, Tim, ARMS/Web is Coming, pp. 1-2, Aug. 13, 1999.
GUI ARMS/400 Development Project Approach.
Enterprise Rent-A-Car Company ARMS—Vehicle Messaging System Overview, May 16, 2001, p. 1-35.
Enterprise Rent-A-Car Company ARMS—Vehicle Messaging System Phase II Project Charter, Aug. 20, 1999, p. 1-6.
"Additional Internet Efforts Will Propel Every Segment of Our Business", Free Enterprise, Summer 1999, p. 13.
ARMS/400 Automated Rental Management System, Copyright 1999.
ARMS/400 Automated Rental Management System, Copyright 1998.
ARMS/400 Automated Rental Management System, Version 3, Feb. 1997.
The Jacada User Guide: Jacada for Java, Version 6.0, CST Catalog UG-213-0799, $1^{st}$ Ed., Jul. 1999.
Planning and Managing a Project, Version 5.3, CST Catalog UG-184-1198, $1^{st}$ Ed., Nov. 1998, pp. 1-90.
Interoffice Memorandum re ARMS Outline, Oct. 7, 1999, pp. 1-2.
EnterpriseRent-A-Car Rental Application Development and Support Project Request, Jul. 6, 1999, pp. 1-2.
Enterprise Rent-A-Car Rental Application Development and Support Project Request, Jul. 12, 1999, pp. 1-3.
King, Jeff and Estes, Steve, Enterprise Rent-A-Car ARMS Web-enabled Management Reporting System initial Project Analysis & Options, Jul. 23, 1999, pp. 1-7.
Email from Angela Babin, Jun. 22, 1999, single page.
Edlund, Al, "How Thin Clients Lead to Fat Networks", Business Communications Review, Jul. 1998, pp. 28-31.
Declaration of Timothy Weinstock, which was submitted in the parent U.S. Appl. No. 09/641,820 and received by the USPTO on Jan. 17, 2006 for the parent U.S. Appl. No. 09/641,820.
"Rental Management for Vehicle Replacement Rentals", National Electronic Data Interchange Transaction Set Implementation Guide, 272/824, Jul. 2000.
"Rental Management Invoicing and Application Advice for Vehicle Replacement Rentals", National Electronic Data Interchange Transaction Set Implementation Guide, 811/824, Jul. 2000.
"Rental Management Remittance Advice for Vehicle Replacement Rentals", National Electronic Data Interchange Transaction Set Implementation Guide, 820, Jul. 2000.
CLIP, "Serylets: CGI the Java Way", Byte, May 1, 1998, pp. 55-56, vol. 23, No. 5, McGraw-Hill, Inc., St. Peterborough, US.
Darrah, "Hi-Tech Streamlines Car Rental Process", Feb. 1999, p. 29, vol. 66, Issue 2.
Declaration of William G. Tingle, including Exhibits A-F, filed Jan. 12, 2006 in U.S. Appl. No. 09/641,820.
Kiplinger's Money Power; "Booking a room, vehicle for vacation via the 'Net"; Copyright May 2, 1997; Chronicle Publishing Company; Downloaded from the Internet on Apr. 7, 2002.
Office Action for CA Application No. 2416840 dated Jan. 7, 2005.
Office Action for CA Application No. 2416840 dated Mar. 5, 2010.
Office Action for EP Application No. 01273072.7 dated Apr. 11, 2004.
Response to Office Action for CA Application No. 2416840 dated Jul. 7, 2005.
Response to Office Action for EP Application No. 01273072.7 dated Aug. 30, 2005.
U.S. Appl. No. 09/564,911, filed May 4, 2000 (Williams).
U.S. Appl. No. 09/698,491, filed Oct. 27, 2000 (Menendez).
U.S. Appl. No. 09/698,502, filed Oct. 27, 2000 (Menendez).
U.S. Appl. No. 09/698,552, filed Oct. 27, 2000 (Menendez).

* cited by examiner

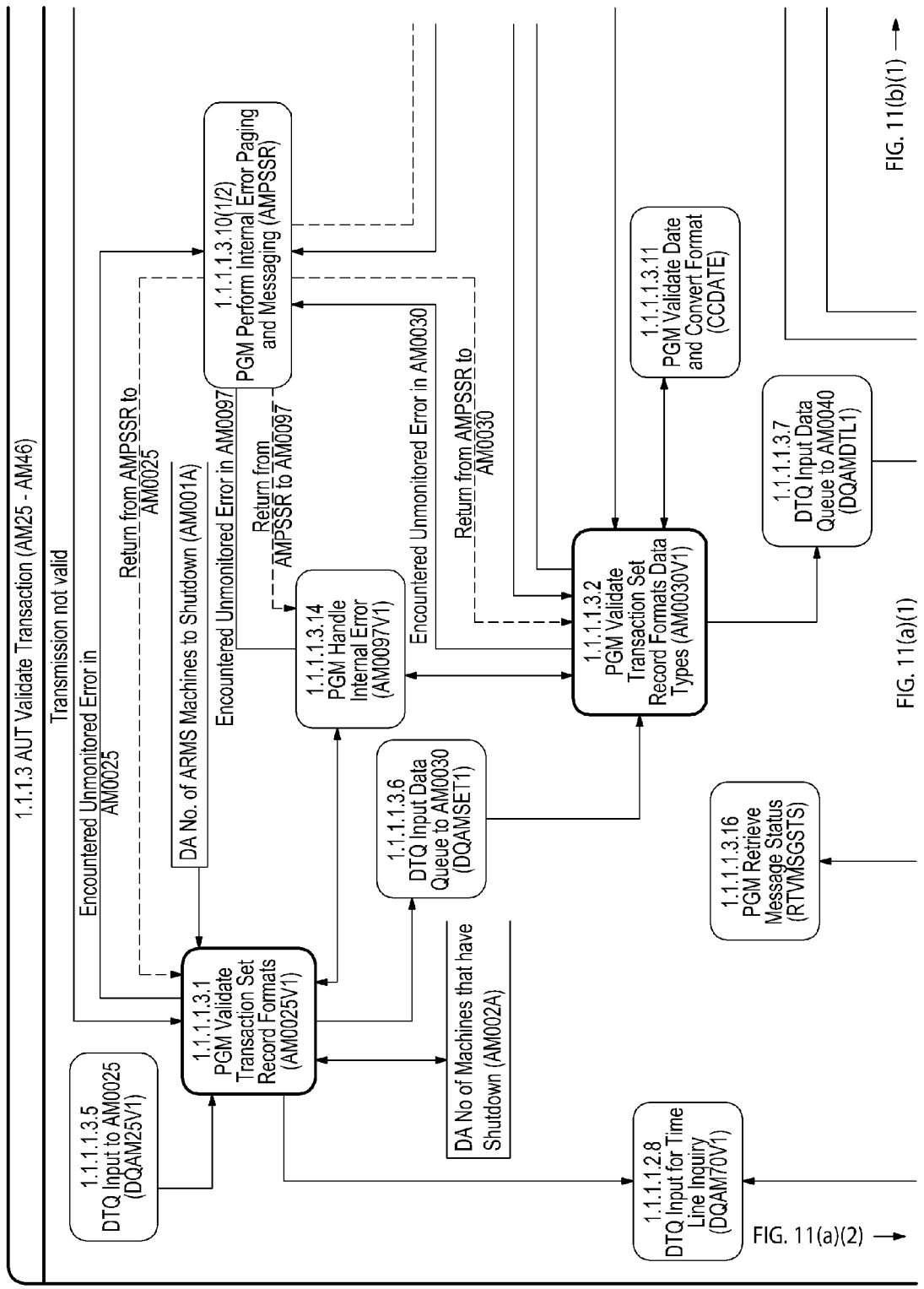

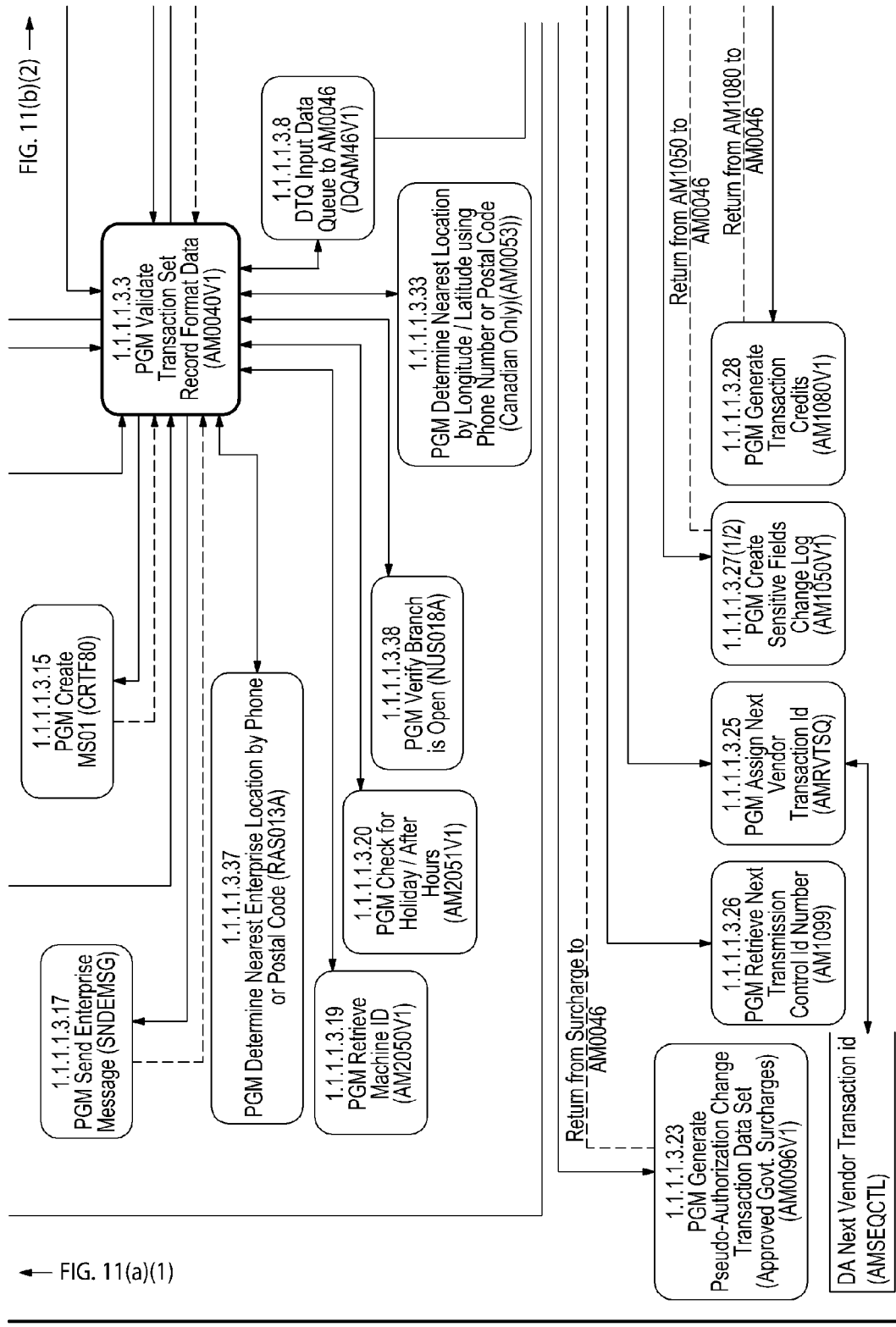

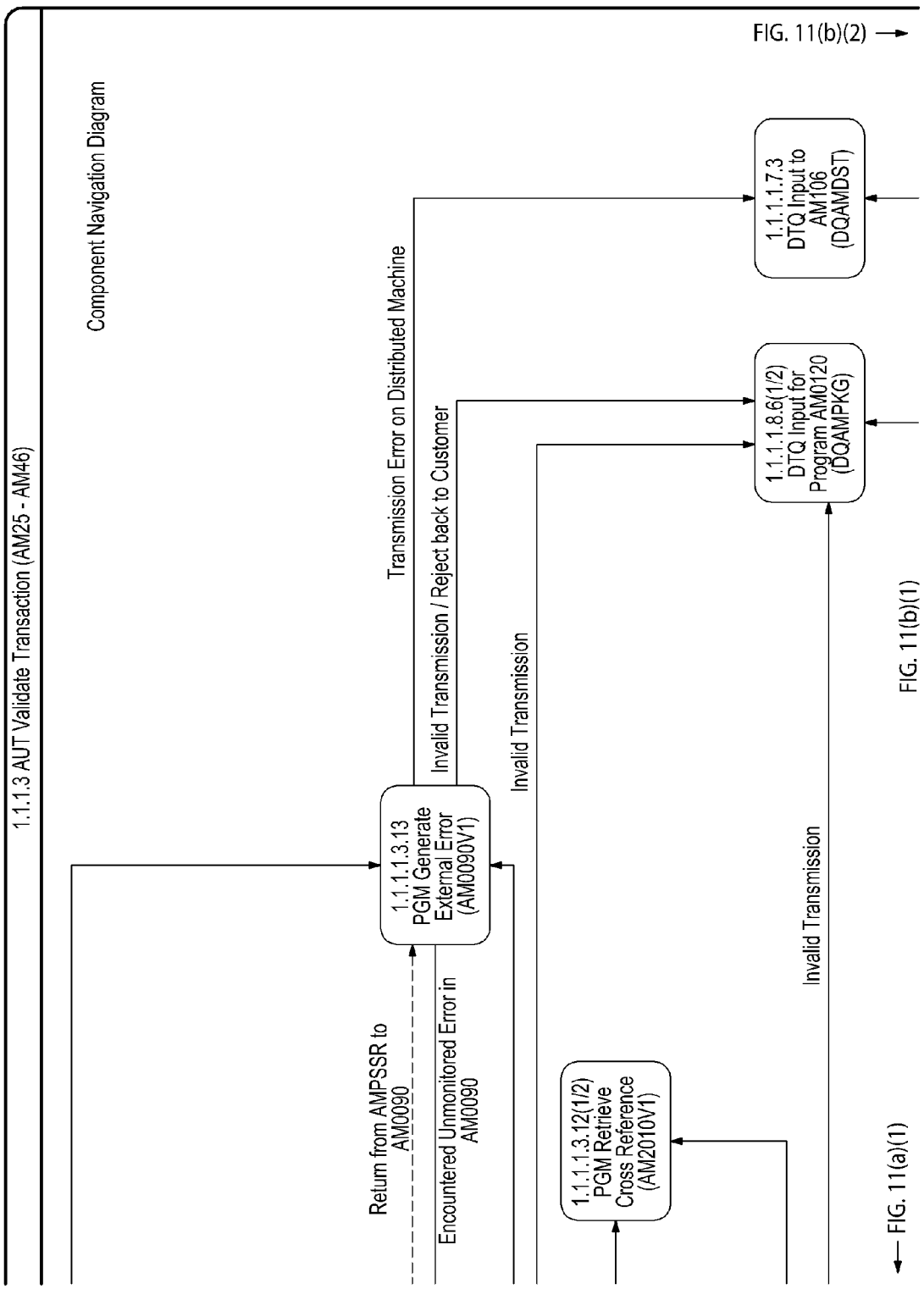

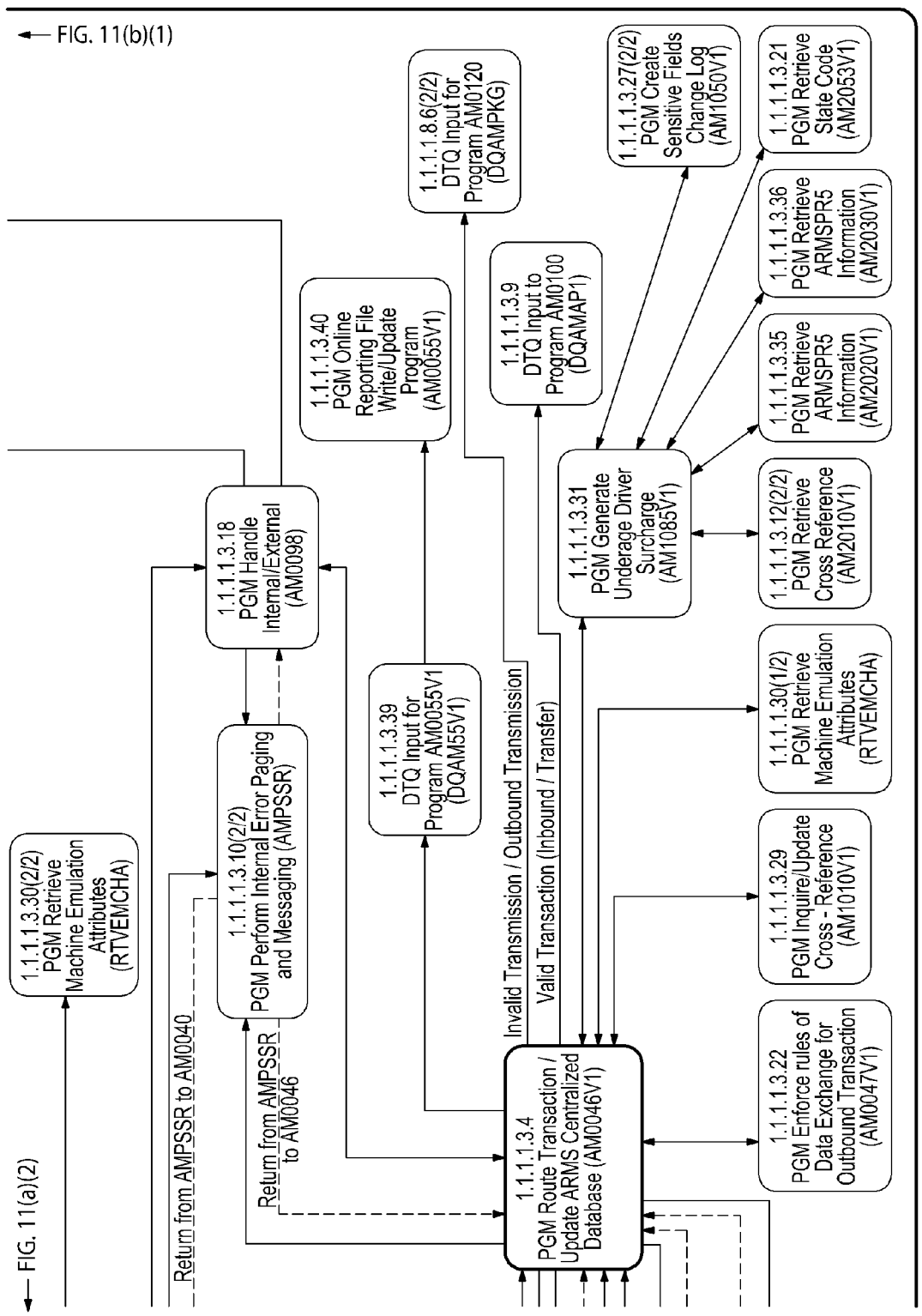

ARMS/Web 2.0

Welcome to the
Automated Rental Management System

| create a RESERVATION | find a CUSTOMER | action items | completed actions | reports | my profile | help |

Claims office: 001    Handling for: Self    [TRANSFER FILE]

You just authorized 3 day at $29.39/day for Hanks, Tom

EXTEND RENTAL: for Bowie, David  Claim no. 765849322-001
CUSTOMER FILE 2 of 4 Action Items Extension requested for:

[3] additional authorized days @ [Compact/21.95 ▼] [VIEW CARS]

Policy Limits [20/500 ▼]

Note to Enterprise:

Note to Self Only:

Rental Status*
Last Authorized Date:     5/15/00
Rental Start Date:        4/13/00
Days Authorized to Date:  5 days
Policy Limits:            $259.00
Charges to Date:          $239.00
Direct Bill %:            100%

Messages:  5/01/00 Body Shop said waiting for fender from vendor
4/14/00 Body Shop on quote Go to Notebook

[LAST DAY] [PROCESS] [SKIP >>]

[Change or Add]

RENTER INFORMATION
Bowie, David
1735 N. Paulina St.
Chicago, IL 60622

Home: (773)564-6054
Work: (773)395-6200
Email: dbowie@zefer.com
Requested email confirmation RENTAL INFORMATION
Authorized Class: Standard
Days/Rate: 5 days @ $21.99/day
Current Class: Full-Size
Additional Charges: None
Direct Bill %: None
Rental Date: 03/28/2000
Start Date: 03/20/2000

Enterprise Rent-A-Car Location:
Enterprise Edgewater Branch
5400 N. Ashland
Chicago, IL60622
773-334-5400

ADDITIONAL CLAIM INFORMATION
Claim Number: 32323232323232323
Claim Type: Theft
Insured Name: Lalumandier, Craig
Owner's vehicle: GMC Suburban 1999
Date of Loss: 03/28/2000
Loss Type: Non-Driveable
Policy: Daily rate/
Maximum dollars: 30/600

Repair Location:
Elco Chevrolet
Chicago, IL 60621
(773)334-9832

NOTEBOOK:
Message, Belanger, Hugues, 2/20/00
Note from Enterprise, Sarussi, Marty, 2/21/00
Extension Request, 2/24/00
Extension, 2/25/00

● top of page    Contact Us | Terms & Conditions

FIG. 93(a)

(Insurance User)

[Change or Add]

RENTER INFORMATION:
Bowie, David
1735 N. Paulina St.
Chicago, IL 60622

Home: (773)564-6054
Work: (773)395-6200
Email: dbowie@zefer.com
Requested email confirmation RENTAL INFORMATION:
Authorized Class: Standard
Days/Rate: 5 days @ $21.99/day
Current Class: Full-Size
Additional Charges: None
Direct Bill %: None
Rental Date: 03/28/2000
Start Date: 03/20/2000

Rental Location:
Enterprise Edgewater Branch
5400 N. Ashland
Chicago, IL60622
773-334-5400

ADDITIONAL CLAIM INFORMATION:
Claim Number: 32323232323232323
Claim Type: Theft
Insured Name: Lalumandier, Craig
Owner's vehicle: GMC Suburban 1999
Date of Loss: 03/28/2000
Loss Type: Non-Driveable
Policy: Daily rate/
Maximum dollars: 30/600

Repair Location:
Elco Chevrolet
Chicago, IL 60621
(773)334-9832

NOTEBOOK:
Message, Belanger, Hugues, 2/20/00
Note from Enterprise, Sarussi, Marty, 2/21/00
Extension Request, 2/24/00
Extension, 2/25/00

● top of page  Contact Us | Terms & Conditions | Log Off

FIG. 93(b)

(Fleet User)

```
┌─────────────────────────────────────────────────────────────────────────────┐
│   ┌─────────────┐              Welcome to the                               │
│   │             │          Automated Rental Management System               │
│   └─────────────┘                                                           │
│  ╱create a ╲╱ find a ╲  ╱ action items │ completed actions │ reports │ my profile │ help ╲
│ ╱RESERVATION╲CUSTOMER╲                                                      │
│                         Claims office: 001    Handling for: Yourself   [TRANSFER FILE] │
│  You just authorized 3 day at $29.39/day for Hanks, Tom                    │
│  EXTEND RENTAL: for Bowie, David  Claim no. 765849322-001                  │
│     CUSTOMER FILE                                              2 of 4 Action Items │
│  ┌──────────────────────────────────────────────────────────────────────┐  │
│  │ Extension requested for:                    Note to Rental Company:  │  │
│  │                                                                       │  │
│  │  ☐ additional authorized days @ [Compact/21.95 ▼] [VIEW CARS]  [▼]   │  │
│  │                                                                 [▲]   │  │
│  │            Policy Limits [20/500 ▼]                                  │  │
│  │  Messages:                                                            │  │
│  │  08/31/00 BSS 2 more days + Waiting on Parts:                        │  │
│  │  08/30/00 Waiting on fender:                                          │  │
│  │  08/29/00 Extension requested through 08/30/00:                      │  │
│  │  3 days extension requested:              Rental Location:           │  │
│  │  Go to Notebook                           Enterprise Edgewater Branch │  │
│  │                                           773-334-5400                │  │
│  │  Current Rental Status*                   Repair Facility:            │  │
│  │  Rental Start Date:      5/15/00          Elco Chevrolet              │  │
│  │  Last Authorized Date:   04/13/00         (773)-334-9832              │  │
│  │  Authorized to Date:     5 days           Owner Vehicle: 1999 GMC Suburban │
│  │  Charges to Date:        $239.00                                      │  │
│  │                                               ☐ Extend this rental?   │  │
│  │  *Does not include taxes and surcharges   [LAST DAY][PROCESS][SKIP >>]│  │
│  └──────────────────────────────────────────────────────────────────────┘  │
```

[Change or Add]

RENTER INFORMATION:
Bowie, David
1735 N. Paulina St.
Chicago, IL 60622

Home: (773)564-6054
Work: (773)395-6200
Email: dbowie@zefer.com
Requested email confirmation RENTAL INFORMATION:
Authorized Class: Standard
Days/Rate: 5 days @ $21.99/day
Current Class: Full-Size
Additional Charges: None
Rental Date: 03/28/2000
Start Date: 03/20/2000

Rental Location:
Enterprise Edgewater Branch
5400 N. Ashland
Chicago, IL60622
773-334-5400

ADDITIONAL CLAIM INFORMATION:
Claim Number: 32323232323232323
Claim Type: Theft
Insured Name: Lalumandier, Craig
Owner's vehicle: GMC Suburban 1999
Date of Loss: 03/28/2000
Loss Type: Non-Driveable
Policy: Daily rate/
Maximum dollars: 30/600

Repair Location:
Elco Chevrolet
Chicago, IL 60621
(773)334-9832

NOTEBOOK:
Message, Belanger, Hugues, 2/20/00
Note from Enterprise, Sarussi, Marty, 2/21/00
Extension Request, 2/24/00
Extension, 2/25/00

● top of page        Contact Us | Terms & Conditions | Log Off

FIG. 93(c)

(Dealership User)

Welcome to the Automated Rental Management System

| create a RESERVATION | find a CUSTOMER | action items | completed actions | reports | my profile | help |

Claims office: 001   Handling for: Yourself   [TRANSFER FILE]

You just authorized 3 day at $29.39/day for Hanks, Tom

EXTEND RENTAL: for Bowie, David  Claim no. 765849322-001
CUSTOMER FILE 2 of 4 Action Items

Extension requested for:

☐ additional authorized days @ [Compact/21.95 ▼] [VIEW CARS]

Policy Limits [20/500 ▼]

Messages:
08/31/00 BSS 2 more days + Waiting on Parts:
08/30/00 Waiting on fender:
08/29/00 Extension requested through 08/30/00:
3 days extension requested:
Go to Notebook

Current Rental Status*
Rental Start Date:     5/15/00
Last Authorized Date:  04/13/00
Authorized to Date:    5 days
Charges to Date:       $239.00

*Does not include taxes and surcharges

Note to Rental Company:

Note to Self:

Rental Location:
Enterprise Edgewater Branch
773-334-5400

Repair Facility:
Elco Chevrolet
(773)-334-9832
Owner Vehicle:  1999 GMC Suburban ☐ Extend this rental?

[LAST DAY] [PROCESS] [SKIP >>]

[Change or Add]

RENTER INFORMATION:
Bowie, David
1735 N. Paulina St.
Chicago, IL 60622

Home: (773)564-6054
Work: (773)395-6200
Email: dbowie@zefer.com
Requested email confirmation RENTAL INFORMATION:
Authorized Class: Standard
Days/Rate: 5 days @ $21.99/day
Current Class: Full-Size
Additional Charges: None
Rental Date: 03/28/2000
Start Date: 03/20/2000

Rental Location:
Enterprise Edgewater Branch
5400 N. Ashland
Chicago, IL60622
773-334-5400

ADDITIONAL CLAIM INFORMATION:
Claim Number: 32323232323232323
Claim Type: Theft
Insured Name: Lalumandier, Craig
Owner's vehicle: GMC Suburban 1999
Date of Loss: 03/28/2000
Loss Type: Non-Driveable
Policy: Daily rate/
Maximum dollars: 30/600

Repair Location:
Elco Chevrolet
Chicago, IL 60621
(773)334-9832

NOTEBOOK:
Message, Belanger, Hugues, 2/20/00
Note from Enterprise, Sarussi, Marty, 2/21/00
Extension Request, 2/24/00
Extension, 2/25/00

● top of page   Contact Us | Terms & Conditions | Log Off

FIG. 93(d)

(Corporate User)

Welcome to the
Automated Rental Management System

| create a RESERVATION | find a CUSTOMER | action items | completed actions | reports | my profile | help |

Claims office: 001  Handling for: Yourself  [TRANSFER FILE]

You just authorized 3 day at $29.39/day for Hanks, Tom

EXTEND RENTAL: for Bowie, David  Claim no. 765849322-001
CUSTOMER FILE 2 of 4 Action Items Extension requested for:

☐ additional authorized days @ [Compact/21.95 ▼] [VIEW CARS]
Policy Limits [20/500 ▼]

Messages:
08/31/00 BSS 2 more days + Waiting on Parts:
08/30/00 Waiting on fender:
08/29/00 Extension requested through 08/30/00:
3 days extension requested:
Go to Notebook

Current Rental Status*
Rental Start Date:       5/15/00
Last Authorized Date:    04/13/00
Authorized to Date:      5 days
Charges to Date:         $239.00

*Does not include taxes and surcharges

Note to Rental Company:

Note to Self:

Rental Location:
Enterprise Edgewater Branch
773-334-5400

☐ Extend this rental?
[LAST DAY] [PROCESS] [SKIP >>]

[Change or Add]

RENTER INFORMATION:
Bowie, David
1735 N. Paulina St.
Chicago, IL 60622

Home: (773)564-6054
Work: (773)395-6200
Email: dbowie@zefer.com
Requested email confirmation RENTAL INFORMATION:
Authorized Class: Standard
Days/Rate: 5 days @ $21.99/day
Current Class: Full-Size
Additional Charges: None
Rental Date: 03/28/2000
Start Date: 03/20/2000

Rental Location:
Enterprise Edgewater Branch
5400 N. Ashland
Chicago, IL 60622
773-334-5400

ADDITIONAL CLAIM INFORMATION:
Corporate Class Number: 3232323232323
Loss Type: Non-Driveable
Policy: Daily rate/
Maximum dollars: 30/600

NOTEBOOK:
Message, Belanger, Hugues, 2/20/00
Note from Enterprise, Sarussi, Marty, 2/21/00
Extension Request, 2/24/00
Extension, 2/25/00

● top of page    Contact Us | Terms & Conditions | Log Off

FIG. 93(e)

(ARMS/Web 2.0)

Welcome to the Automated Rental Management System

| create a RESERVATION | find a CUSTOMER | action items | completed actions | reports | my profile | help |

Claims office: [001 ▼]    You are handling for: [Yourself ▼]

Action Items: Welcome back, Fitzgerald, Neil.

● Below please find the action items that require your attention.

To sort the Action Items, click the column title of your chosen sorting method
(ex: to sort by date, click "DATE RECEIVED")

| ▼ TYPE | DATE RECEIVED | RENTERS NAME | CLAIM NUMBER | ADJUSTER |
|---|---|---|---|---|
| Direct Bill Request | 04-23-00 | Hanks, Tom | 234589871 | Fitzgerald, Neil |
| Extension | 05-01-00 | Bowie, David | 234587871 | Fitzgerald, Neil |
| Invoice | 05-01-00 | Weber, Andrew | 754589877 | Fitzgerald, Neil |
| Invoice | 05-01-00 | Crystal, Billy | 235469871 | Fitzgerald, Neil |

Contact Us | Terms & Conditions

FIG. 95(a)

(Corporate User)

| | Welcome to the |
| | Automated Rental Management System |

| create a RESERVATION | find a CUSTOMER | action items | completed actions | reports | my profile | help |

Claims office: 001 ▼    Handling for: Yourself ▼

Action Items: Welcome back, Fitzgerald, Neil.

⊙ Below please find the action items that require your attention.

To sort the Action Items, click the column title of your chosen sorting method
(ex: to sort by date, click "DATE RECEIVED")

| ▼ TYPE | DATE RECEIVED | RENTERS NAME | CLAIM NUMBER | RENTAL COMPANY | ADJUSTER |
|---|---|---|---|---|---|
| ◁ Direct Bill Request | 04-23-00 | Hanks, Tom | 234589871 | Enterprise Rent-A-Car | Fitzgerald, Neil |
| 🗓 Extension | 05-01-00 | Bowie, David | 234587871 | HLE Rent-A-Car | Fitzgerald, Neil |
| Message | 05-01-00 | Simpson, Homer | 754589877 | Enterprise Rent-A-Car | Fitzgerald, Neil |
| Invoice | 05-01-00 | Weber, Andrew | 754589877 | Enterprise Rent-A-Car | Fitzgerald, Neil |
| Returned Invoice | 05-01-00 | Crystal, Billy | 235469071 | Rent-A-Wreck | Fitzgerald, Neil |
| Payment List | 06-15-00 | (5) Invoices | | Car Temps | Fitzgerald, Neil |
| Unassigned Items | 06-15-00 | (7) Action Items | | Enterprise Rent-A-Car | Unassigned |

◁ Over 24 hours old
🗓 New information has come in

Contact Us | Terms & Conditions | Log Off

FIG. 95(e)

Welcome to the
Automated Rental Management System

| create a RESERVATION | find a CUSTOMER | action items | completed actions | reports | my profile | help |

Claims office: 001 ▼    Handling for: Yourself ▼

You just approved an invoice for Crystal, Billy
Total Amount $536.13

Action Items:
UNASSIGNED

Weber, Andrew
28445 Main Ave
Chicago, IL 60622
555-555-1212

DIRECT BILL REQUEST
Claim Number: 754589877
Vehicle Condition: Select a Loss Type ▼
Claim Type: Select a Claim Type ▼
Date of Loss: January ▼ 1 ▼ 2000 ▼  ▼
Note to Enterprise:

① Assign to Office 001 ▼
② Assign Adjuster Unassigned ▼
-or-
③ Cancel this item

Smith, Joe
28445 Main Ave
Chicago, IL 60622
555-555-1212

DIRECT BILL REQUEST
Claim Number: 754589877
Vehicle Condition: Select a Loss Type ▼
Claim Type: Select a Claim Type ▼
Date of Loss: January ▼ 1 ▼ 2000 ▼  ▼
Note to Enterprise:

① Assign to Office 001 ▼
② Assign Adjuster Unassigned ▼
-or-
③ Cancel this item

[PREVIOUS]                                    [PROCESS]

Contact Us | Terms & Conditions

FIG. 97(a)

(Dealership User)

Welcome to the Automated Rental Management System

| create a RESERVATION | find a CUSTOMER | action items | completed actions | reports | my profile | help |

Claims office: 001    Handling for: Yourself

You just approved an invoice for Crystal, Billy
Total Amount $536.13

Action Items:
UNASSIGNED

---

Weber, Andrew
28445 Main Ave
Chicago, IL 60622
555-555-1212

Rental Location:
Enterprise Edgewater Branch
5400 N. Ashland
Chicago, IL 60622
773-334-5400

DIRECT BILL REQUEST

Purchase Order No: 754589877
Bill Type: [ ]
Date of Loss: January 1 2000 [ ]
Note to Rental Company: [ ]

①Assign to Office  001
②Assign Administrator  Unassigned
-or-
③Cancel this item

---

Smith, Joe
28445 Main Ave
Chicago, IL 60622
555-555-1212

Rental Location:
Enterprise Edgewater Branch
5400 N. Ashland
Chicago, IL 60622
773-334-5400

DIRECT BILL REQUEST

Purchase Order No: 754589877
Bill Type: [ ]
Date of Loss: January 1 2000 [ ]
Note to Rental Company: [ ]

①Assign to Office  001
②Assign Administrator  Unassigned
-or-
③Cancel this item

---

[PREVIOUS]                                    [PROCESS]

Contact Us | Terms & Conditions | Log Off

FIG. 97(d)

(ARMS/Web 2.0)

Welcome to the
Automated Rental Management System

| create a RESERVATION | find a CUSTOMER | action items | completed actions | reports | my profile | help |

Claims office: 001    You are handling for: Yourself    [TRANSFER FILE]

Authorize Direct Bill: for Hanks, Tom    Claim no. 765849322-001
CUSTOMER FILE                                                1 of 4 Action Items

Direct Bill Requested for:

[  ] days @ [Compact/21.95 ▼]
Policy: Daily rate/ Maximum dollars [20/500 ▼]

Note to Enterprise:
[              ▼]

Note to Self Only:
[              ▼]

Claim Number: [765849322-001]
Claim Type: [Select a Claim Type ▼]
Loss Type: [Select a Loss Type ▼]

Date of Loss: [mm][dd][yy] [ ]
Date Rental Needed: [mm][dd][yy] [ ]

Insured Name: Last [          ]  First [          ]

Message: Direct Bill request for Hanks: Tom 4/23/00

Go to Notebook                                    [CANCEL] [PROCESS] [SKIP >>]

[Change or Add]

RENTER INFORMATION:
Hanks, Tom
1735 N. Paulina St.
Chicago, IL 60622

Home: (773)564-6054
Work: (773)395-6200
Email: thanks@zefer.com
Requested email confirmation RENTAL INFORMATION:
Enterprise Rent-A-Car Location:
Enterprise Edgewater Branch
5400 N. Ashland
Chicago, IL 60622
773-334-5400

ADDITIONAL CLAIM INFORMATION:
Insured Name: Lalumandier, Craig
Owner's vehicle: GMC Suburban 1999
Date of Loss: 03/28/2000
Type of Loss: Non-Driveable

Repair Facility:
Elco Chevrolet
22 Elston Dr.
Chicago, IL 60621
(773)334-9832

NOTEBOOK:
Direct Bill request for Hanks, Tom 4/23/00

● top of page

Contact Us | Terms & Conditions

FIG. 101(a)

(Insurance User)

Welcome to the
Automated Rental Management System

| create a RESERVATION | find a CUSTOMER | action items | completed actions | reports | my profile | help |

Claims office: 001    Handling for: Yourself    [TRANSFER FILE]
Authorize Direct Bill: for Hanks, Tom  Claim no. 765849322-001
CUSTOMER FILE                                          1 of 4 Action Items Direct Bill Requested for:  Claim Number: [765849322-001]   Claim Type: [Select a Claim Type ▼]

[   ] days @ [Compact/21.95 ▼]  [VIEW CARS]    Note to Rental Company:
Policy: Daily rate/ [20/500 ▼]
Maximum dollars
Direct Bill%: [100]

Vehicle Condition: [Select a Condition ▼]

Date of Loss: [January ▼] [1 ▼] [2000 ▼] [ ]

Date Rental Needed: [January ▼] [1 ▼] [2000 ▼] [ ]

Insured Name: Last [            ]  First [            ]

Message: Direct Bill request for Hanks, Tom 4/23/00

Go to Notebook                             [CANCEL] [PROCESS] [SKIP >>]

[Change or Add]

RENTER INFORMATION:
Hanks, Tom                    Home: (773)564-6054
1735 N. Paulina St.           Work: (773)395-6200
Chicago, IL 60622             Email: thanks@zefer.com
                              Requested email confirmation RENTAL INFORMATION:
Rental Location:
Enterprise Edgewater Branch
5400 N. Ashland
Chicago, IL 60622
773-334-5400

NOTEBOOK:
Direct Bill request for Hanks, Tom 4/23/00

● top of page

Contact Us | Terms & Conditions | Log Off

FIG. 101(b)

(Fleet User)

```
┌─────────────────────────────────────────────────────────────────────┐
│  ╱‾‾‾‾╲              Welcome to the                                 │
│ ╱  e   ╲_       Automated Rental Management System                  │
│ ╲_____╱                                                            │
│ ┌──────┬──────┐ ┌────────────┬──────────────────┬────────┬──────────┬──────┐
│ │create a│find a│ │action items│completed actions │reports │my profile│ help │
│ │RESERVATION│CUSTOMER│                                                       │
│ └──────┴──────┘ Claims office: 001    Handling for: Yourself  [TRANSFER FILE]│
│ Authorize Direct Bill: for Hanks, Tom  Claim no. 765849322-001              │
│   CUSTOMER FILE                                         1 of 4 Action Items │
│  ┌──────────────────────────────────────────────────────────────────┐       │
│  │ Direct Bill Requested for:  Claim Number:[765849322-001]  Claim Type:[Select a Claim Type▼]│
│  │                                                                  │       │
│  │   [  ] days @ [Compact/21.95▼]  [VIEW CARS]   Note to Rental Company: │
│  │  Policy: Daily rate/[20/500▼]                 ┌──────────────┐   │       │
│  │  Maximum dollars                              │              │▼  │       │
│  │                                               └──────────────┘▲  │       │
│  │                                                                  │       │
│  │  Protection Coverage:[          ▼]                               │       │
│  │                                                                  │       │
│  │   Date of Loss:[January▼][1▼][2000▼][ ]                          │       │
│  │                                                                  │       │
│  │   Date Rental [January▼][1▼][2000▼][ ]                           │       │
│  │      Needed:                                                     │       │
│  │                                                                  │       │
│  │  Insured Name: Last[            ]  First[              ]         │       │
│  │                                                                  │       │
│  │  Message: Direct Bill request for Hanks, Tom 4/23/00             │       │
│  │                                                                  │       │
│  │  Go to Notebook                       [CANCEL] [PROCESS] [SKIP >>]│      │
│  └──────────────────────────────────────────────────────────────────┘       │
└─────────────────────────────────────────────────────────────────────┘
```

[Change or Add]

RENTER INFORMATION:
Hanks, Tom
1735 N. Paulina St.
Chicago, IL 60622

Home: (773)564-6054
Work: (773)395-6200
Email: thanks@zefer.com
Requested email confirmation RENTAL INFORMATION:
Rental Location:
Enterprise Edgewater Branch
5400 N. Ashland
Chicago, IL 60622
773-334-5400

NOTEBOOK:
Direct Bill request for Hanks, Tom 4/23/00

 top of page

Contact Us | Terms & Conditions | Log Off

FIG. 101(c)

(Corporate User)

| | Welcome to the Automated Rental Management System |

| create a RESERVATION | find a CUSTOMER | action items | completed actions | reports | my profile | help |

Office: 001  Handling for: Yourself  [TRANSFER FILE]

Authorize Direct Bill: for Hanks, Tom  Corporate Class No. 765849322-001

CUSTOMER FILE  1 of 4 Action Items

Direct Bill Requested for: Corporate Class No: [765849322-001]

[ ] days @ [Compact/21.95 ▼] [VIEW CARS]      Note to Rental Company: [        ]

Date Rental Needed: [January ▼] [1 ▼] [2000 ▼] [ ]

Message: Direct Bill request for Hanks, Tom 4/23/00

Go to Notebook                              [CANCEL] [PROCESS] [SKIP >>]

[Change or Add]

RENTER INFORMATION:
Hanks, Tom
1735 N. Paulina St.
Chicago, IL 60622

Home: (773)564-6054
Work: (773)395-6200
Email: thanks@zefer.com
Requested email confirmation RENTAL INFORMATION:
Rental Location:
Enterprise Edgewater Branch
5400 N. Ashland
Chicago, IL 60622
773-334-5400

NOTEBOOK:
Direct Bill request for Hanks, Tom 4/23/00

● top of page

Contact Us | Terms & Conditions | Log Off

FIG. 101(e)

(ARMS Web 2.0)

[Initial Reservation]

Welcome to the
Automated Rental Management System

| create a RESERVATION | find a CUSTOMER | action items | completed actions | reports | my profile | help |

Claims office: [ ▼ ]  Handling for: [ ▼ ]

create a RESERVATION
last name
[        ]
first name
[        ]
claim number:
[        ]
claim type:
[please choose ▼]
please post code where car is needed:
[        ]
○ Phone
○ Post Code

[NEW RESERVATION]

Welcome back, Fitzgerald, Neil.

● Below please find the action items that require your attention.

To sort the Action Items, click the column title of your chosen sorting method
(ex: to sort by date, click "DATE RECEIVED")

| DATE RECEIVED | RENTERS NAME | CLAIM NUMBER | ADJUSTER |
|---|---|---|---|
| 04-23-00 | Hanks, Tom | 234589871 | Fitzgerald, Neil |
| 05-01-00 | Bowie, David | 234587871 | Fitzgerald, Neil |
| 05-01-00 | Simpson, Homer | 754589877 | Fitzgerald, Neil |
| 05-01-00 | Weber, Andrew | 754589877 | Fitzgerald, Neil |
| 05-01-00 | Crystal, Billy | 235469071 | Fitzgerald, Neil |
| 06-15-00 | (5) Invoices | | Fitzgerald, Neil |
| 06-15-00 | (7) Action Items | | Unassigned |

☐ New information has come in.

Contact Us | Terms & Conditions | Log Off

FIG. 103(a)

(Insurance User)

Welcome to the Automated Rental Management System

| create a RESERVATION | find a CUSTOMER |
|---|---| action items | completed actions | reports | my profile | help

Claims office: 001 ▼    Handling for: Yourself ▼

Welcome back, Fitzgerald, Neil.

🔽 Below please find the action items that require your attention.

To sort the Action Items, click the column title of your chosen sorting method
(ex: to sort by date, click "DATE RECEIVED")

| DATE RECEIVED | RENTERS NAME | CLAIM NUMBER | RENTAL COMPANY | ADJUSTER |
|---|---|---|---|---|
| 04-23-00 | Hanks, Tom | 234589871 | Enterprise Rent-A-Car | Fitzgerald, Neil |
| 05-01-00 | Bowie, David | 234587871 | HLE Rent-A-Car | Fitzgerald, Neil |
| 05-01-00 | Simpson, Homer | 754589877 | Enterprise Rent-A-Car | Fitzgerald, Neil |
| 05-01-00 | Weber, Andrew | 754589877 | Enterprise Rent-A-Car | Fitzgerald, Neil |
| 05-01-00 | Crystal, Billy | 235469071 | Rent-A-Wreck | Fitzgerald, Neil |
| 06-15-00 | (5) Invoices | | Car Temps | Fitzgerald, Neil |
| 06-15-00 | (7) Action Items | | Enterprise Rent-A-Car | Unassigned |

Sidebar:
- last name
- first name
- claim number:
- claim type: please choose ▼
- rental company: please choose ▼
- please post code where car is needed:
- ○ Phone
- ○ Post Code
- [NEW RESERVATION]

Contact Us | Terms & Conditions | Log Off

FIG. 103(b)

(Fleet User)

Welcome to the
Automated Rental Management System

| create a RESERVATION | find a CUSTOMER | action items | completed actions | reports | my profile | help |

Claims office: [001 ▼]   Handling for: [Yourself ▼]

last name
[          ]

first name
[          ]

claim number:
[          ]

claim type:
[please choose ▼]

rental company:
[please choose ▼]

please post code where car is needed:
[          ]

○ Phone
○ Post Code

[NEW RESERVATION]

Welcome back, Fitzgerald, Neil.

● Below please find the action items that require your attention.

To sort the Action Items, click the column title of your chosen sorting method
(ex: to sort by date, click "DATE RECEIVED")

| DATE RECEIVED | RENTERS NAME | CLAIM NUMBER | RENTAL COMPANY | ADMINISTRATOR |
|---|---|---|---|---|
| 04-23-00 | Hanks, Tom | 234589871 | Enterprise Rent-A-Car | Fitzgerald, Neil |
| 05-01-00 | Bowie, David | 234587871 | HLE Rent-A-Car | Fitzgerald, Neil |
| 05-01-00 | Simpson, Homer | 754589877 | Enterprise Rent-A-Car | Fitzgerald, Neil |
| 05-01-00 | Weber, Andrew | 754589877 | Enterprise Rent-A-Car | Fitzgerald, Neil |
| 05-01-00 | Crystal, Billy | 235469071 | Rent-A-Wreck | Fitzgerald, Neil |
| 06-15-00 | (5) Invoices | | Car Temps | Fitzgerald, Neil |
| 06-15-00 | (7) Action Items | | Enterprise Rent-A-Car | Unassigned |

Contact Us | Terms & Conditions | Log Off

FIG. 103(c)

(Dealership User)

Welcome to the Automated Rental Management System create a RESERVATION | find a CUSTOMER | action items | completed actions | reports | my profile | help last name: [ ]
first name: [ ]
purchase order number: [ ]
bill type: [please choose ▼]
rental company: [please choose ▼]
please post code where car is needed: [ ]
○ Phone
○ Post Code

[NEW RESERVATION]

Claims office: [001 ▼]   Handling for: [Yourself ▼]

Welcome back, Fitzgerald, Neil.

● Below please find the action items that require your attention.

To sort the Action Items, click the column title of your chosen sorting method
(ex: to sort by date, click "DATE RECEIVED")

| DATE RECEIVED | RENTERS NAME | PURCHASE ORDER NUMBER | RENTAL COMPANY | ADMINISTRATOR |
|---|---|---|---|---|
| 04-23-00 | Hanks, Tom | 234589871 | Enterprise Rent-A-Car | Fitzgerald, Neil |
| 05-01-00 | Bowie, David | 234587871 | HLE Rent-A-Car | Fitzgerald, Neil |
| 05-01-00 | Simpson, Homer | 754589877 | Enterprise Rent-A-Car | Fitzgerald, Neil |
| 05-01-00 | Weber, Andrew | 754589877 | Enterprise Rent-A-Car | Fitzgerald, Neil |
| 05-01-00 | Crystal, Billy | 235469071 | Rent-A-Wreck | Fitzgerald, Neil |
| 06-15-00 | (5) Invoices | | Car Temps | Fitzgerald, Neil |
| 06-15-00 | (7) Action Items | | Enterprise Rent-A-Car | Unassigned |

Contact Us | Terms & Conditions | Log Off

FIG. 103(d)

(Corporate User)

Welcome to the Automated Rental Management System create a RESERVATION | find a CUSTOMER | action items | completed actions | reports | my profile | help Claims office: [001 ▼]   Handling for: [Yourself ▼]

Welcome back, Fitzgerald, Neil.

● Below please find the action items that require your attention.

To sort the Action Items, click the column title of your chosen sorting method
(ex: to sort by date, click "DATE RECEIVED")

| DATE RECEIVED | RENTERS NAME | CORPORATE CLASS NUMBER | RENTAL COMPANY | ADMINISTRATOR |
|---|---|---|---|---|
| 04-23-00 | Hanks, Tom | 234589871 | Enterprise Rent-A-Car | Fitzgerald, Neil |
| 05-01-00 | Bowie, David | 234587871 | HLE Rent-A-Car | Fitzgerald, Neil |
| 05-01-00 | Simpson, Homer | 754589877 | Enterprise Rent-A-Car | Fitzgerald, Neil |
| 05-01-00 | Weber, Andrew | 754589877 | Enterprise Rent-A-Car | Fitzgerald, Neil |
| 05-01-00 | Crystal, Billy | 235469071 | Rent-A-Wreck | Fitzgerald, Neil |
| 06-15-00 | (5) Invoices | | Car Temps | Fitzgerald, Neil |
| 06-15-00 | (7) Action Items | | Enterprise Rent-A-Car | Unassigned |

Sidebar:
last name [ ]
first name [ ]
corporate class number: [ ]
rental company: [please choose ▼]
please post code where car is needed: [ ]
○ Phone
○ Post Code
[NEW RESERVATION]

☐ New information has come in.

Contact Us | Terms & Conditions | Log Off

FIG. 103(e)

(ARMS Web 2.0)

Welcome to the Automated Rental Management System

| create a RESERVATION | find a CUSTOMER | action items | completed actions | reports | my profile | help |

Claims office: 001     Handling for: Self

Please verify the reservation you want to create does not exist.
If it exists, you can click the link to view the file or process it.

Matches Found: You requested a reservation for: Hanks, Tom
Claim Number: 765849322  Claim Type: Claimant

[NEW RESERVATION]

AUTHORIZED

| Claim No. | Customer Name | Status | Date Rental Needed | Invoice Amount |
|---|---|---|---|---|
| 765849322-001 | Hanks, Tom | Closed | 4/23/2000 | $200.95 |
| 765849322-002 | Jones, Bill | Open (customer in car) | 4/18/2000 | $256.98 |

25 items in the list                    Matches 1-25 of 325    View next 25>>

UNAUTHORIZED

| Claim No. | Customer Name | Status | Date Rental Needed |
|---|---|---|---|
| 765849322-001 | Hanks, Tom | Direct Bill Request | 4/23/2000 |
| 888234213 | Jones, Bob | Open (customer in car) | 4/18/2000 |
| 888254321 | Hanks, Sophia | Open (customer in car) | 4/16/2000 |

25 items in the list                    Matches 1-25 of 325    View next 25>>

● top of page

Contact Us | Terms & Conditions | Log Off

[NEW RESERVATION]

FIG. 104(a)

(Dealership User)

Welcome to the Automated Rental Management System create a RESERVATION | find a CUSTOMER | action items | completed actions | reports | my profile | help Claims office: 001          Handling for: Yourself Please verify the reservation you want to create does not exist.
If it exists, you can click the link to view the file or process it.

Matches Found: You requested a reservation for: Hanks, Tom
Purchase Order Number: 765849322  Bill Type: Claimant    [NEW RESERVATION]

AUTHORIZED

| Purchase Order No. | Customer Name | Status | Date Rental Needed | Invoice Amount | Rental Company |
|---|---|---|---|---|---|
| 765849322-001 | Hanks, Tom | Closed | 4/23/2000 | $200.95 | Enterprise Rent-A-Car |
| 765849322-002 | Jones, Bill | Open (customer in car) | 4/18/2000 | $256.98 | HLE Rent-A-Car |

25 items in the list                    Matches 1-25 of 325    View next 25>>

UNAUTHORIZED

| Purchase Order No. | Customer Name | Status | Date Rental Needed | Rental Company |
|---|---|---|---|---|
| 765849322-001 | Hanks, Tom | Direct Bill Request | 4/23/2000 | Enterprise Rent-A-Car |
| 888234213 | Jones, Bob | Open (customer in car) | 4/18/2000 | HLE Rent-A-Car |
| 888254321 | Hanks, Sophia | Open (customer in car) | 4/16/2000 | Car Temps |

25 items in the list                    Matches 1-25 of 325    View next 25>>

● top of page                                    [NEW RESERVATION]

Contact Us | Terms & Conditions | Log Off

FIG. 104(d)

(Corporate User)

Welcome to the
Automated Rental Management System

| create a RESERVATION | find a CUSTOMER | action items | completed actions | reports | my profile | help |

Claims office: 001　　　　　　Handling for: Yourself

Please verify the reservation you want to create does not exist.
If it exists, you can click the link to view the file or process it.

Matches Found: You requested a reservation for: Hanks, Tom
　　　　　　　Corporate Class Number: 765849322　　　　　　　　　　[NEW RESERVATION]

AUTHORIZED

| Corporate Class No. | Customer Name | Status | Date Rental Needed | Invoice Amount | Rental Company |
|---|---|---|---|---|---|
| 765849322-001 | Hanks, Tom | Closed | 4/23/2000 | $200.95 | Enterprise Rent-A-Car |
| 765849322-002 | Jones, Bill | Open (customer in car) | 4/18/2000 | $256.98 | HLE Rent-A-Car |

25 items in the list　　　　　　　　　　　　　　Matches 1-25 of 325　　View next 25>>

UNAUTHORIZED

| Corporate Class No. | Customer Name | Status | Date Rental Needed | Rental Company |
|---|---|---|---|---|
| 765849322-001 | Hanks, Tom | Direct Bill Request | 4/23/2000 | Enterprise Rent-A-Car |
| 888234213 | Jones, Bob | Open (customer in car) | 4/18/2000 | HLE Rent-A-Car |
| 888254321 | Hanks, Sophia | Open (customer in car) | 4/16/2000 | Car Temps |

25 items in the list　　　　　　　　　　　　　　Matches 1-25 of 325　　View next 25>>

● top of page　　　　　　　　　　　　　　　　　　　　　　　　　　　[NEW RESERVATION]
　　　　　　　　Contact Us | Terms & Conditions | Log Off

FIG. 104(e)

(Fleet User)

Welcome to the Automated Rental Management System

| create a RESERVATION | find a CUSTOMER | action items | completed actions | reports | my profile | help |

Claims office: [001 ▼]   Handling for: [Yourself ▼]

Create Reservation:
QUICK FORM for Coppola, Francis  Claim no. 754589877     GEICO
*Denotes required field

RENTAL INFORMATION:

* Authorized Days: [   ] @ [Select a rate ▼]  [VIEW CARS]
Policy: Daily rate/ Maximum dollars [20/500 ▼]
Protection Coverage: [            ]

Notebook:
Note to Rental Company:
[                    ▼]
[                    ▲]

RENTER INFORMATION:

* Last: [            ]   * First: [            ]
Email: [            ]  ☐ send email confirmation:
Phone Numbers:  Ext.
* [        ] [    ]  [Home ▼] ○ Pick up location
  [        ] [    ]  [Home ▼] ○ Pick up location Location closet to: 773-395-6200
Enterprise Edgewater Branch
5400 N. Ashland
Chicago, IL 60622
773-334-5400

Pick different location:
[Change to a Favorite Location ▼] [MORE LOCATIONS]

[CANCEL] [CONFIRM RESERVATION]

● top of page

ADDITIONAL INFORMATION:

* Claim Number: [            ]
* Claim Type: [Claimant ▼]
Date of Loss: [January ▼] [1 ▼] [2000 ▼] [ ]
Date Rental Needed: [January ▼] [1 ▼] [2000 ▼] [ ]
Insured Name: [            ] [            ]
                Last            First
Additional Charges: None [ADDITIONAL CHARGES]

Repair Facility: [            ]
City: [            ]
State/Province: [AB ▼]  Post Code: [        ]
Phone: [            ]
Renter's Vehicle: [    ] [            ]
                   year   make/model
Renter's Address: [            ]
Renter's City: [            ]
State/Province: [AB ▼]
Post Code: [        ]  ○ Pick up location

[CANCEL] [CONFIRM RESERVATION]

● top of page

Contact Us | Terms & Conditions | Log Off

FIG. 105(c)

(Corporate User)

Welcome to the
Automated Rental Management System

| create a RESERVATION | find a CUSTOMER | action items | completed actions | reports | my profile | help |

Claims office: [001 ▼]   Handling for: [Yourself ▼]

Create Reservation:
QUICK FORM for Coppola, Francis   Claim no. 754589877                    GEICO
*Denotes required field

RENTAL INFORMATION:

* Authorized Days: [  ] @ [Select a rate ▼] [VIEW CARS]

Corporate Class Number: [                    ]

Notebook:
Note to Rental Company:
[                    ▼]

Note to Self Only:
[                    ▼]

RENTER INFORMATION:

* Last: [          ]    * First: [          ]

Email: [          ]   ☐ send email confirmation:

Phone Numbers:  Ext.
* [          ] [    ] [Home ▼]  ○ Pick up location
  [          ] [    ] [Home ▼]  ○ Pick up location Location closet to: 773-395-6200
  Enterprise Edgewater Branch
  5400 N. Ashland
  Chicago, IL 60622
  773-334-5400

Pick different location:
[Change to a Favorite Location ▼] [MORE LOCATIONS]

[CANCEL] [CONFIRM RESERVATION]

● top of page

ADDITIONAL INFORMATION:

Date Rental Needed: [January ▼] [1 ▼] [2000 ▼] [  ]

Additional Charges: None [ADDITIONAL CHARGES]

● top of page                                       [CANCEL] [CONFIRM RESERVATION]

Contact Us | Terms & Conditions | Log Off

FIG. 105(e)

(ARMS Web 3.0)

Welcome to the
Automated Rental Management System

| create a RESERVATION | find a CUSTOMER | action items | completed actions | reports | my profile | help |

Claims office: 001     Handling for: Self     [TRANSFER FILE]

You just authorized 3 days at $29.39/day for Hanks, Tom

Confirmation:
CUSTOMER FILE        ☐ Don't show me this confirmation page again.  [GO TO NEXT ACTION ITEM]

This confirmation page can be removed...
You can remove this page from your future transactions with ARMS.

How it works...
Simply check this "Don't show me this confirmation again" checkbox and click the "Next Action Item" button.

What will happen next?
When you complete an action item, the system will immediately show you the next action item on your list for you to process. The confirmation will continue to appear, it will provide information about your last transaction as well as the ability to make any changes to that transaction.

Should you check the "Don't show me this confirmation page again" box, this page will never be shown to you again in the future.

● top of page

Contact Us | Terms & Conditions | Log Off

FIG. 106(a)

(Fleet/Dealership/Corporate User)

| | Welcome to the Automated Rental Management System |
|---|---|
| create a RESERVATION / find a CUSTOMER | action items \| completed actions \| reports \| my profile \| help |
| | Claims office: 001     Handling for: Yourself    [TRANSFER FILE] |

You just authorized 3 days at $29.39/day for Hanks, Tom

Confirmation:
CUSTOMER FILE          ☐ Don't show me this confirmation page again. [GO TO NEXT ACTION ITEM]

This confirmation page can be removed...
You can remove this page from your future transactions with ARMS.

How it works...
Simply check this "Don't show me this confirmation again" checkbox and click the "Next Action Item" button.

What will happen next?
When you complete an action item, the system will immediately show you the next action item on your list for you to process. The confirmation will continue to appear, it will provide information about your last transaction as well as the ability to make any changes to that transaction.

Should you check the "Don't show me this confirmation page again" box, this page will never be shown to you again in the future.

● top of page

Contact Us | Terms & Conditions | Log Off

FIG. 106(c)

(ARMS/Web 3.0)

Change Location

Search for Any [United States ▼] Location

Rental Company [Select All ▼]

◉ Postal Zip Code [          ]
○ Telephone      Enter information for the area in which you'd like to rent
○ City

[ Next >> ]

FIG. 108(b)

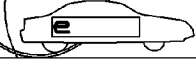

[Change or Add]
RENTER INFORMATION:
Hanks, Tom
1735 N. Paulina St.
Chicago, IL 60622

Home: (773)564-6054
Work: (773)395-6200
Email: dbowie@zefer.com
Requested email confirmation RENTAL INFORMATION:
Authorized Class: Standard
Days/Rate: 5 days @ $21.95/day
Current Class: Compact
Additional Charges: None
Direct Bill %: None
Rental Date: 03/28/2000
Start Date: 03/20/2000

Enterprise Rent-A-Car Location:
Enterprise Edgewater Branch
5400 N. Ashland
Chicago, IL 60622
773-334-5400

ADDITIONAL CLAIM INFORMATION:
Claim Number: 765849322-001
Claim Type: Theft
Insured Name: Lalumandier, Craig
Owner's vehicle: GMC Suburban 1999
Date of Loss: 03/28/2000
Loss Type: Non-Driveable
Policy: Daily rate/
Maximum dollars: 30/600

Repair Facility:
Elco Chevrolet
Chicago, IL 60621
773-334-9832

NOTEBOOK:
Message, Belanger, Hugues, 2/20/00
Note from Enterprise, Sarussi, Marty, 2/21/00
Extension Request, 2/24/00
Extension, 2/25/00

 top of page     Contact Us | Terms & Conditions | Log Off

Invoicing: PRINTER FRIENDLY PAGE ☐ Print Rental History too
[Use the "Print" button from your browser after clicking the "Printer-Friendly Version" button.]

RENTAL:                                              INVOICE:
Enterprise Rent-A-Car Location:                      Reference: PPGM D073082
6850 Ladue Rd.                                       Invoice Date: 02/10/00
Saint Louis, MO 631240001                            Federal ID: 4800791835
(314) 512-0294

Authorized                                           CLAIM:
Authorized Period: 02/10/00 to 03/01/00 (20 days)    Renter: Weber, Andrew
Days                               20                Claim Number: 5698754821
Rate                            22.99                Claim Type: Claimant
Direct Bill Percent              100%                Vehicle Condition: Non-Driveable
Total authorized:     459.8 Plus Tax & Surcharges    Date of Loss: 02/05/00
                                                     Insured Name: Smith, Bob Actual Rental
Rental Period: 02/10/00 to 03/01/00 (20 days)
Billed Period: 02/10/00 to 03/01/00 (20 days)
Actual Days:
Actual Days:
    20 @ $22.99/day =            $505.78
Direct Bill Percent                 100%
Sales Tax (6%) =                  $30.35
Total Charges:                   $536.13
Amount Received:                   $0.00
Total Due:                       $536.13

● top of page                                                              PREVIOUS
                       Contact Us | Terms & Conditions | Log Off

FIG. 129(b)

Handle Unapproved Invoices Activity Diagram

| ☐ | Bob's Autobarn | 333-377-2091 | 1 |
| ☑ | Johnson Glass | 333-397-9000 | 3 |
| ☐ | Wagonhaus | 333-521-2029 | 2 |

[PROCESS]

FIG. 144

Welcome to the Automated Rental Management System create a RESERVATION | find a CUSTOMER | action items | completed actions | reports | my profile | help Claims office: 003     Handling for: Yourself
Authorize Direct Bill: for Reed, Keith Claim no. 123-9829
CUSTOMER FILE Direct Bill Requested for: Claim Number: [123-9829]     Claim Type: [Insured ▼]

[   ] days @ [Economy/18.99 ▼] [VIEW CARS]

Policy: Daily rate/ Maximum dollars [Please chose a rate. ▼]

Direct Bill%: [100]

Vehicle Condition: [Please select a condition ▼]

Date of Loss: [September ▼] [20 ▼] [2000 ▼] [▦▼]

Date Rental Needed: [September ▼] [22 ▼] [2000 ▼] [▦▼]

Insured Name:     Last: [        ]     First: [        ]

Note to Enterprise:
[                    ]

Note to Self Only:
[                    ]

Messages:

Go to Notebook                                              [CANCEL] [PROCESS]

[Change or Add]
RENTER INFORMATION:
Keith Reed                              Home: (314)555-3876
                                        Work: Work: N/A RENTAL INFORMATION:
Enterprise Rent-A-Car Location:         Email: N/A
ENTERPRISE RENT-A-CAR
3752 BOGEY RD
SAINT CHARLES MO 633033105
6369463010
ADDITIONAL CLAIM INFORMATION:
Insured Name: N/A                       Repair Facility:
Owner's vehicle: N/A                    N/A
Date of Loss: 9/20/00
Type of Loss:
NOTEBOOK:

● top of page

Contact Us | Terms & Conditions | Log Off

FIG. 147(a)

|  | Report Sorted By ||||||||||||
|  | Adjuster |||| Repair Facility |||| Office ||||
|  | Open Detail | Open Summary | Closed Detail | Closed Summary | Open Detail | Open Summary | Closed Detail | Closed Summary | Open Detail | Open Summary | Closed Detail | Closed Summary |
|---|---|---|---|---|---|---|---|---|---|---|---|---|
| Adjuster Name | X | 1 | X | 1 |  |  |  |  | 1 |  | 1 |  |
| Renter Name | 1 |  | 1 |  | 1 |  | 1 |  |  |  |  |  |
| Claim Number | 2 |  | 2 |  | 2 |  | 2 |  | 2 |  | 2 |  |
| Claim Type | 3 |  | 3 |  | 3 |  | 3 |  | 3 |  | 3 | 2 |
| Authorized Days* | 6 | 5 | 6 | 5 | 6 | 5 | 6 | 5 | 6 | 5 | 6 | 5 |
| Authorized Rate* | 4 | 3 | 4 | 3 | 4 | 3 | 4 | 3 | 4 | 3 | 4 | 3 |
| Rental Days* | 5 | 4 |  |  | 5 | 4 |  |  | 5 | 4 |  |  |
| Billed Days*+ |  |  | 5 | 4 |  |  | 5 | 4 |  |  | 5 | 4 |
| Days Behind* | 7 | 6 |  |  | 7 | 6 |  |  | 7 | 6 |  |  |
| Number of Extensions* | 8 | 7 | 7 | 6 | 8 | 7 | 7 | 6 | 8 | 7 | 7 | 6 |
| Surcharges | 9 |  |  |  | 9 |  |  |  | 9 |  |  |  |
| Authorized Amount* | 10 | 8 |  |  | 10 | 8 |  |  | 10 | 8 |  |  |
| Amount Received* |  |  | 9 | 8 |  |  | 9 | 8 |  |  | 9 | 8 |
| Total Charges* |  |  | 8 | 7 |  |  | 8 | 7 |  |  | 8 | 7 |
| Billed Amount* |  |  | 10 | 9 |  |  | 10 | 9 |  |  | 10 | 9 |
| Total Contracts | X | 2 | X | 2 | X | 2 | X | 2 | X | 2 | X | X |
| Repair Facility Name |  |  |  |  | X | 1 | X | 1 |  |  |  |  |
| Repair Facility Telephone |  |  |  |  | X |  | X |  |  |  |  |  |
| Office Name |  |  |  |  |  |  |  |  | X | 1 | X | X |
| Month/Year |  |  |  |  |  |  |  |  |  |  |  | 1 |

+ Not available in current state system. Being implemented by the ARMS Maintenance team.

FIG. 149

Welcome to the
Automated Rental Management System

| create a RESERVATION | find a CUSTOMER | action items | completed actions | reports | my profile | help |

Office: 001    Handling for: Yourself

Reports:
Add a new report view:

Name this report: [          ]    ① Choose a name for your new report.

Start from a View: [Closed Ticket Detail] (optional)    ② You may choose a report view (optional).

Ticket Status: [Closed Tickets]    ③ Choose a ticket status.

④ Add the fields you'd like and the order you'd like to see them.

Select fields to display on report:

Available Fields
```
Renter Name
Claim Number
Claim Type
Billed Days
Auth. Days
Auth. Rate
Number of Extensions
Total Charges
Renter Charges
Total Billed Charges
```

[<< REMOVE]
[INSERT >>]
[DICTIONARY]

New Report Fields
```
Adjuster Name
Other Charges
Repair Facility
Rental Days
Renter State
Office
Rental Open Date
Rental Close Date
```

[↑]
[↓]

Save this report view | Close without saving | Delete this report

Contact Us | Terms & Conditions

FIG. 152

| | | | | |
|---|---|---|---|---|
| | | Welcome to the Automated Rental Management System | | | create a RESERVATION | find a CUSTOMER | action items | completed actions | reports | my profile | help Claims Office: 001          Handling for: Yourself Administration:
MODIFY USER Create a New User/Team Create a:  ● New User   ○ New Team

| Primary Office: | Last Name: | First Name: | User ID: |
|---|---|---|---|
| Choose an Office ▼ | | | |

[PROCESS]

Modify/View Users

A B C D E F G H I J K L M N O P Q R S T U V W X Y Z Teams

Show Entire Company

| Name | User ID | Default Office | Office Description |
|---|---|---|---|
| Ⓐ Apple, Bob | NAT 3079 | 001 | Ladue |
| Abram, Sue | NAT 5997 | 002 | Ballwin |
| Ⓑ Bagwell, Bob | NAT 3079 | 003 | Manchester |
| Bolton, Dave | NAT 9043 | 001 | Ladue |
| Ⓒ Chester, Don | NAT 0796 | 002 | Ballwin |
| Ⓓ Dithers, Sezn | NAT 0796 | 002 | Ballwin |

Contact Us | Terms & Conditions | Log Off

FIG. 154

Welcome to the Automated Rental Management System

| create a RESERVATION | find a CUSTOMER | action items | completed actions | reports | my profile | help |

Claims Office: 001        Handling for: Yourself

Administration:
MODIFY USER

User Information:                                                                [PROCESS]

Last Name: [ ]        First Name: [ ]
    User ID: [ ]        E-mail Address: [ ]
    ☑ Active        ☐ Reset Password Office:
    Primary Office: Selected Office
    Address: 123 Sesame Street
    City: NEW YORK    State/Province: NY    Post Code: 12345
    Phone Number: (314) 555-9856

Available Offices        Authorized Offices
    001            *Selected Office
    002
    003    [INSERT >>]
    004    [<< REMOVE]
    005

[* SET PRIMARY OFFICE]

Authorizations:
    Authorized Limits: [ ] Days/Rental
    $ [ ] Max/Rental

File Ownership:
    ☐ Allows files and action items to be assigned to this adjuster.

Work Authority:
    Please choose the section of ARMS this user will be able to view.
    ☑ Create Reservations
    ☑ Authorized/Extend Rentals
    ☑ Pay Invoice
    ☑ Reporting (Management)
    ☑ Receive Unassigned Action Items
    ☑ User Maintenance

[PROCESS]

● top of page    Contact Us | Terms & Conditions | Log Off

FIG. 156

Welcome to the
Automated Rental Management System create a RESERVATION | find a CUSTOMER | action items | completed actions | reports | my profile | help Claims Office: 001  Handling for: Y my profile
user admin
log off Administration:
MODIFY TEAM

Team Information:

Team Name: [ ]
E-mail Address: [ ]
☑ Active Team

Office:

Primary Office: Chicago 012
Address: 1449 Plaza Court
City: Chicago    State/Province: IL    Post Code: 63144
Phone Number: 636-896-9898

File Ownership:
☐ Allow files and action items to be assigned to this team.

Team Members:

| Available | | Team Members |
|---|---|---|
| Frank Rizzo<br>Phil Conners<br>Ned Ryerson<br>Regis Philbin<br>Rex Kramer<br>Jeff Everson<br>Doris Pickerill<br>David Fereday<br>Oderus Urungus<br>Flattus Maximus<br>Johnny B. Good<br>Captain Caveman | [INSERT >>]<br>[<< REMOVE] | |

[PROCESS]

Contact Us | Terms & Conditions | Log Off

FIG. 157

EXTENDED WEB ENABLED BUSINESS TO BUSINESS COMPUTER SYSTEM FOR RENTAL VEHICLE SERVICES

CROSS REFERENCE TO RELATED APPLICATION

This application is a continuation-in-part of Ser. No. 09/641,820, filed Aug. 18, 2000 now U.S. Pat. No. 7,275,038.

Reference to a Computer Program Listing Appendix Submitted on Compact Disc

This application includes a computer program listed appendix submitted on a compact disc, the compact disc containing the files "Exhibit A.txt" (file created Dec. 28, 2010; file size of 316 kilobytes), "Exhibit C.txt" (file created Dec. 28, 2010; file size of 534 kilobytes), and "Exhibit D.txt" (file created Dec. 28, 2010; file size of 261 kilobytes), these files being incorporated herein by reference.

INTRODUCTION

The invention disclosed and claimed in the parent cross referenced above relates generally to the field of an Internet enabled business-to-business intelligent communication link allowing a first business organization to have intelligent interaction with a second fully integrated business organization to facilitate the placing of orders or reservations for business services or goods, with the services or goods provider having a computer network linking multiple levels of its organization to provide for the smooth conduct of business between the two organizations. More particularly, this field relates to an Internet enabled automatic rental vehicle transaction system to facilitate the conduct of rental vehicle transactions between two multilevel business organizations, one of which provides such rental vehicle transaction services in an integrated manner through business enterprise software to a high volume user of such rental vehicle services wherein an Internet web portal is defined by the rental vehicle service provider which interconnects the two business organizations at multiple levels, providing a graphical user interface (GUI) for the transaction of large amounts of rental vehicle services automatically and virtually without human intervention upon entry. The invention of the present continuation-in-part application extends the functionality of the parent invention by providing an intelligent portal that is readily configurable to suit any particular customer and any particular provider data requirements or method of doing business. This added functionality allows the invention, for example, to provide the user with access to other suppliers in the same seamless and integrated manner. In other words, the user now has access to not just one integrated business but multiple businesses, some of which may but need not be, integrated businesses thereby extending the invention for use in a generic application to satisfy a user's needs for a good or service not just from one vendor but all vendors connected to the invention.

BACKGROUND OF THE INVENTION

Computer technology has been embraced by many businesses in order to handle their ever increasing order flow as well as to mitigate the increasing blizzard of paper required to be produced to document this business. A significant benefit which often drives the implementation of technology is its further advantage in increasing productivity to thereby allow fewer people to handle greater volumes of business. One such good example demonstrating the efficiencies and value to be gained by implementing technology is the business model developed and followed by the assignee of the present invention. A rental car company at its heart, the assignee transacts an ever increasing number of time sensitive, relatively low dollar volume, vehicle rentals which in many instances require authorizations to be made in advance, reservations of vehicles from available geographic and vehicle type selections, monitoring of the rental as it progresses including possibly extending the rental under certain circumstances, communications between the various parties involved in the transaction to ensure ultimate customer satisfaction, and financial accounting for the transaction including generating invoices and processing them for payment. While a significant portion of the vehicle rental business involves rental for leisure, business travel, etc., another significant business relationship has developed with insurance companies and the like in what has been termed as the replacement car rental service business. In this business, a vehicle insurance company may have many thousands of policyholders who are eligible to be involved in accidents, and other dislocations of use, requiring that a vehicle be rented for that customer's use while his own vehicle be made ready again for use. Thus, for this business segment, a multi-tiered business organization such as a vehicle insurance company represents a significant customer for repetitive vehicle rental services. To conduct this business in an orderly, time efficient and cost efficient manner, it is necessary that this insurance company has as its business partner a vehicle rental company which is itself multi-tiered, such as the assignee of the present invention. This is because the needs, both geographically and in volume, are significant which require the dedication of a significant amount of resources. To satisfy these needs and to respond to other business growth, in its embrace of technology the assignee hereof has succeeded in developing an in-house computer system and related software which has integrated its business internally. This business integration has been massive and company-wide as is needed to integrate a company having a central office with literally thousands of individual branches located nationally, and even now internationally, with hundreds of thousands of vehicles available for rental. Furthermore, other business partners including other service providers such as vehicle repair shops have also been given access to this system to allow for input of information relating to progress of vehicle repair, extension of rental time, etc. as the rental progresses. This integrated business computer network and software generally includes a mainframe server at the heart of a wide area network (WAN) which facilitates the transfer of vehicle rental information and orders company-wide. This integrated business model is most efficient and needed in order to satisfy the vehicle rental service needs of a vehicle insurance company which itself may be national or even international in scope.

As a first step in extending the integration of technology into this business model, the present assignee has previously developed and implemented a computer system which has provided improved communication capabilities between the two business partners. This system generally comprised a second mainframe computer linked to the first mainframe of the integrated business network, with dedicated access lines being provided from this second mainframe to various levels of the multilevel business organization comprising the insurance company. In effect, with this additional mainframe and dedicated pipeline access, various individuals at the insurance company were permitted to directly interact with the integrated business computer network of the vehicle rental company as well as other selected service providers such as body shops where wrecked vehicles were being repaired. The implementation of this system provided a great step forward over the people intensive business activity previously required in order to handle the large number of transactions encountered in this business relationship. Historically, the replacement car market engendered large numbers of telephone calls being placed between the insurance company, the rental company, and the body shop where vehicle repair was being performed in order to authorize the rental, select and secure the desired replacement vehicle to be provided, monitor the progress of the repair work so that scheduling of the rental vehicle could be controlled, extending the vehicle rental in the event of delays in repair, authorizing various activities involved in the rental process including upgrades of vehicles or other charges for services, and subsequent billing of the rental service and processing the billing to the insurance company for payment.

While the implementation of this system was successful and represented a tremendous step forward in automating the business relationship between the insurance company and the vehicle rental company, it did have certain limitations. For example, a specific communication link had to be established between the rental vehicle company and the particular users at the insurance company designated to have access to this system. Thus, special attention and some modicum of expense was required to establish these "pipelines" and maintain them. Still another aspect to the system implemented was that it was not "browser" based nor did it provide graphical user interface (GUI) menus. Thus, each user had to be specifically trained in the particular "language" used by the system and learn to work with specific menus nested in a specific manner as well as codes for entering commands which were not similar to other computer software programs. This software design thus necessarily required additional training in order to insure that users could gain the full measure of advantage provided by the system and in order to minimize the opportunity for erroneous information or incorrect reservations from being entered or otherwise confusing the business transactions. Furthermore, user efficiency was not immediate and required skill beyond that ordinarily found in casual computer users, as we are all becoming in this computer age. Still another disadvantage to the system was that access was required to a designated entry point in the system in order for a person authorized to be on the system to work with it. As the nature of the insurance and replacement car business requires extreme mobility at multiple levels of both business partners, this represents a limitation to the usefulness and time efficiency with which various business functions could be performed. Therefore, while implementation of the second mainframe allowing for pipeline connections at various levels of the multi-tiered insurance company was a significant step forward in automating the business relationship between the two business partners, significant limitations to this solution were readily apparent to the users thereof.

SUMMARY OF THE INVENTION

In the parent application cross-referenced above, the inventors herein have succeeded in designing and developing a means for substantially enhancing the business to business communication link between these two businesses which provide significant advantages over its prior embodiment. More particularly, the inventors have succeeded in replacing the dedicated pipeline access of the existing system with a web portal allowing Internet access to the mainframe with a browser based graphical user interface (GUI) presentation. This also made the system more readily accessible to smaller business partners as the expense of the "pipeline" was eliminated. The parent invention offers several important technical advantages over the previous system. First of all, by taking advantage of the ubiquitous nature of the Internet, the ultimate in portability and connectivity for this system is now provided in a business environment where mobility and connectivity are at a premium. In other words, a claims adjuster, body shop, or any other business employee authorized to have access to the system may gain access at any site offering Internet access. In present day technology that includes many mobile devices and appliances which are Internet enabled. As technology advances, it is conceivable that this access will extend to permit "24/7" access by any authorized person at any geographic location. This is a marked improvement providing immediate benefit and advantage over the dedicated pipeline access of the prior art system.

A second major advantage of the parent invention is its graphical user interface. The inventors have taken full advantage of this browser based GUI to streamline and organize the presentation of information to a user to actually guide him as he interacts in doing his business. One such example is customized design of the menus such that the user is guided and directed to answer only those questions required to be answered in order to conduct the particular transaction being addressed, and further to present choices to the user for his selection to minimize the need for the user to rely on his own memory or to be familiar with complicated and specialized codes to enter data or request transaction activity. With the recent and continuing explosion of the Internet, more people are becoming familiar with browser programs and their operation through their own daily activities in their personal lives. This familiarity paves the way for easier training and quicker orientation of a new user to the present invention. For large business organizations communicating at multiple levels, this significant advantage cannot be minimized as there are large numbers of people who must be continuously trained due to the growth of the organizations, as well as the replacement of employees due to the inevitable attrition. Thus, the parent invention provides an immediate increase in worker productivity, and makes that improved efficiency available to many more workers who are not particularly skilled otherwise in computer usage.

Still another advantage provided by the parent invention is through the implementation of additional functionalities which are engendered by the browser/GUI interface. As the system is continuously used, and feedback is continuously monitored and analyzed, additional features that add value through providing management information as well as by speeding transaction activity over the system may be implemented. For example, several of these features include the ability of a user to create an on demand report for transaction activity including summaries of transactions handled by a particular user or group of users which might either be open or closed. Another example of additional functionality which improves the efficiency of a user is the ability to create a repair facility call back list which allows a user to sort existing open vehicle rental reservations by repair facility (body shop) and date such that a user is presented with the list of open reservations at a particular repair facility which can be readily handled in a single telephone call while at the same time having the system on line to implement any needed changes such as extensions of reservations, etc. Additional functionality has also been provided to speed the processing of invoicing which of course also speeds their payment and cash receipts. For example, it was found that even despite the built-in error checking and correction facilities provided to the users of the system, a repetitive pattern of mistakes involving incorrect claim numbers was discovered. To speed the processing of these, an additional functionality was provided as an "electronic audit" known as invoice return which returns an invoice to a particular adjuster upon detection of an incorrect claim number for his human intervention and correction of the claim number. In this manner, problem invoices exhibiting one of the most common problems encountered may be readily handled within the system and in an efficient manner, instead of manually as before.

The parent invention also has as a significant advantage the ability to be further customized to meet the individual business partners' needs and desires as well as to provide additional functionality by offering additional features which become desirable upon accumulation of user data based on user experience. Furthermore, once implemented, they are immediately available system wide. While this allows for consistent usage, it is limited in the sense that all of the system users are forced to use the same menus, data definitions, etc. This is not seen as a limitation for the one-to-one business application intended to be primarily addressed by the parent invention.

Still another advantage of the parent invention is that the graphical user interface incorporates point and click interaction, using buttons and tabs to present or conceal data for the user's attention or inattention as the case may be, and provide a much more robust interaction capability through the creation of menu designs that allow for access to the most commonly needed features from any point in the menu architecture. This is to be contrasted with the prior system which consisted of a main frame character based interface while the parent invention with its GUI interface allows a user to point and click to navigate and to make selections by pull down selection, thereby reducing errors. As users become more experienced with the system, and their confidence level grows, they are much more likely to become bored and aggravated with the rigid structure of the prior system requiring them to follow along a certain menu architecture in order to complete certain tasks. On the other hand, the parent invention generally increases the interest of the user in using the system. These advantages of the parent invention over the prior interface promote employee productivity by allowing a user more control over his work which is critical in achieving savings in human resources to operate the system which is one of its main goals.

The present invention extends the parent invention and expands its capabilities and functionalities. With the present invention, a user may not only have access to its business partner, but also one or more competitors of its business partner through the same Internet portal. In this way, at least two needs are satisfied. First, the user can have access to a variety of providers to choose from where business needs or desires require. This allows the user to use a single portal and not have to sign on to a number of different portals, even should they be available. Furthermore, the user isn't troubled to learn how to access and use different portals even should they be available. Presently, not all providers are operating an Internet portal for offering their services, so by allowing business competitors to be accessible through the same portal, independent development of other portals is forestalled. This is a benefit to the operator of the main portal as it creates and maintains a competitive advantage by handling all of the order flow which creates a data base of useful information for marketing purposes. Although initially the portal services might be offered for no additional cost to a competitor, eventually a fee might be charged which would at least partially offset the cost for owning and operating the portal.

The design of the portal is elegant and offers great flexibility for customizing not only the menus for presentation to the user, but also in the design of the data base entries needed or desired by the user and/or the competitive provider. For example, some users might not know or care about the features of a vehicle rented and so those data entries may not be provided space on the menu for the user to fill in. The data base as handled by the networked computer system then need not keep track of that data for that customer. This feature is readily accommodated by the data base programming and is conveniently implemented.

In still another aspect of the present invention, the web portal has the capability to accommodate the varying data requirements also of the various competitive providers, but also the level of their sophistication as evidenced in their respective computer systems and interface facilities. For example, the web portal may be configured to communicate the user's order to the competitive provider via email, phone, or even through a connection directly to an integrated computer system having the same or substantially the same interoperability as the integrated computer system of the assignee hereof. This capability extends to accommodating and matching the competing data requirements of the user and the competitive providers, and having the flexibility to design and implement menus that readily meet these competing needs. Furthermore, the present invention allows for changes to be implemented by simple re-programming of the web portal which minimizes the effort and enhances the "user friendly" aspect to the present invention.

Not only are these "global" improvements made available with the present invention, there are other more particularized improvements that add functionality within the operating framework of the parent invention. For example, one such improvement is the ability to "virtually" assign work groups within the user so that, for example, multiple adjusters might be made into a team with a shared work load so that all of the team members have access to the same pool of work, such as the placing of reservations for the same group of drivers. With this "virtual team" assignment capability, work groups may be readily re-assigned to match changing work loads without worrying about re-configuring hardware or internal network connections. This can be a very valuable feature to accommodate staffing issues over geographical distances that can be nation-wide, with access through the web portal to reservation facilities which are themselves nation-wide.

Still another feature is the ability to customize an individual user's authorization limits. As can be appreciated, one of the mixed blessings of providing enhanced functionality to the individual user's of any integrated computer system is that it places great power in the hands of the user which at the same time creates the potential for abuse. There have been well publicized instances of "rogue" employees making financial decisions or placing instructions which have far reaching financial consequences well beyond the intended authority of an employee, with disastrous results. With the present invention, one feature is the ability to limit the financial commitments that a user may make during any pre-selected time period. For example, the user's profile may limit his ability to make only a certain dollar limit of vehicle reservations over any certain number of work days. In this way, added safe guards may be conveniently provided, monitored by reporting capabilities, and changes as circumstances warrant, all with simple programming changes at the web portal.

There are still other features that are provided by the present invention that find their genesis in the different approach taken over the parent invention and owing to the inherent increased flexibility of using a web based programming for the web portal to interface between the user and the providers on the web server and eliminating the need for any custom software on the user's terminal. The details of these are to be found and described in the detailed description of the preferred embodiment below. Examples include the ability to send confirmatory communications to the user that the reservation has been received and entered into the provider's system for fulfillment, custom report design including the capability to save and re-generate the custom report upon user command, increased flexibility to process and pay invoices, etc.

While the principal advantages and features of the invention have been discussed above, a greater understanding of the invention including a fuller description of its other advantages and features may be attained by referring to the drawings and the detailed description of the preferred embodiment which follow.

DETAILED DESCRIPTION OF THE PREFERRED EMBODIMENT

Figure 1:
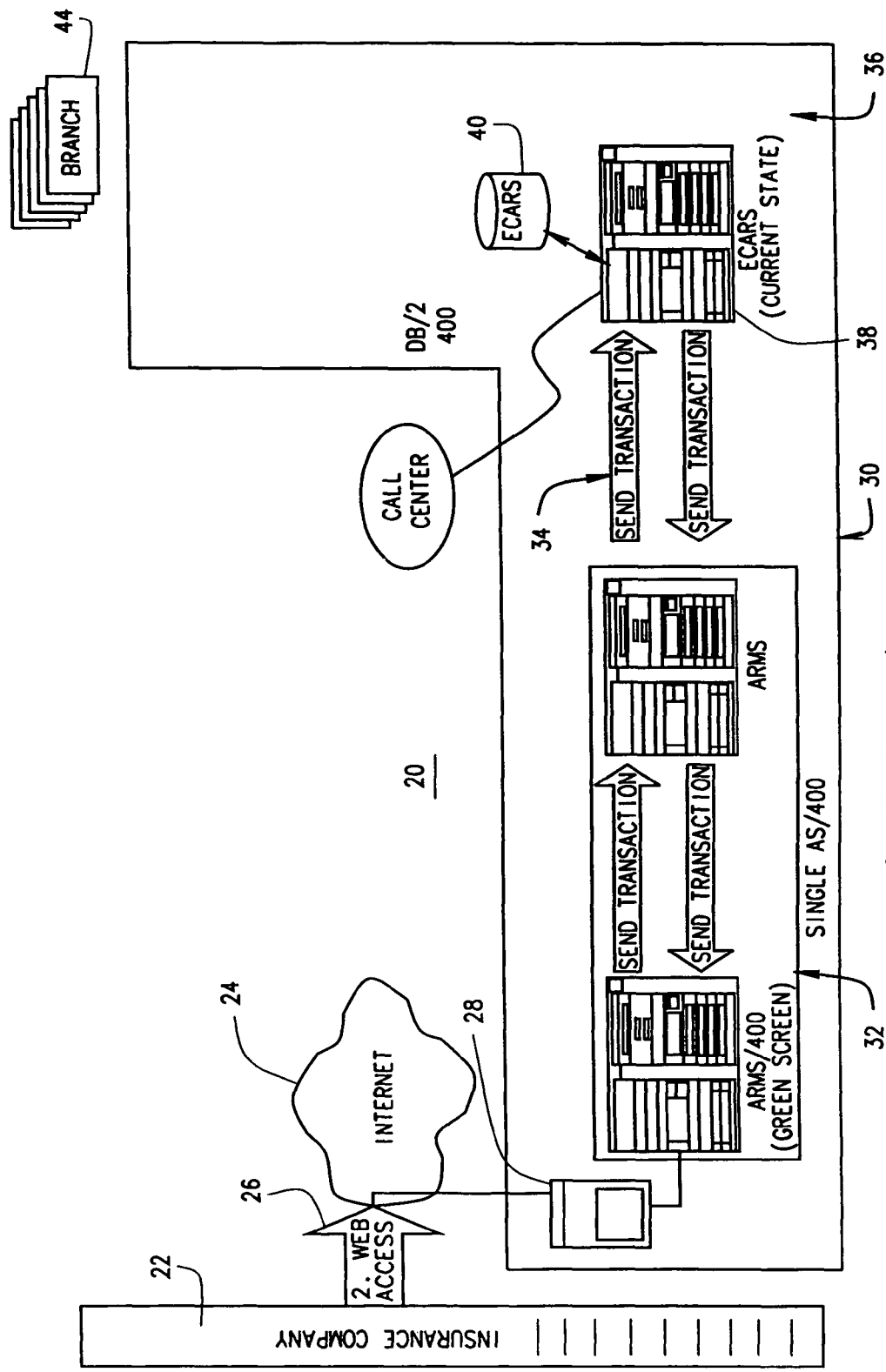
FIG. 1 is a schematic diagram of the computer systems comprising the parent invention.

The overall system architecture for the parent invention 20 is best shown in FIG. 1. As shown therein, an insurance company computer system 22, which itself may be virtually any computer configuration or even a stand alone PC accesses the Internet 24 through any convenient access point 26 such as even including an ISP (Internet service provider), as known in the art. Also connected to the Internet 24 is a web portal 28 which is preferably provided by a server appropriately programmed as explained herein below. This web portal 28 may be appropriate configured as desired to suit any particular business relationship or arrangement, although preferably the inventors herein and assignee of this invention have determined that a 24/7 or full time connection to the Internet 24 is preferable, except for scheduled downtimes for maintenance, etc. The service provider 30 which for purposes of explaining the parent preferred embodiment is preferably a vehicle rental organization, has itself an Internet portal mainframe 32 connected by a bi-directional communication link 34 to a second computer network 36 which may itself preferably have a mainframe server 38. This second computer system 36 is preferably a network having a database 40 for communication with what may be thousands of branch offices each of which has its own computer interface 44 which communicates to this second mainframe server 38 to conduct the integrated business functions of a service provider organization. Instead of communicating with the branch offices directly, a reservation may be communicated to a centralized location for further processing, such as a call center, and then relayed on to an appropriate branch office. This might be desirable under certain circumstances, such as if a branch office is closed, or when a purchaser requires some specialized service such as close monitoring of the rental. This may be done electronically and automatically, or with human intervention.

It should be noted that the particular computer configuration chosen as the preferred embodiment of the parent invention may itself be subject to wide variation. Furthermore, the term "mainframe" as used herein refers solely to a computer which can provide large scale processing of large numbers of transactions in a timely enough manner to suit the particular business application. Preferably, as is presently used by the assignee hereof, an IBM AS/400 mainframe computer is used as each of computers 32, 38. However, as is well known in the art, computer technology is subject to rapid change and it is difficult if not impossible to predict how these computer systems may evolve as technology advances in this art. For example, it is not beyond the realm of possibility that in the not so distant future a network of computers would provide the processing power to conduct these business operations as presently handled by "mainframe" computers. Thus, the term "mainframe" is not used in a limiting sense but merely to indicate that it is descriptive of a computer suited to handle the processing needs for a large scale business application.

It should also be noted that the communication link 46 extending between the server 42 and each of the branch offices 44 may have alternative configurations. For example, in some applications access over the Internet may itself be adequate, recognizing the vagaries of Internet service availability, reliability, and processing speed. Alternatively, this communication link 46 could well be a dedicated pipeline providing broadband service connection full time with back up connections to ensure continuous communication between a particular branch office or groups of branch offices and the service providers business operations computer system 36. Some branch offices might even be served through satellite links. Indeed, it is even possible that a mixture of these wide variations of service level be present within a single organization's structure depending upon communication link cost and availability balanced against service needs. It should merely be noted for present purposes that this communication link 46 serves as the electronic umbilical cord through which branch offices 44 communicate with the business computer system 36 of the present invention.

Attached hereto as exhibits are functional descriptions of the software programs resident on the computers comprising the two computer systems 32, 38 which implement the parent invention. More particularly, attached hereto as Exhibit A is a functional description of the software to implement the integrated business functions resident on the AS/400 or mainframe computer 38. Attached hereto as Exhibits B and C are related flow diagrams (see FIGS. 4-91 of Exhibit B) and explanatory text, respectively, for the software resident on the mainframe AS/400 computer 32. Attached hereto as Exhibit D is a functional description of the software resident on computer 32 but which also appears on the server 28 which creates the web portal for access to the mainframe 32 and its resident program. Server 28 may use a bi-directional GUI to character based interface translator program, well known to those skilled in the art, to present the displays and information obtained and transmitted between the user and the computer 32. However, the software of Exhibit D could also be run on server 28, as would be appreciated by those of skill in the art. It is believed that these functional descriptions and accompanying text as exemplified in these exhibits are adequate to enable an ordinary programmer to implement corresponding software programs for executing the preferred embodiment of the parent invention using ordinary programming skills and without inventive effort.

Figure 2:
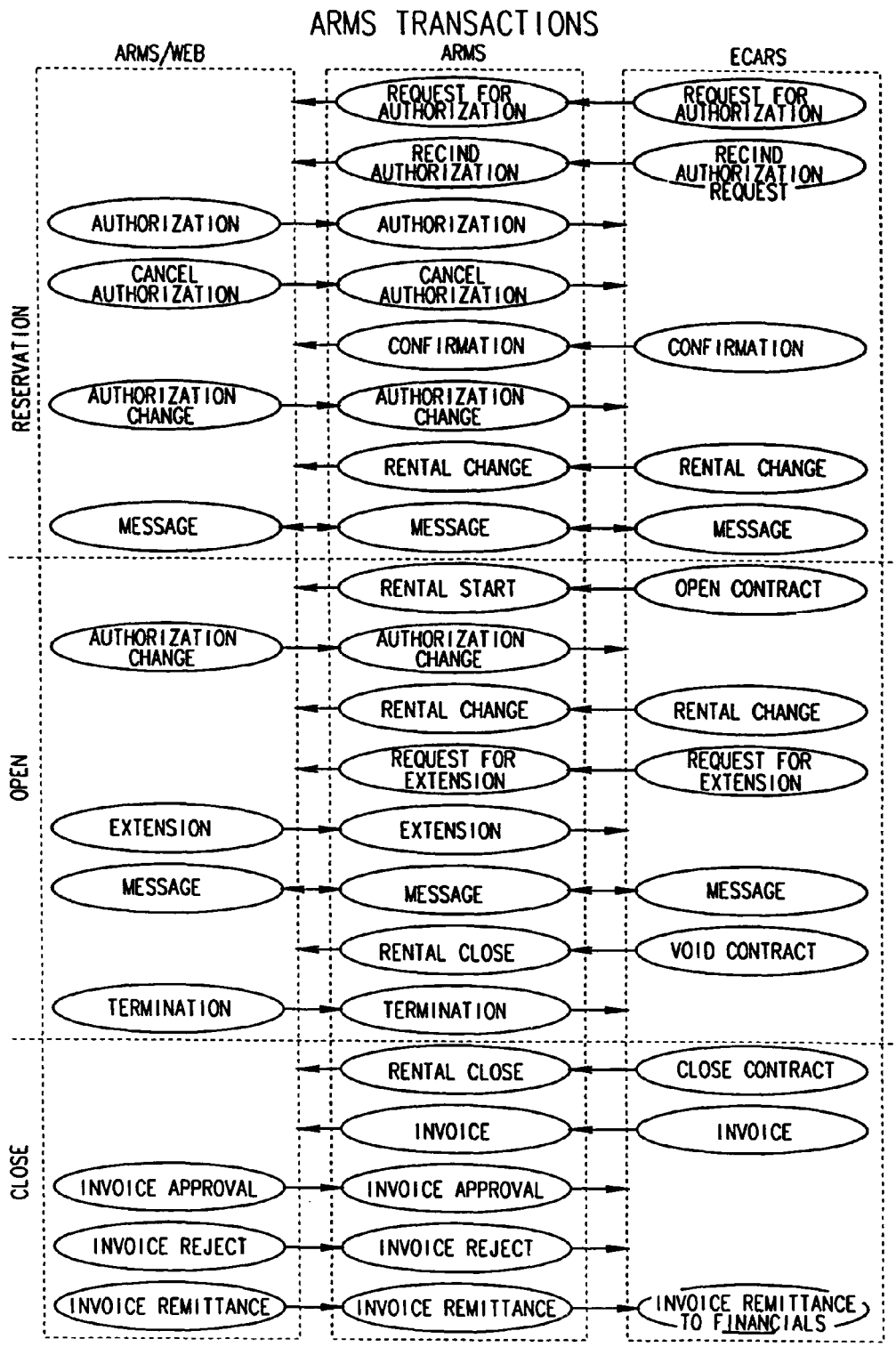
FIG. 2 is a flow chart of the software programs which communicate over the computer systems of FIG. 1 to implement the parent invention.

As a further example of the flow of data and the functional advantages provided by the parent invention, reference is made to FIG. 2. As shown therein, a right hand column is identified as "ECARS" which represents the integrated business software implemented as part of the mainframe operation 38 in computer network 36. The center column headed "ARMS" is resident on mainframe computer 32 and coordinates the communication of data. The left column headed "ARMS/WEB" represents the software resident on computer but which is presented on server 28 and accessible by users through the Internet. Along the left side of FIG. 2 are designated three separate sections of operational activity. These are "reservation" followed by "open" and concluded by "close". Generally, the functional descriptions are arranged in chronological order proceeding from the top of FIG. 2 to the bottom. However, some functional features are permitted throughout the entirety of one of the three periods designated at the left side of FIG. 2. One such example is the "message" function which allows messages to be sent between users at one business organization 22 and branch offices 44 and others connected to the other business organization 30. Proceeding with a description of the transaction, the first set of communications allow for the reservation of the services. These can include requests for authorization or a rescind authorization request to be sent from the service provider to the service purchaser. Correspondingly, authorizations and authorization cancels can be sent from the services purchaser to the services provider. Confirmations are communicated upon confirmation of an authorized reservation request. Authorization changes may be made and communicated from the services purchaser to the service provider. Corresponding rental transaction changes may be communicated from the services provider to the services purchaser. As indicated, through the entirety of this process messages may be sent between users and others connected or having access to the integrated business software, as desired. The consummation of this portion of the transaction is a reservation that has been placed, authorized, confirmed, and provision is made for changes as necessary. During the next phase of the transaction, a reservation is opened and services intended to be provided are started. Generally, and preferably for the rental of vehicles, a start and end date are established in the reservation process. However, along the way, transactional changes may be made, such as for changing the type of vehicle provided, extensions may be requested and entered from either business partner, messages may be transmitted between the business partners, and the transaction may be terminated such as by voiding the contract by one business partner or terminating the authority by the other business partner. The term "reservation" has been used herein to refer not only to the act of placing the order but also to filling the order for services including providing the rental vehicle to the ultimate user and even invoicing for those services.

The last phase of the process involves closing the transaction. During this phase of the transaction, the contract is indicated as being closed and invoiced, the services purchaser can approve invoices, reject invoices, and also remit invoices. Such invoice remittance may also include the actual transfer of funds through an electronic funds transfer medium, or otherwise as previously arranged between the business partners.

It should be understood that this is a streamlined description of the handling of a transaction, and by no means is exhaustive. For example, much more functionality is available to the user including accessing the data base to generate production reports regarding status of open or closed reservations, preparing action item lists to allow a user to organize and prioritize his work, obtaining information available in the system from having been entered by others which would otherwise require phone conversations which are inefficient and occupy still another person's time. A more detailed explanation of the functionality provided is found in the exhibits.

In summary, the parent invention creates almost an illusion that the services purchaser, and the great number of users at various levels of the multi-tier purchaser users, are actually part of the services provider organization in that immediate online access is provided to significant data which enable the user to make reservations for services, monitor those services as they are being provided, communicate with those providing the services, obtain information relating to the status of services as they are being provided, and close transactions, all by interacting with the services provider business organization over that user's PC and without human interaction required by the business providers personnel. By way of contra-distinction, for many years business has been conducted on a human level by customers picking up the telephone and calling services providers and talking to their human counterparts in order to convey information, place orders, monitor orders, including obtaining information as to status, canceling orders, questioning invoices and paying invoices, along with a myriad of other related interactions. Not only did the conduct of business in this manner entail significant amounts of human resources at both ends of the transaction, but it also led to inefficiencies, mistakes and delays all of which increase the cost of doing business and contribute to an increased risk of services being rendered in an unsatisfactory manner in many instances to the end user. The parent invention has taken the preexisting solution of providing electronic communication between the business partners to another level by "web enabling" this system for improved connectivity, improved usability, reduced training, enhanced mobility, and other advantages as described herein.

Figure 3:
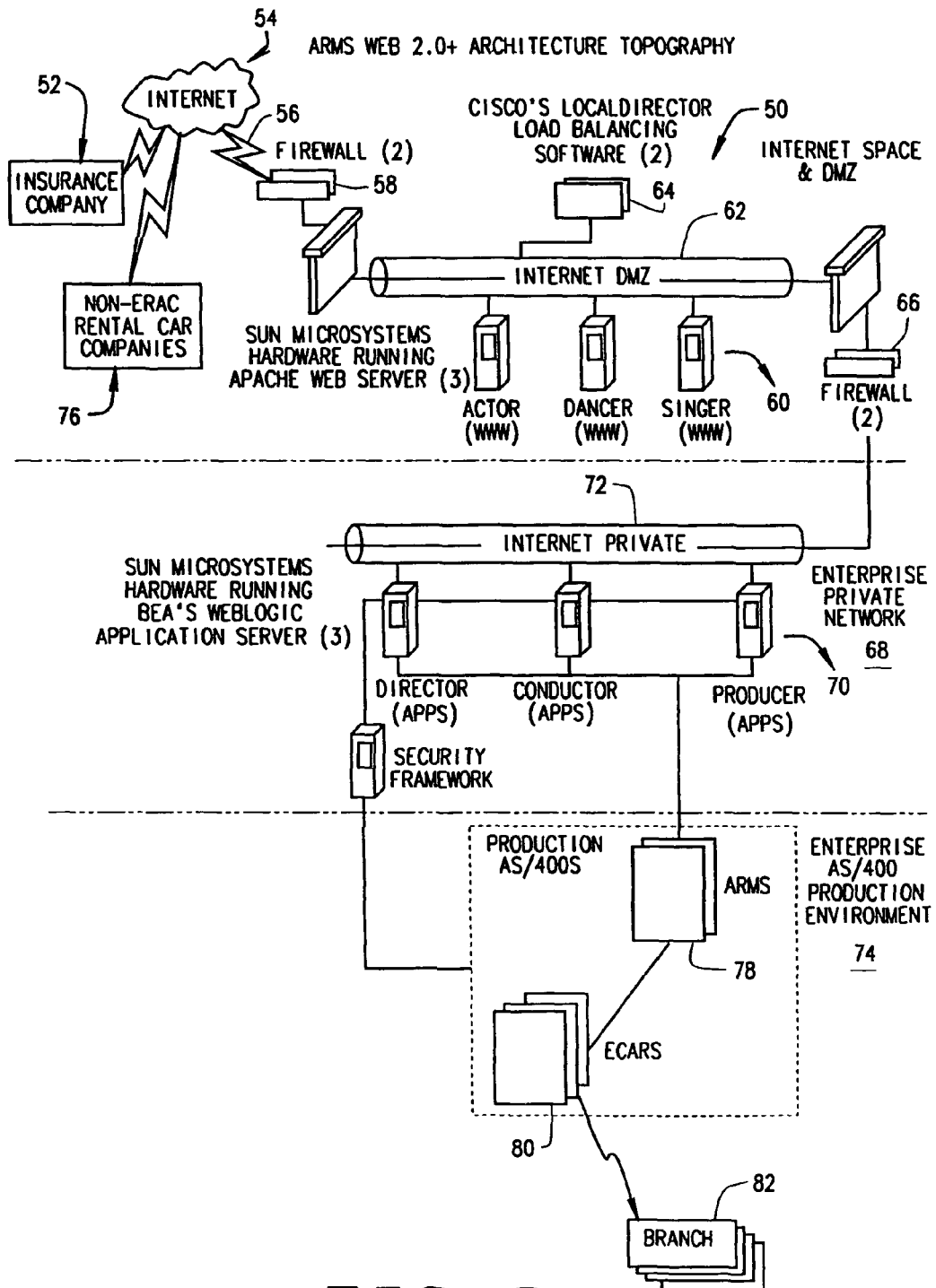
FIG. 3 is a schematic diagram of the computer systems comprising the present invention.

A schematic diagram of the present invention is shown in FIG. 3 and includes three levels of architecture. As shown in the first level of the architecture 50, a user 52 such as an insurance company or other user has access through the Internet 54 to the computer system comprising and incorporating the present invention. An Internet provider provides a link 56 through which Internet connections may be made to communicate with the further described system. For convenience, this Internet connection may be considered as an Internet site or portal in that a user enters a URL and arrives at this connection. A firewall 58 as is known in the art is used for security purposes and to prevent hackers and the like from unauthorized access to the system. A first set of servers 60 are interconnected in a network 62 and may preferably include an ancillary server 64 for running load balancing software or the like to balance the load and provide redundancy amongst what may be a plurality of web servers 60. These web servers 60 may preferably be Sun Microsystem servers running Apache web server software, or other such suitable software as would be well known to those of ordinary skill in the art. This first web server network of servers 60, 62 process the random and disorderly communications flowing to and from this system and the Internet before passing them through a firewall 66 as a further precautionary measure. This first layer of architecture, identified as the Internet space/DMZ layer provides a secure interface and creates order out of the chaos of communications flowing between the system and others, as will be described.

The next layer of architecture 68 is noted in the figure as the "Enterprise private network" and is comprised of a plurality of servers 70 network connected with a network connection 72. Again, although the choice of hardware, is not considered critical by the inventors hereof, Sun Microsystem's server/work station hardware is preferably used to provide the platform for running the application software for processing the various rental vehicle transactions, as will now be explained. Attached hereto as Exhibit E are a series of functional design specifications for the ARMS/WEB application software resident on servers 70 and which provide the detailed description of the operational features of the software and system. With these functional design specifications for the individual modules, it would be readily apparent to those of ordinary skill in the art that programmers of ordinary skill would be able to write software to execute these functional specifications without using inventive effort. Furthermore, the details of this implementation are not considered to provide any aspect of the best mode for carrying out the invention which is defined by the claims below. Generally, the ARMS/WEB application software permits a user to sign on and, when recognized, provides the series of menus presenting choices for the user to indicate the parameters for his reservation. A plethora of information is provided and accessible to the user through the various menus provided from which the user selects and enters data to process the reservation. An important feature of the ARMS/WEB application software is that it provides the user the opportunity to select to place his vehicle rental reservation not only with the integrated business computer system represented by the third level of architecture 74, described below, but also to route the reservation information back through the first architectural level 50 and into the Internet 54 for transmission to a competitive service provider 76. Although the interconnection is depicted in FIG. 3 as being made through the Internet 54, the network of servers 70 configured in accordance with the ARMS/WEB application software may utilize virtually any electronic means for transmitting the reservation information to a competitive services provider 76. These include email, automated telephone, facsimile, and other forms of electronic communication. Of course, the competitive services provider 76 may itself comprise an integrated business such that the level of interconnectivity provided to the user 52 may parallel that disclosed and described in connection with the integrated services provider system of the present invention as well as the parent invention. This integrated business capability is represented as the third level 74 of the architectural topography shown in FIG. 3 which parallels portions of that shown in FIG. 1 in that a pair of network mainframe computers, such as AS/400's 78, 80 may process reservations to and from various branch offices 82 which are geographically diverse.

With the present invention, the Internet portal provided by the AMRS/WEB network configured servers 70 provide an Internet portal for communication with not only the integrated computer enabled business system of the resident services provider, but also a portal for placing reservations to other competitive services provider 76. Thus, the user 52 enjoys the capability of accessing multiple service providers for competitive services through a single Internet connection using a single set of protocols, menus, etc. for the conduct of this business activity. Furthermore, the software configured network of servers 70 is readily configured in Web Logic to adapt to changing user requirements, data requirements, unique competitive service provider requirements, and other upgrades or modifications in a convenient manner by simply modifying the software resident therein. No special browser software of other interface software is required by the user and any special interconnecting software or server/hardware requirements may be satisfied as between the service providers such that the user is presented with a seamless interconnection. As the present invention is configured and works well with the integrated business and computer systems as disclosed herein, it is anticipated that such interconnection and usability may be readily translated to any other such integrated computer system as might be found in other competitive service providers, as would be apparent to those of ordinary skill in the art. Thus, with the present invention, a user is provided with Internet access through a single portal to a plurality of service providers and, to the extent possible, to their integrated computer business systems.

Various changes and modifications to the preferred embodiment as explained herein would be envisioned by those of skill in the art. Examples of these changes and modifications include the utilization of computer systems configured in any one of a myriad of ways using present technology alone. For example, mobile computers are presently available and wireless technology could be used to extend the integrated business network of the services provider, as well as match the mobility needed by the various users connected to and using the present invention. The particular software, and various aspects and features of its design, have been adapted for particular application to the vehicle rental business. Of course, computer software applications satisfying other business needs would necessarily require adaptation to their particular business models. Thus, it is envisioned by the inventors herein that the various software programs described herein would be matched to the particular business application to which the invention is utilized. These and other aspects of the preferred embodiment should not be viewed as limiting and instead be considered merely as illustrative of an example of the practical implementation of the present invention. These changes and modifications should be considered as part of the invention and the invention should be considered as limited only by the scope of the claims appended hereto and their legal equivalents.

EXHIBIT A
   See the file "Exhibit A.txt" submitted on the incorporated compact disc.

Figure 4:
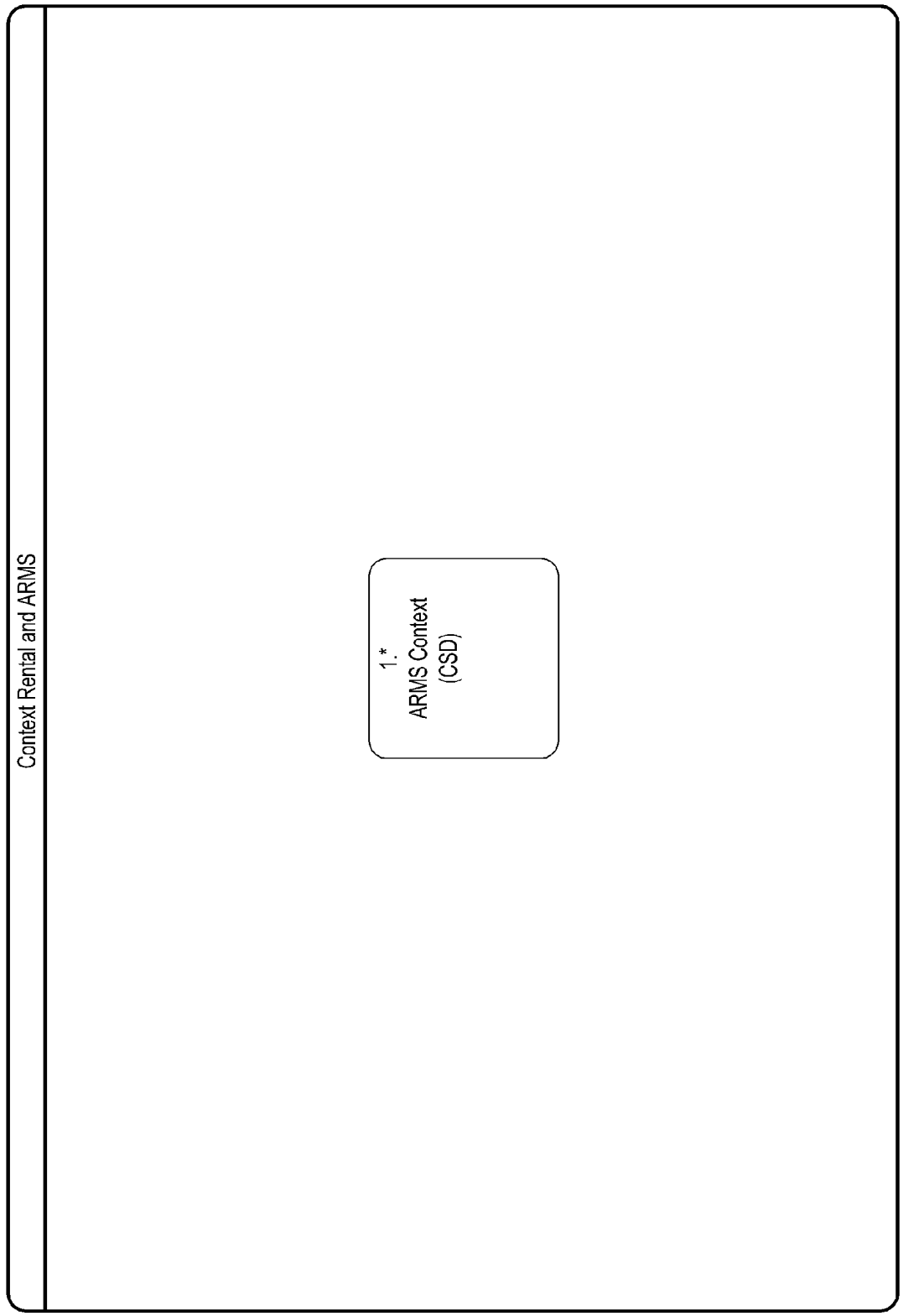
FIGS. 4-91 are flow diagrams for software resident on the mainframe AS/400 computer 32 as described in Exhibits B and C.
Figure 5:
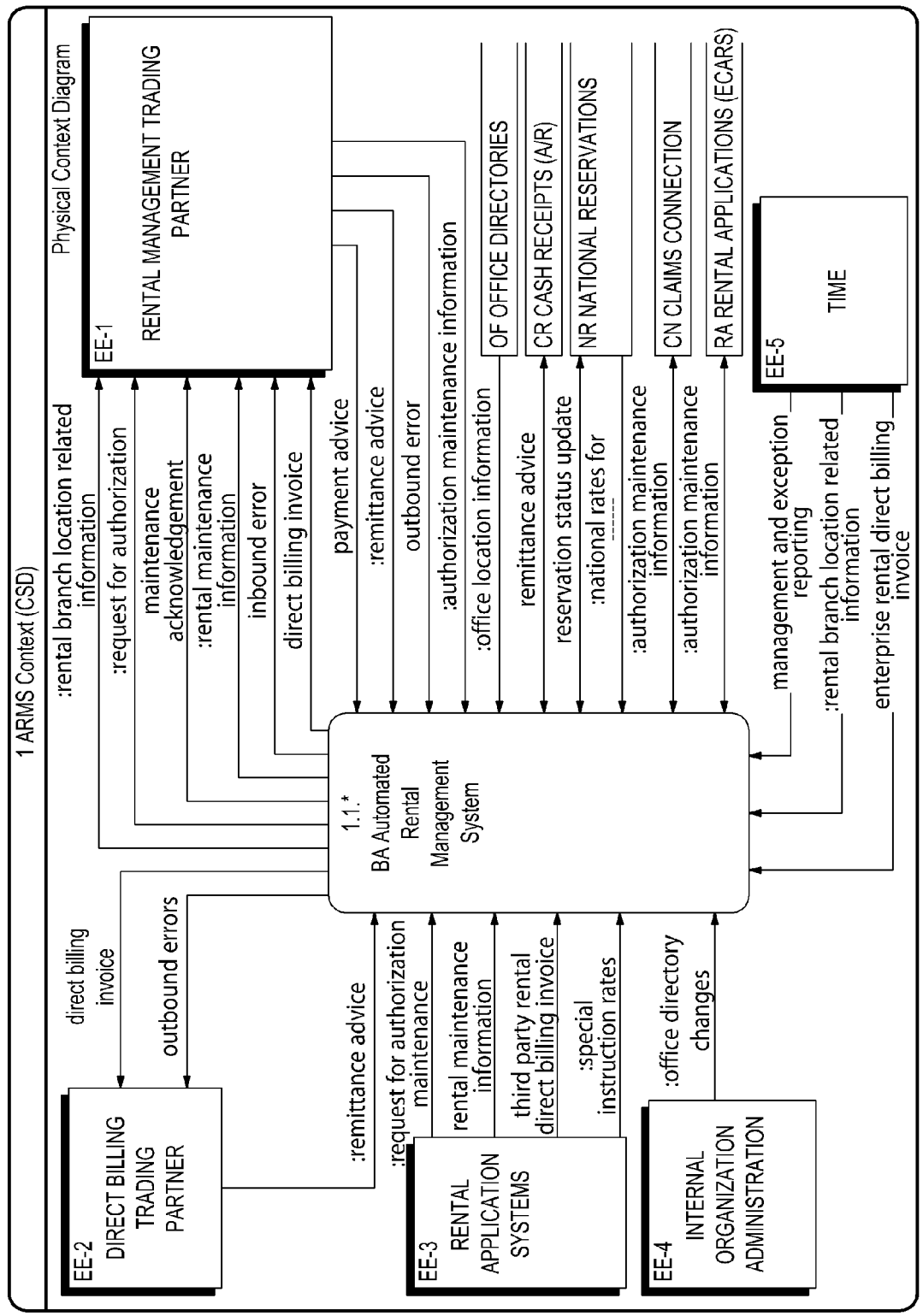
Figure 6:
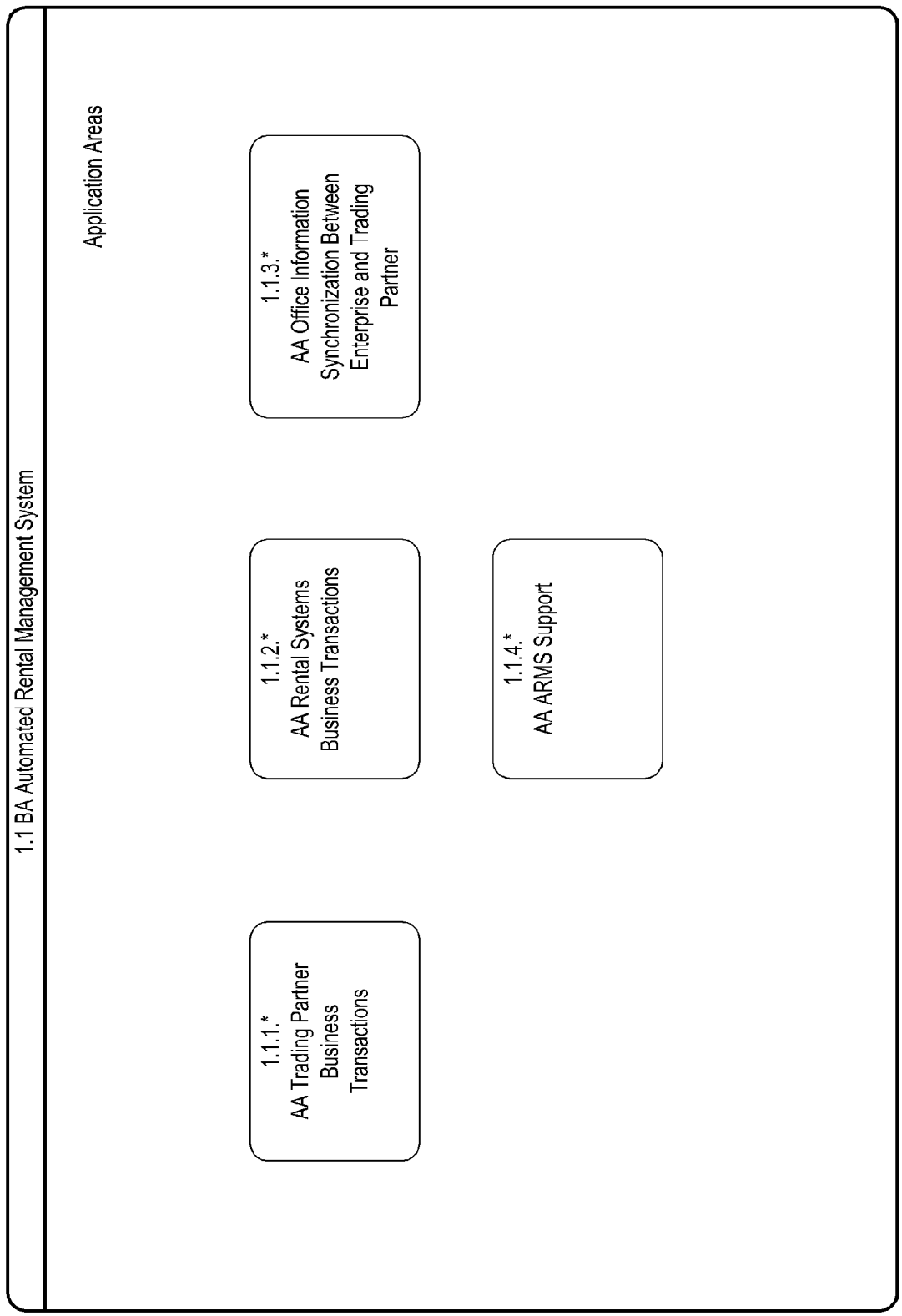
Figure 7:
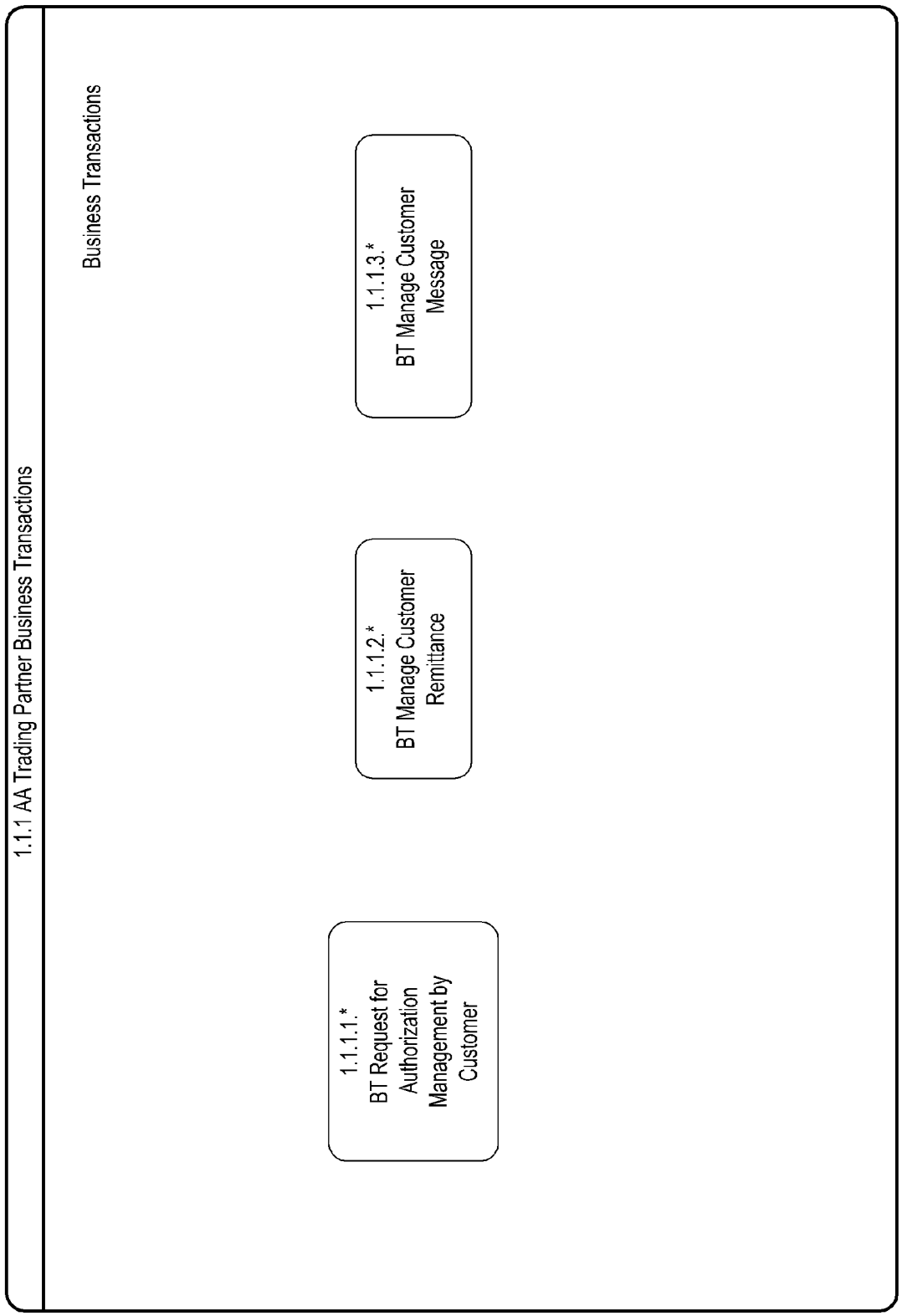
Figure 8:
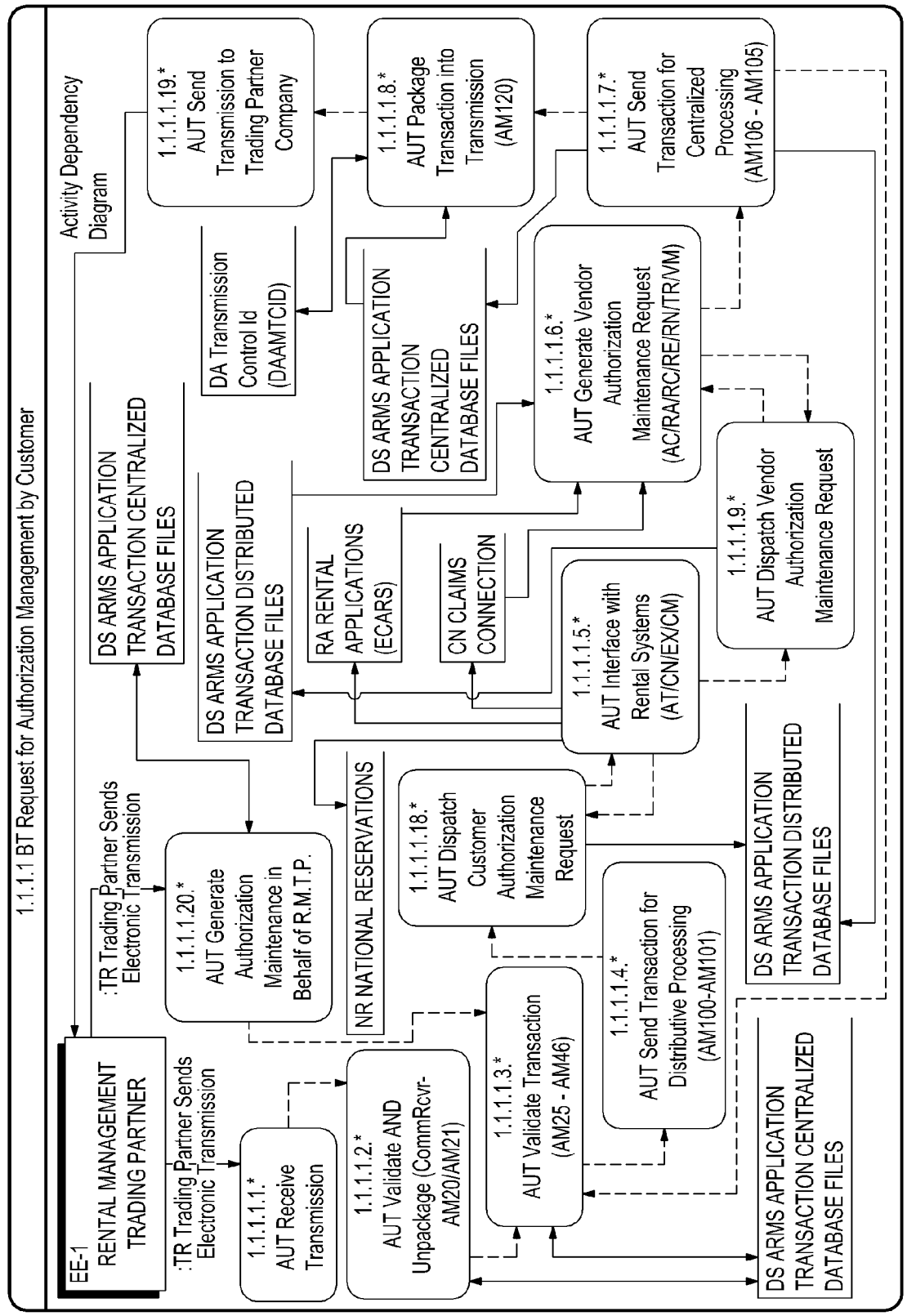
Figure 9:
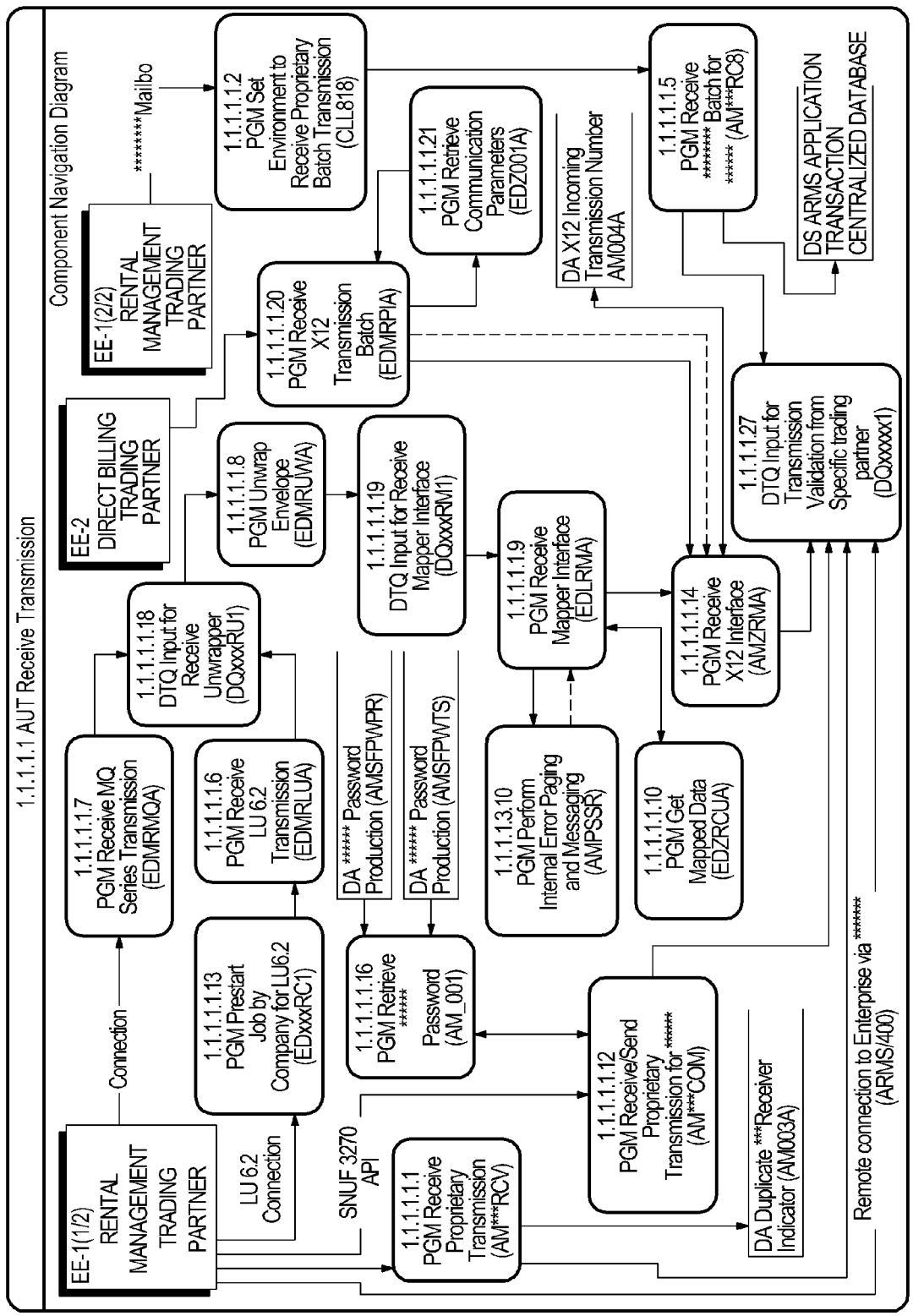
Figure 10:
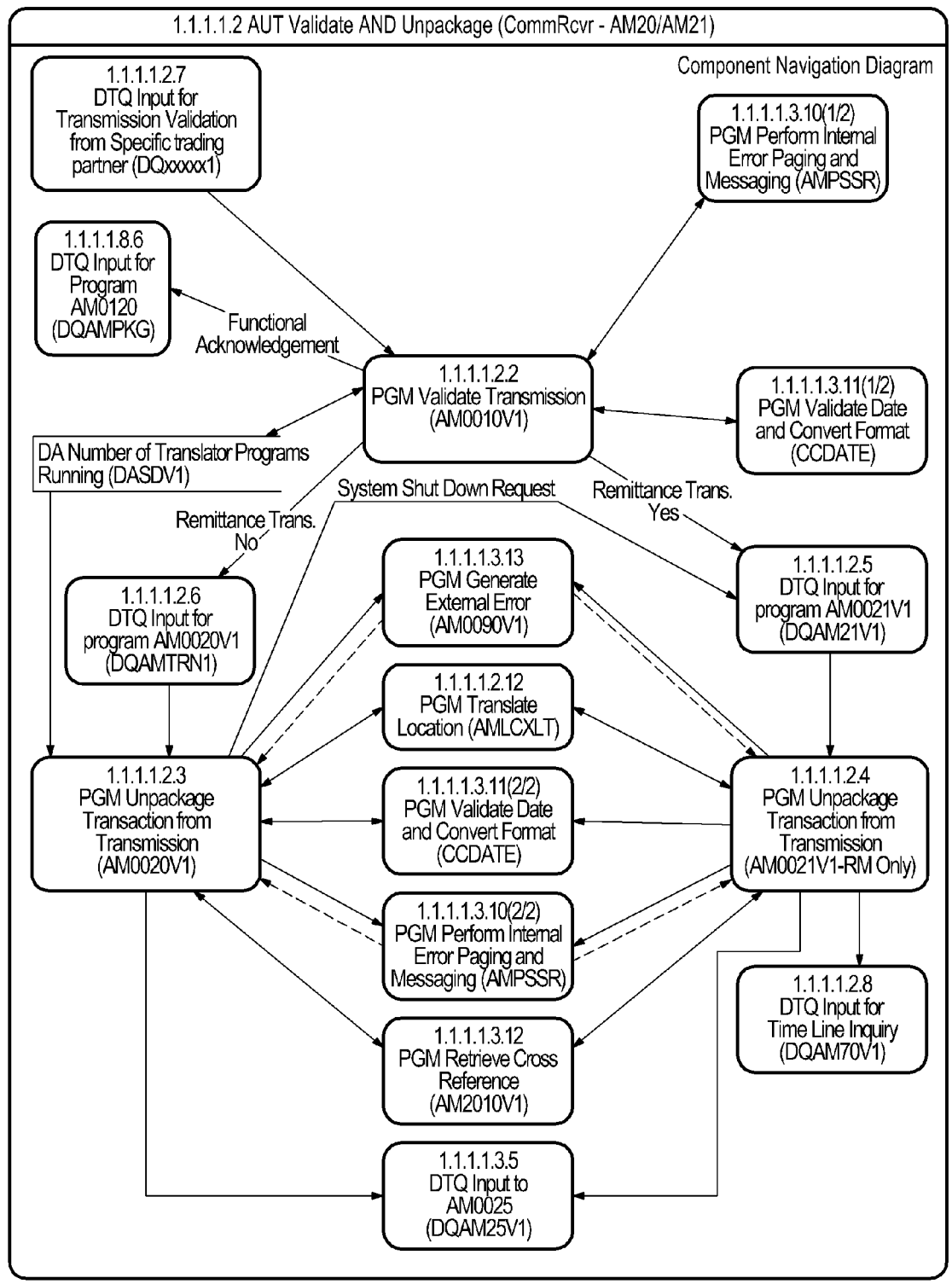
Figure 12:
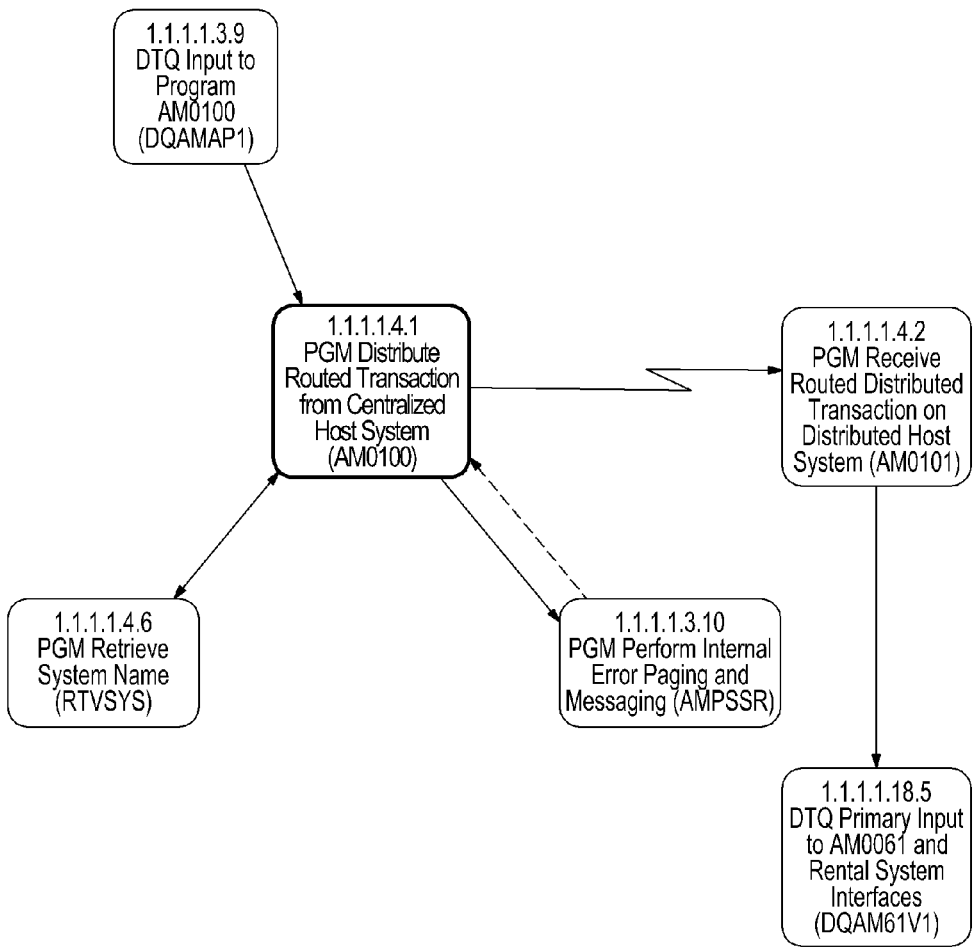
Figure 13:
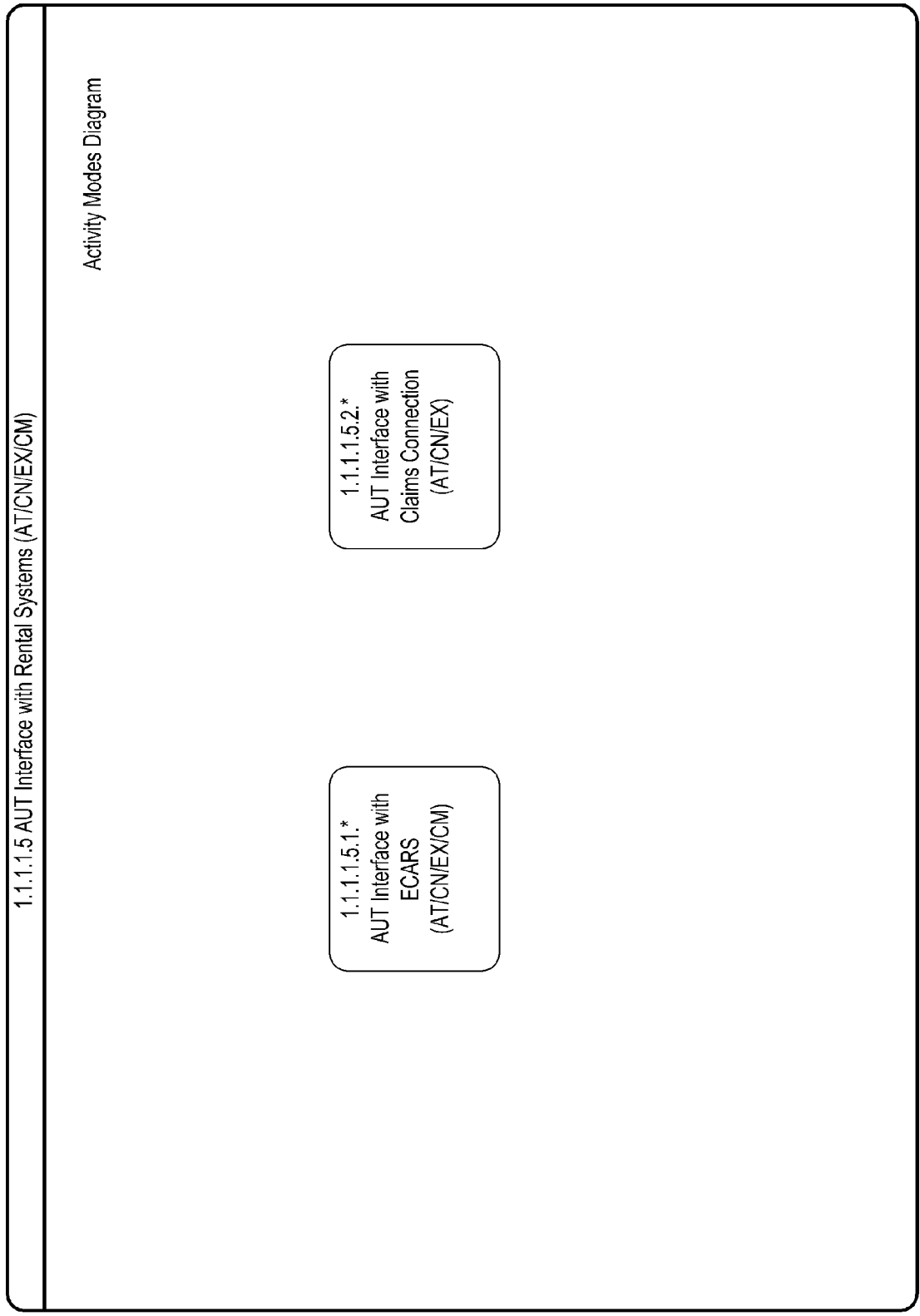
Figure 14A:
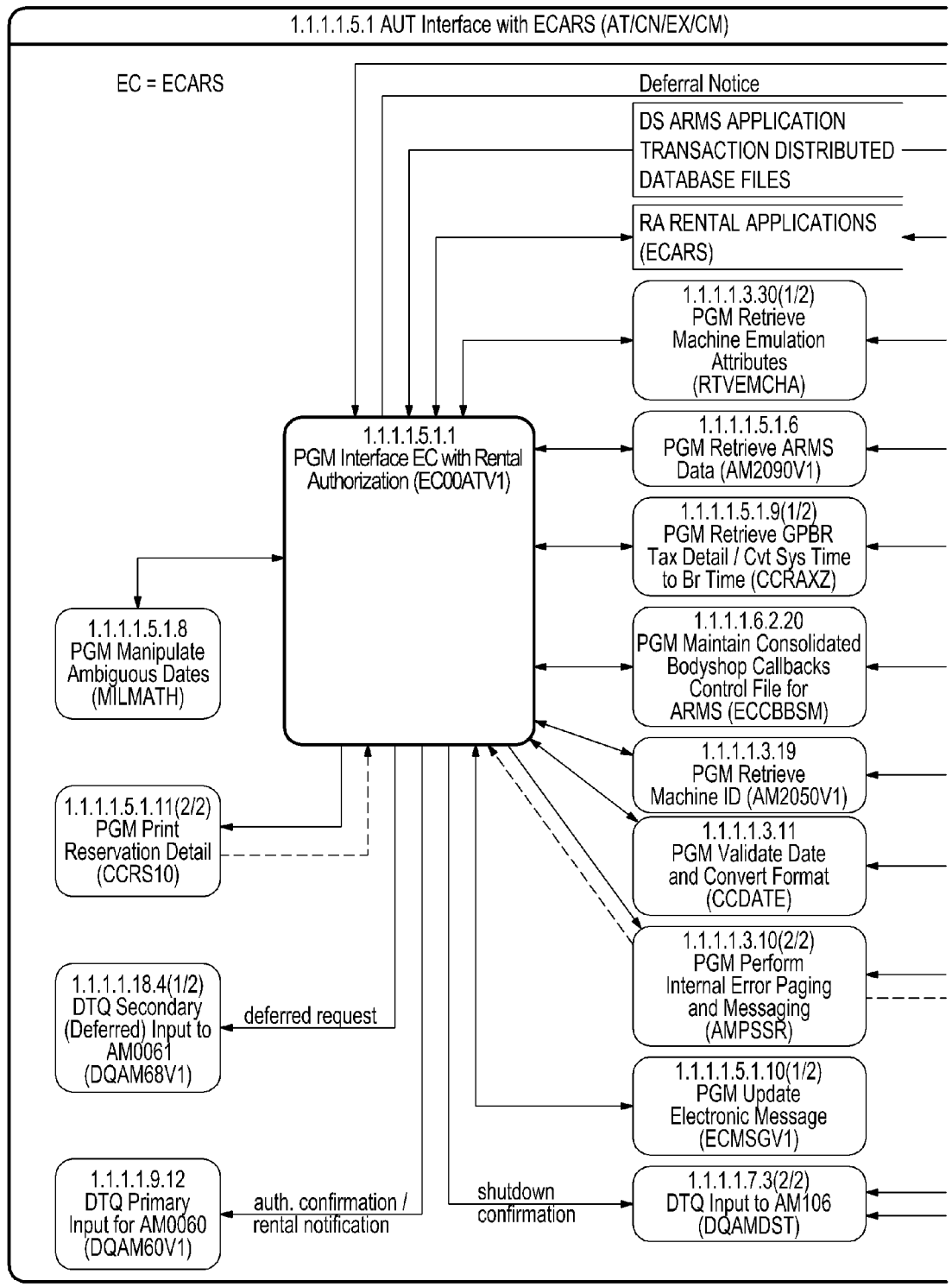
Figure 14B:
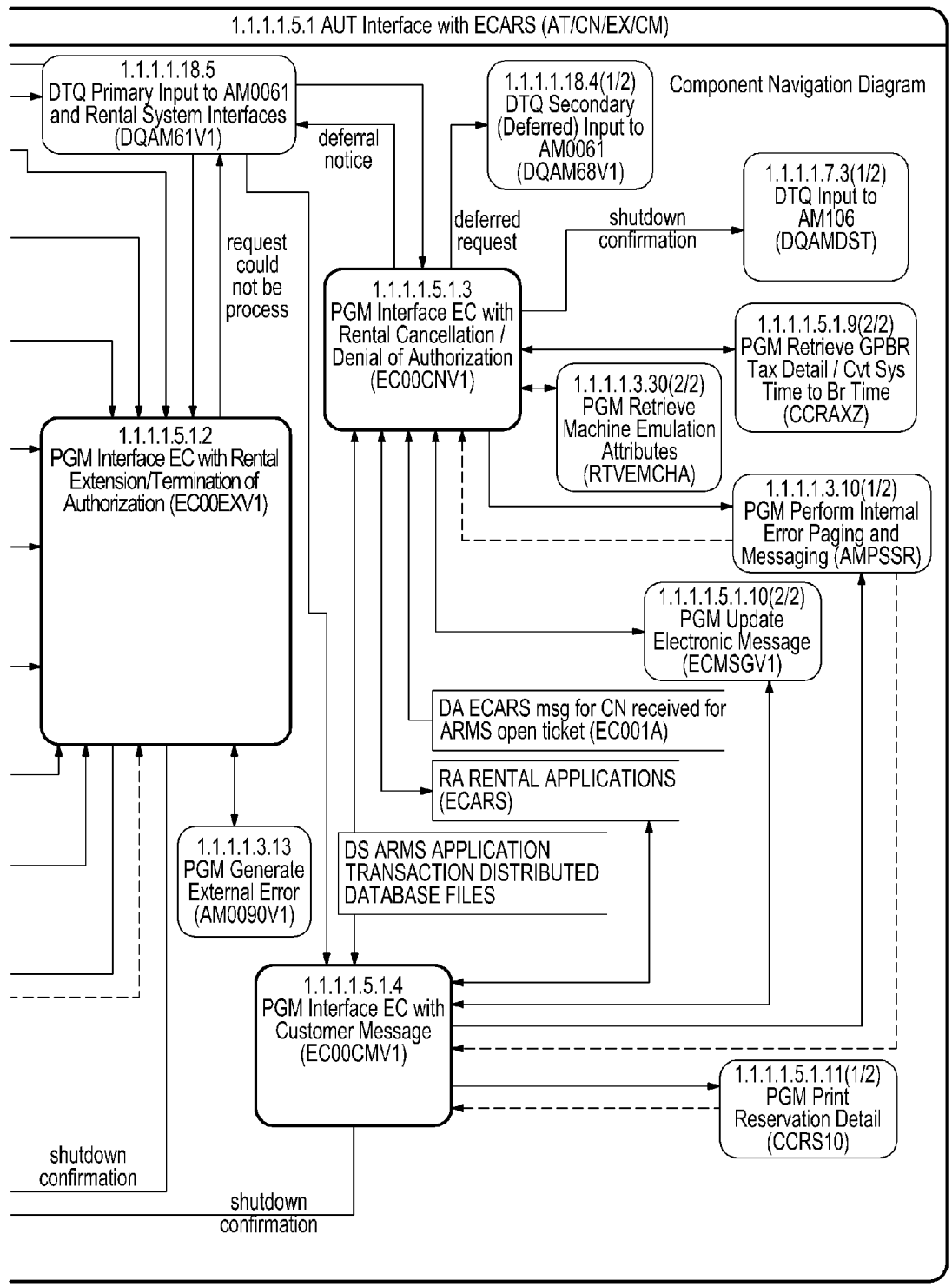
Figure 15:
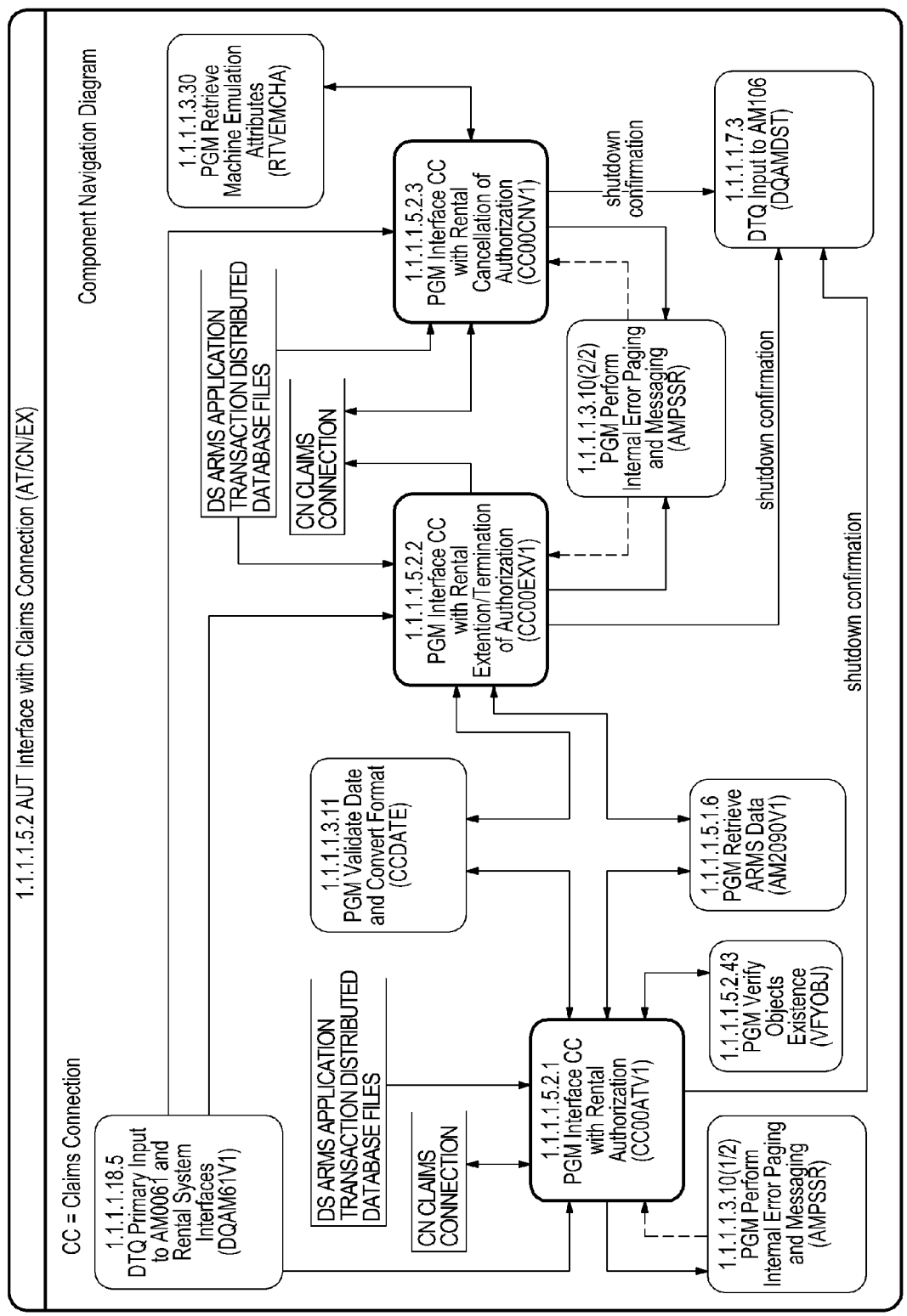
Figure 16:
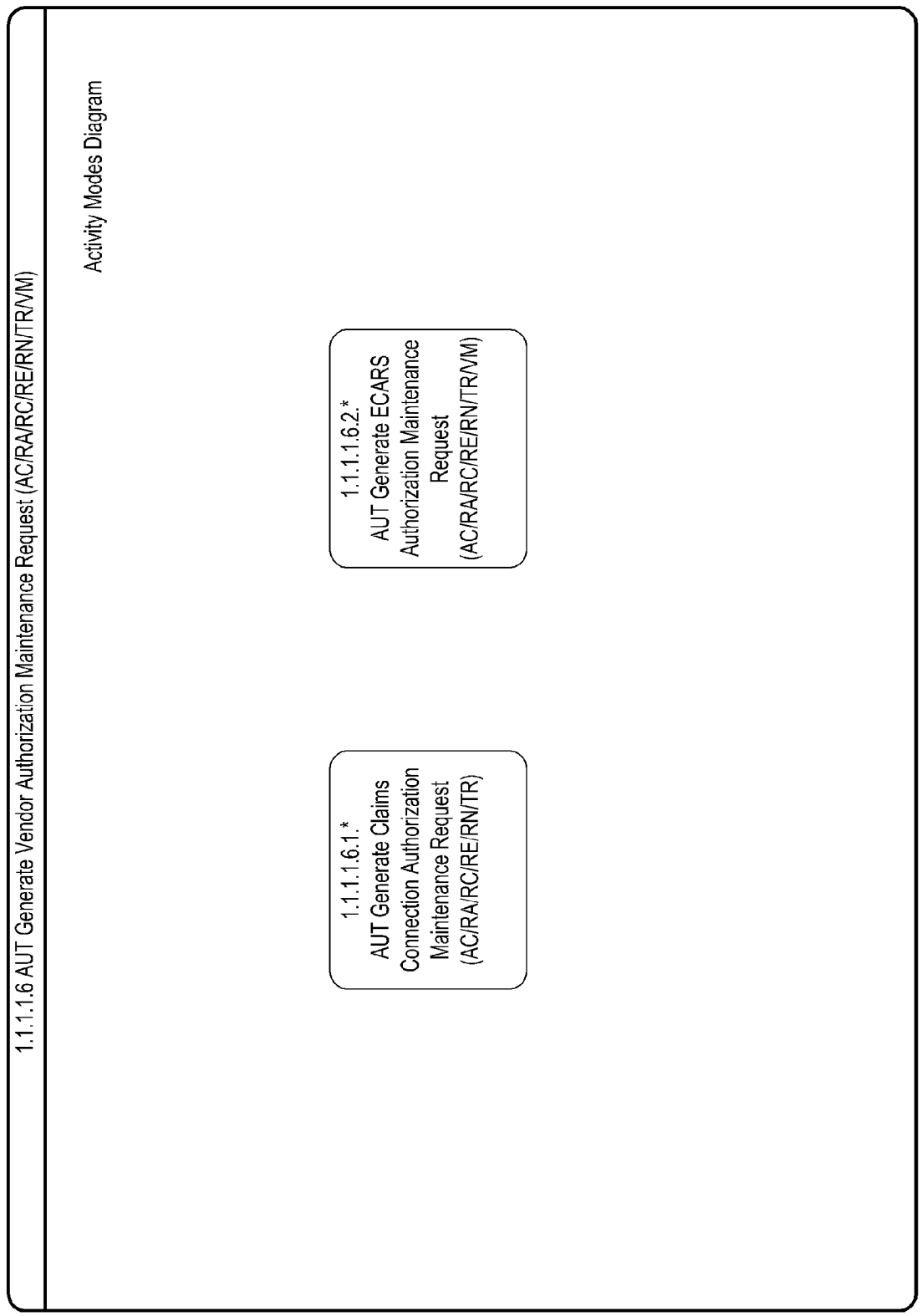
Figure 17:
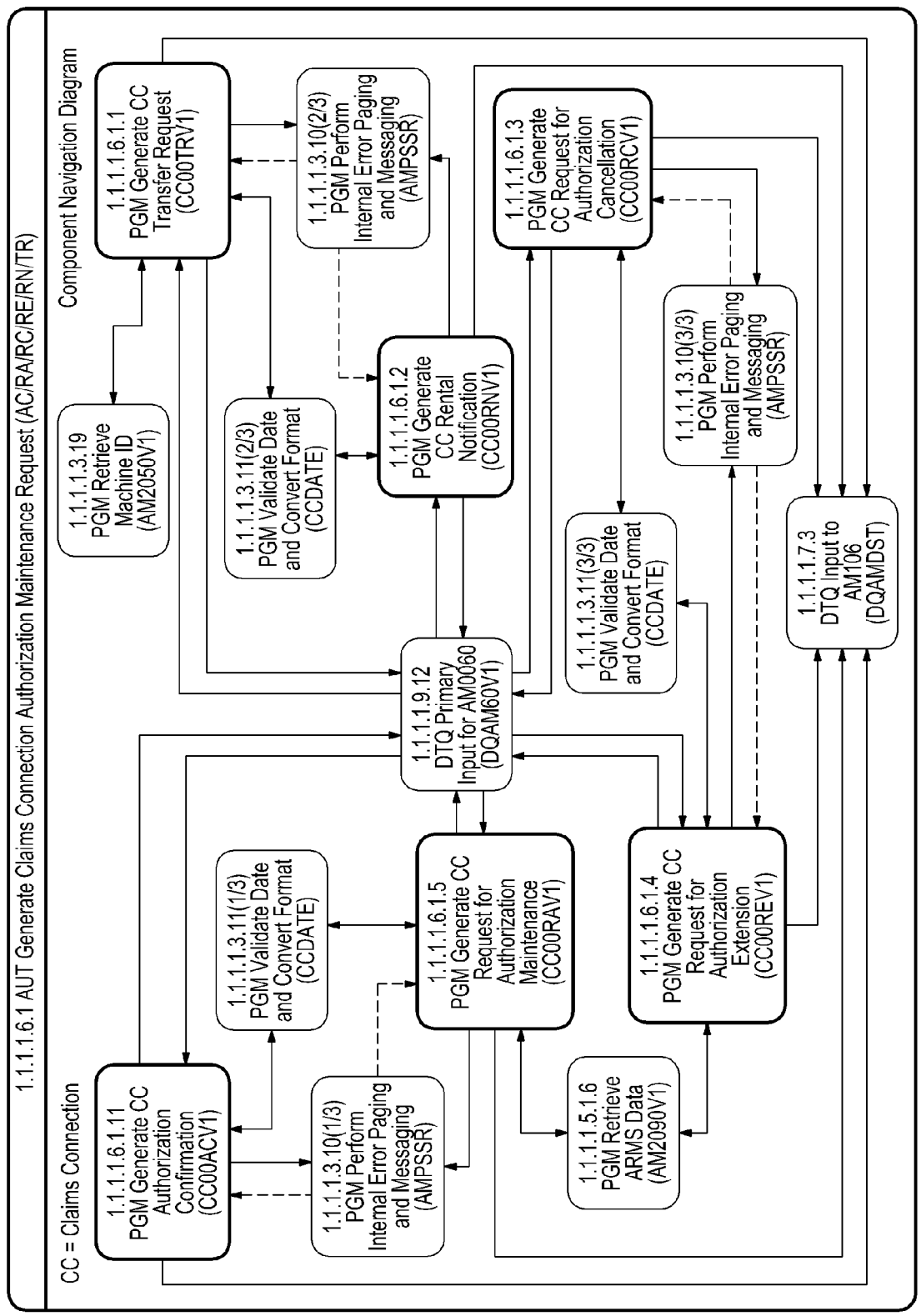
Figure 18A:
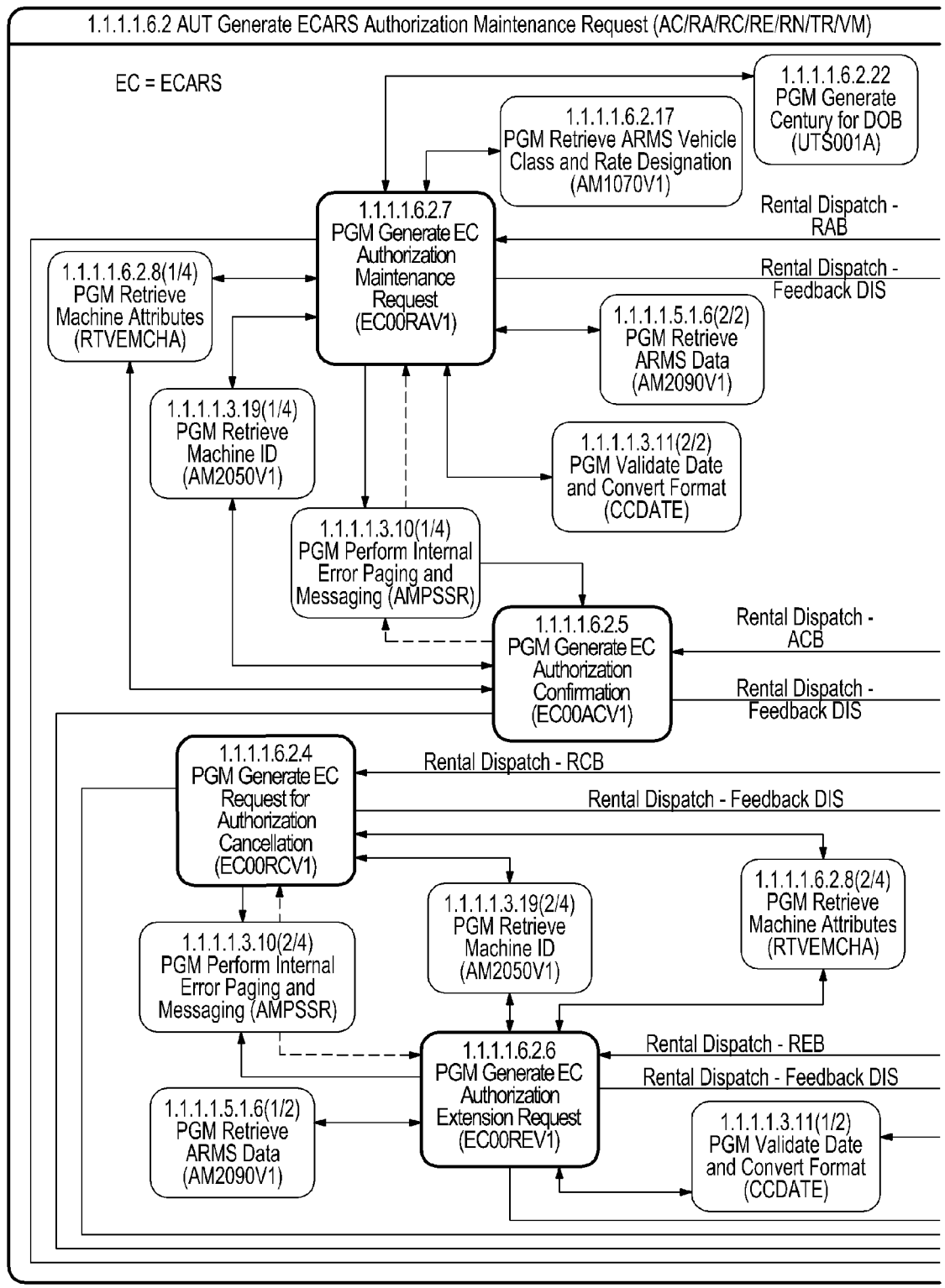
Figure 18B:
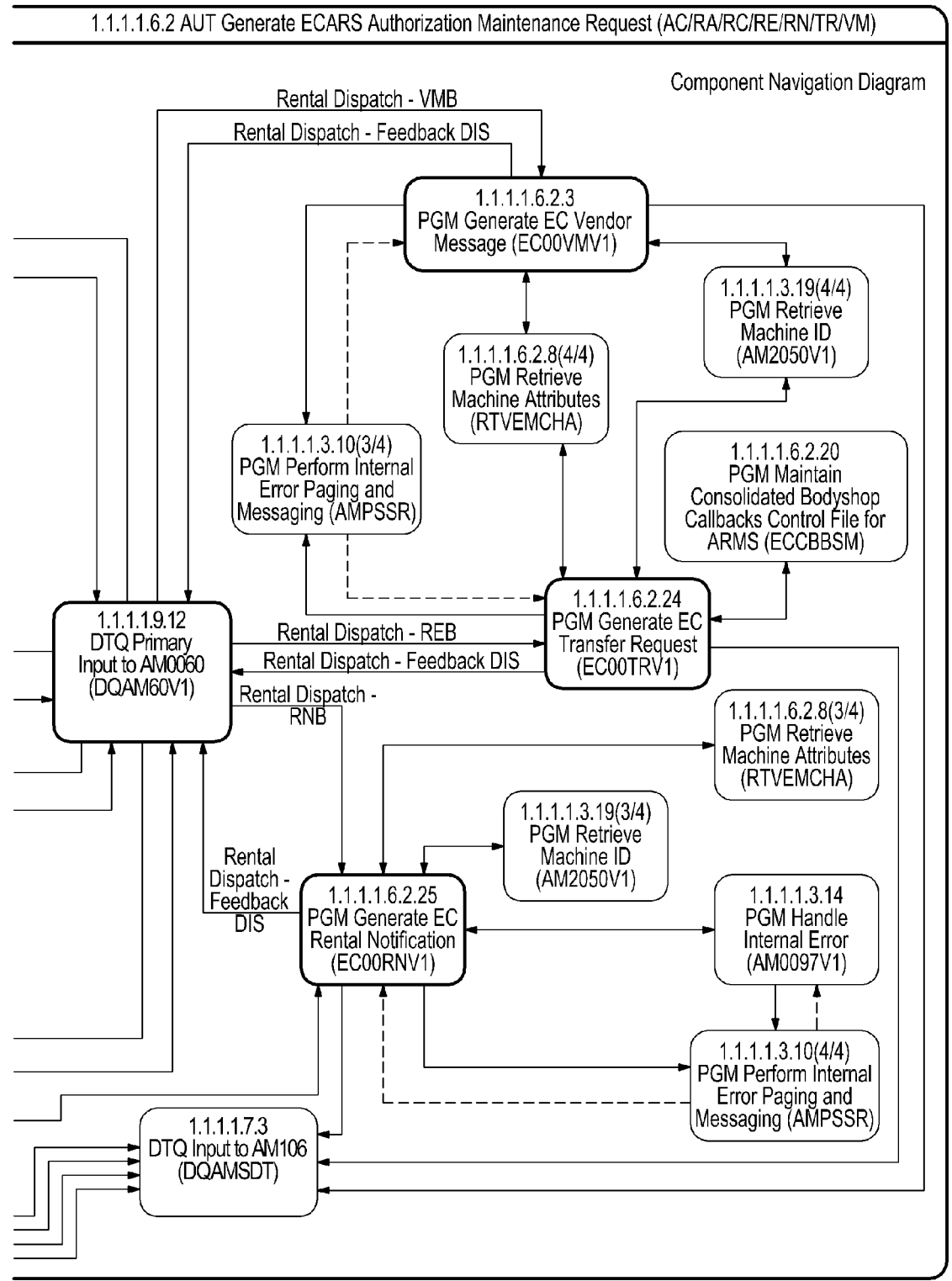
Figure 19:
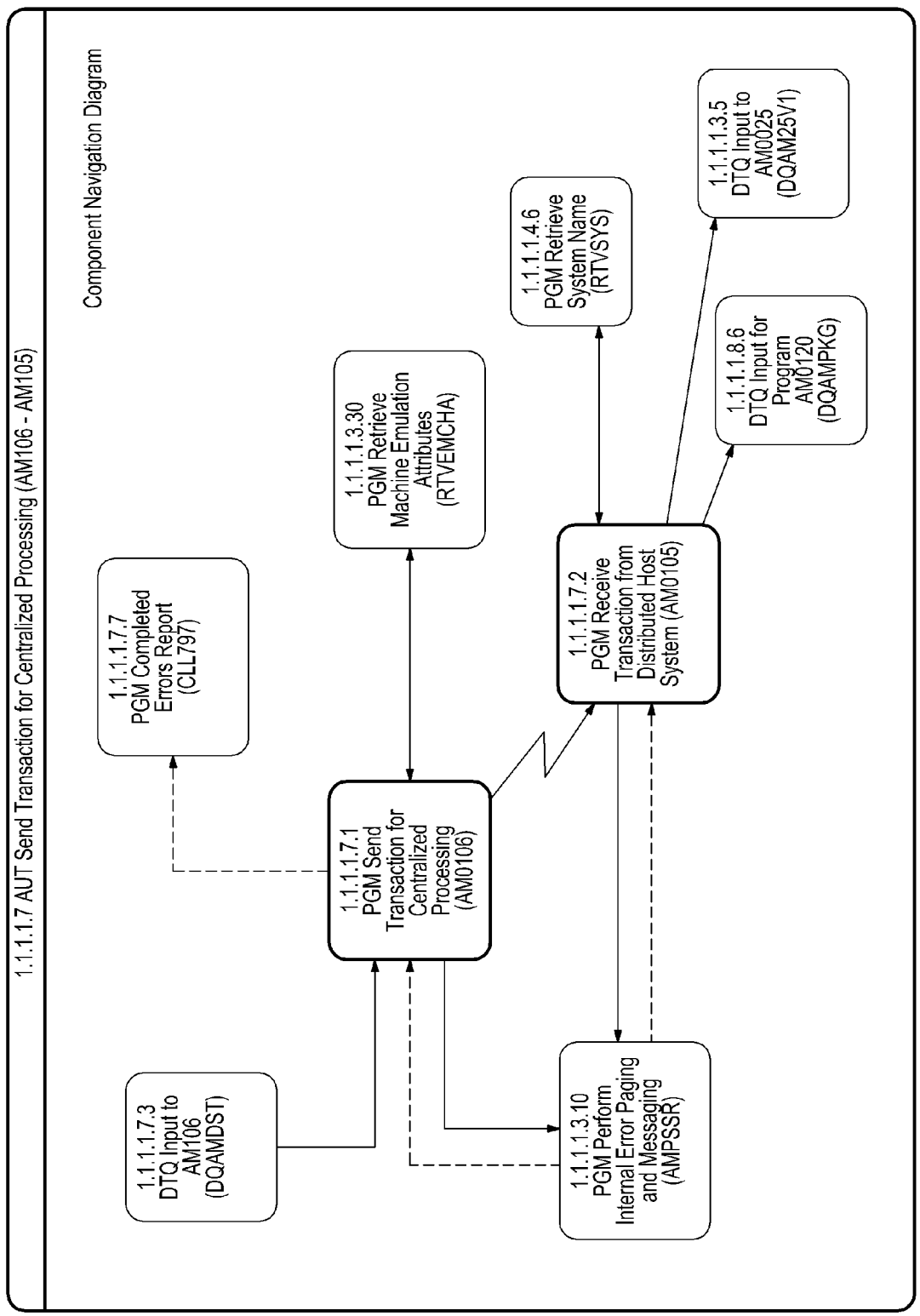
Figure 20:
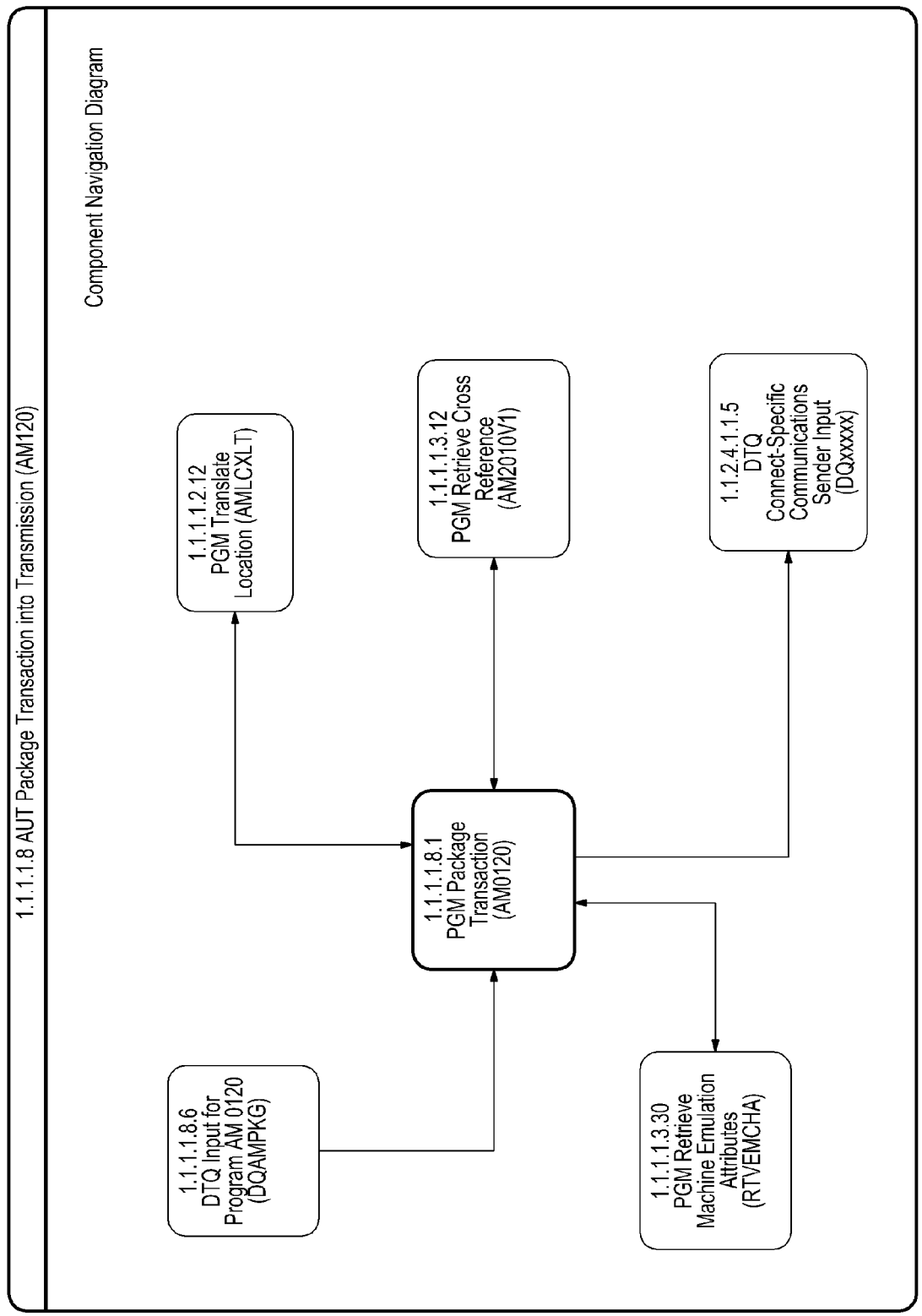
Figure 21:
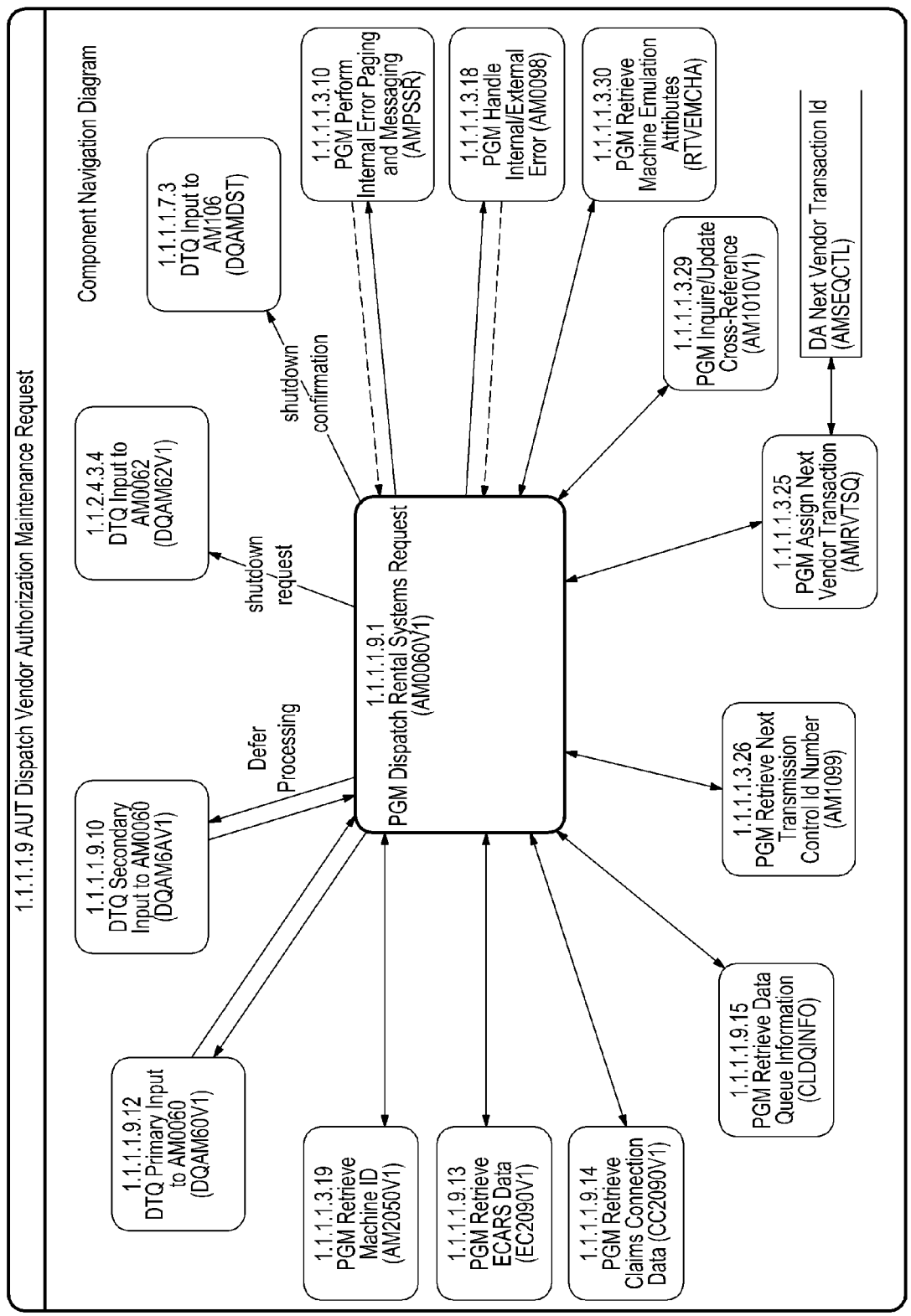
Figure 22:
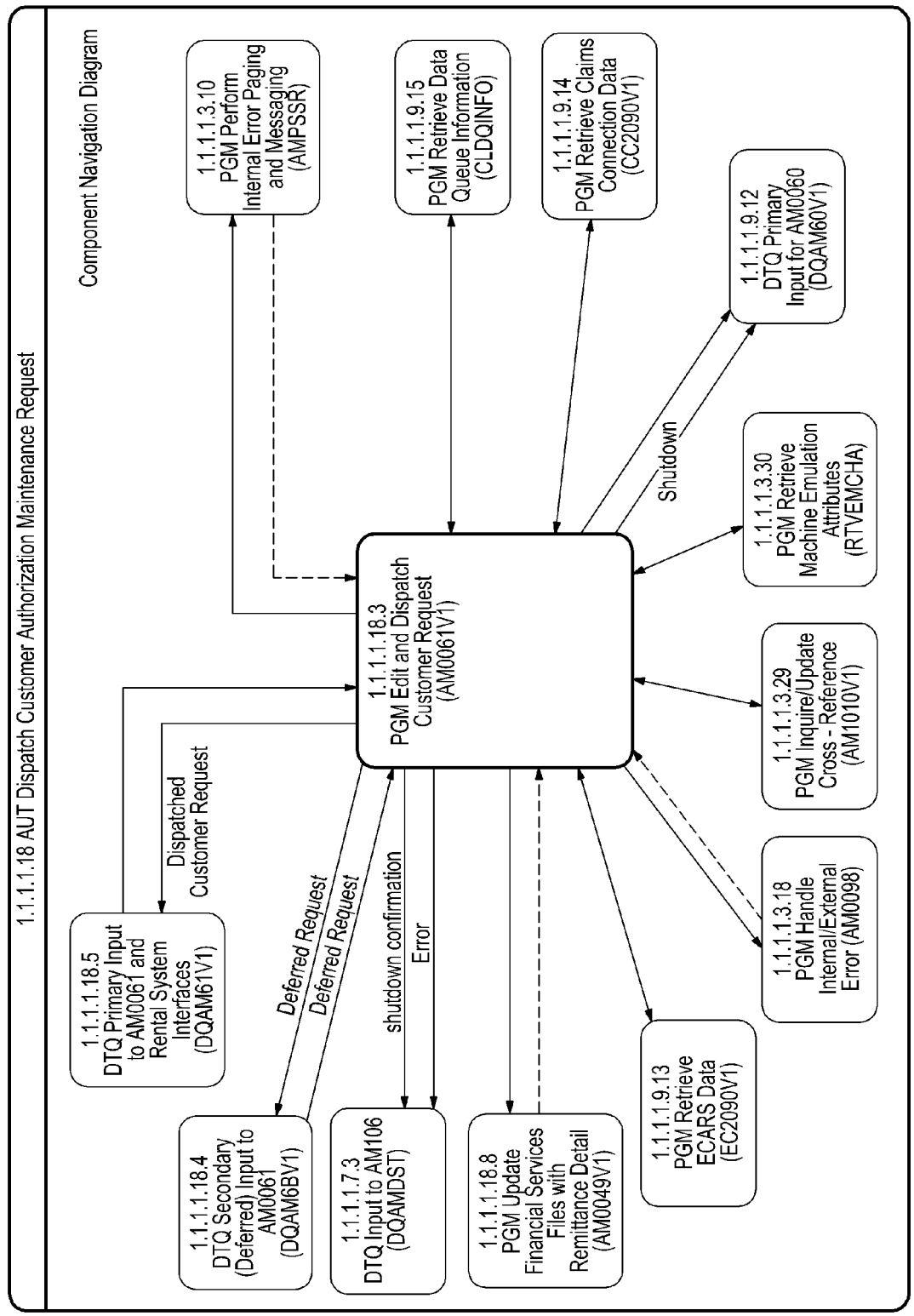
Figure 23:
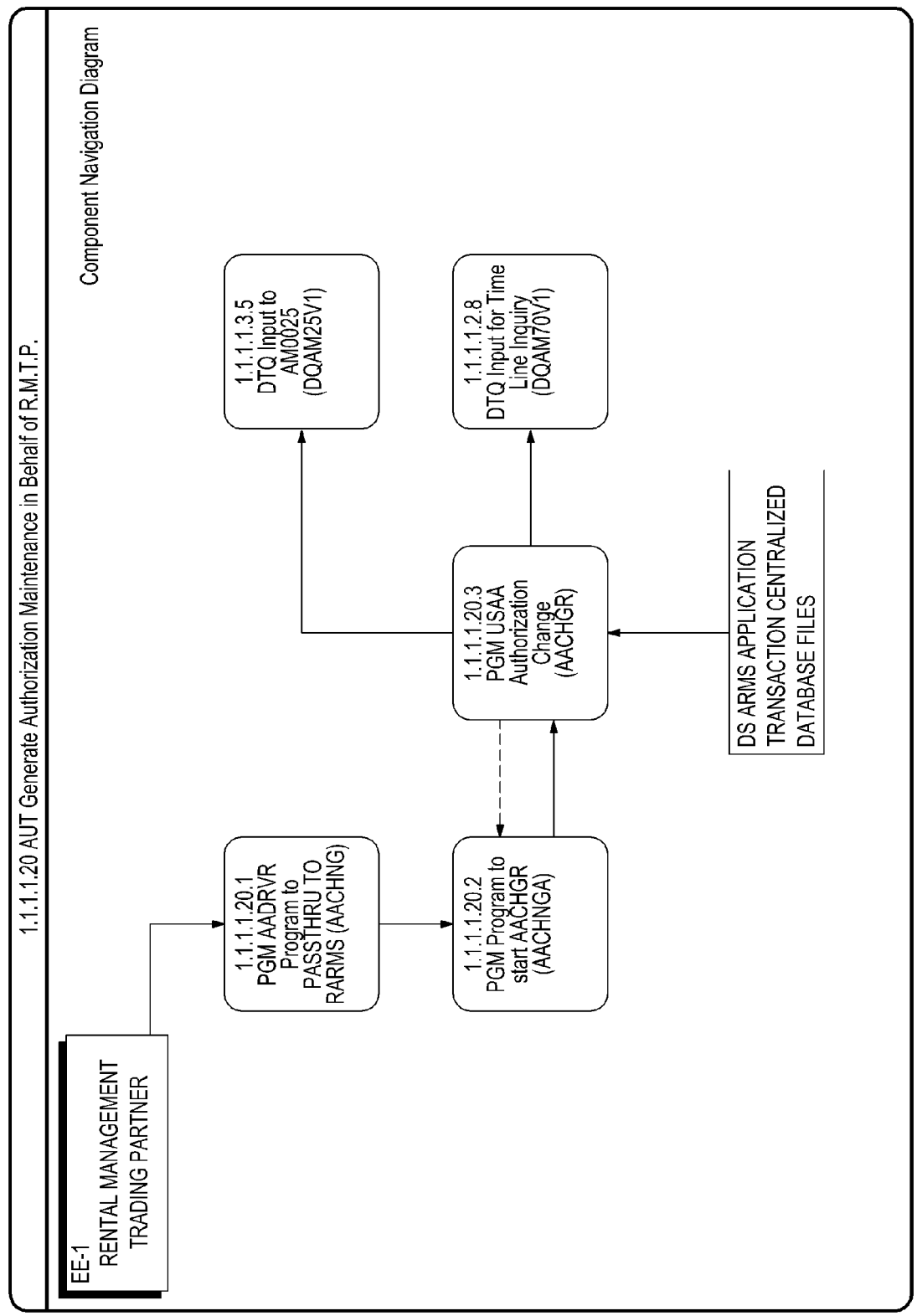
Figure 24:
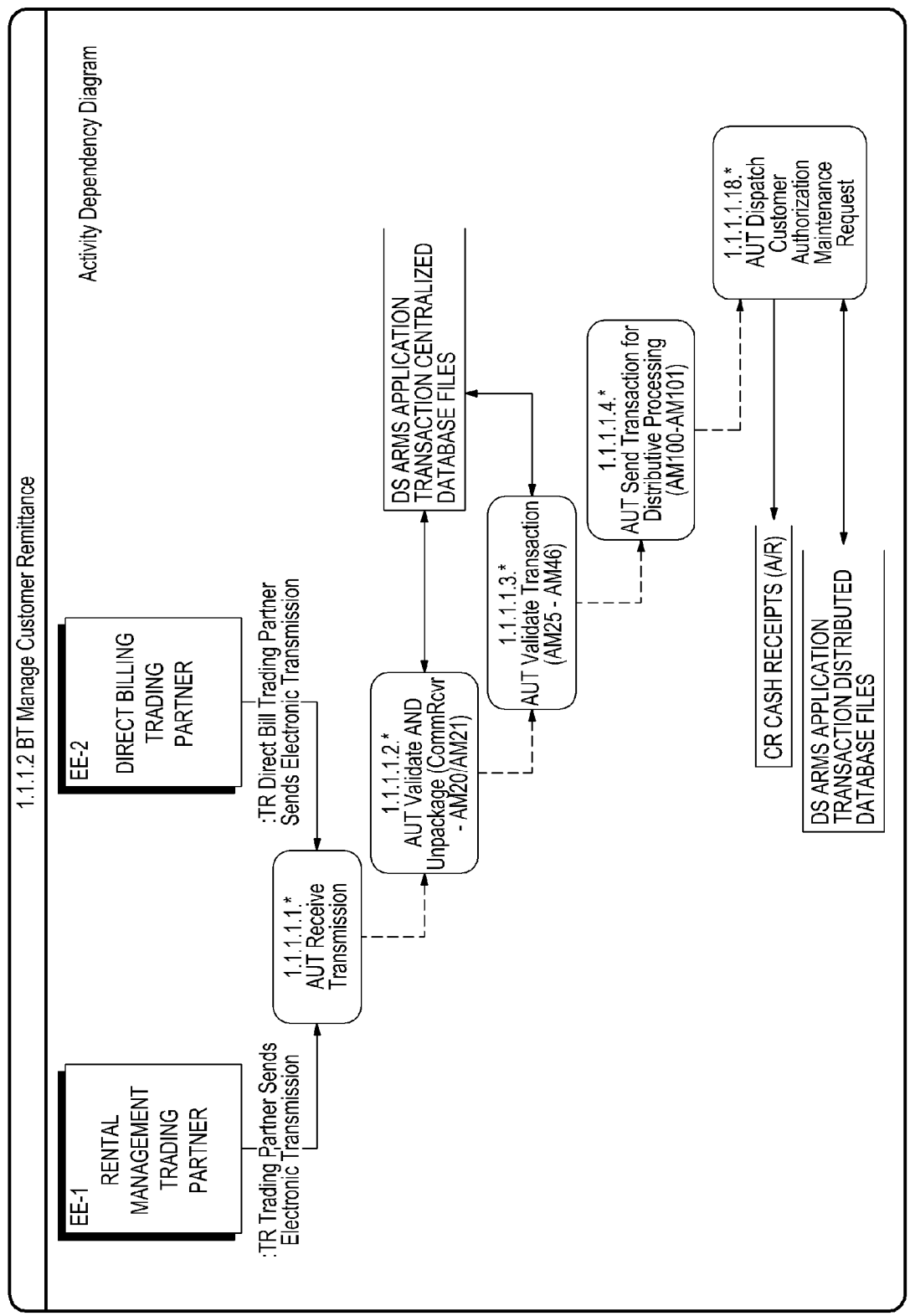
Figure 25:
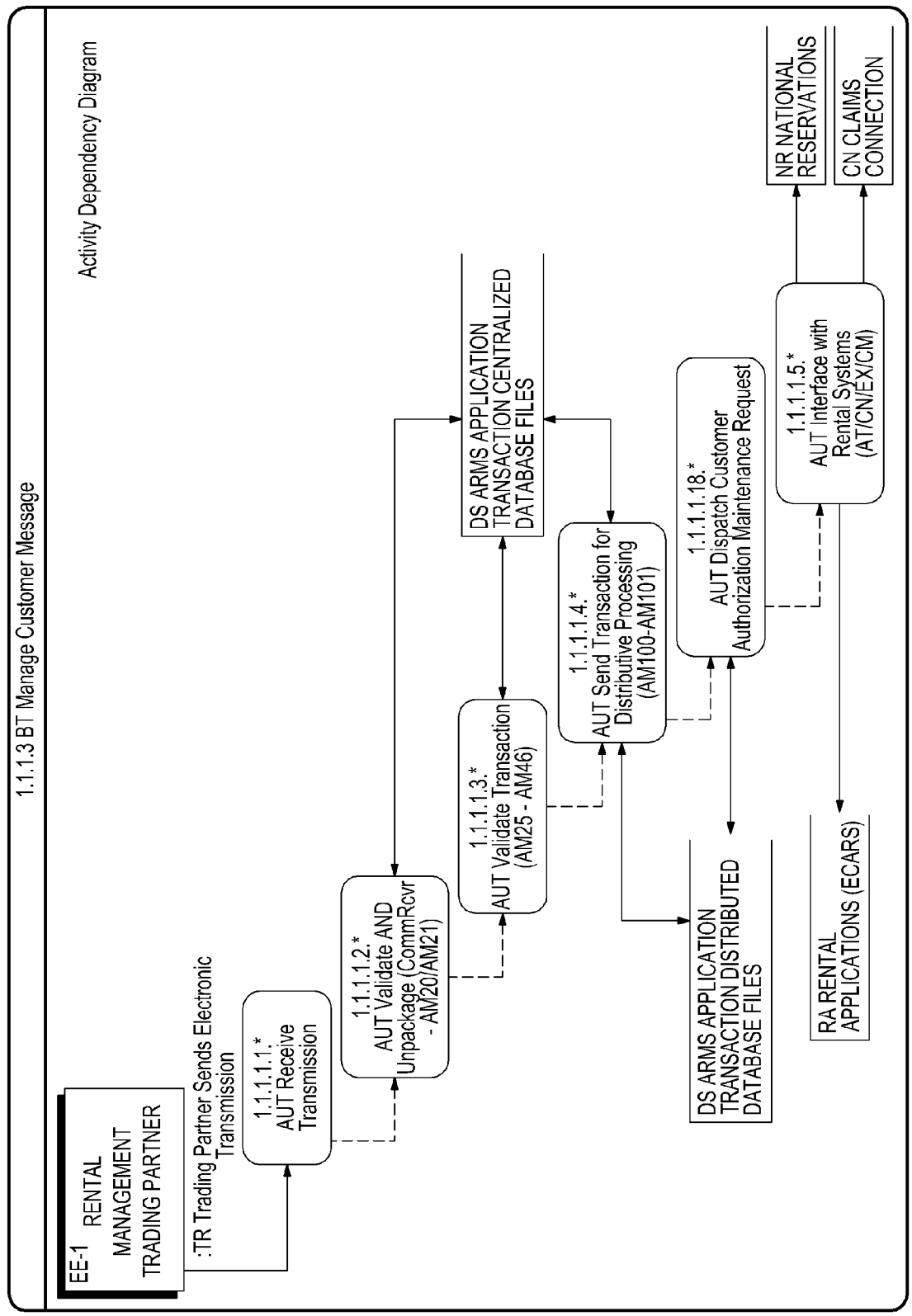
Figure 26:
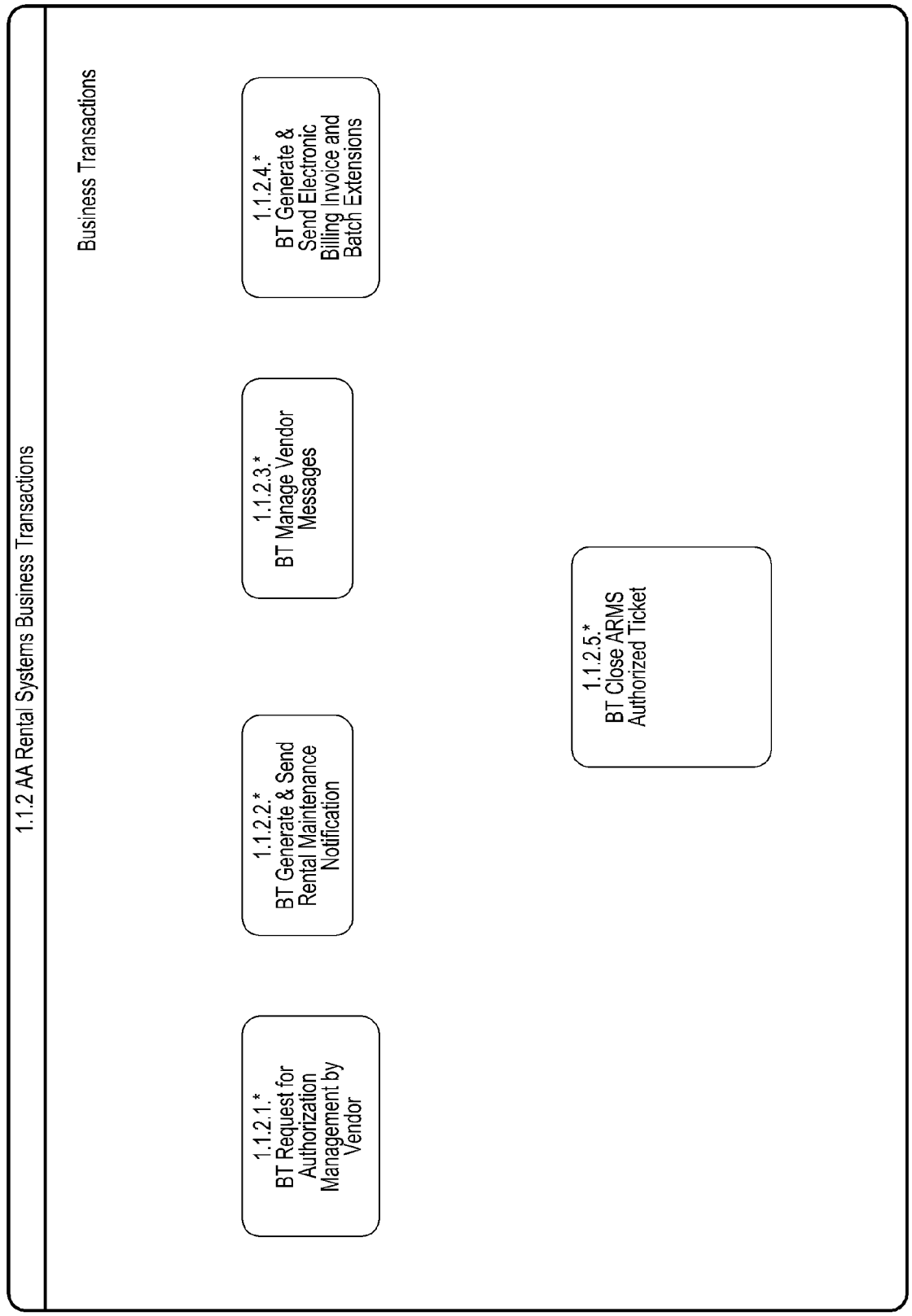
Figure 27:
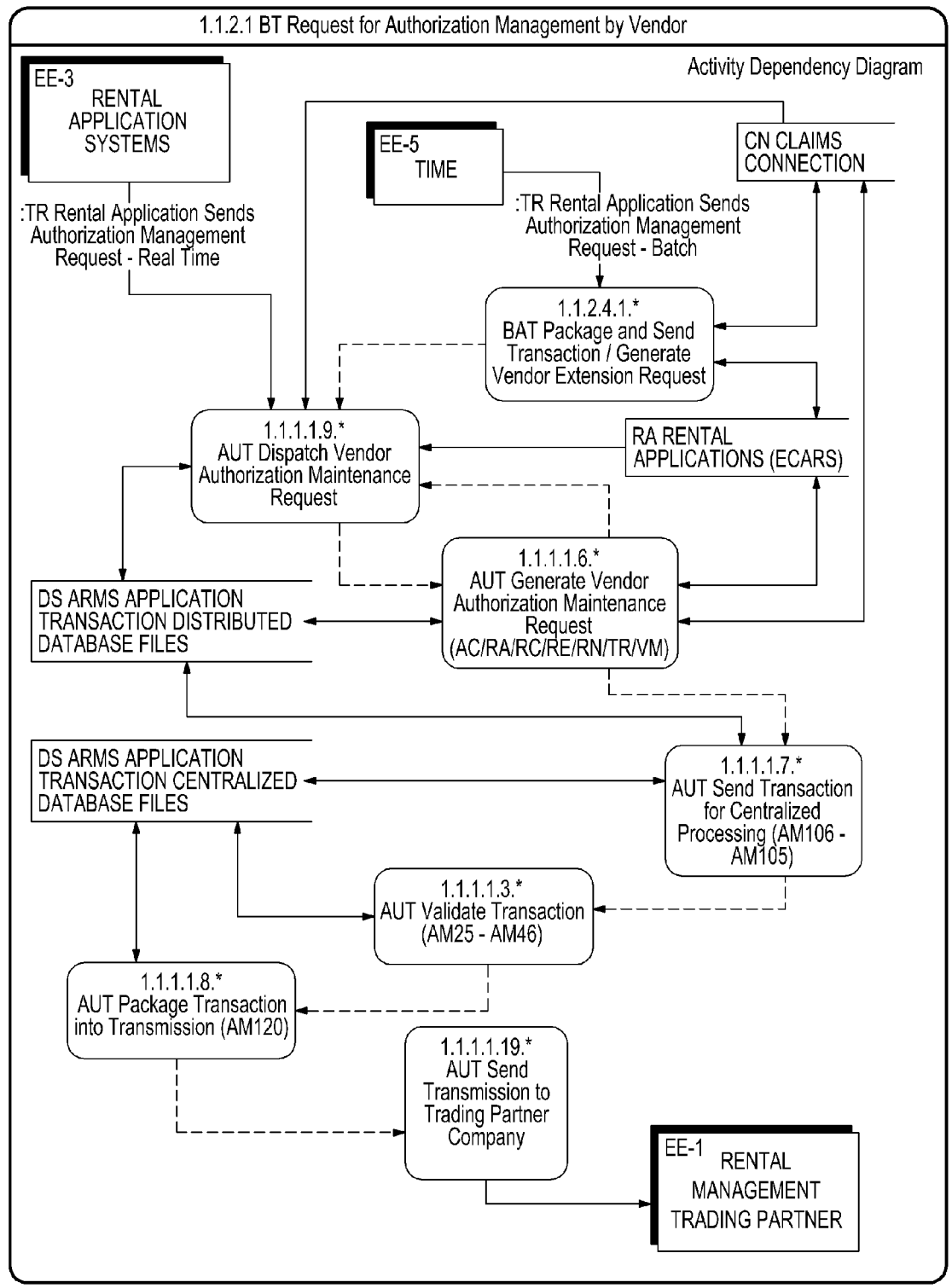
Figure 28:
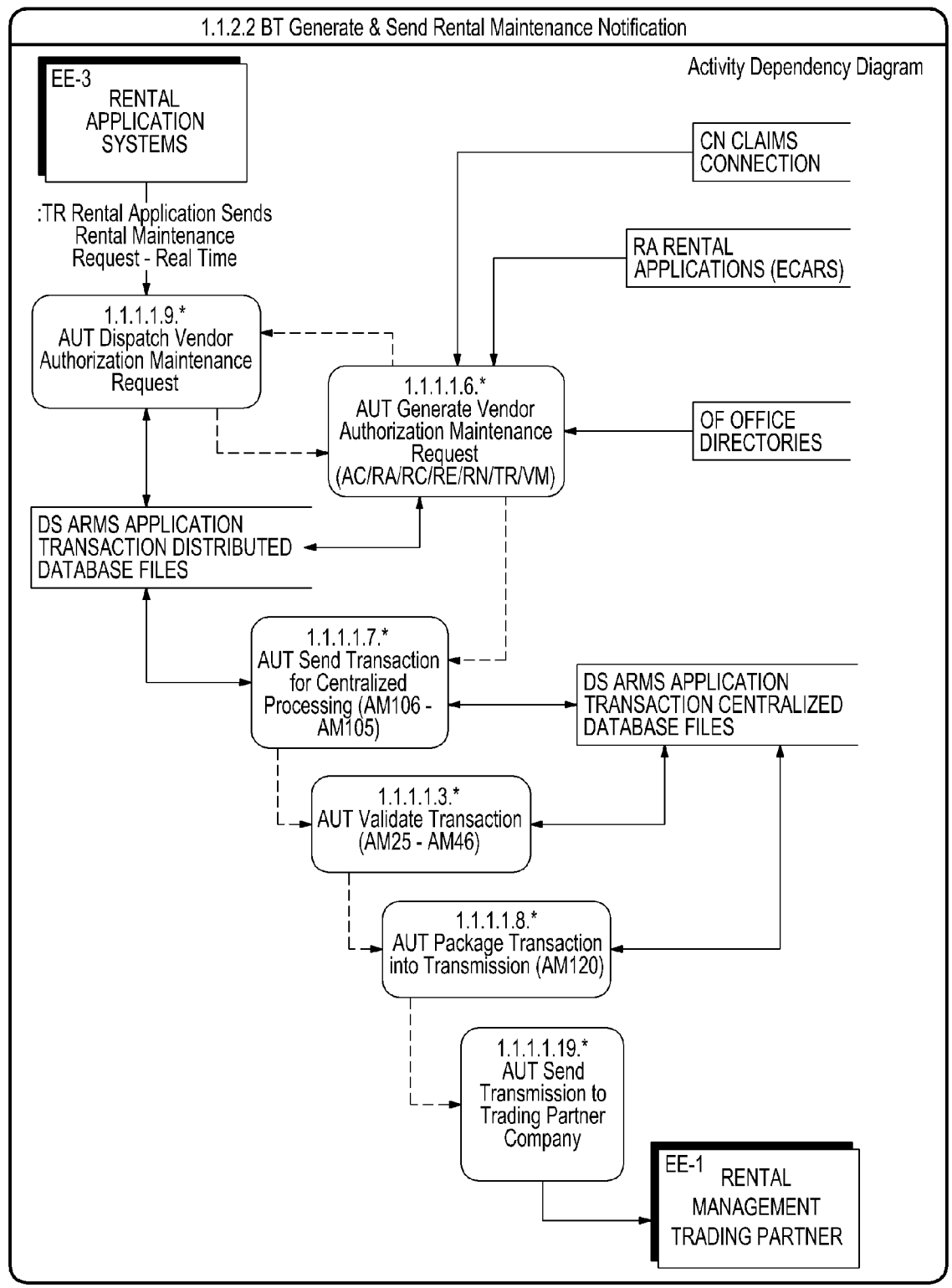
Figure 29:
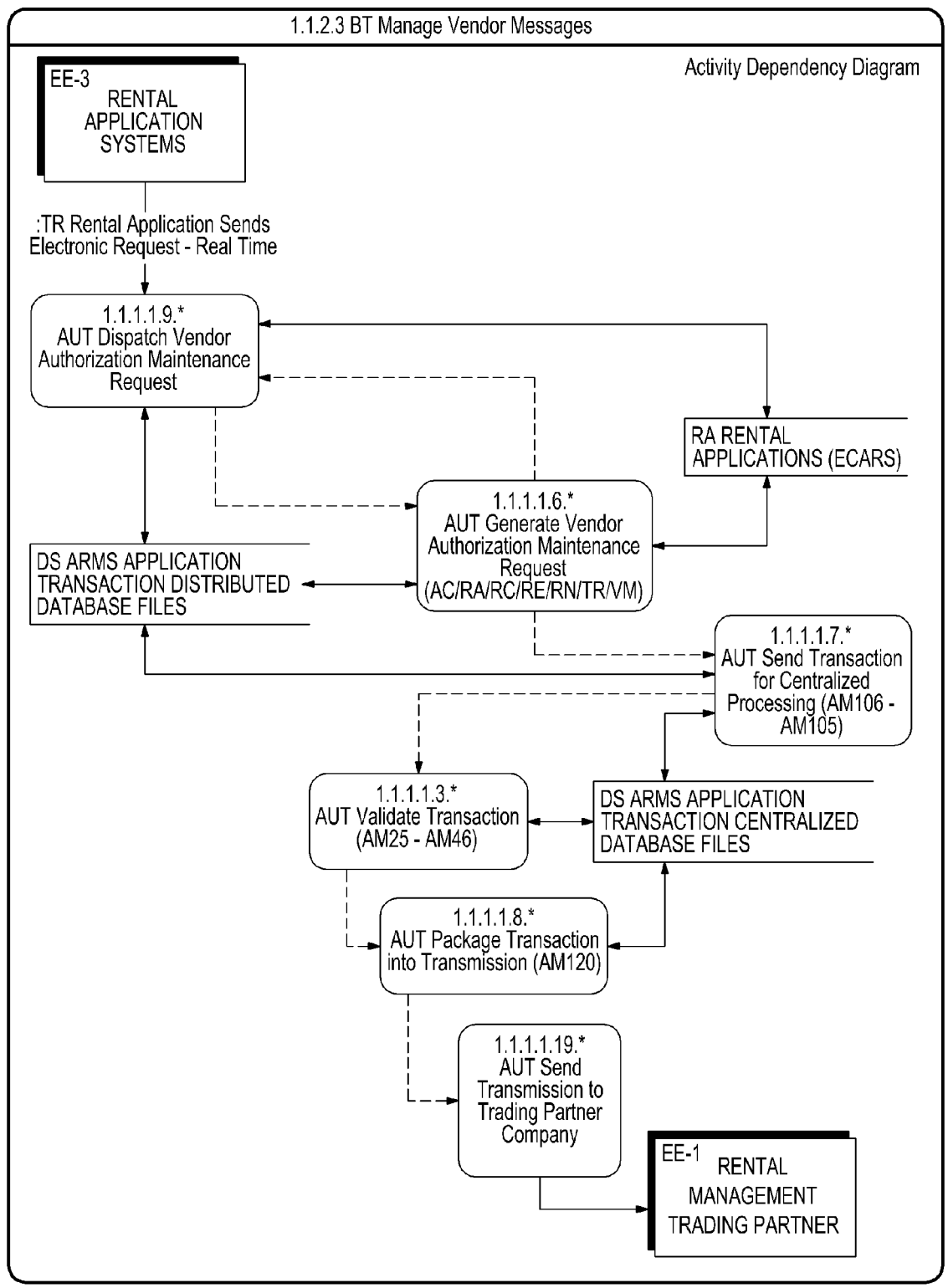
Figure 30:
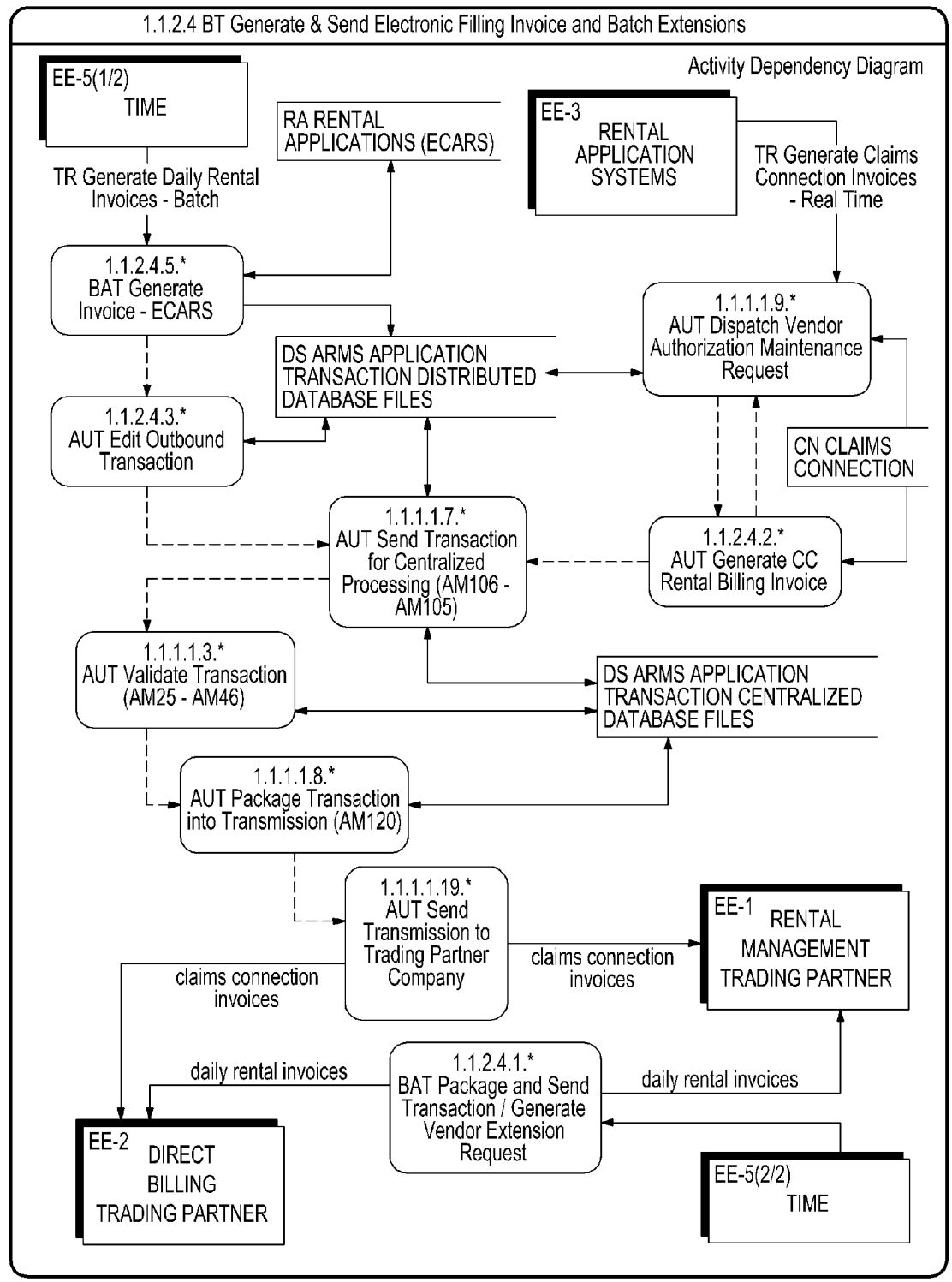
Figure 31:
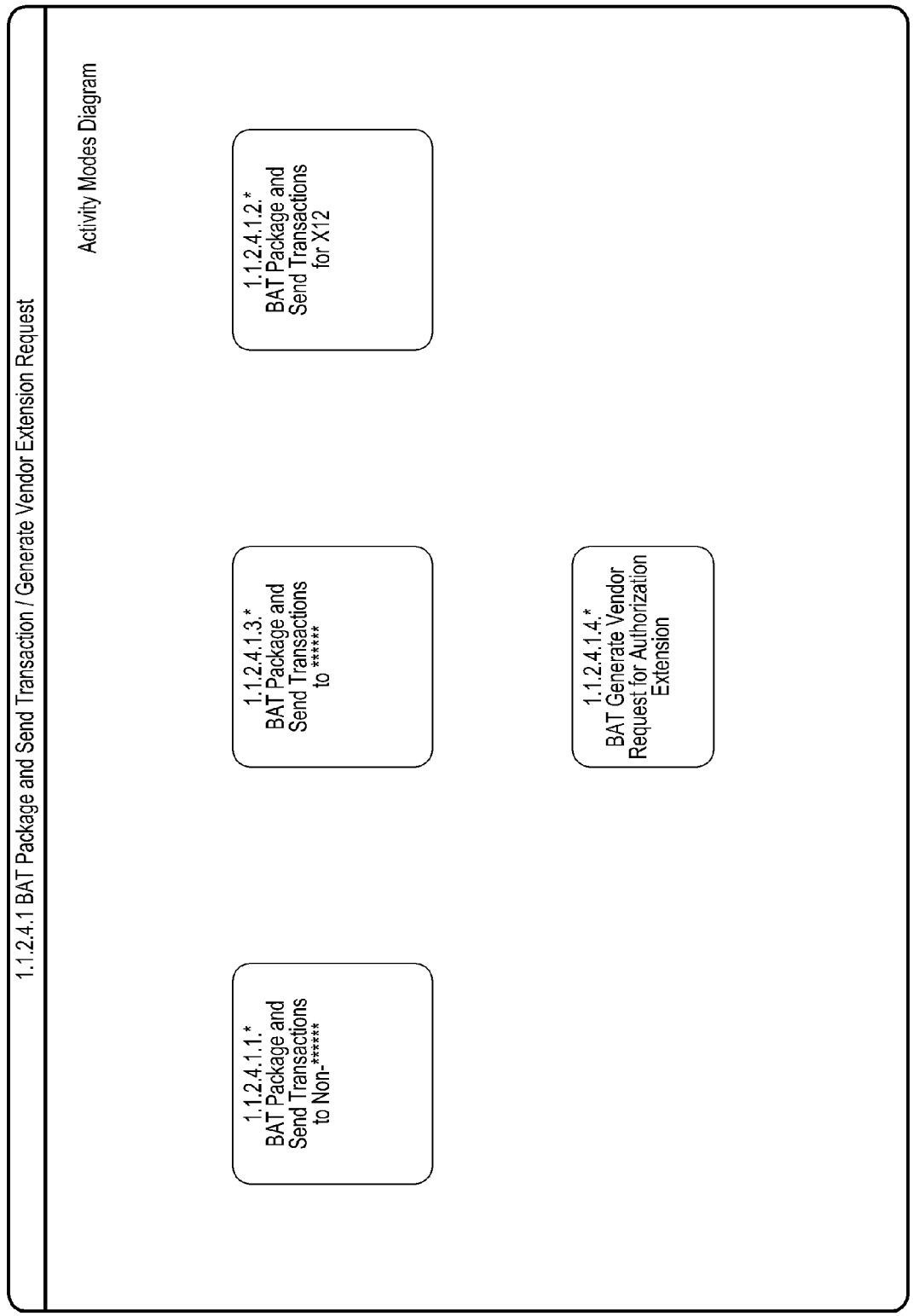
Figure 32:
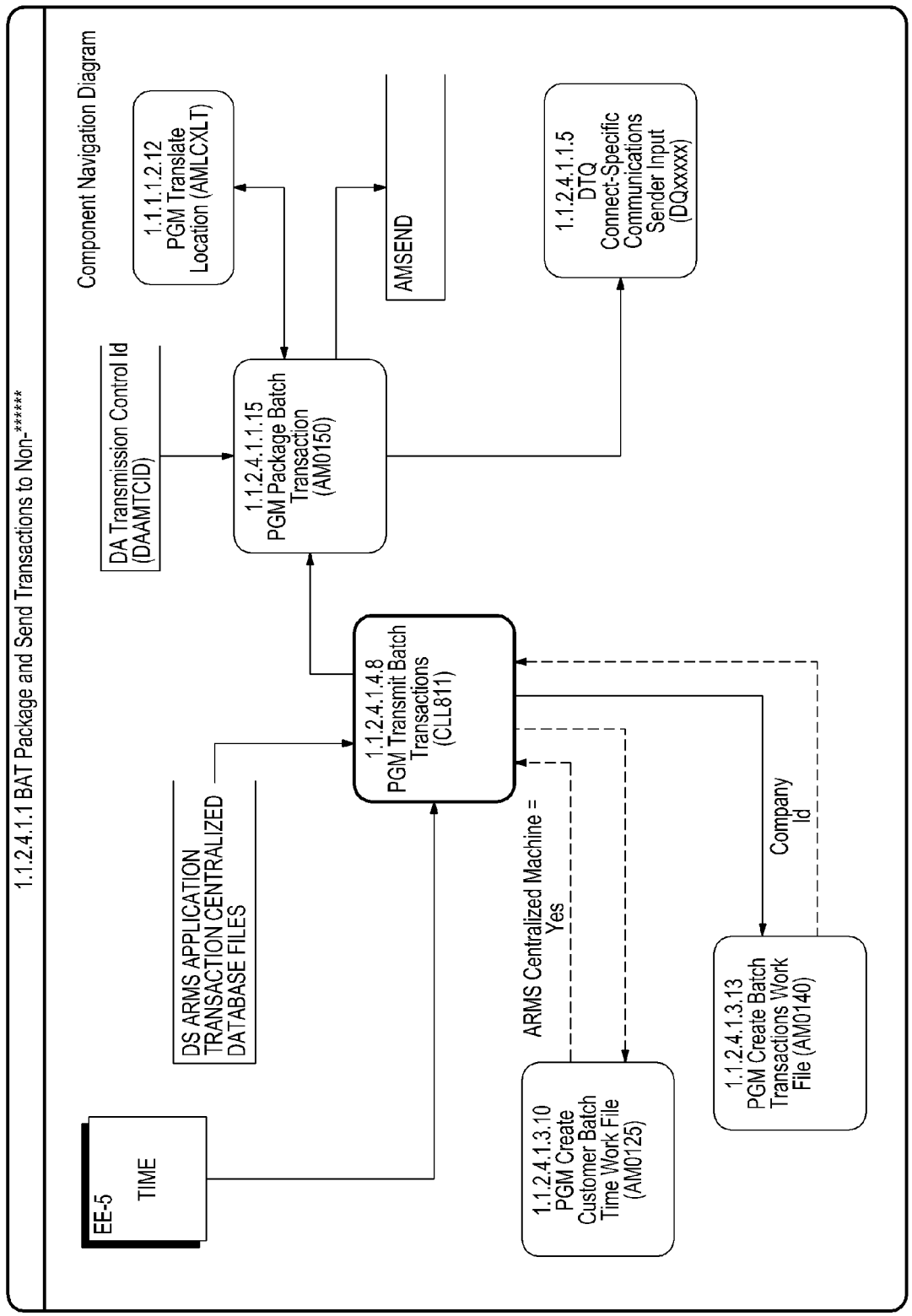
Figure 33:
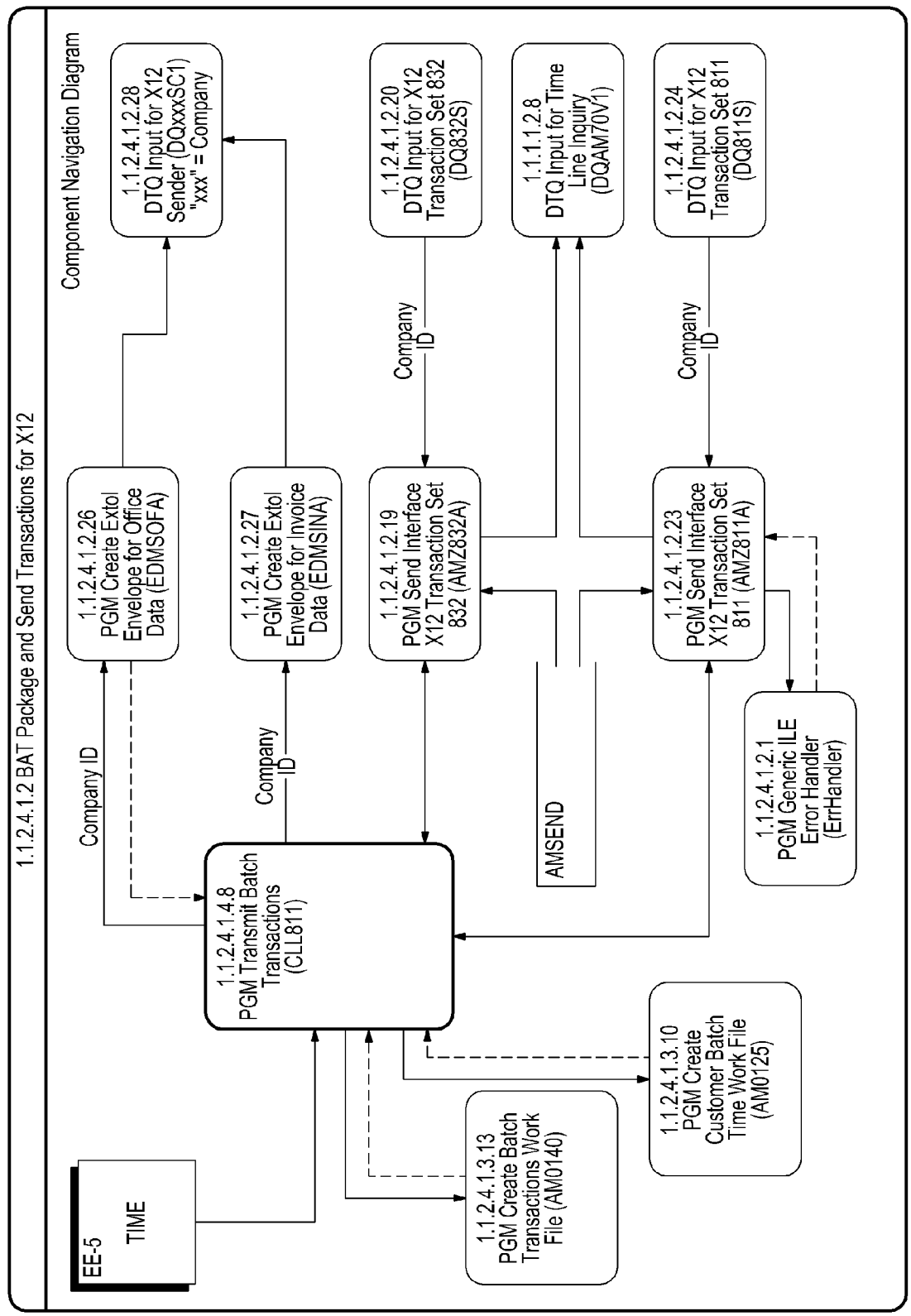
Figure 34:
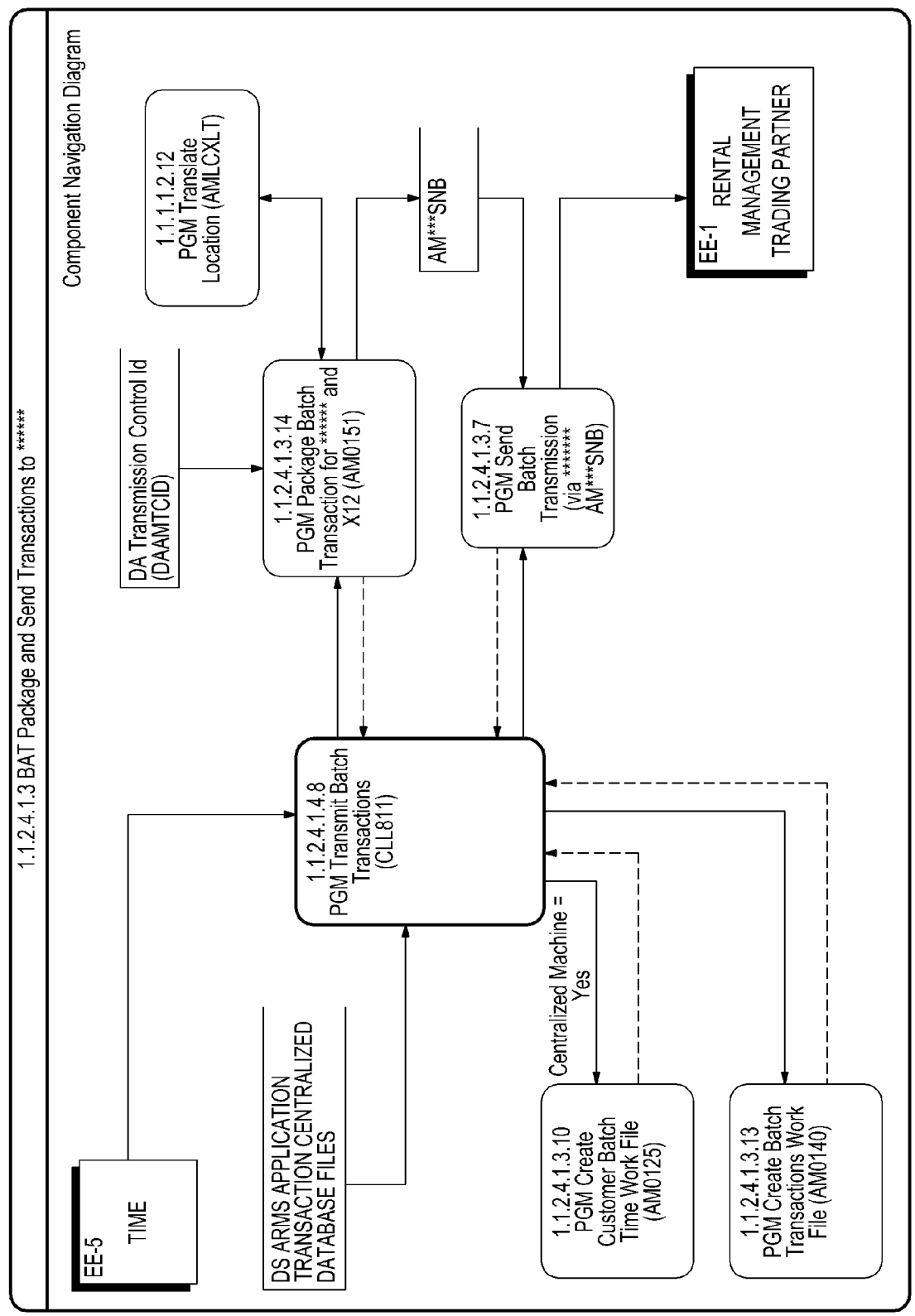
Figure 35:
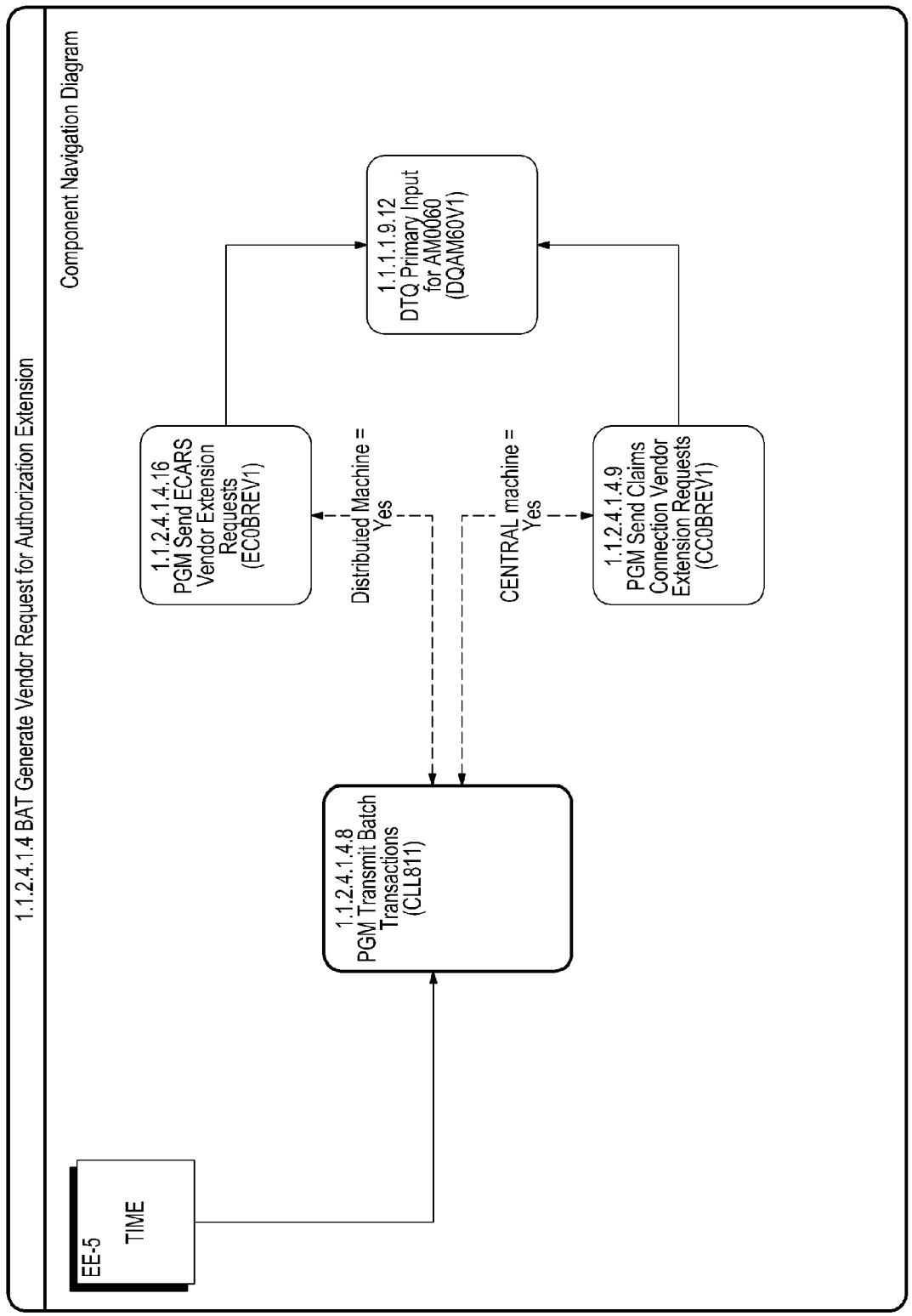
Figure 36:
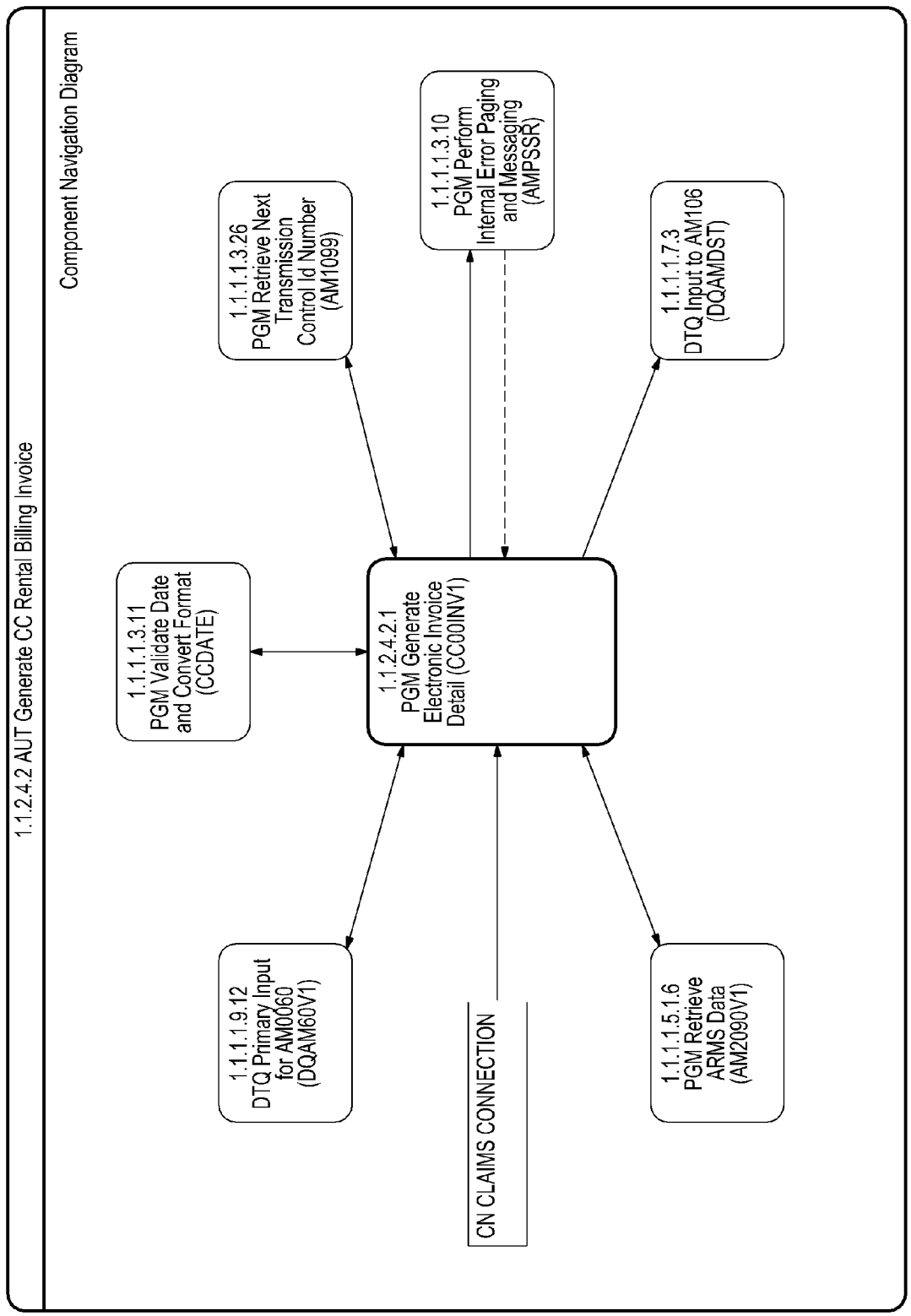
Figure 37:
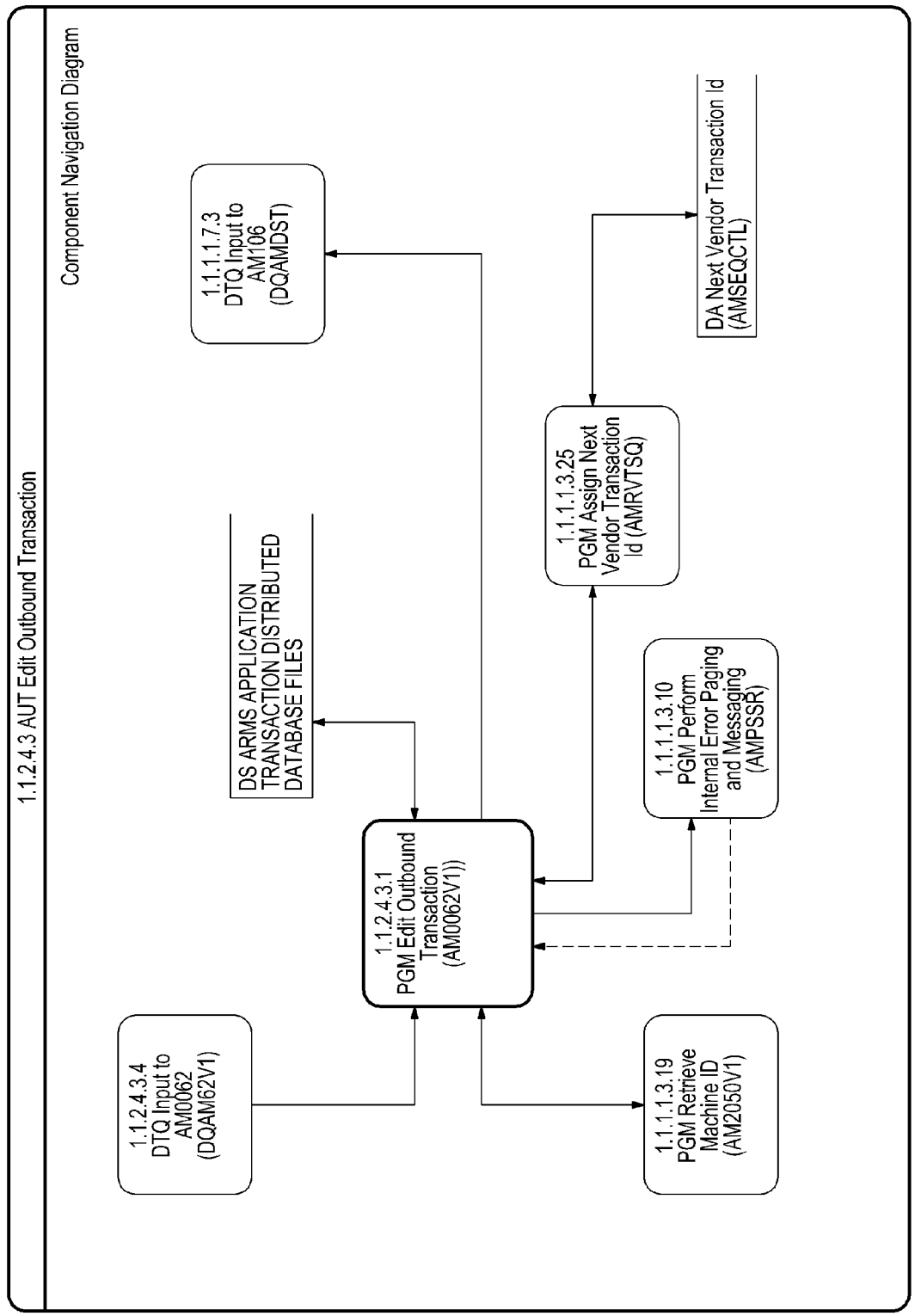
Figure 38:
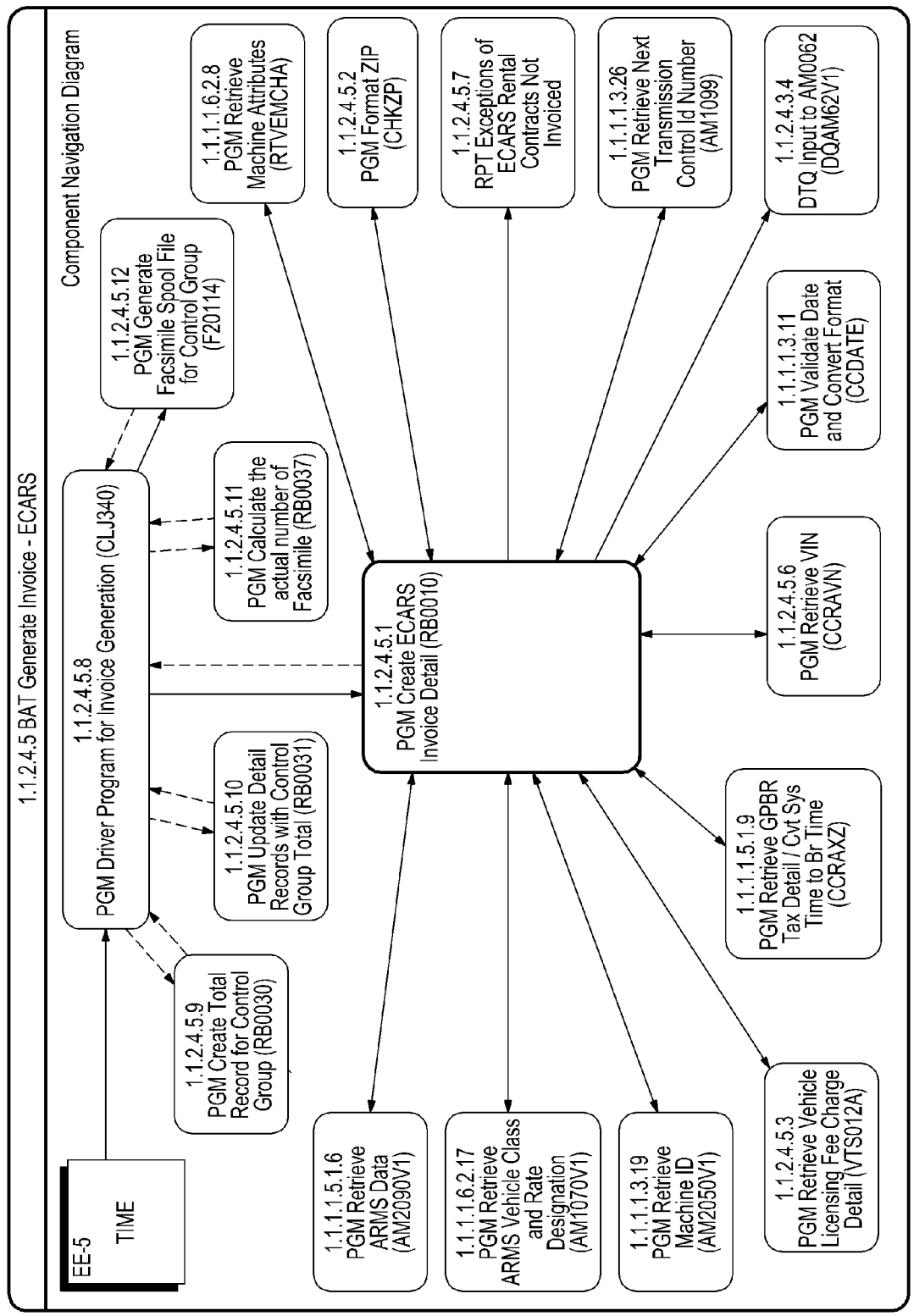
Figure 39:
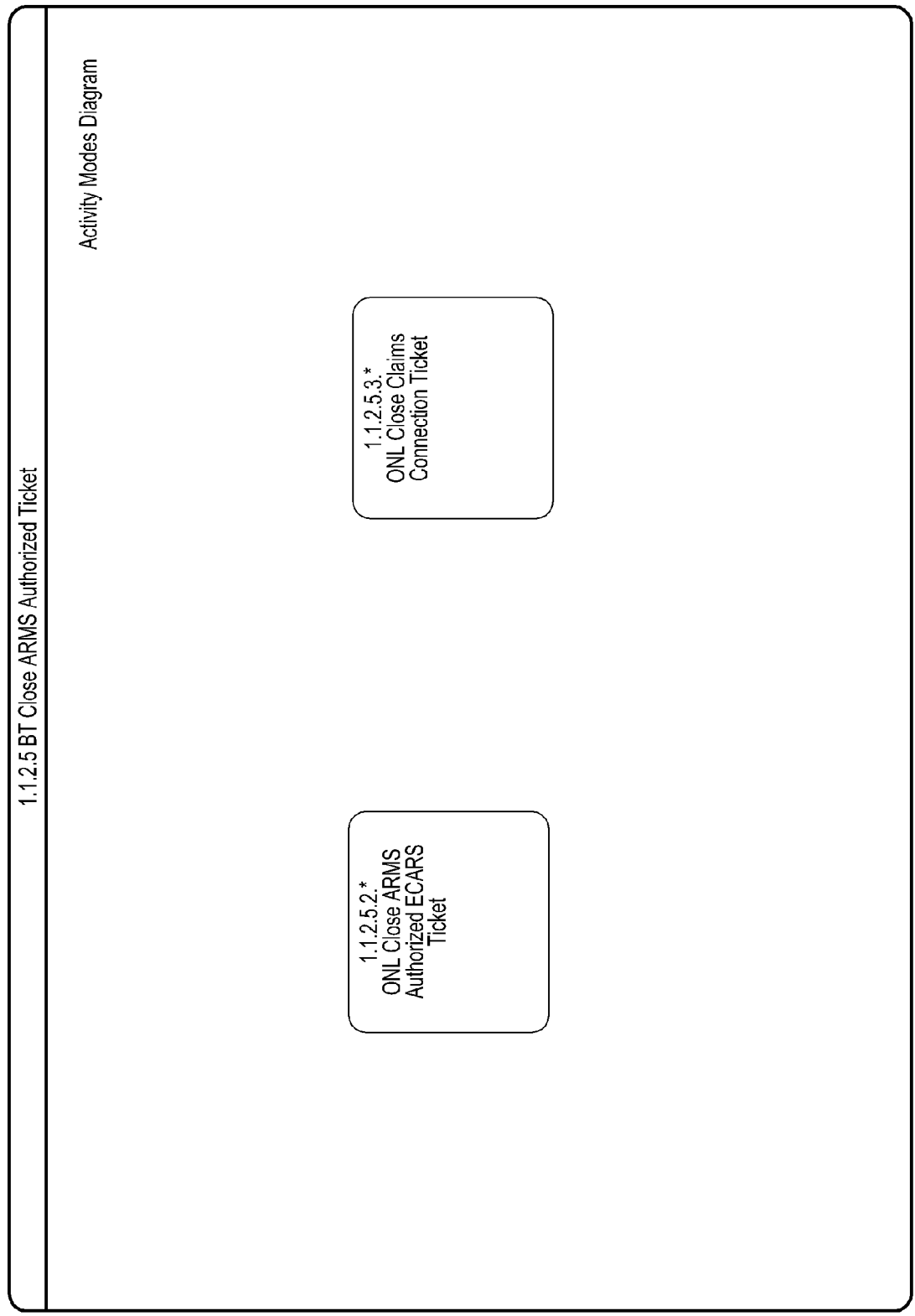
Figure 40:
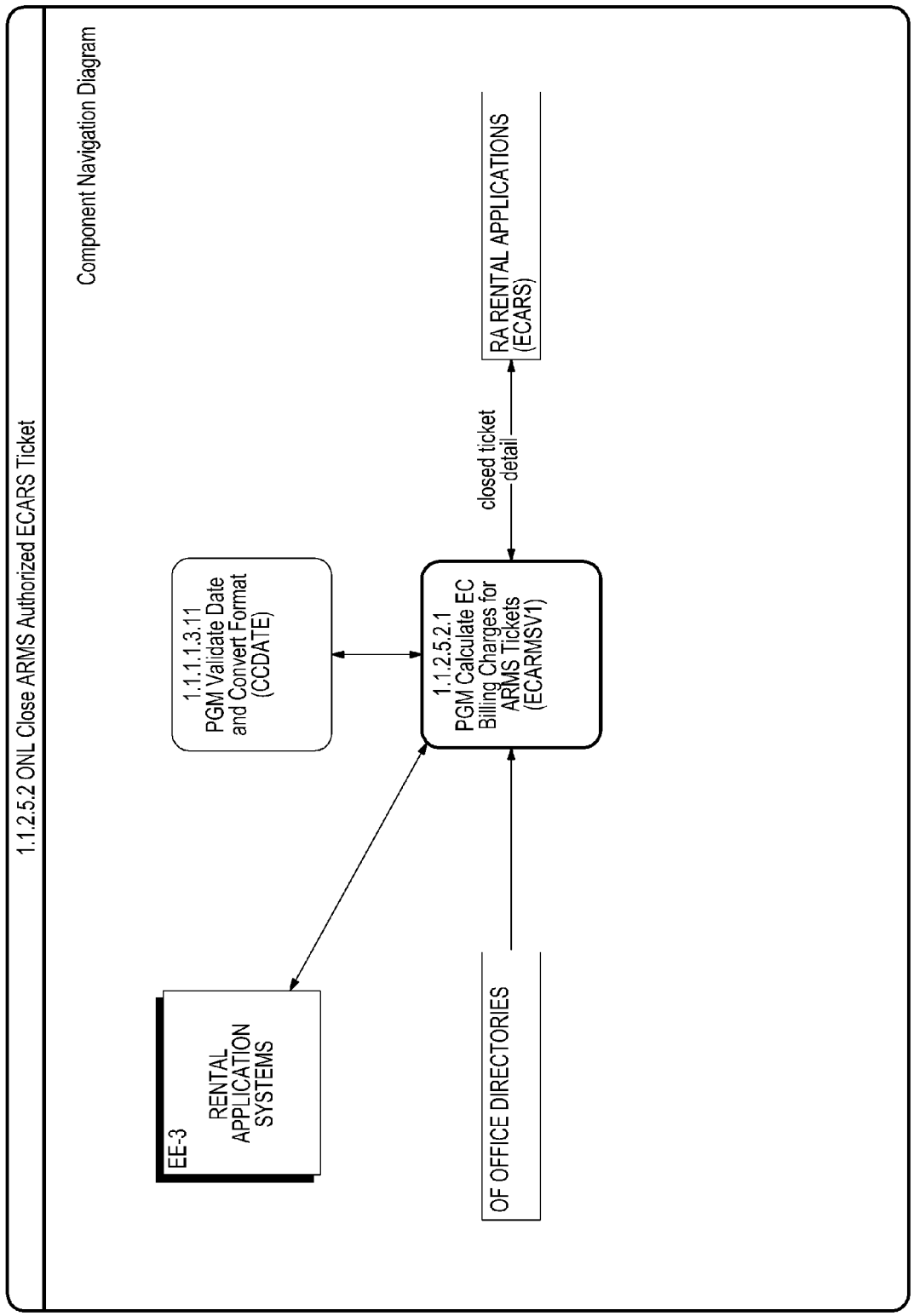
Figure 41:
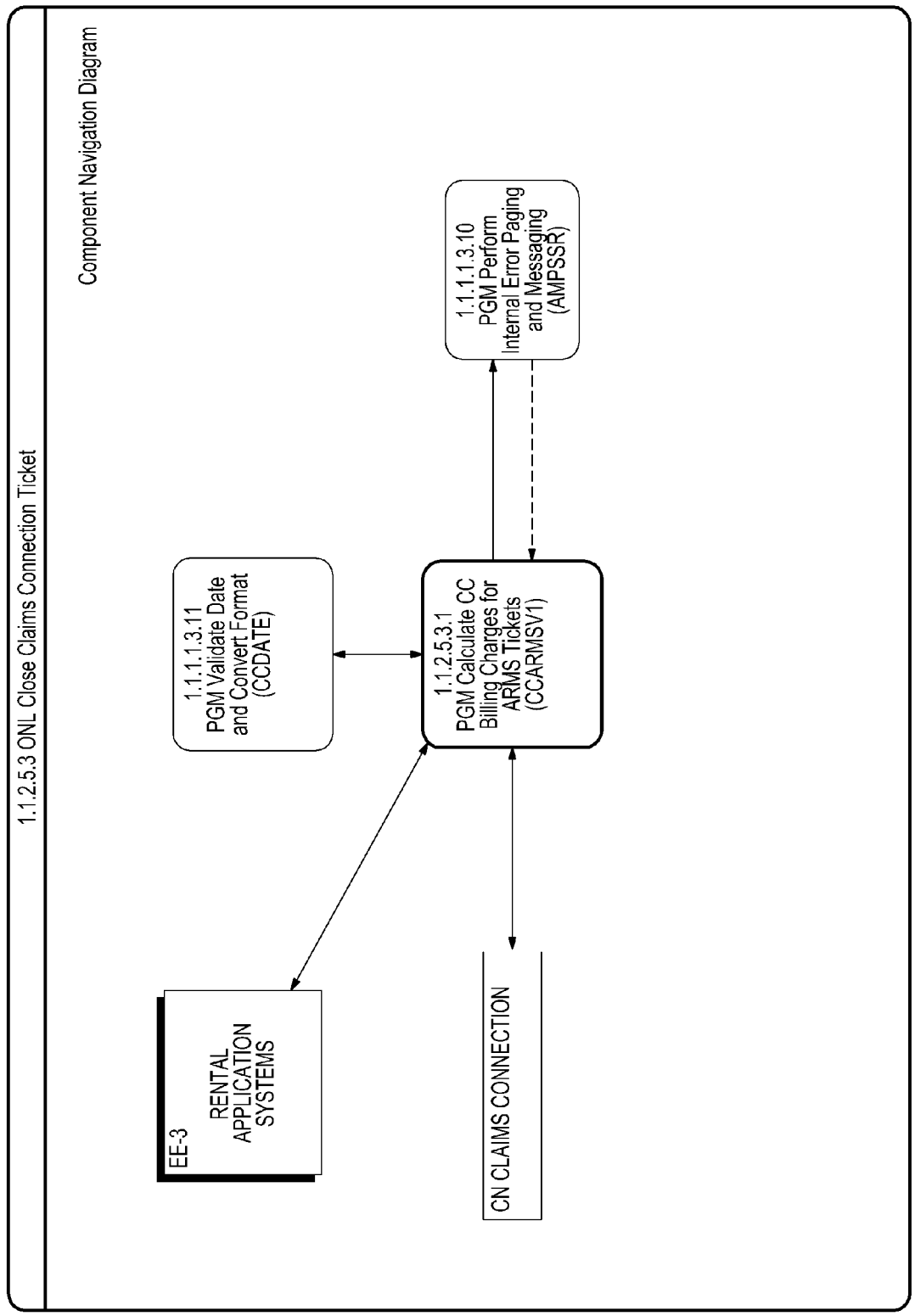
Figure 42:
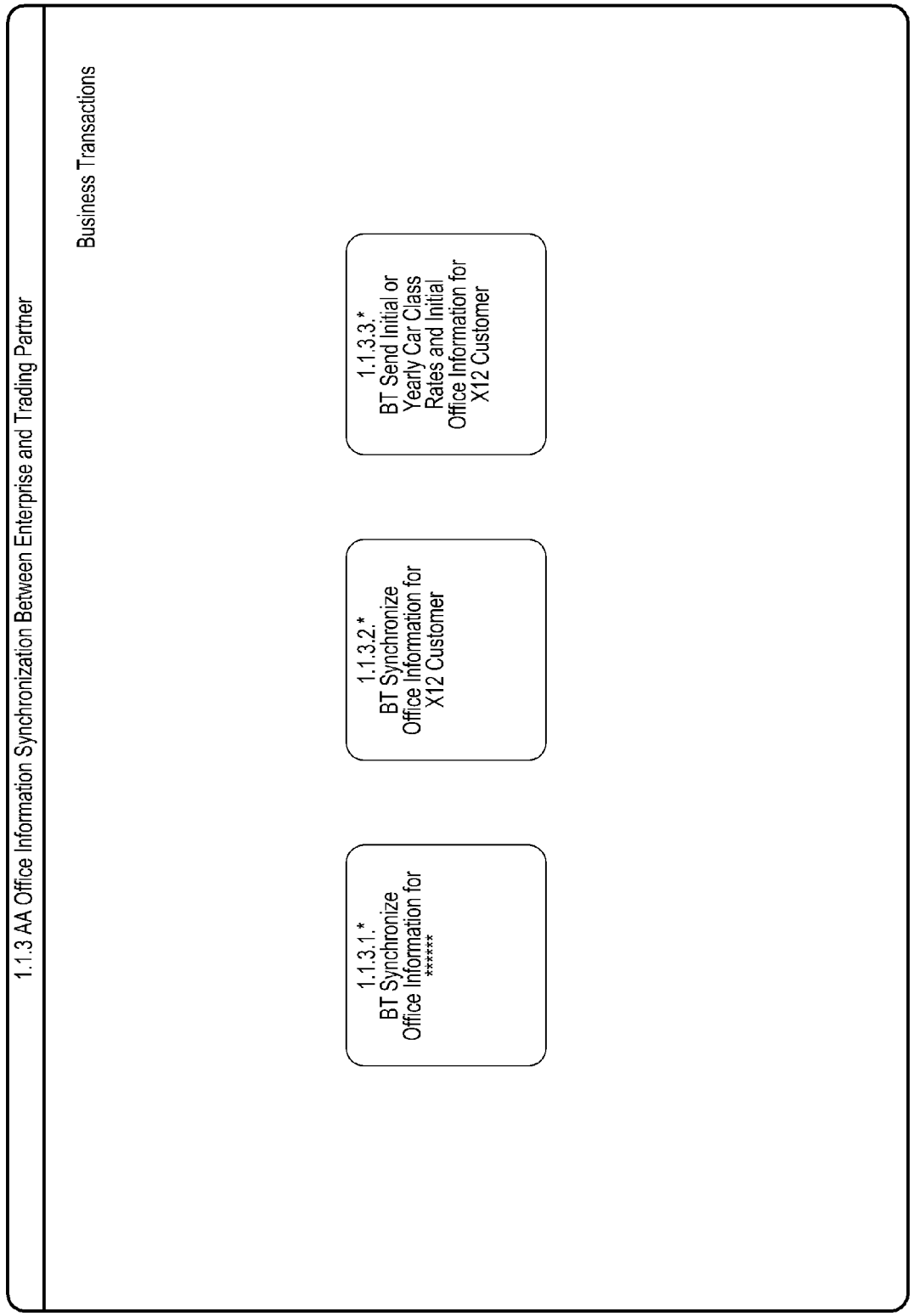
Figure 43:
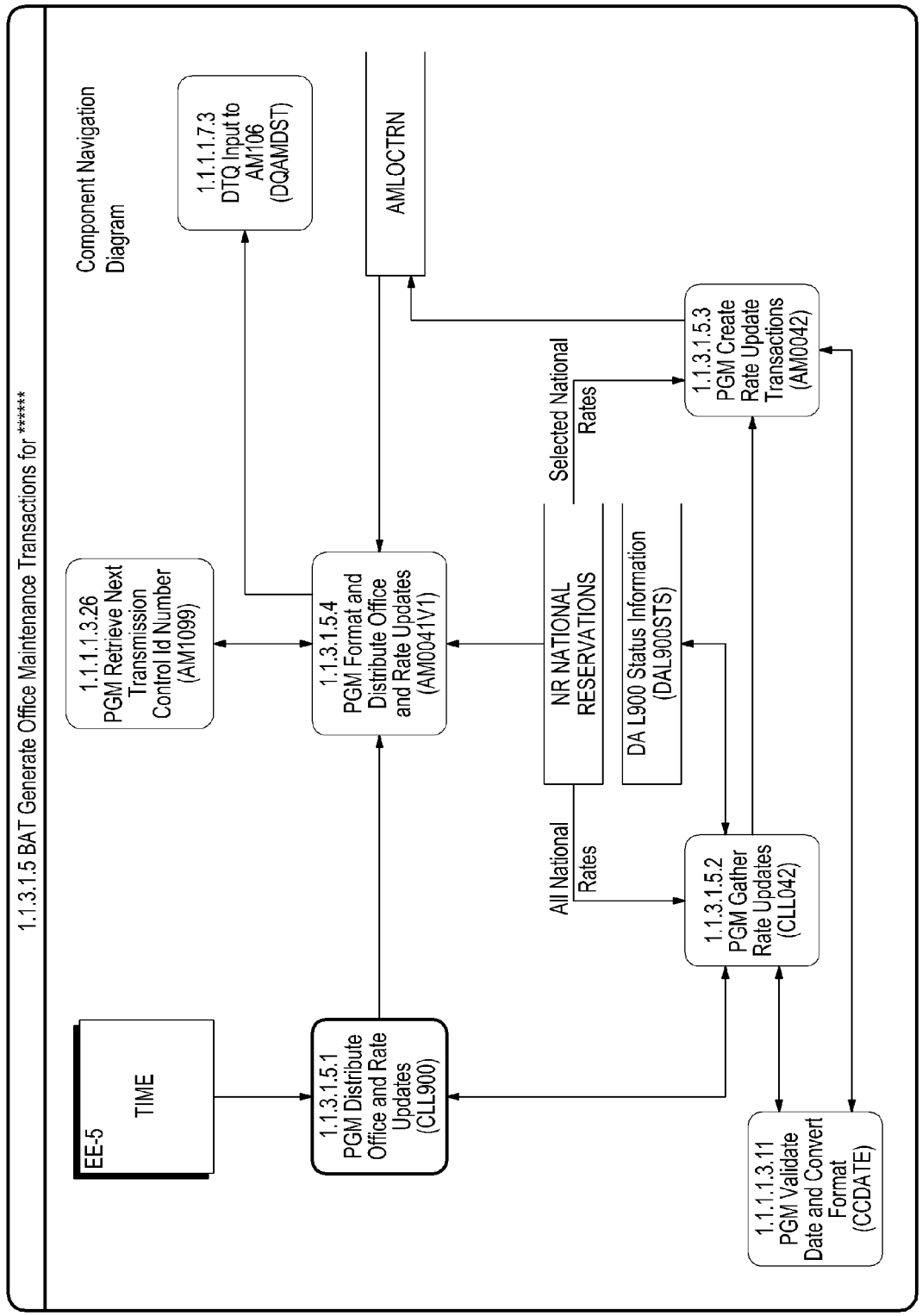
Figure 44:
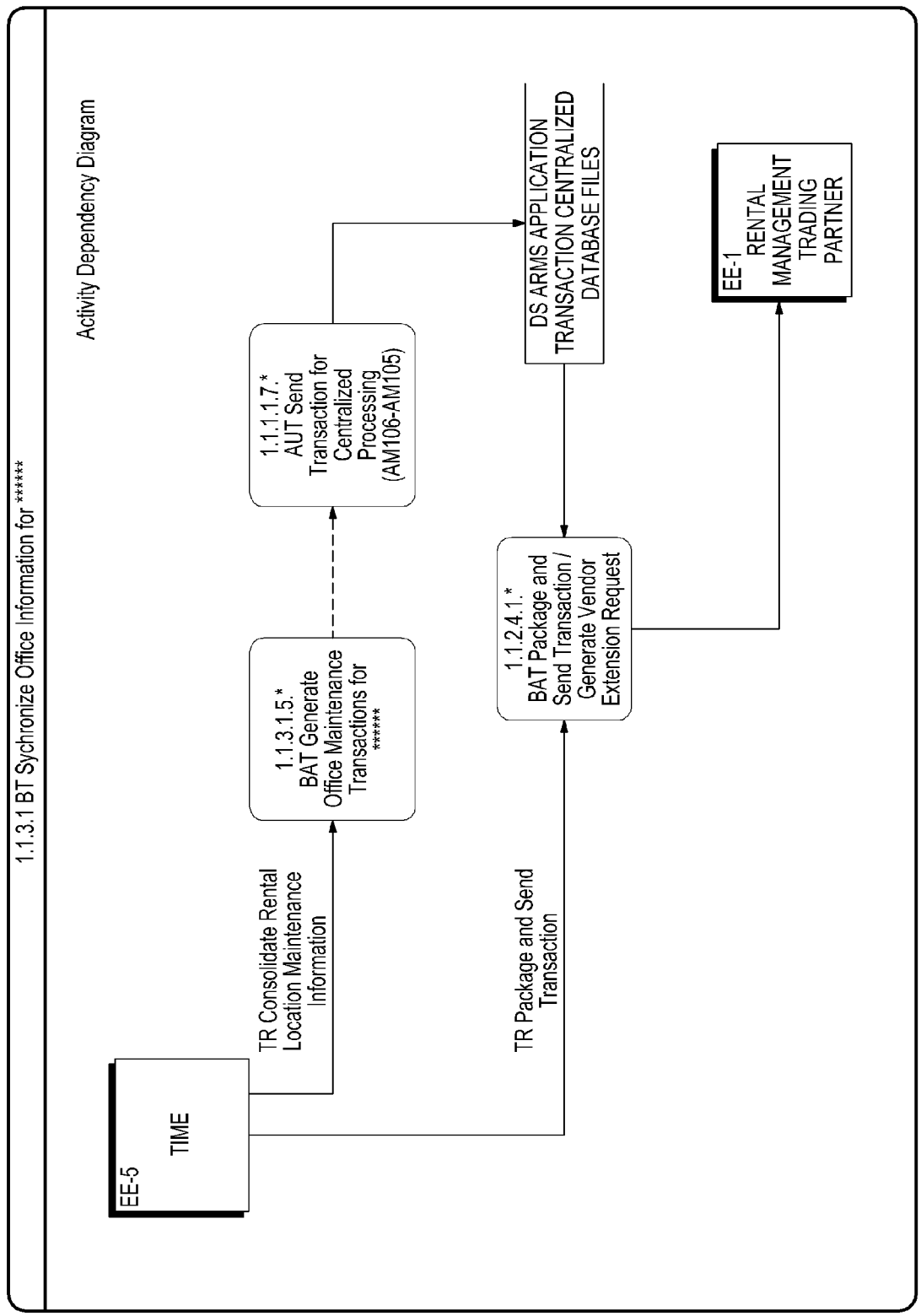
Figure 45:
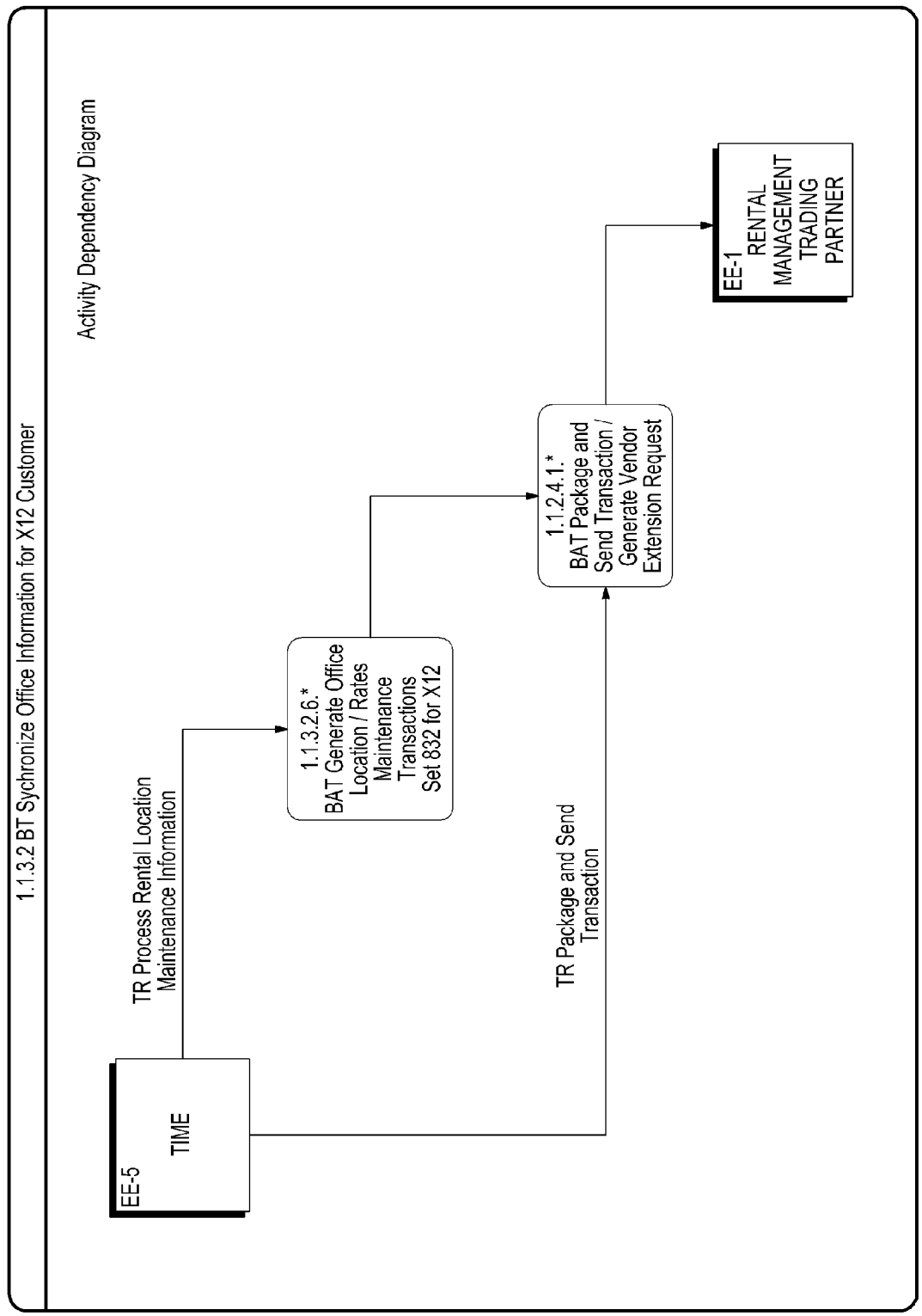
Figure 46A:
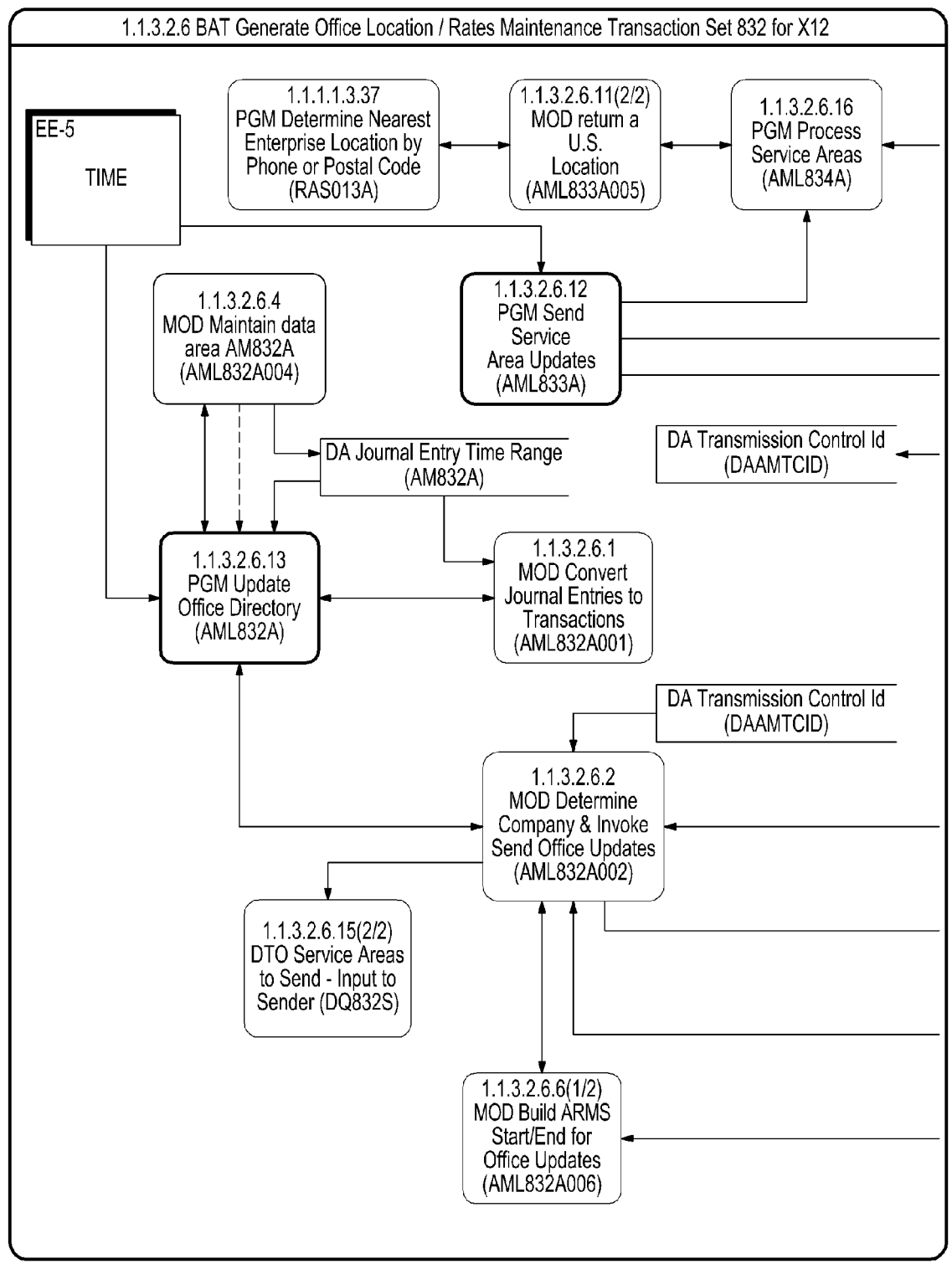
Figure 46B:
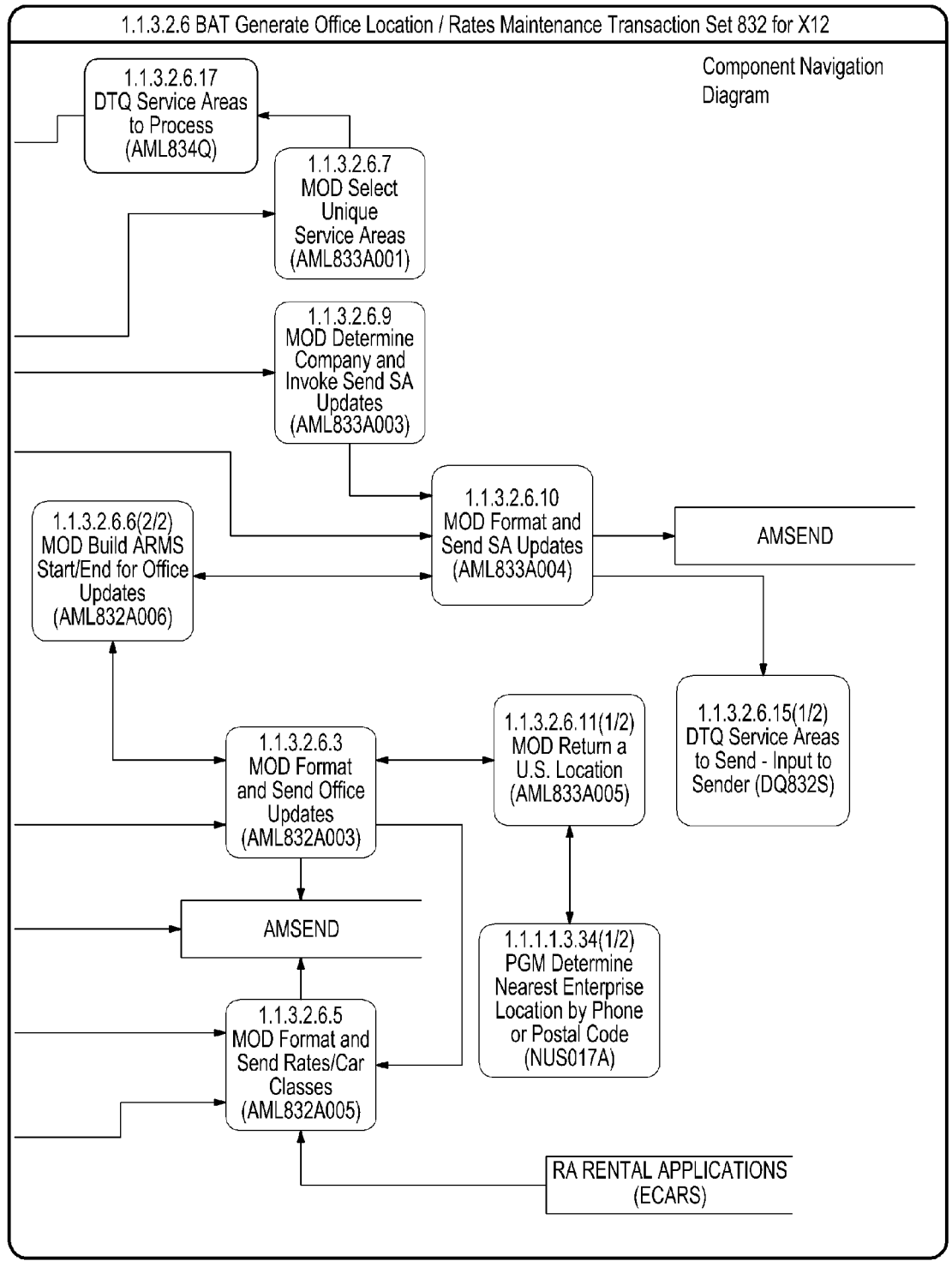
Figure 47:
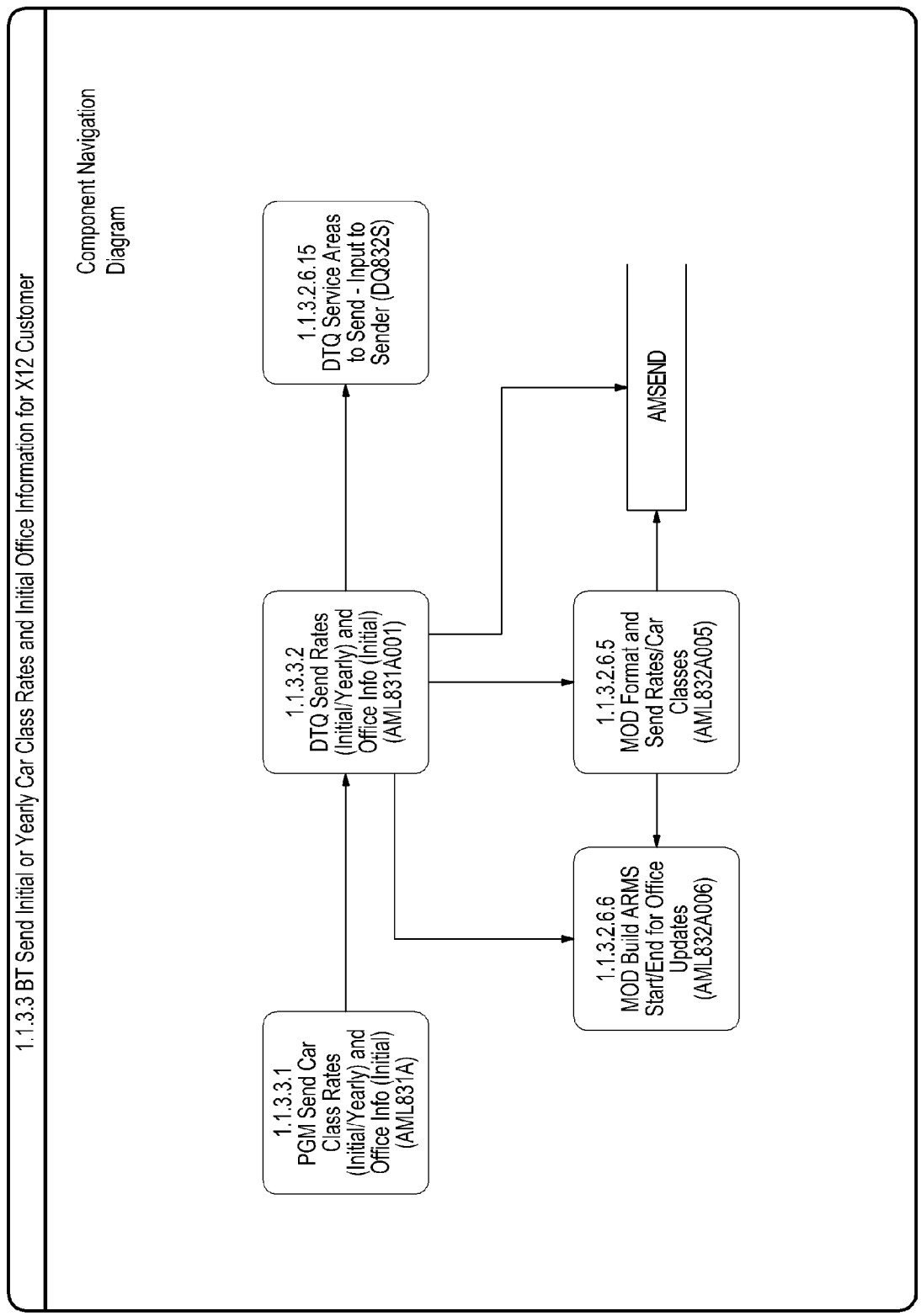
Figure 48:
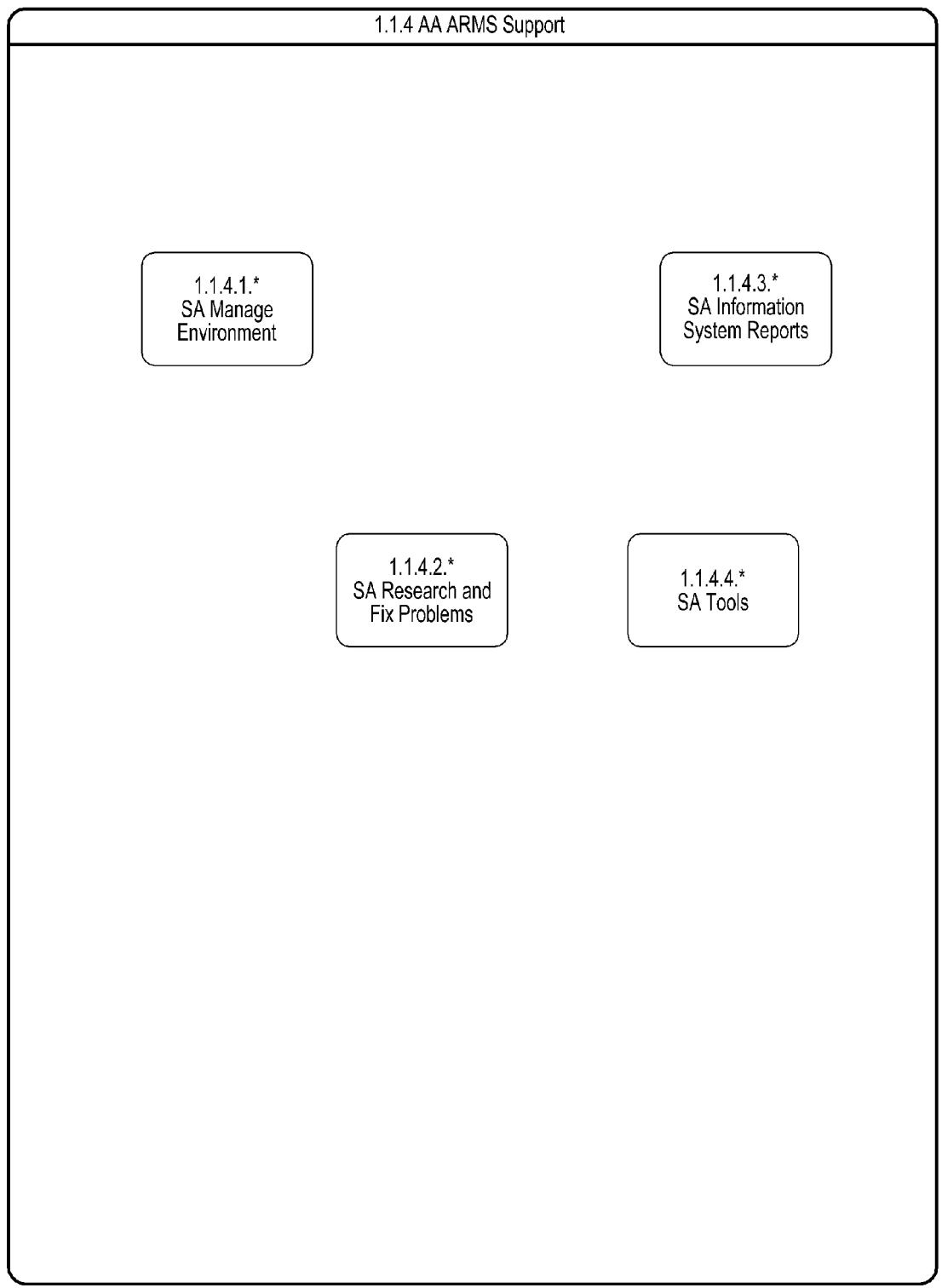
Figure 49:
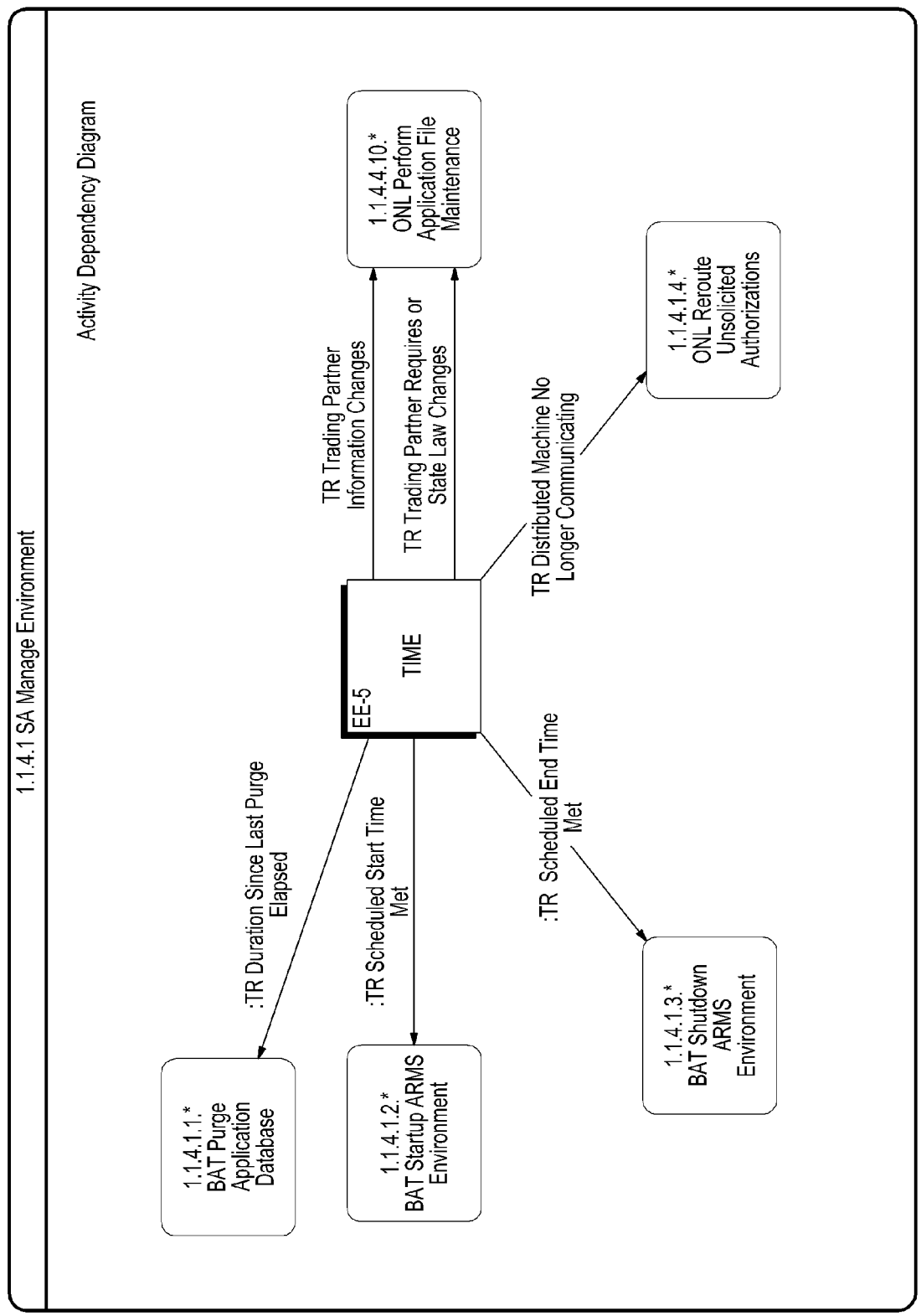
Figure 50:
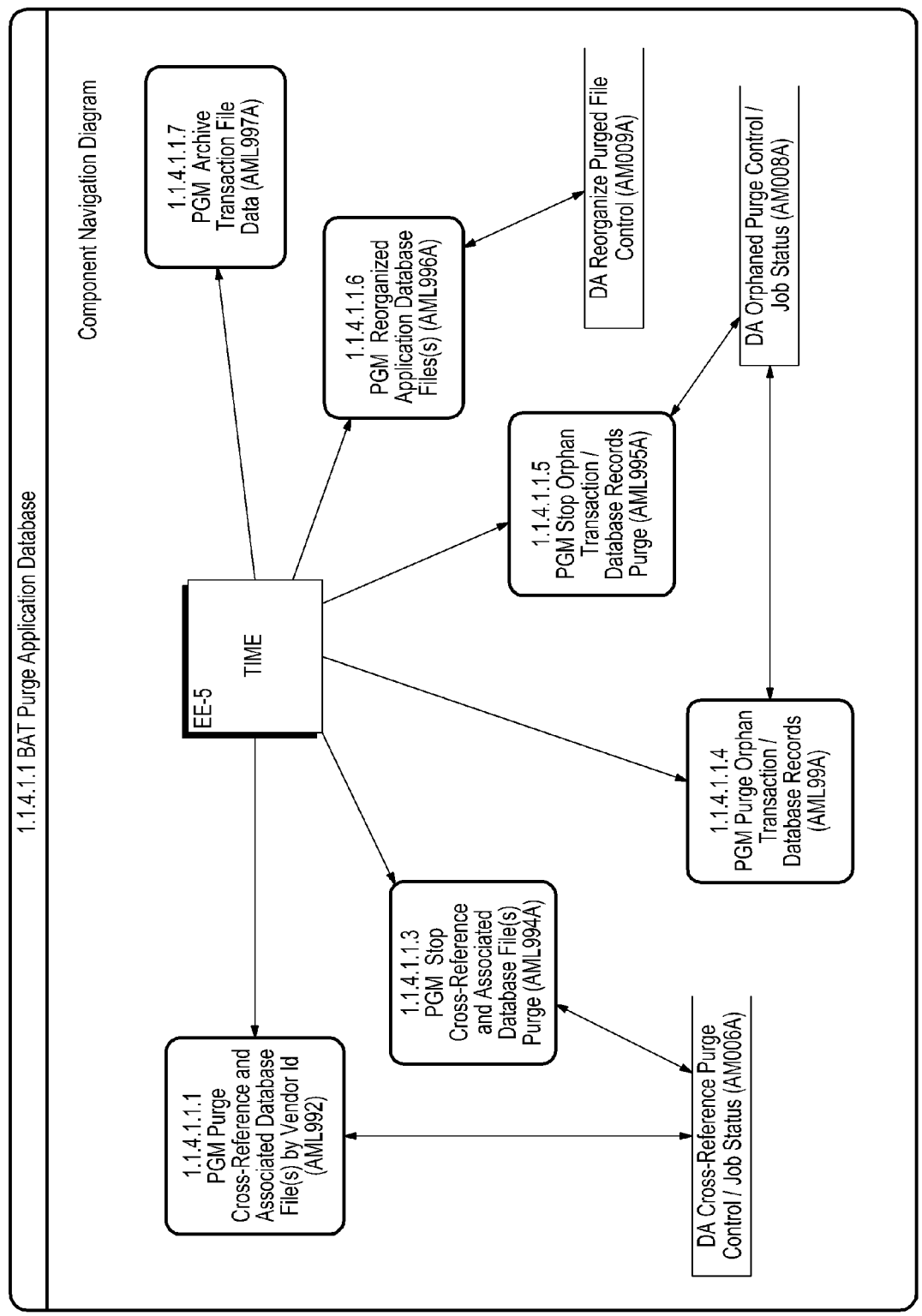
Figure 51:
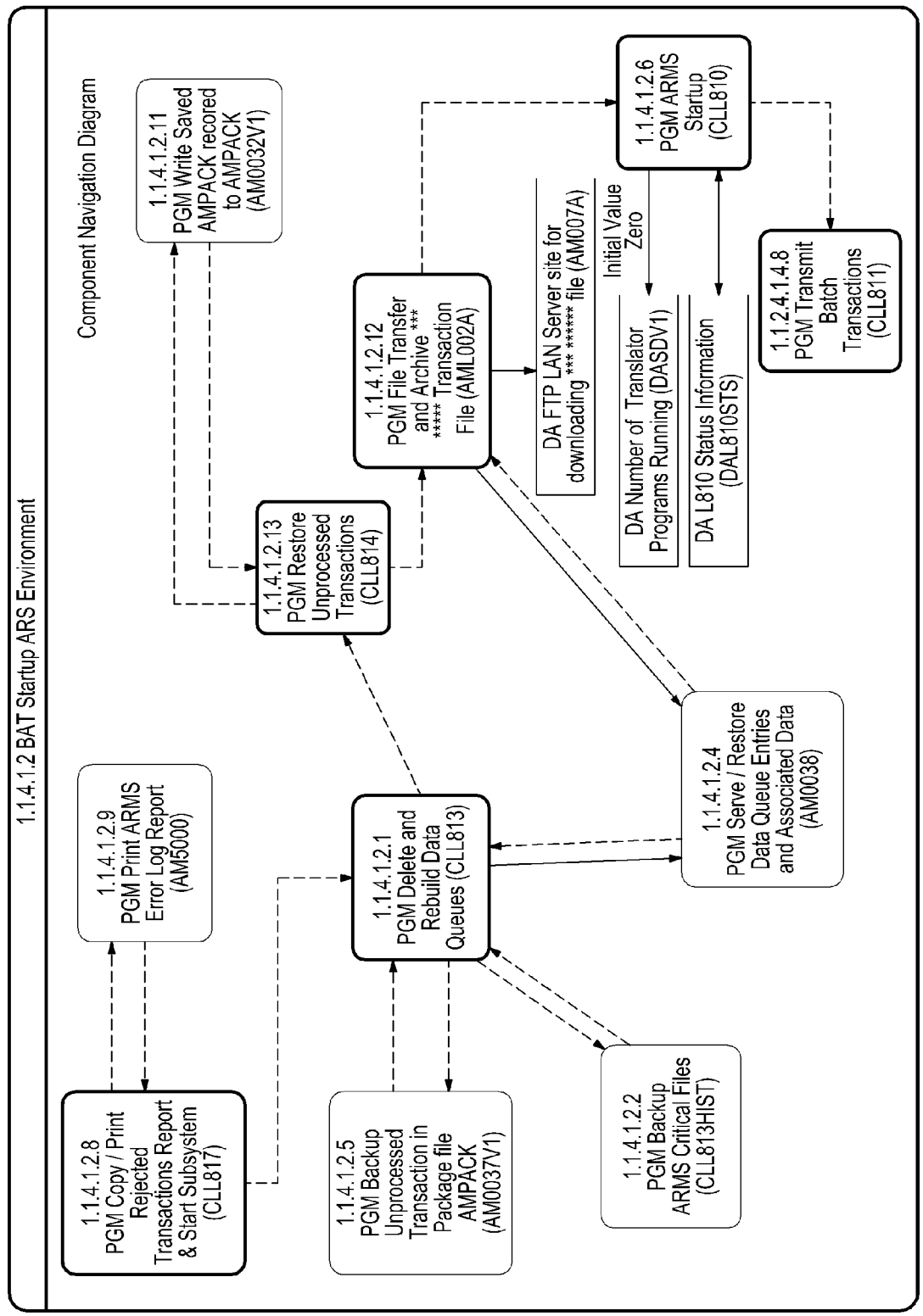
Figure 52:
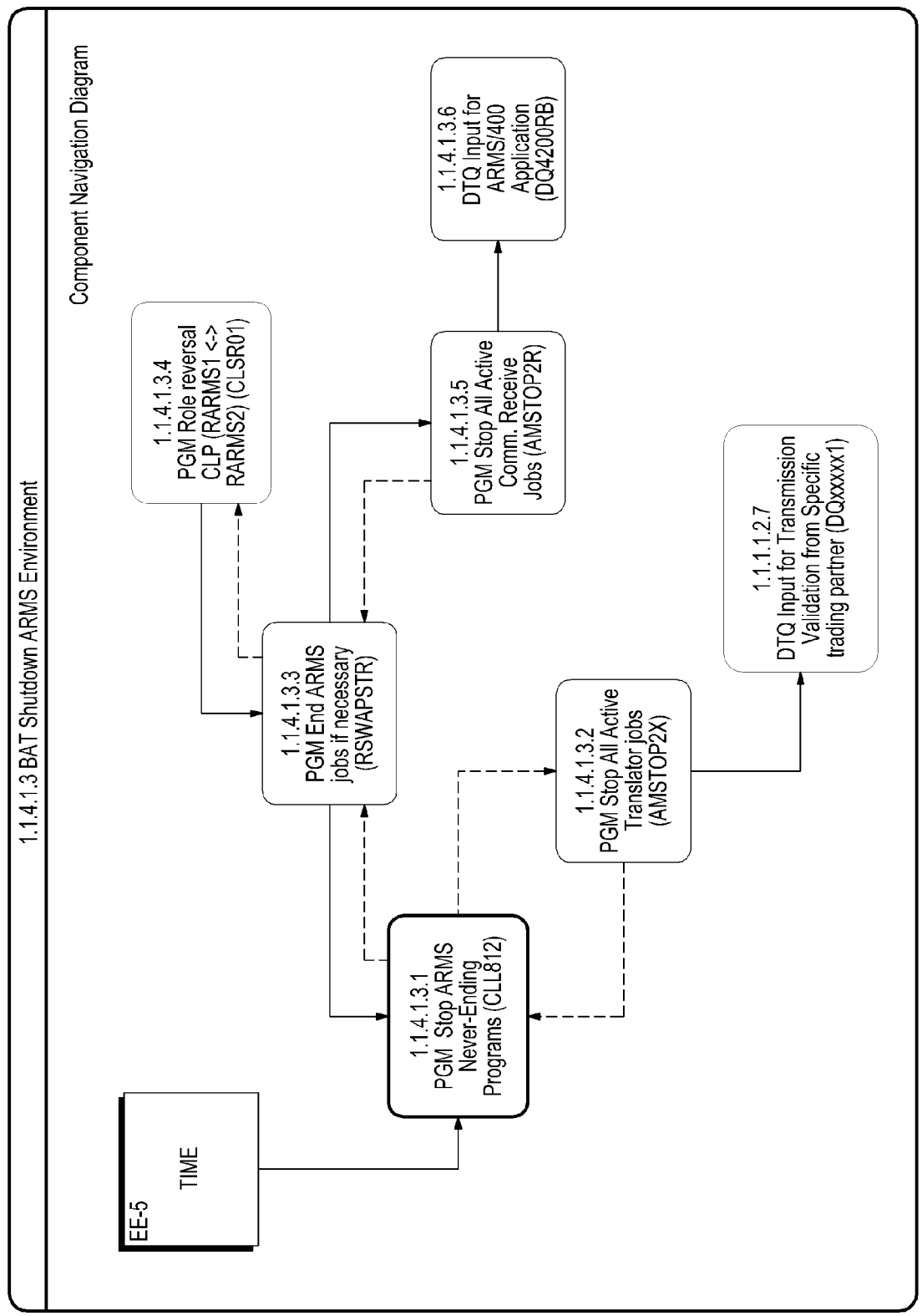
Figure 53:
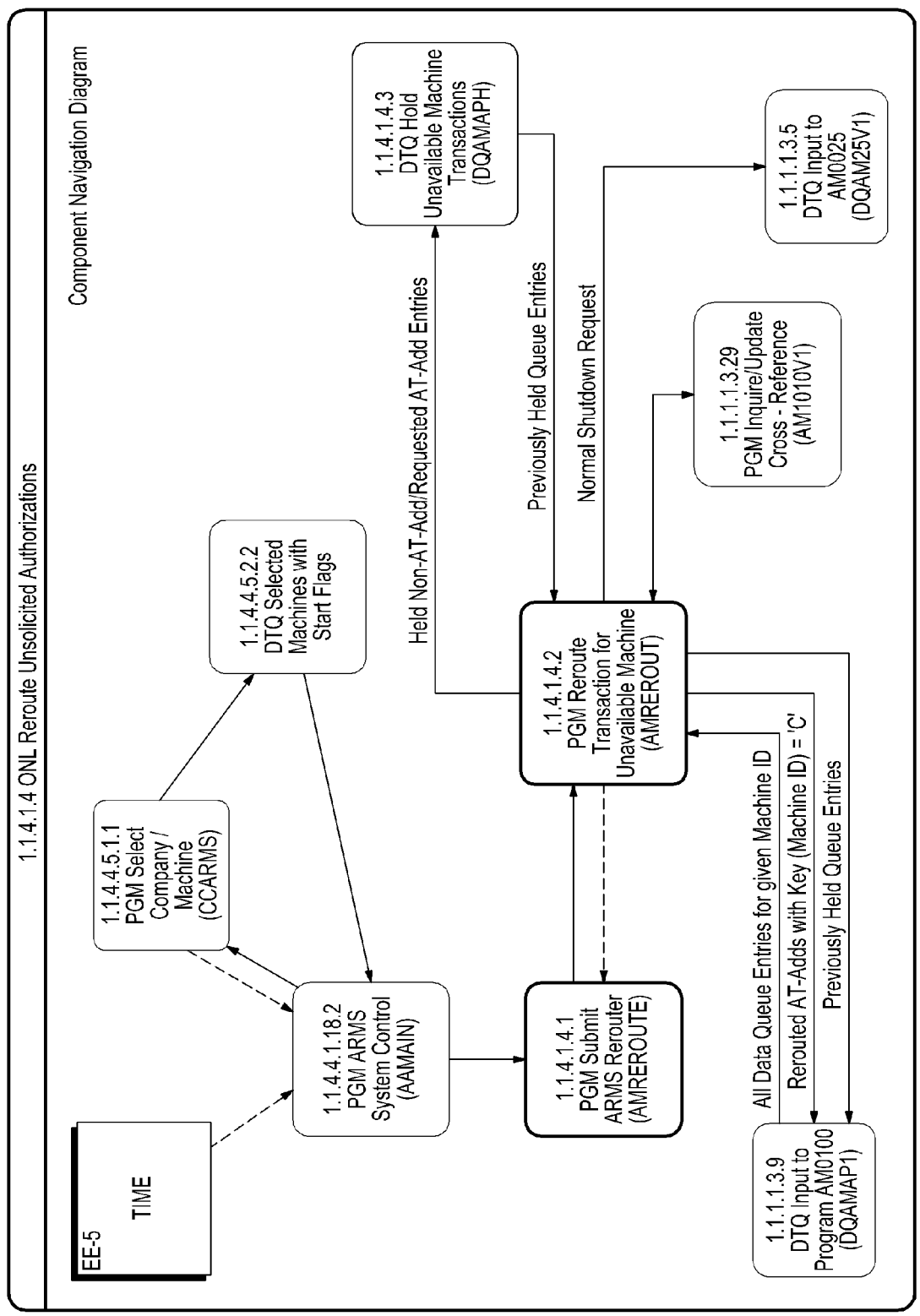
Figure 54:
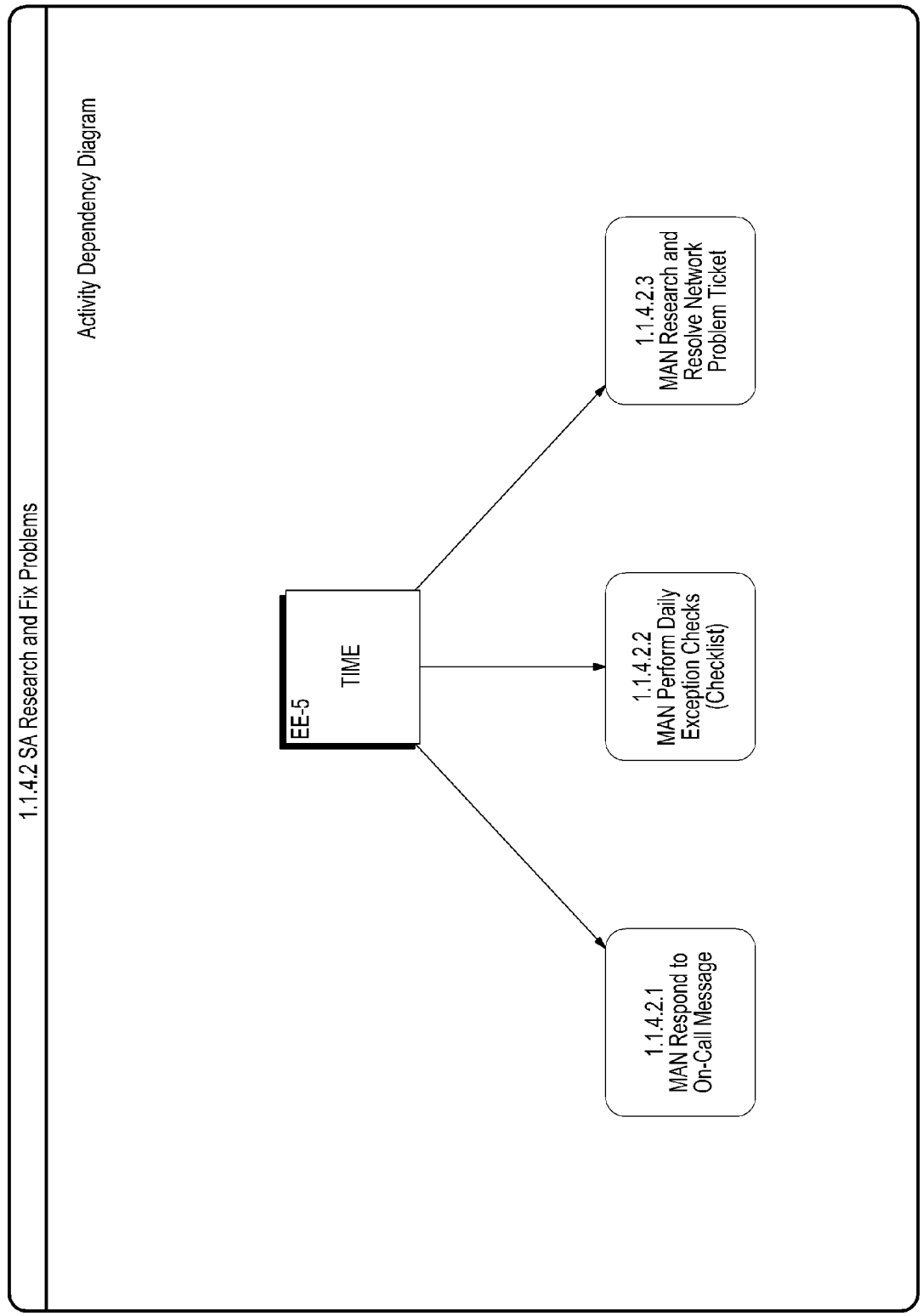
Figure 55:
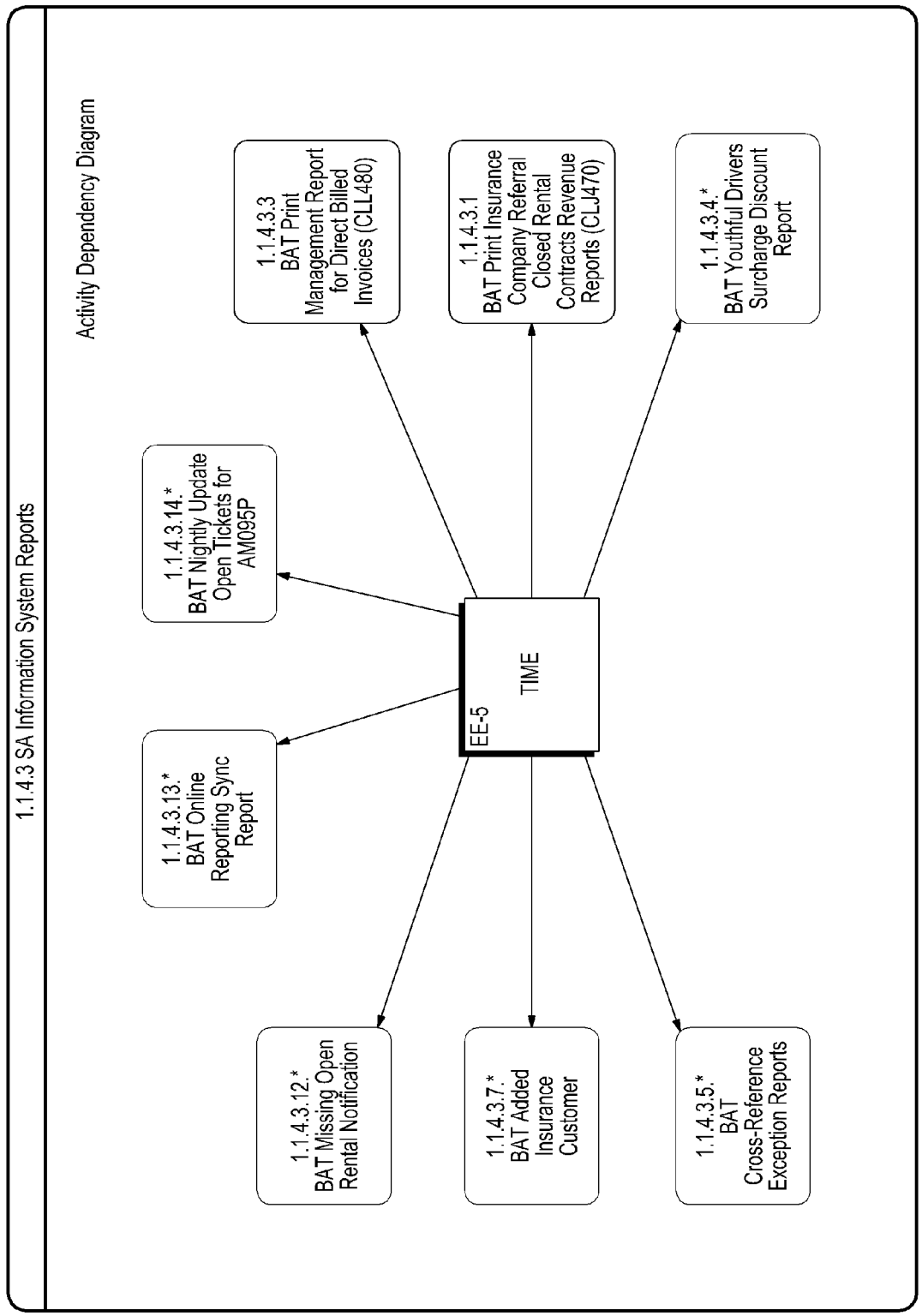
Figure 56:
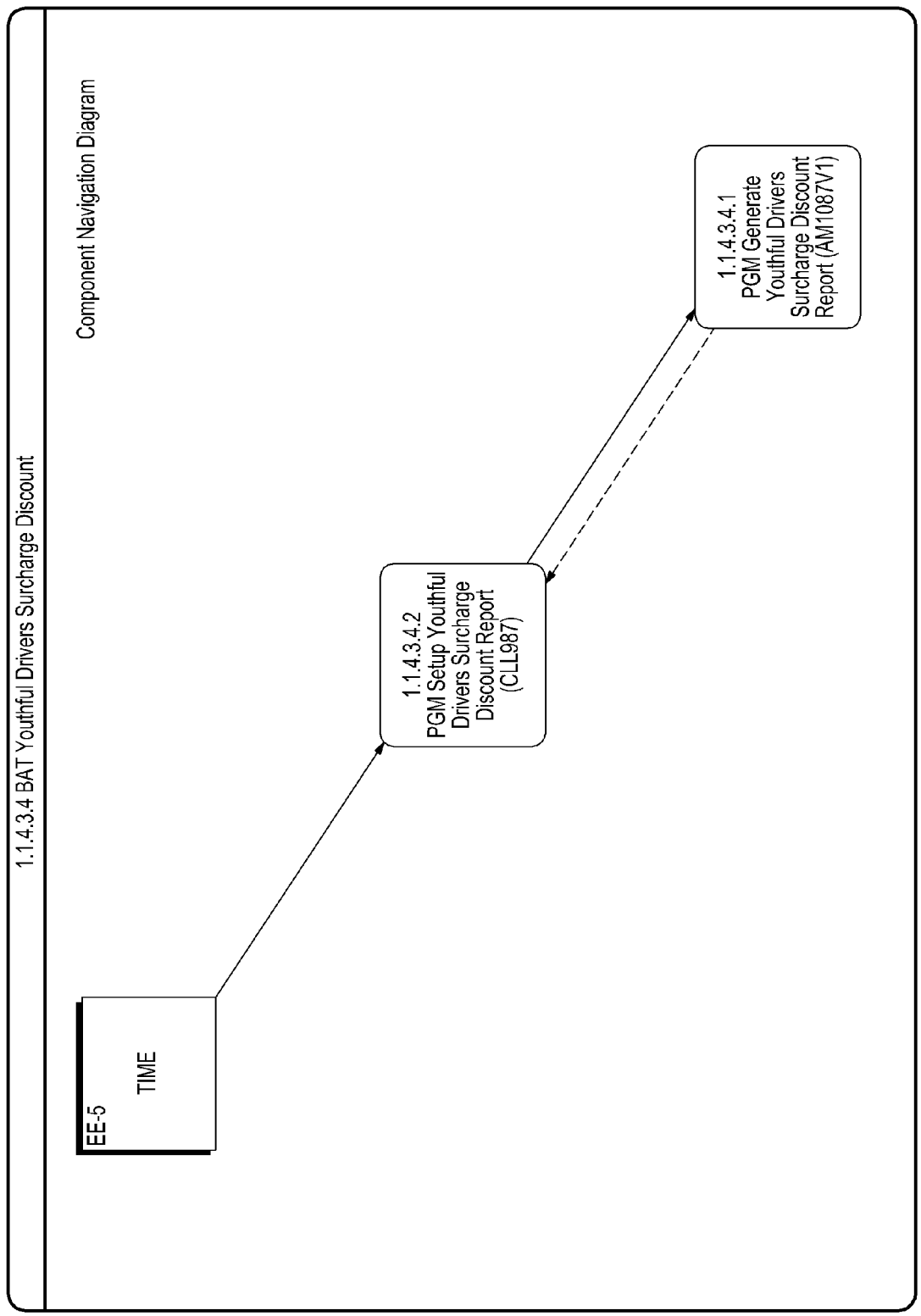
Figure 57:
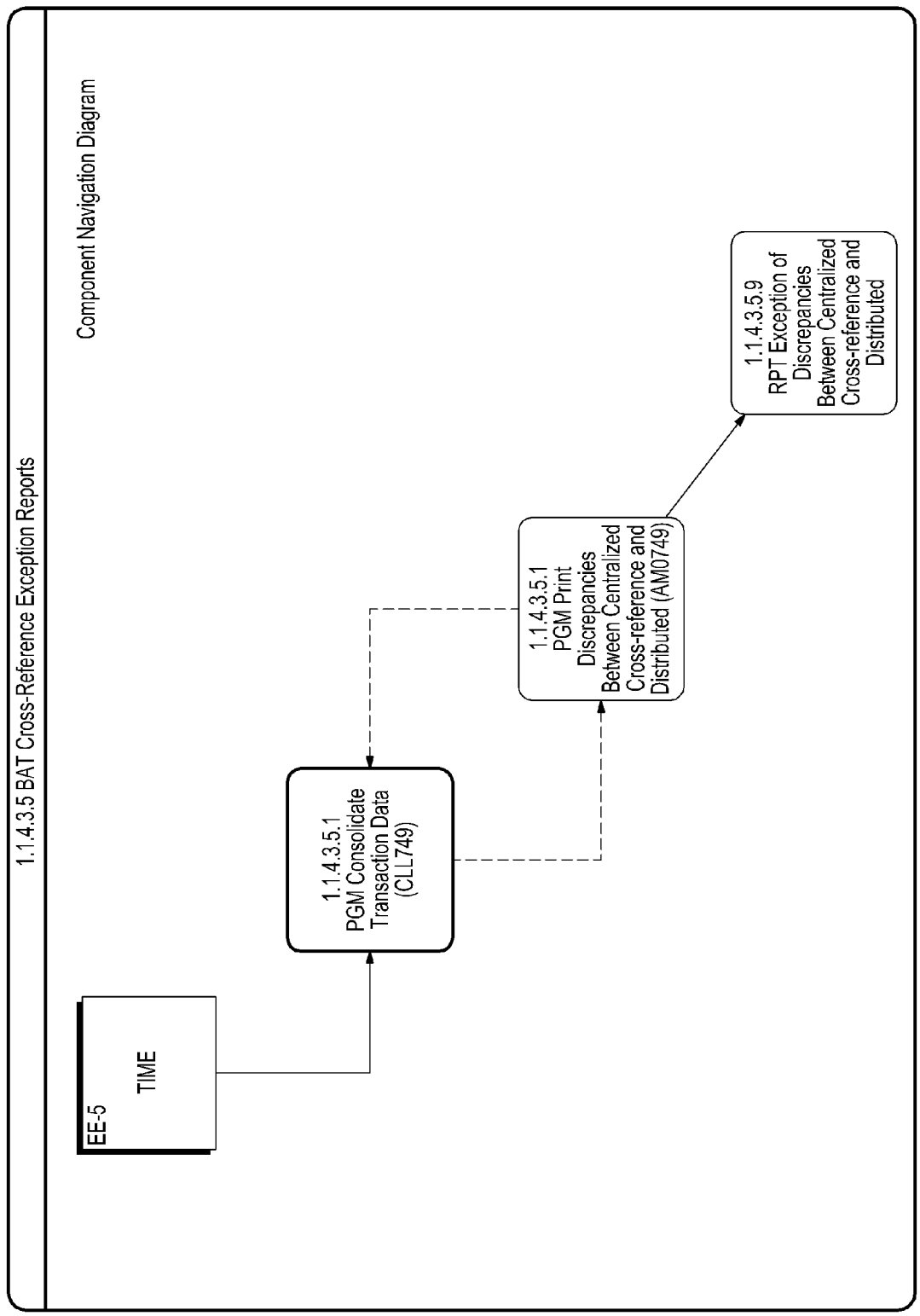
Figure 58:
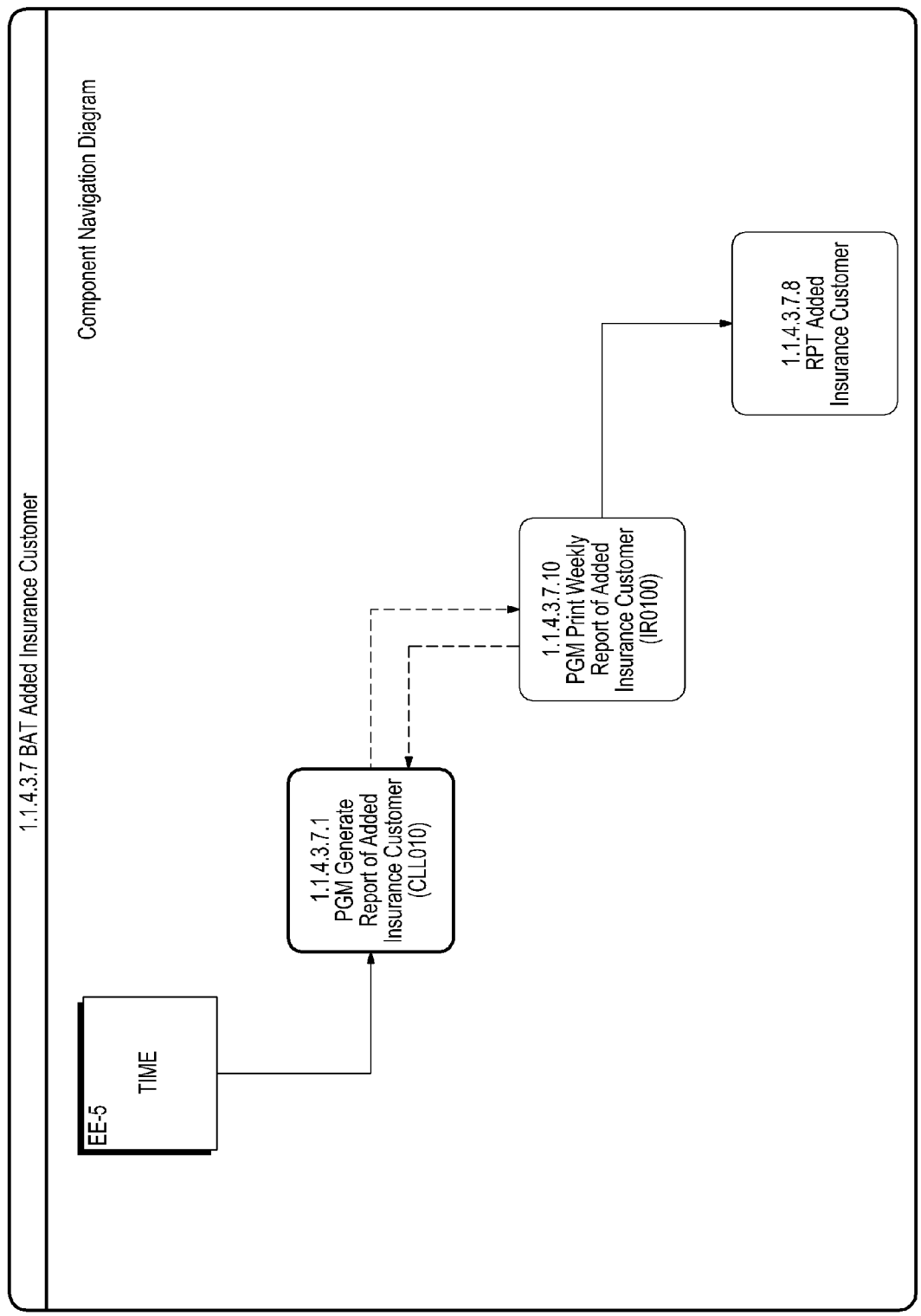
Figure 59:
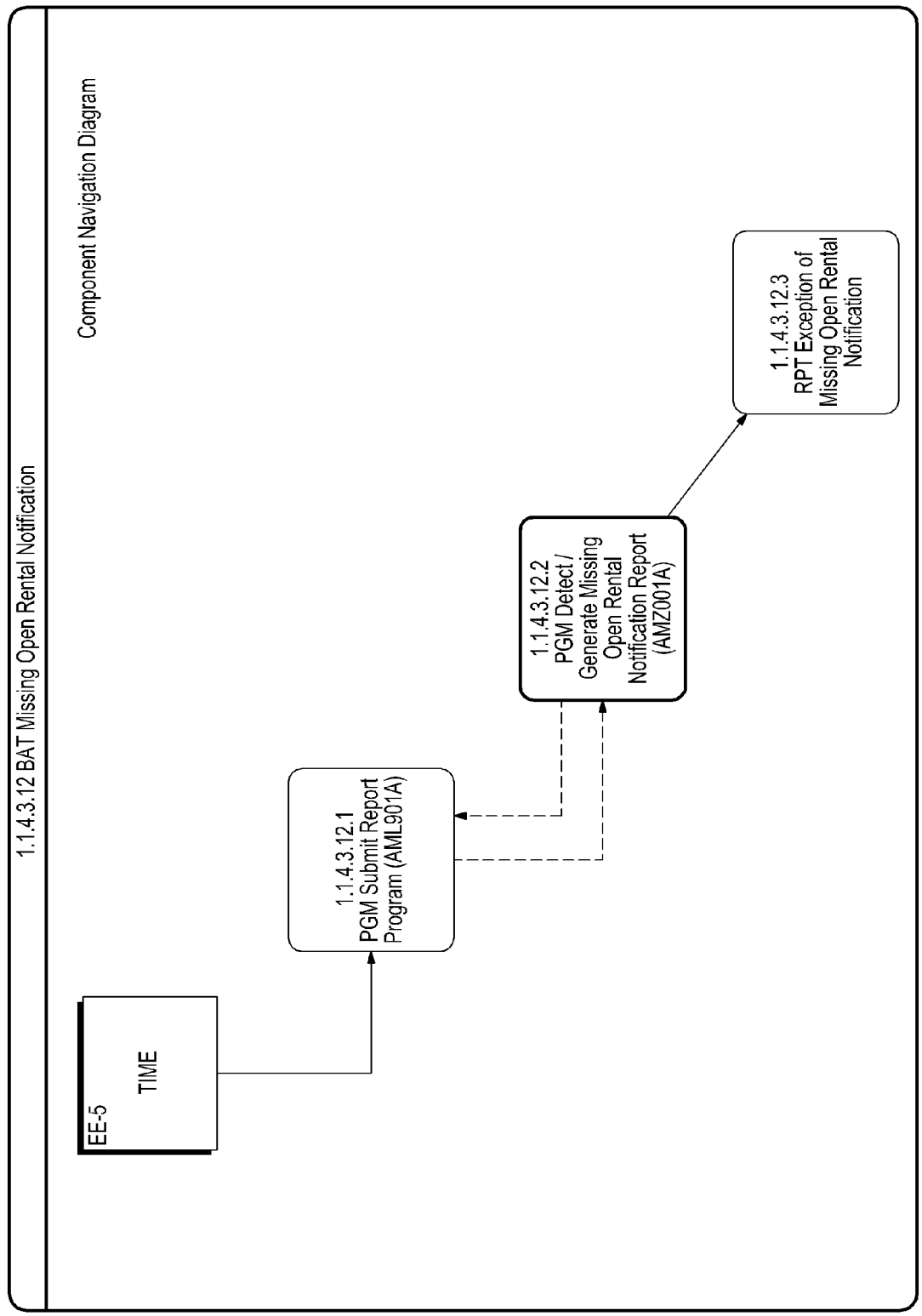
Figure 60:
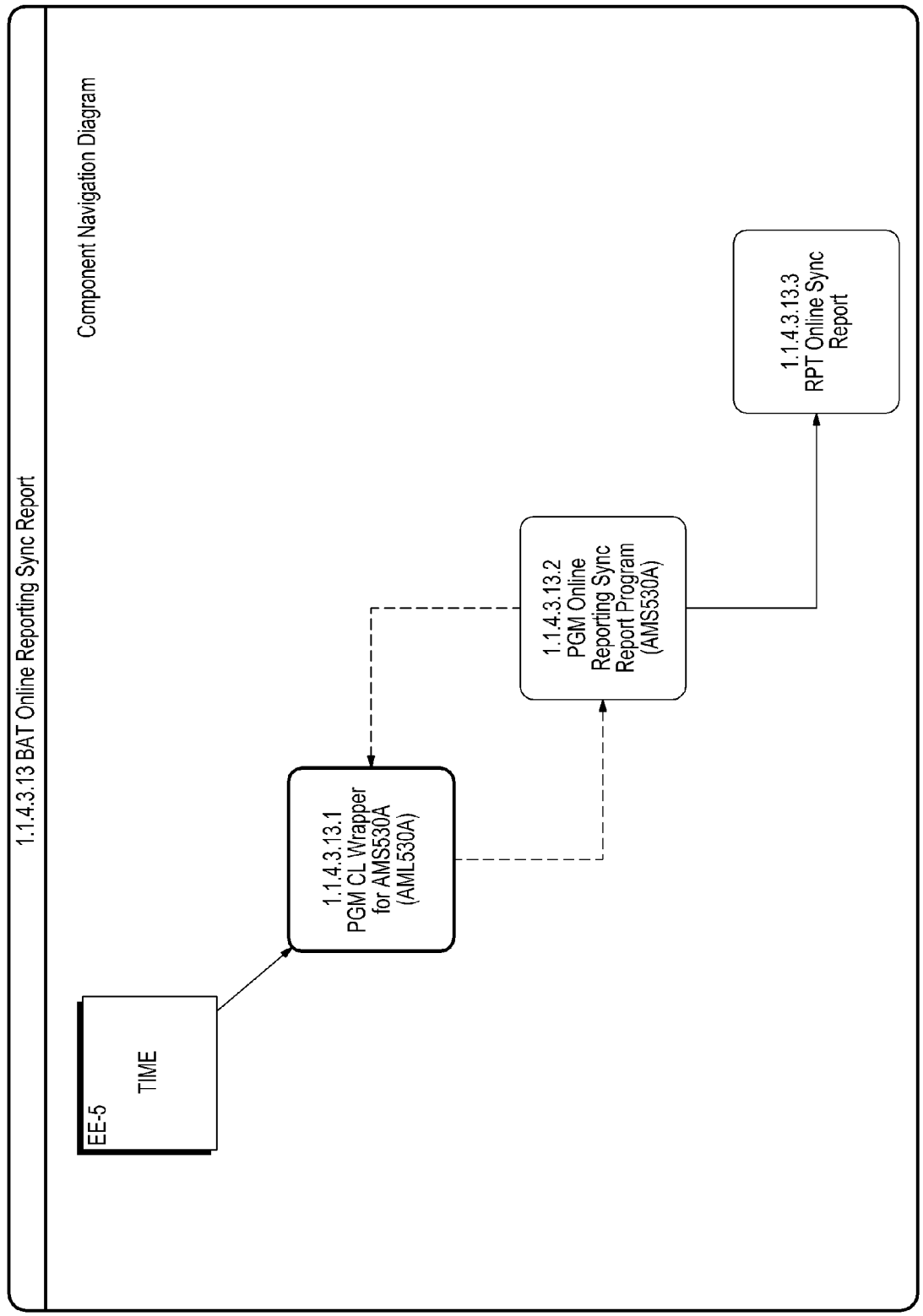
Figure 61:
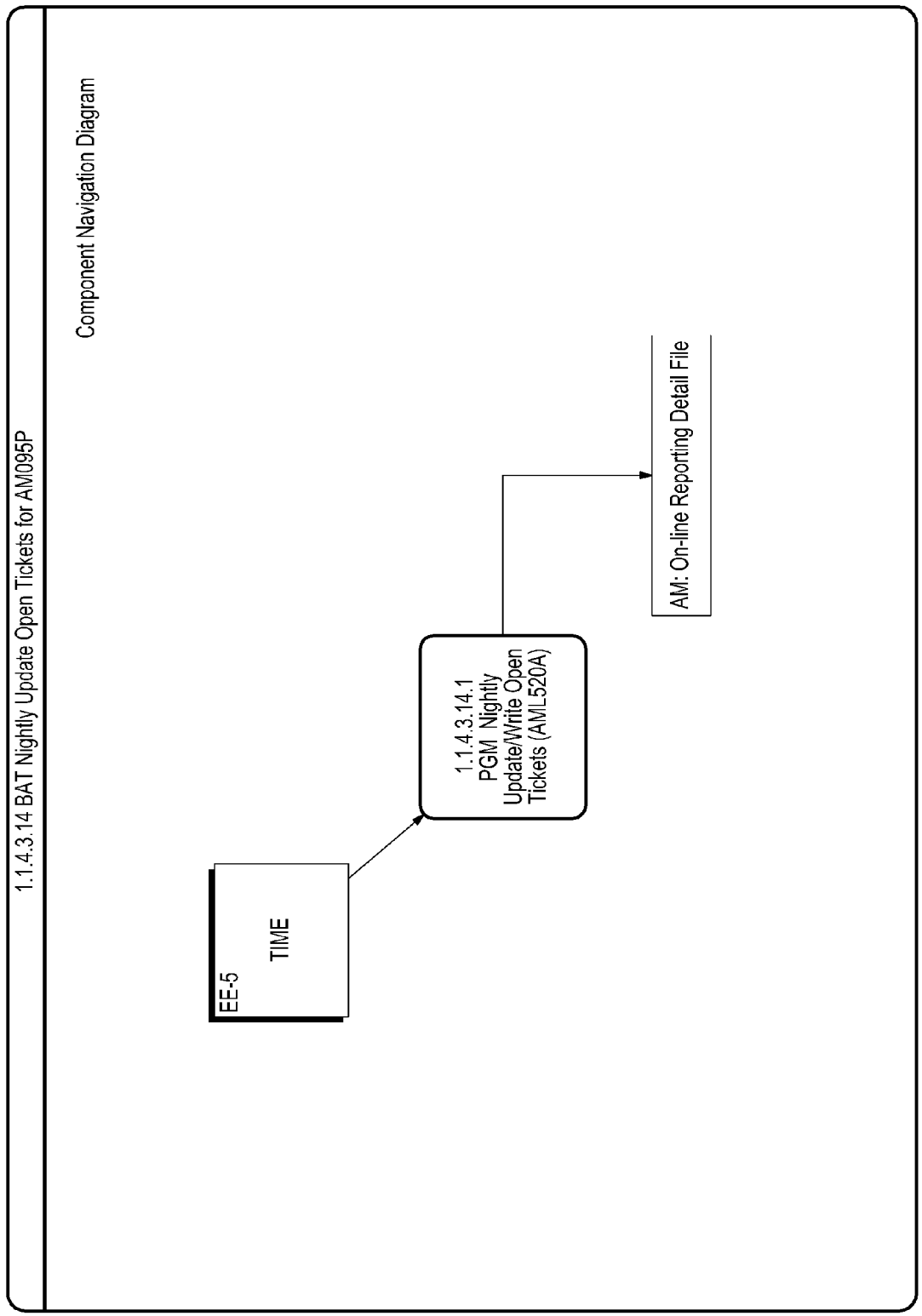
Figure 62:
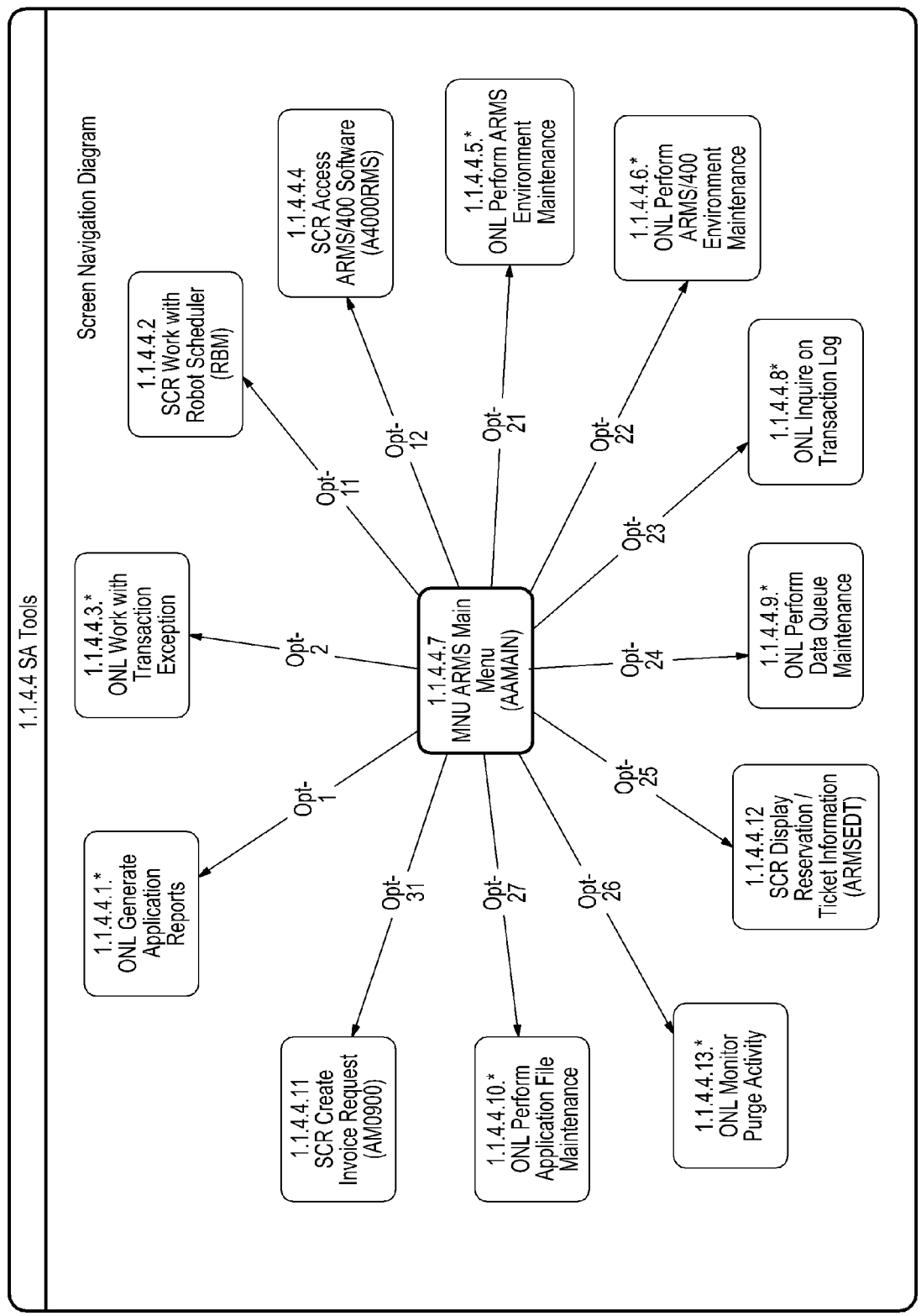
Figure 63:
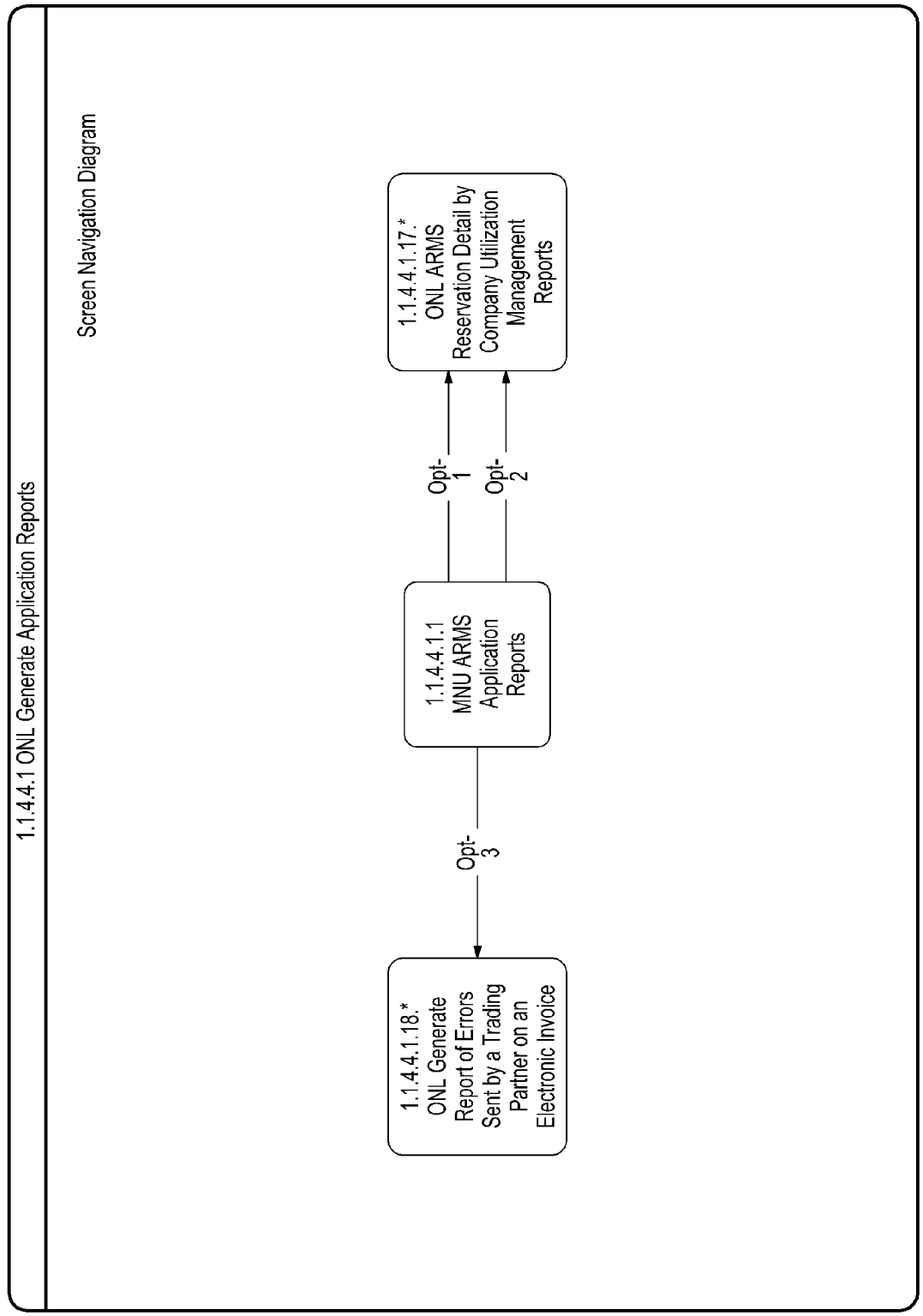
Figure 64:
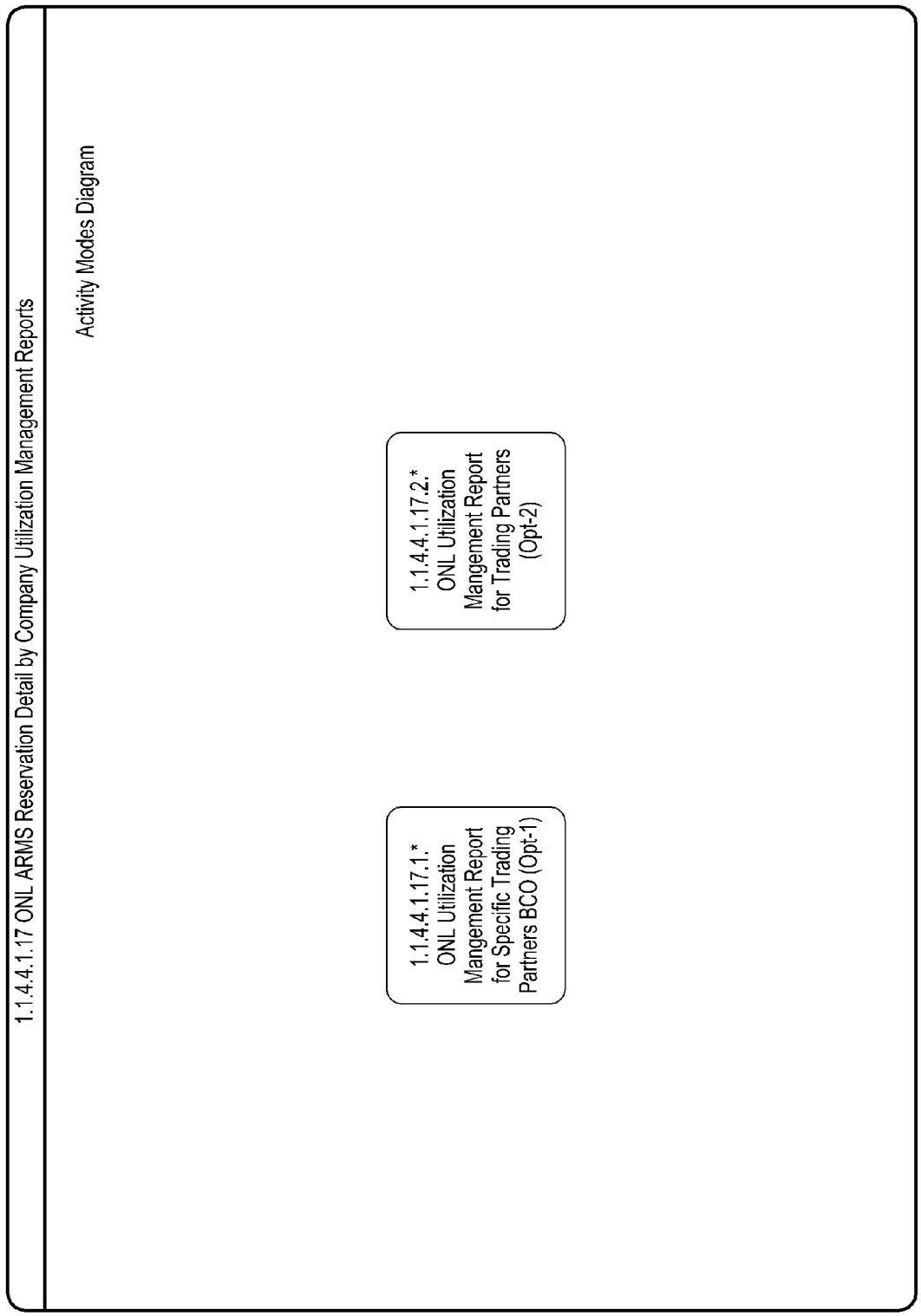
Figure 65:
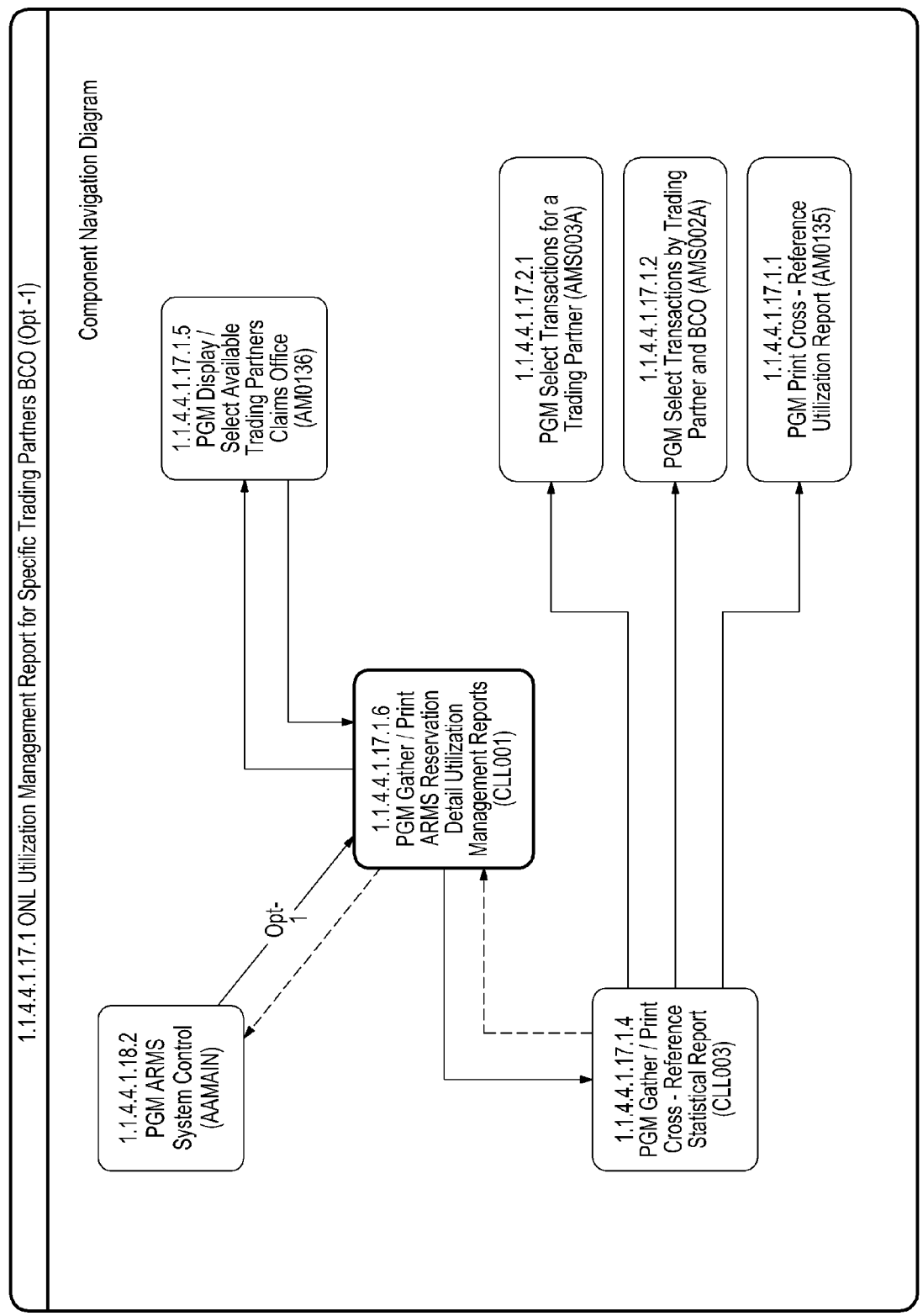
Figure 66:
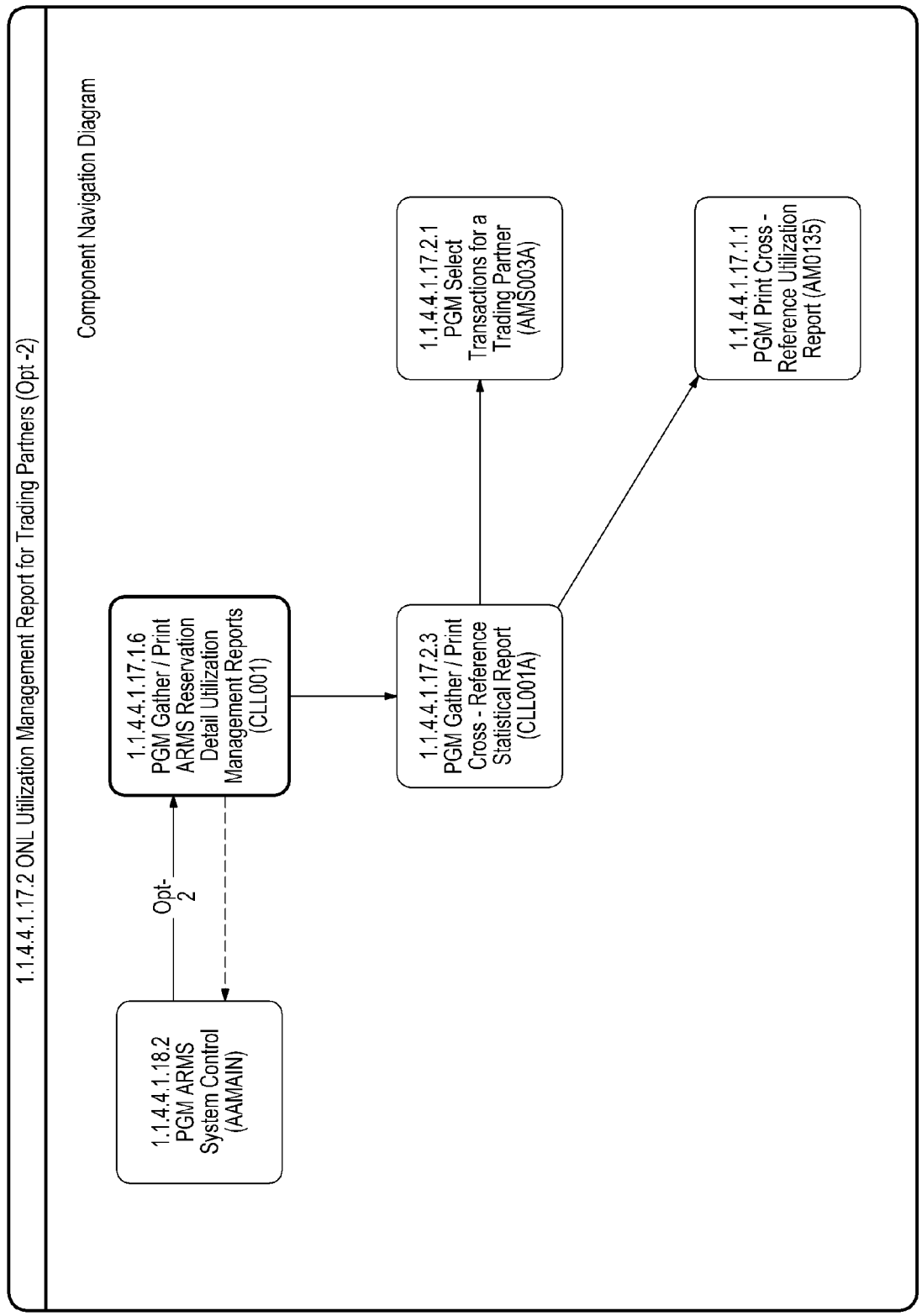
Figure 67:
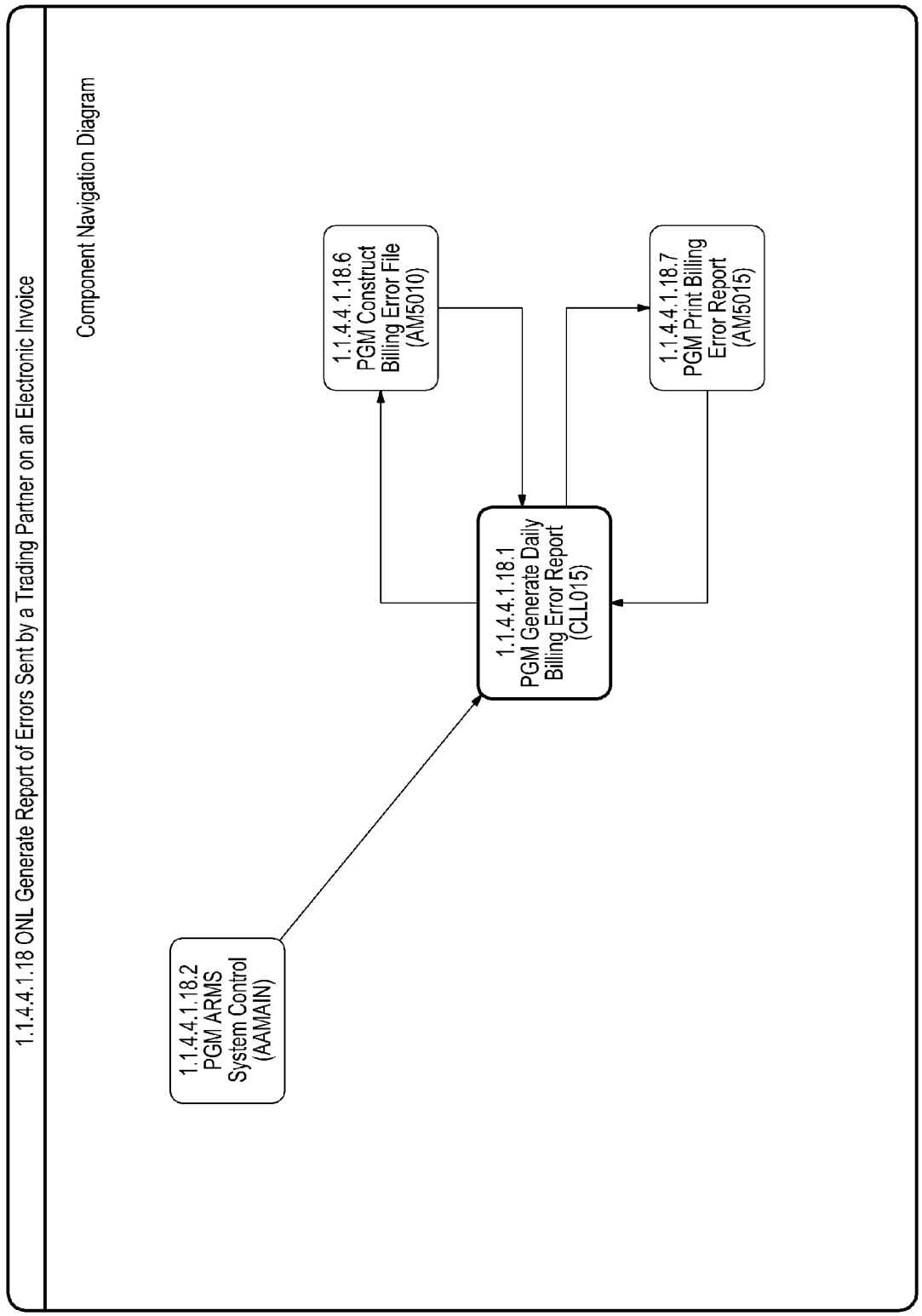
Figure 68:
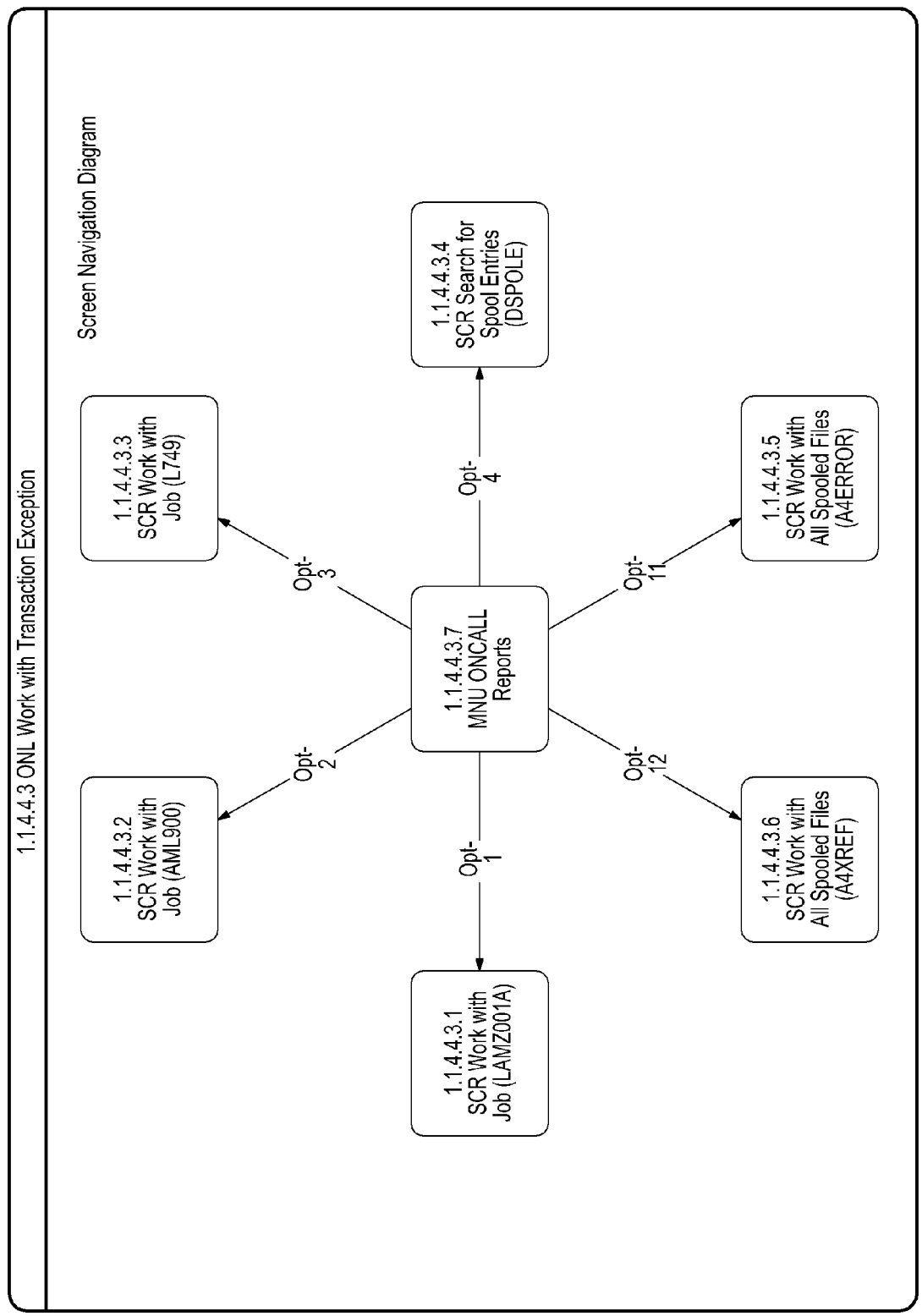
Figure 69:
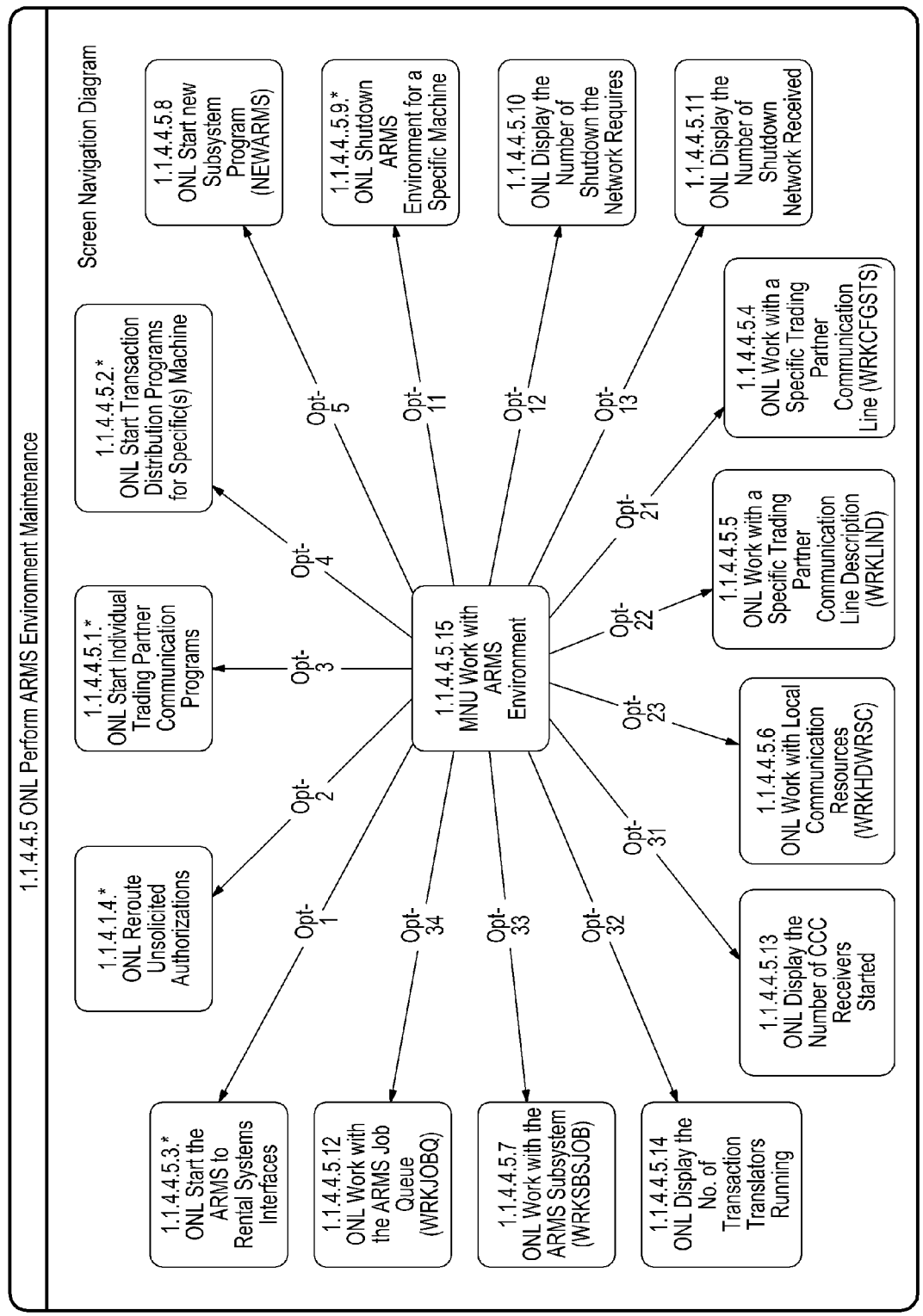
Figure 70:
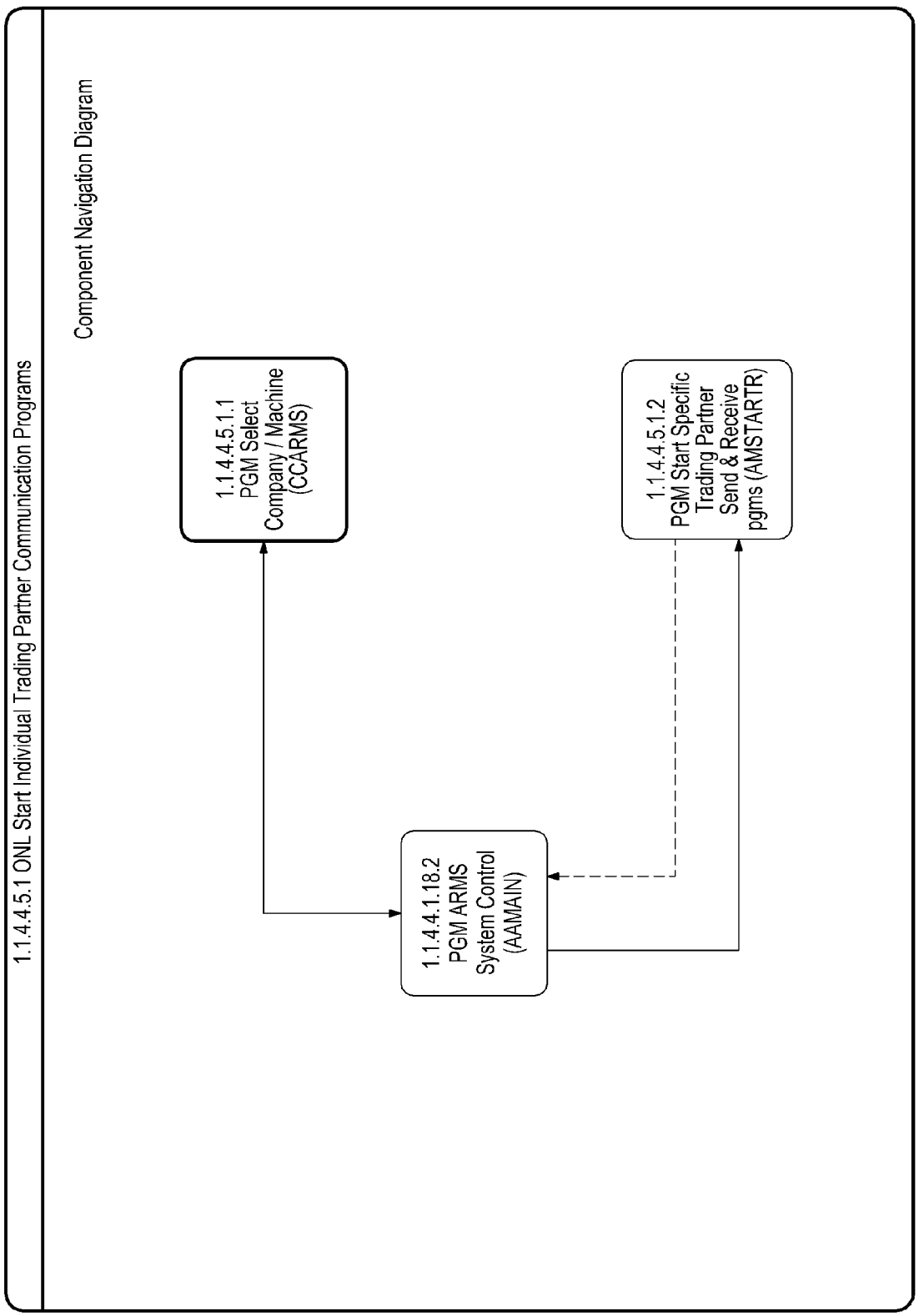
Figure 71:
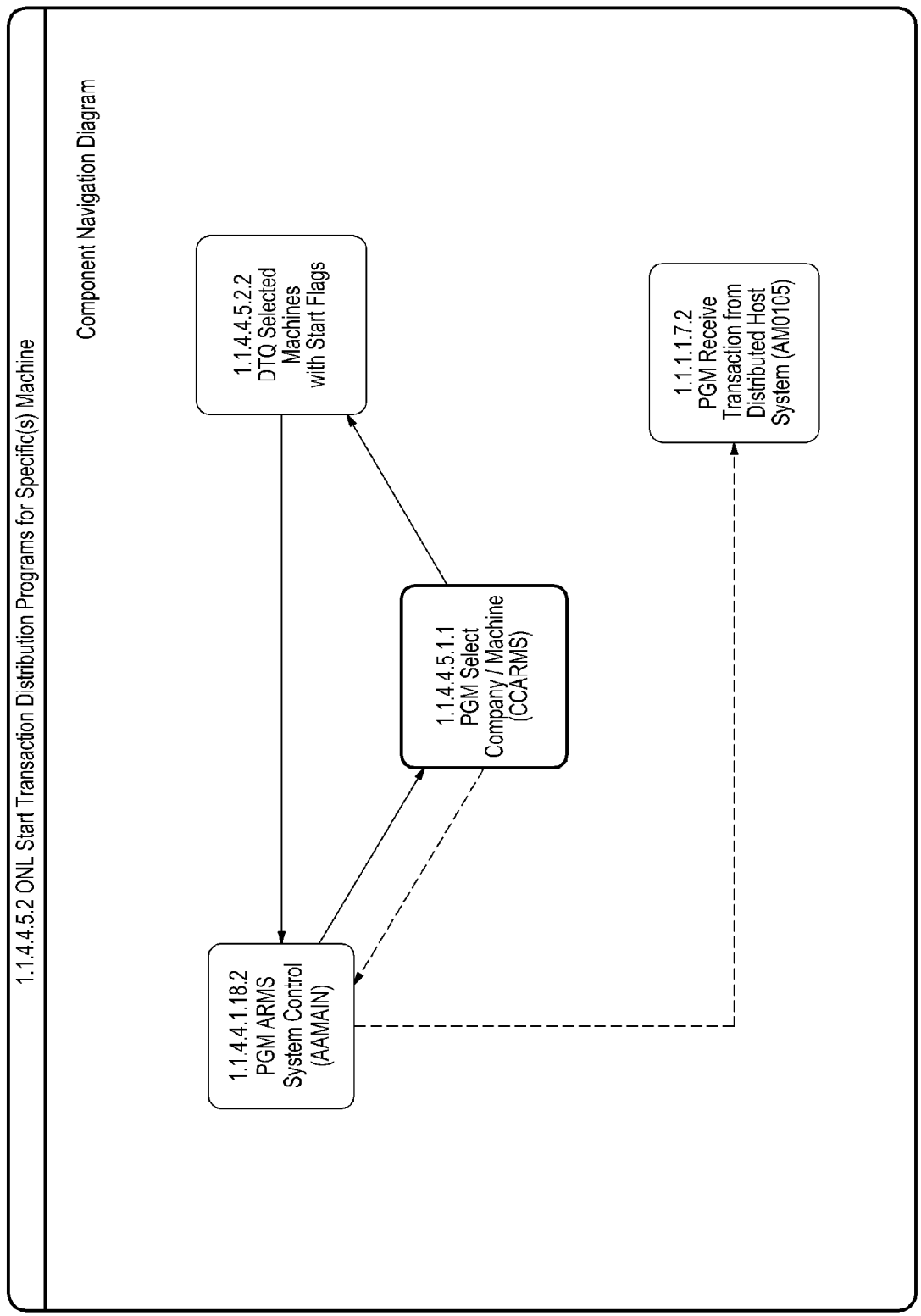
Figure 72:
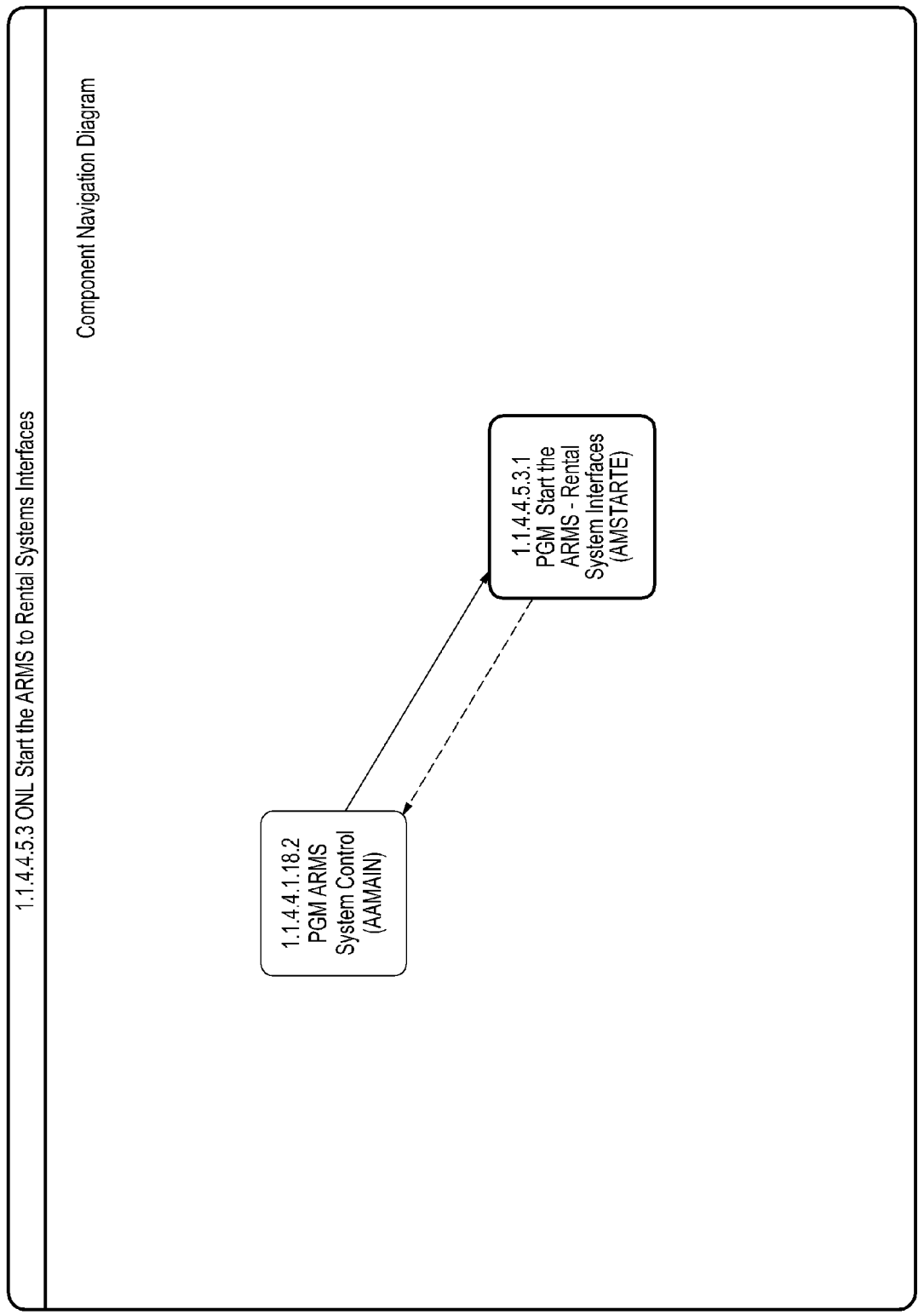
Figure 73:
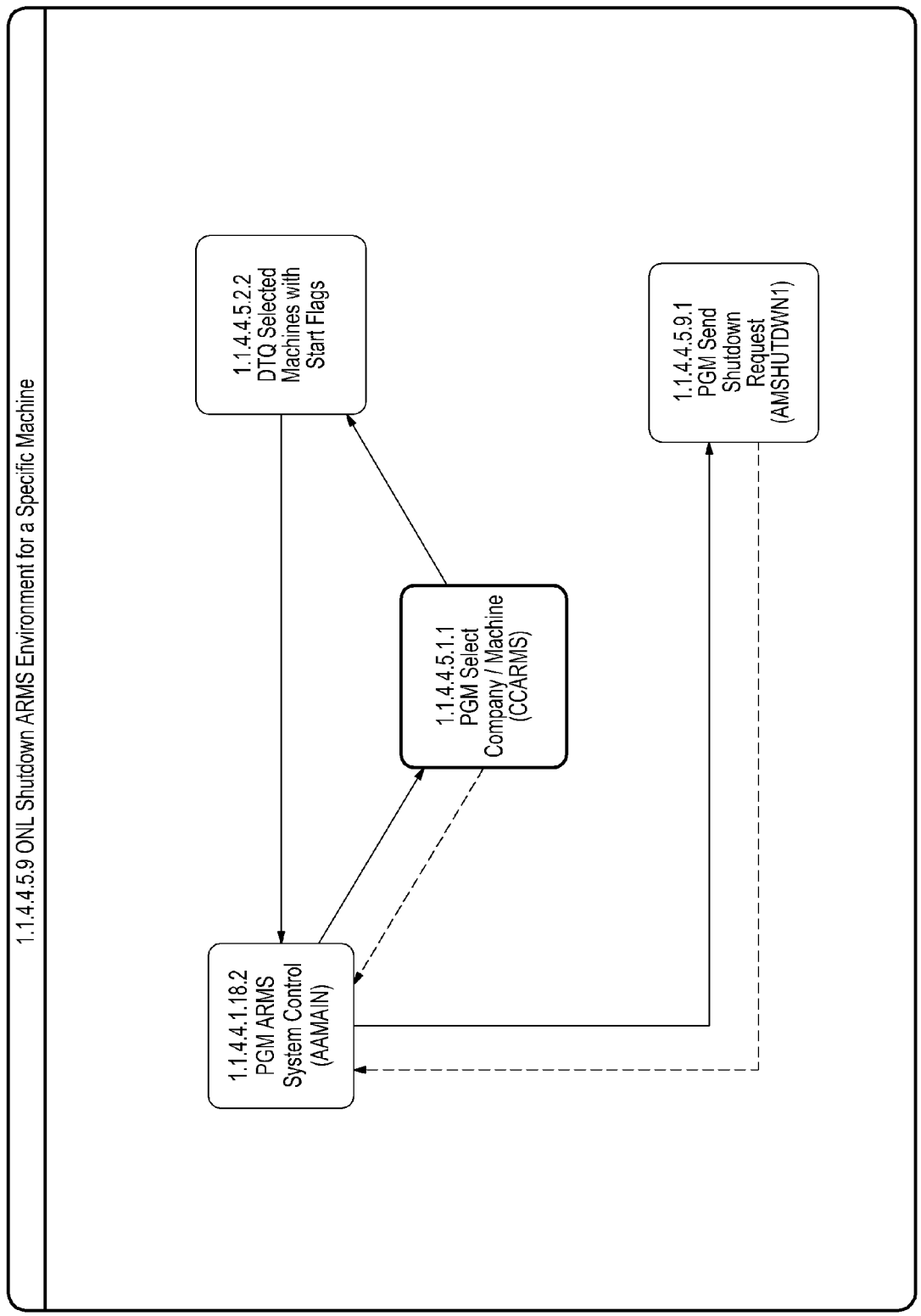
Figure 74:
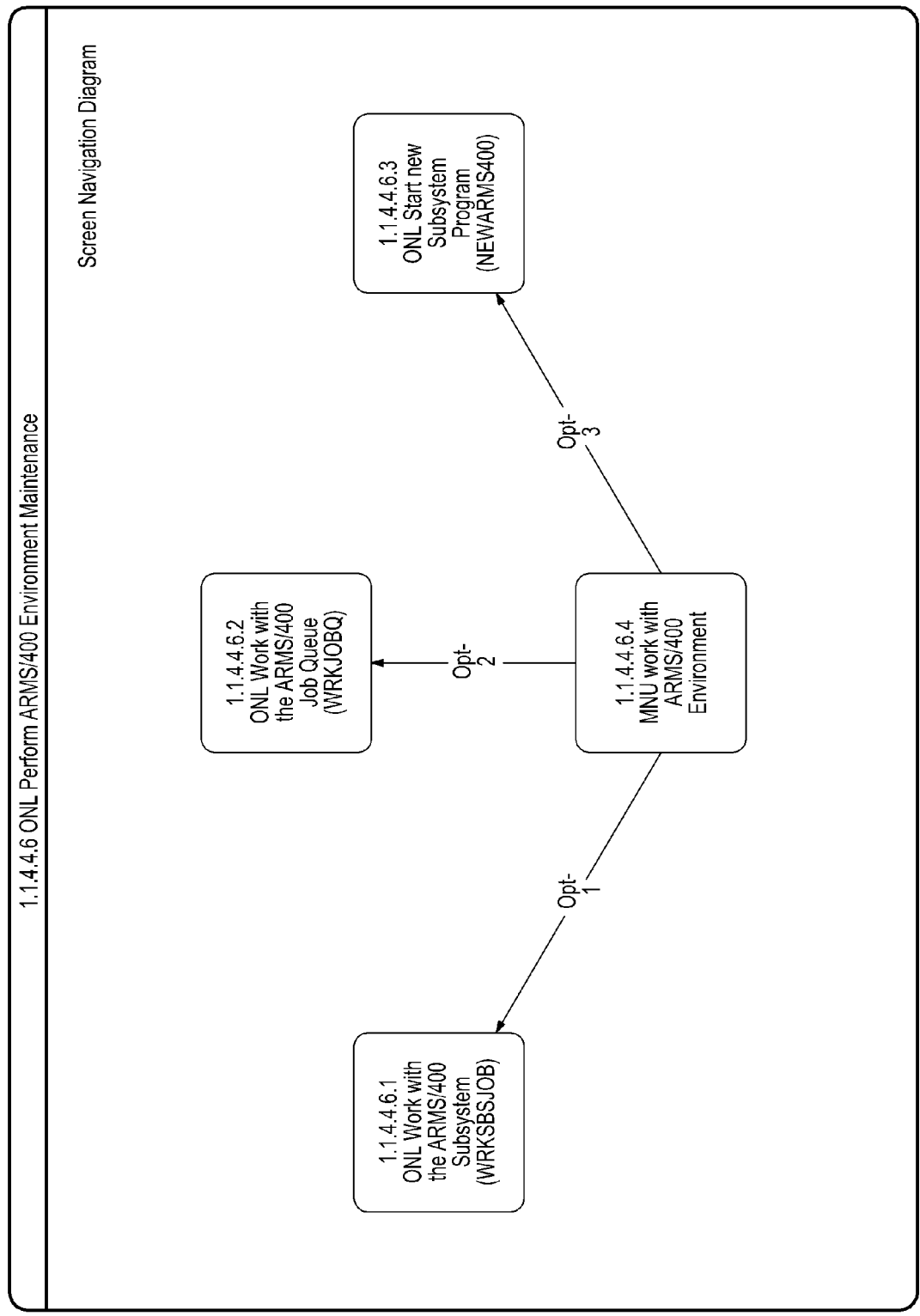
Figure 75:
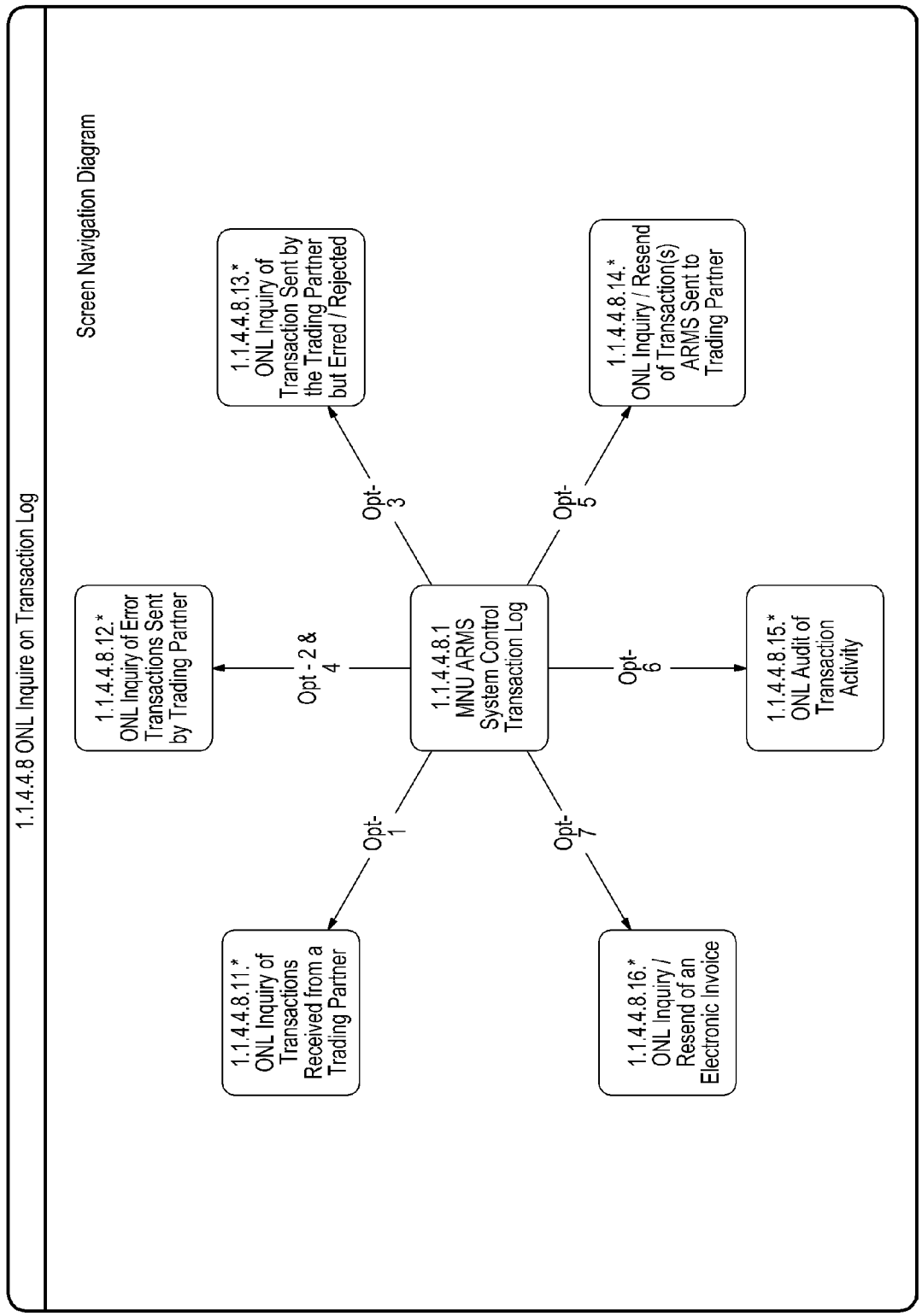
Figure 76:
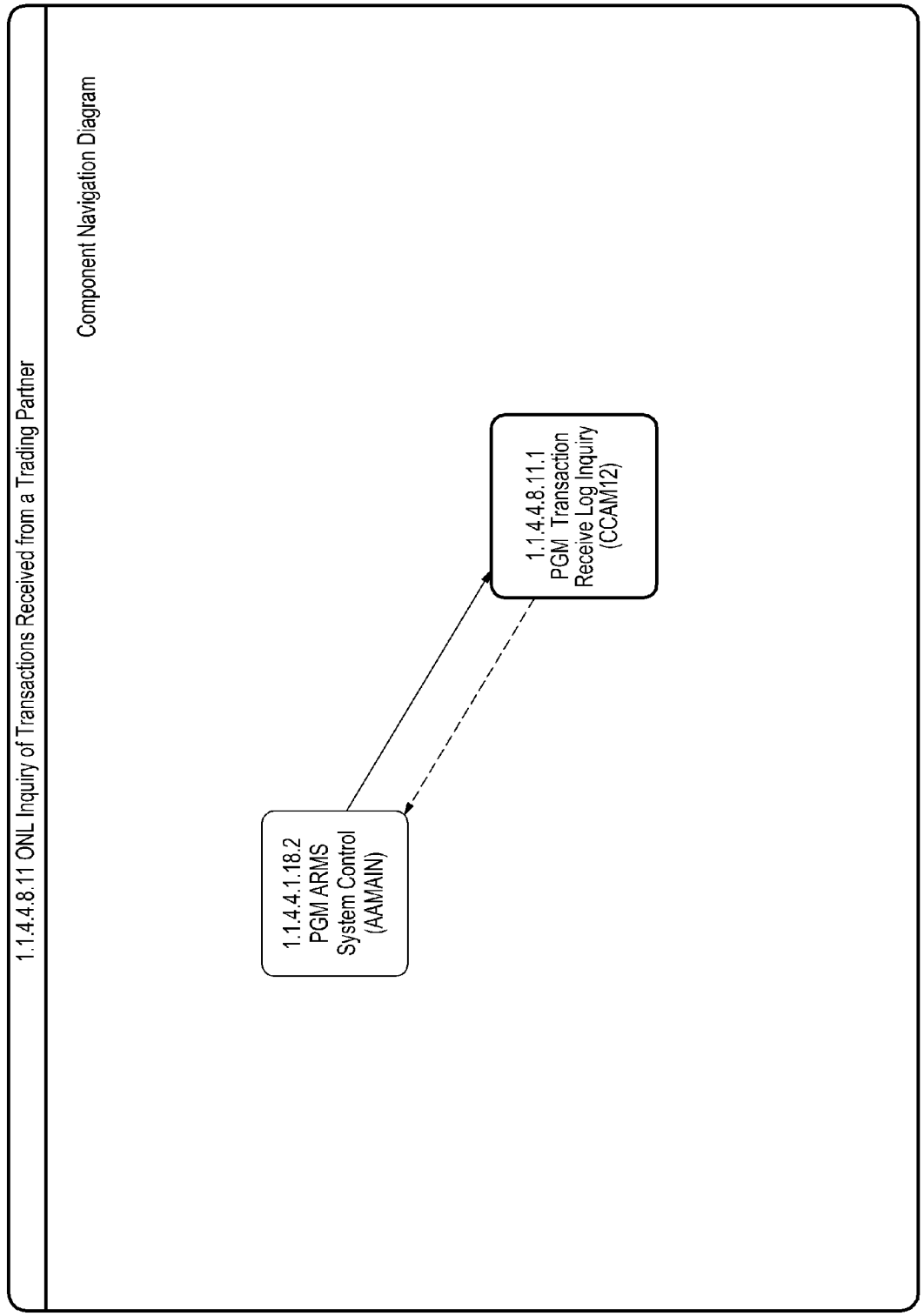
Figure 77:
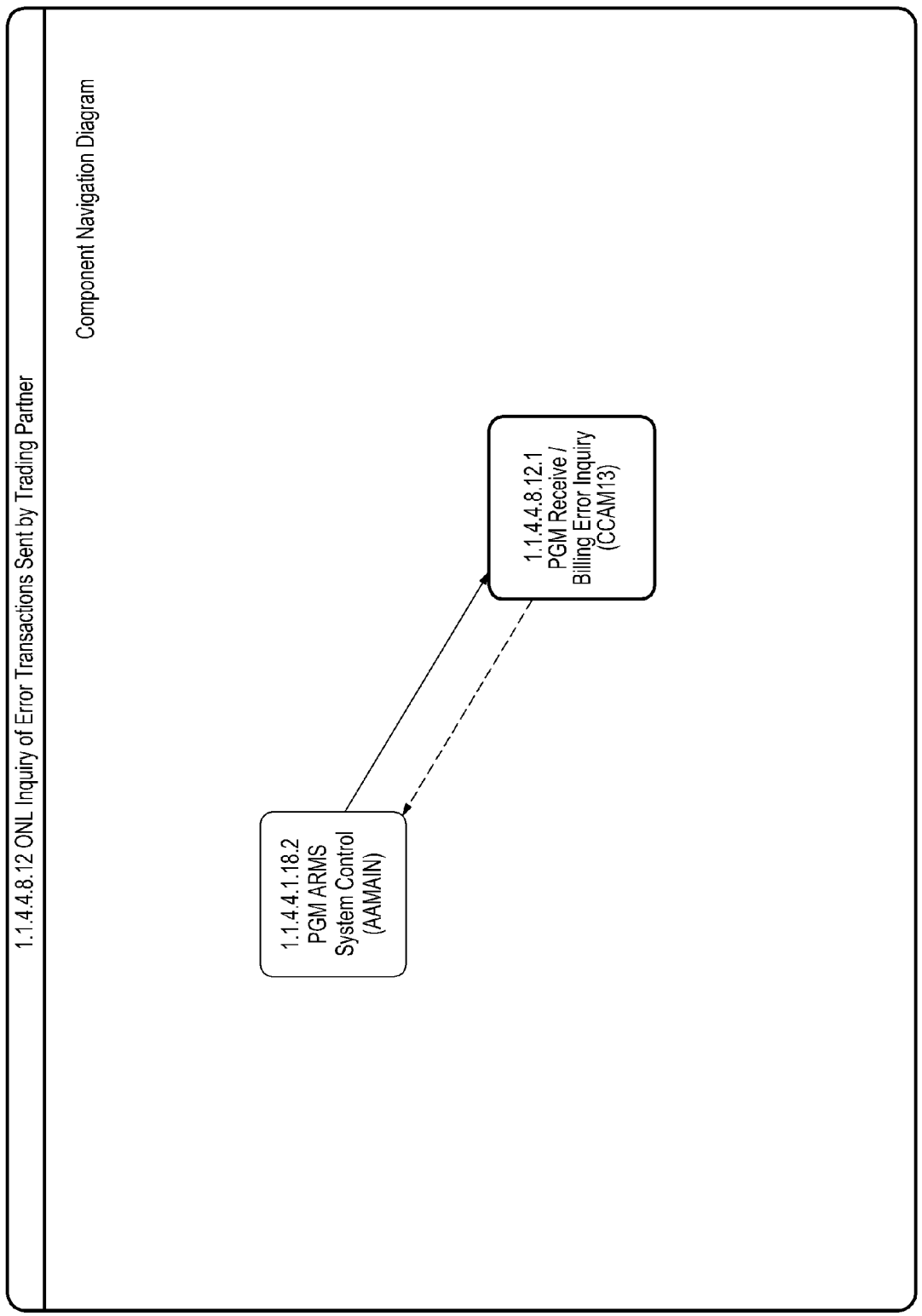
Figure 78:
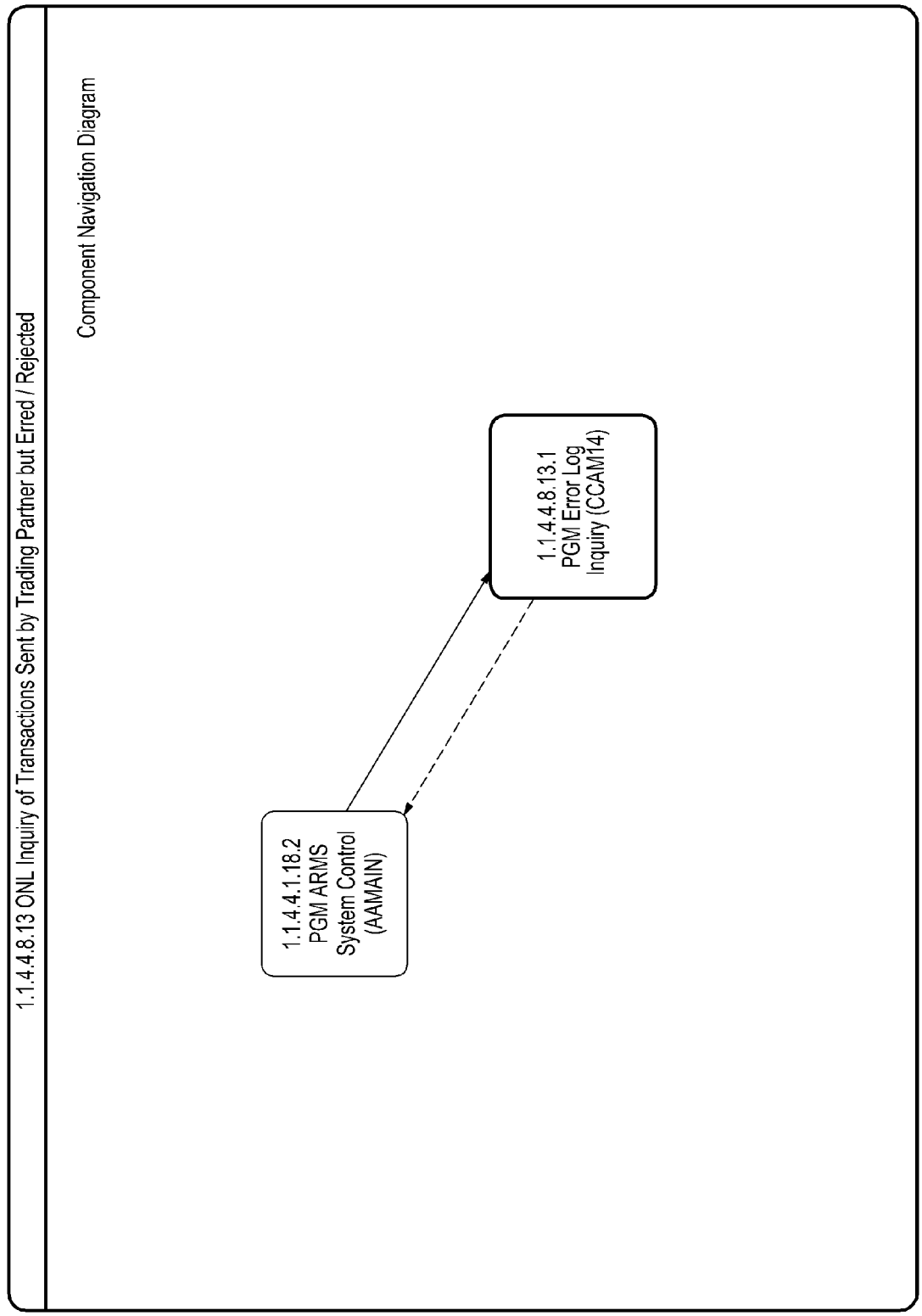
Figure 79:
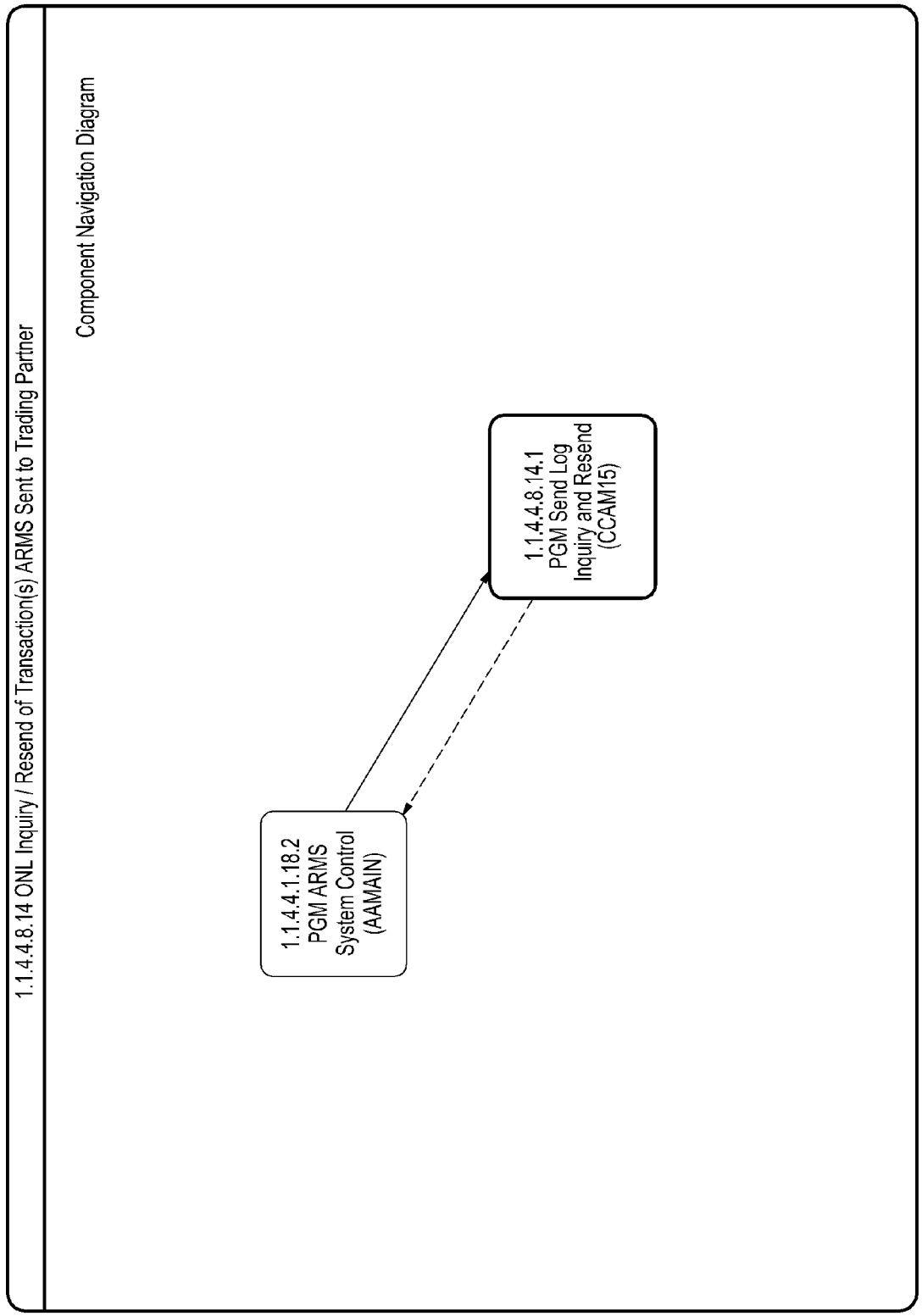
Figure 80:
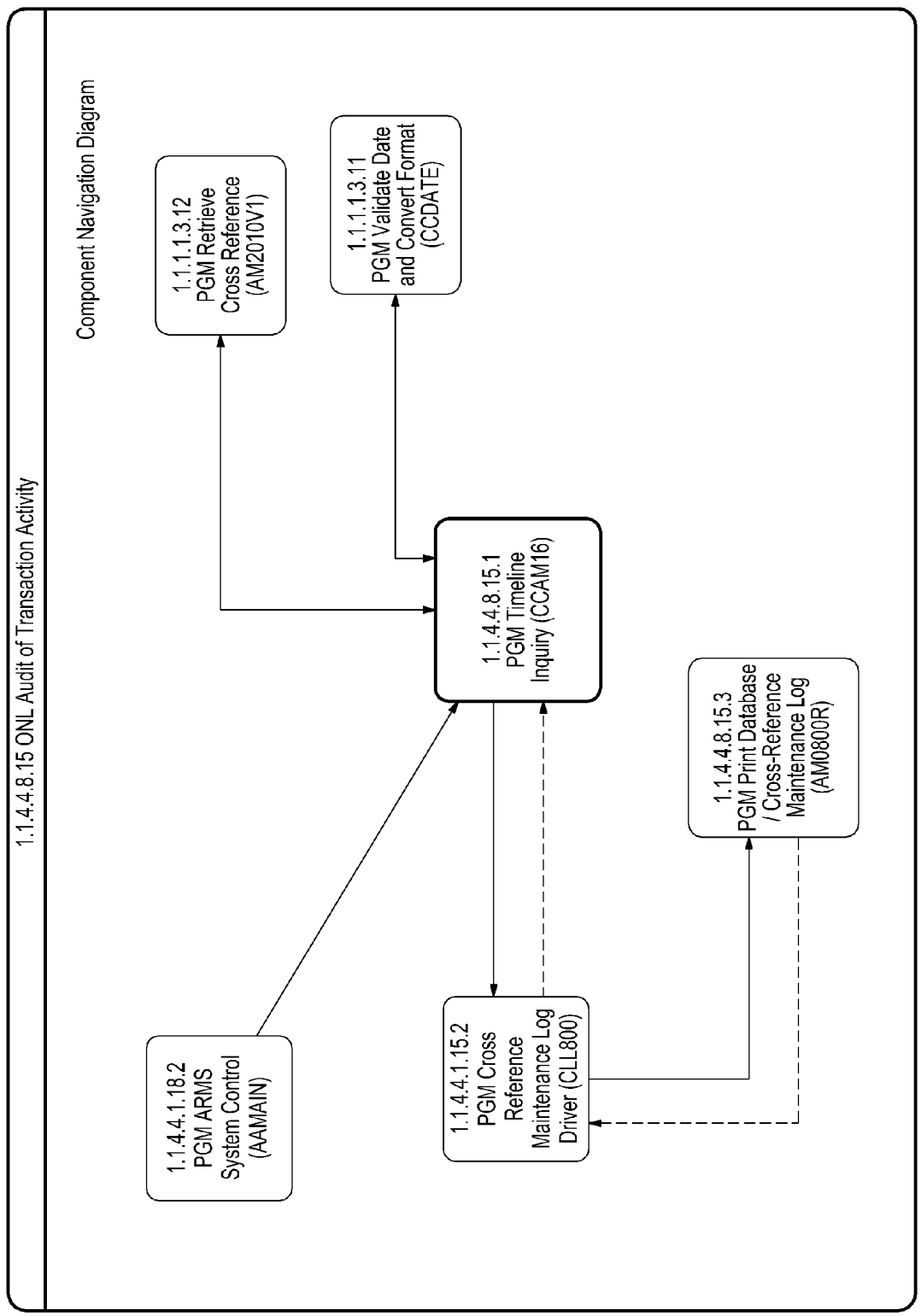
Figure 81:
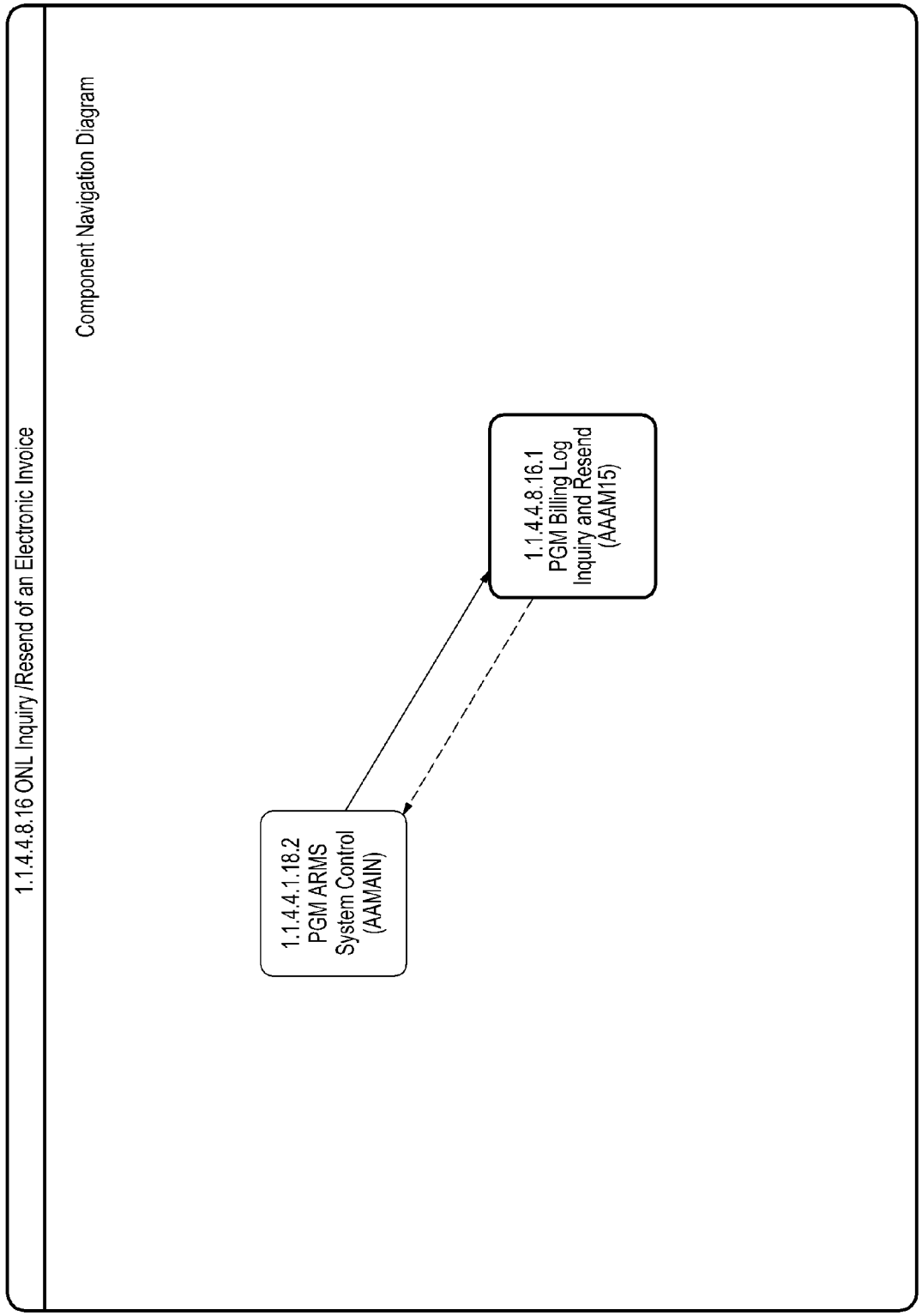
Figure 82:
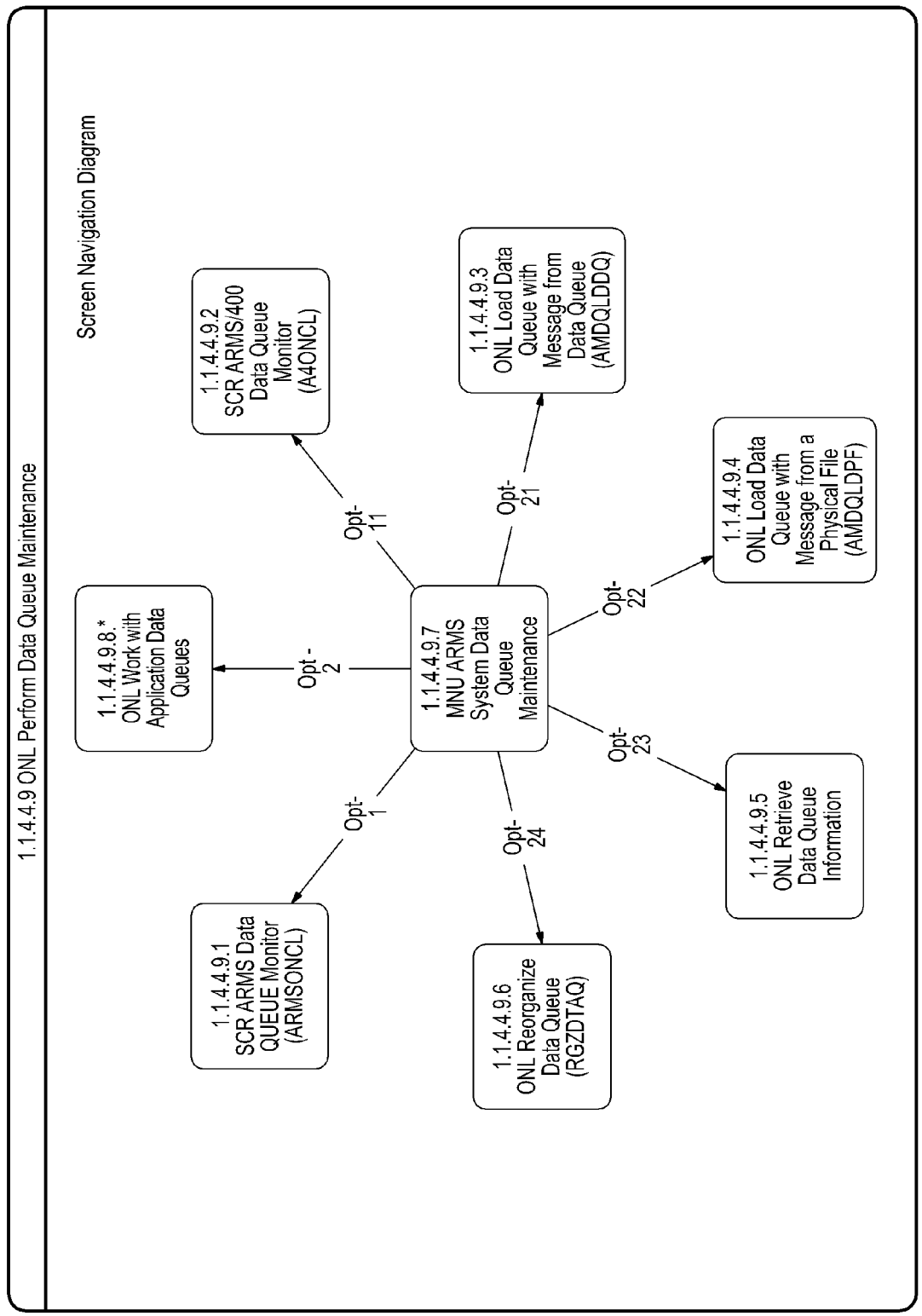
Figure 83:
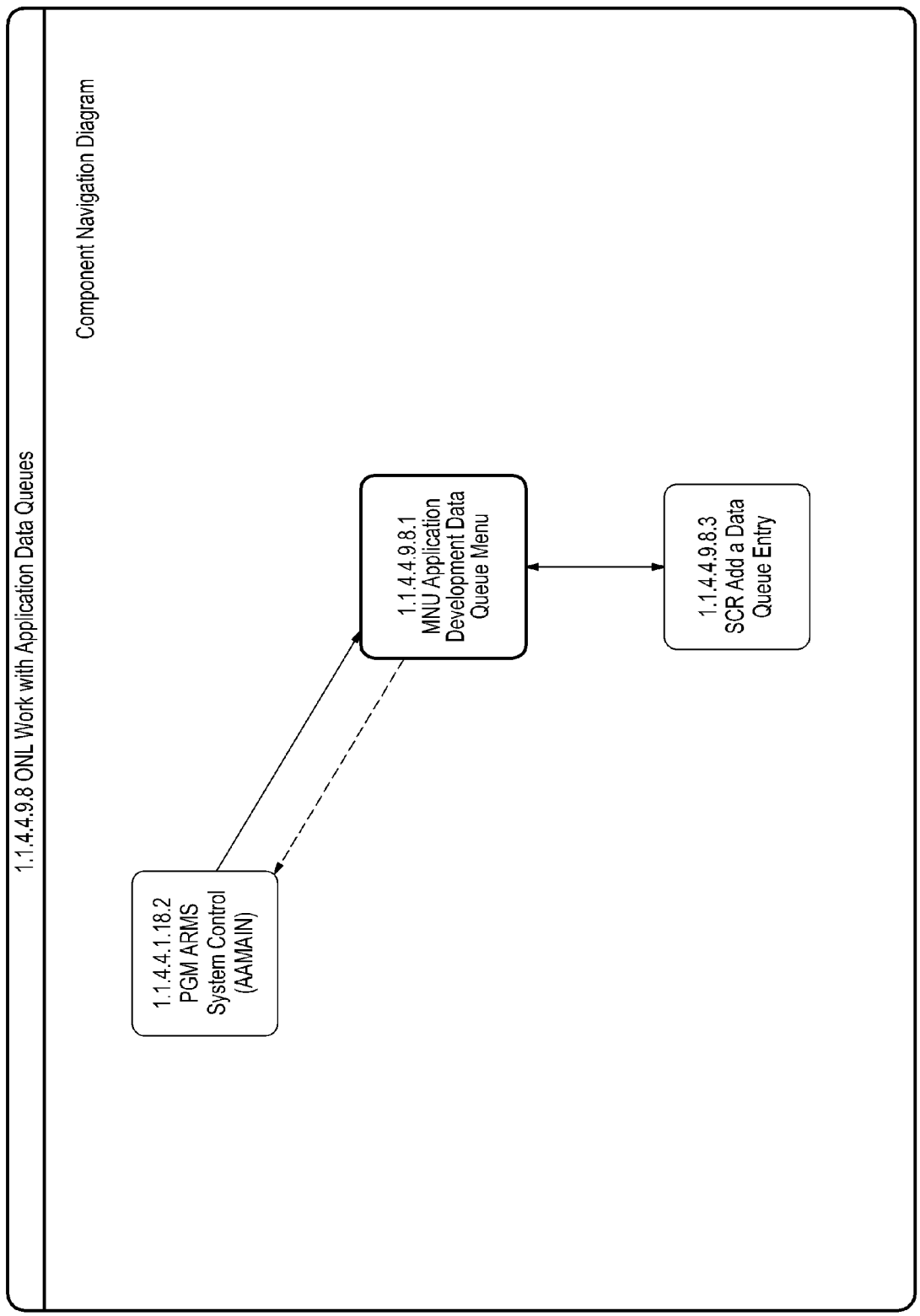
Figure 84:
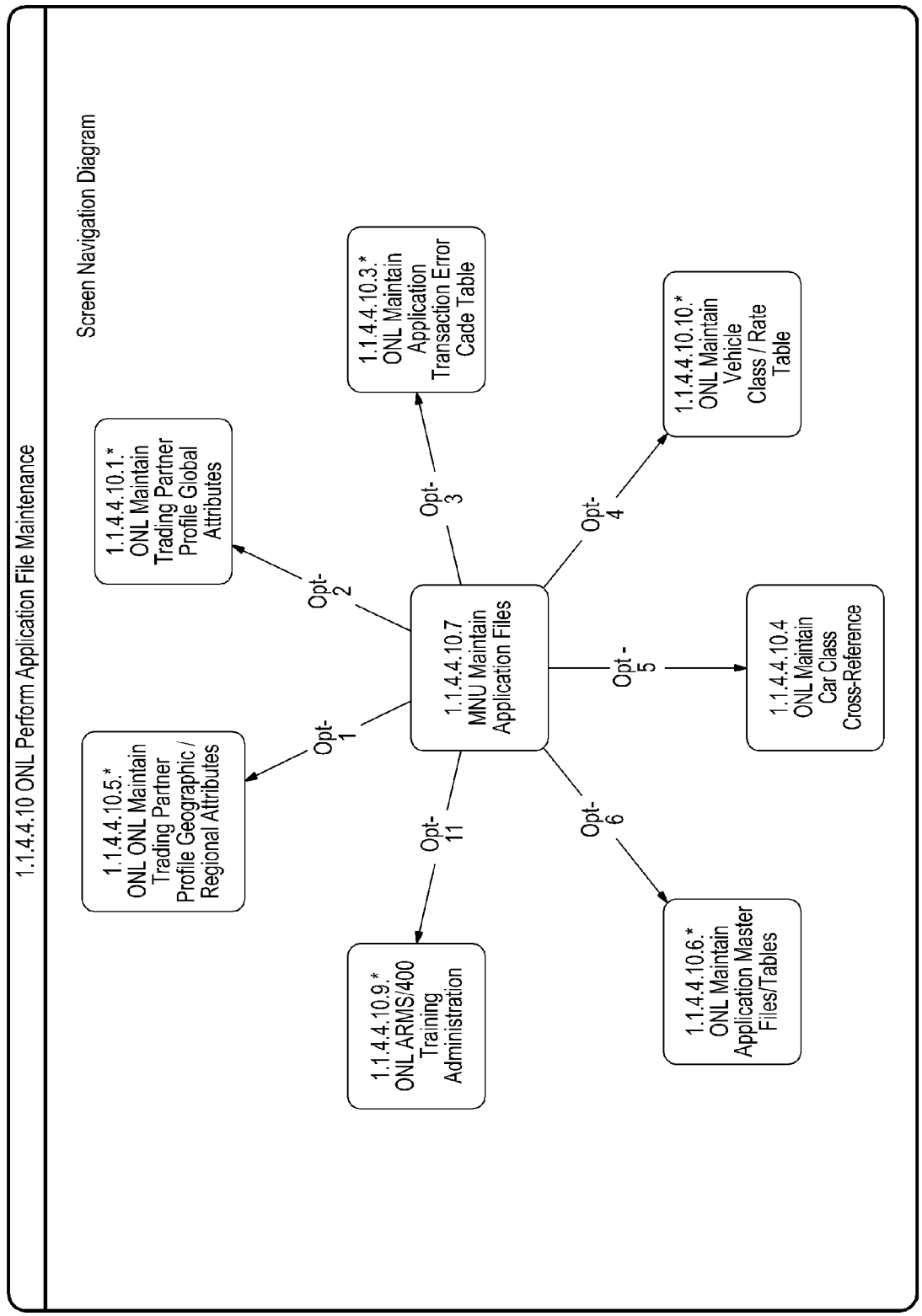
Figure 85:
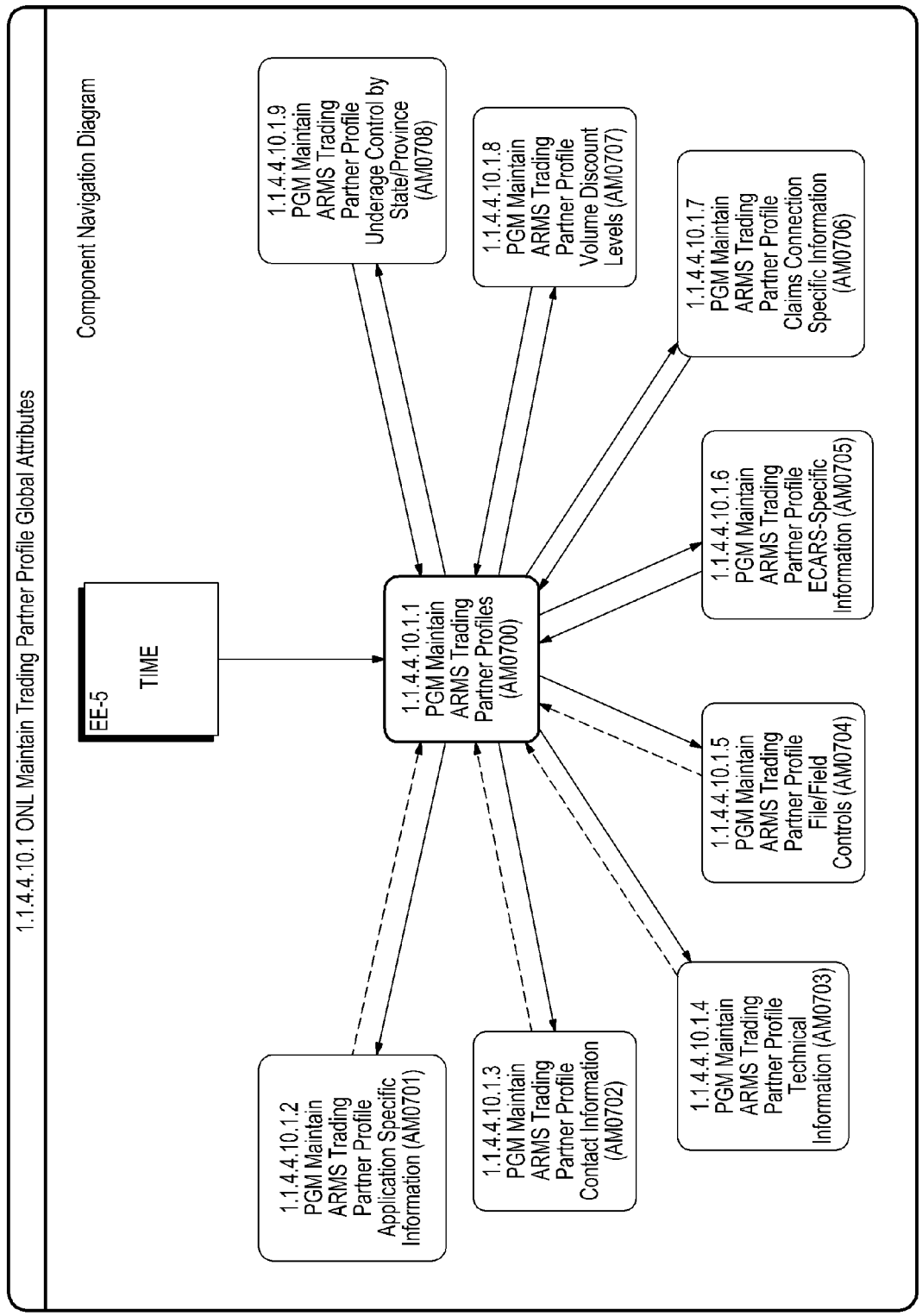
Figure 86:
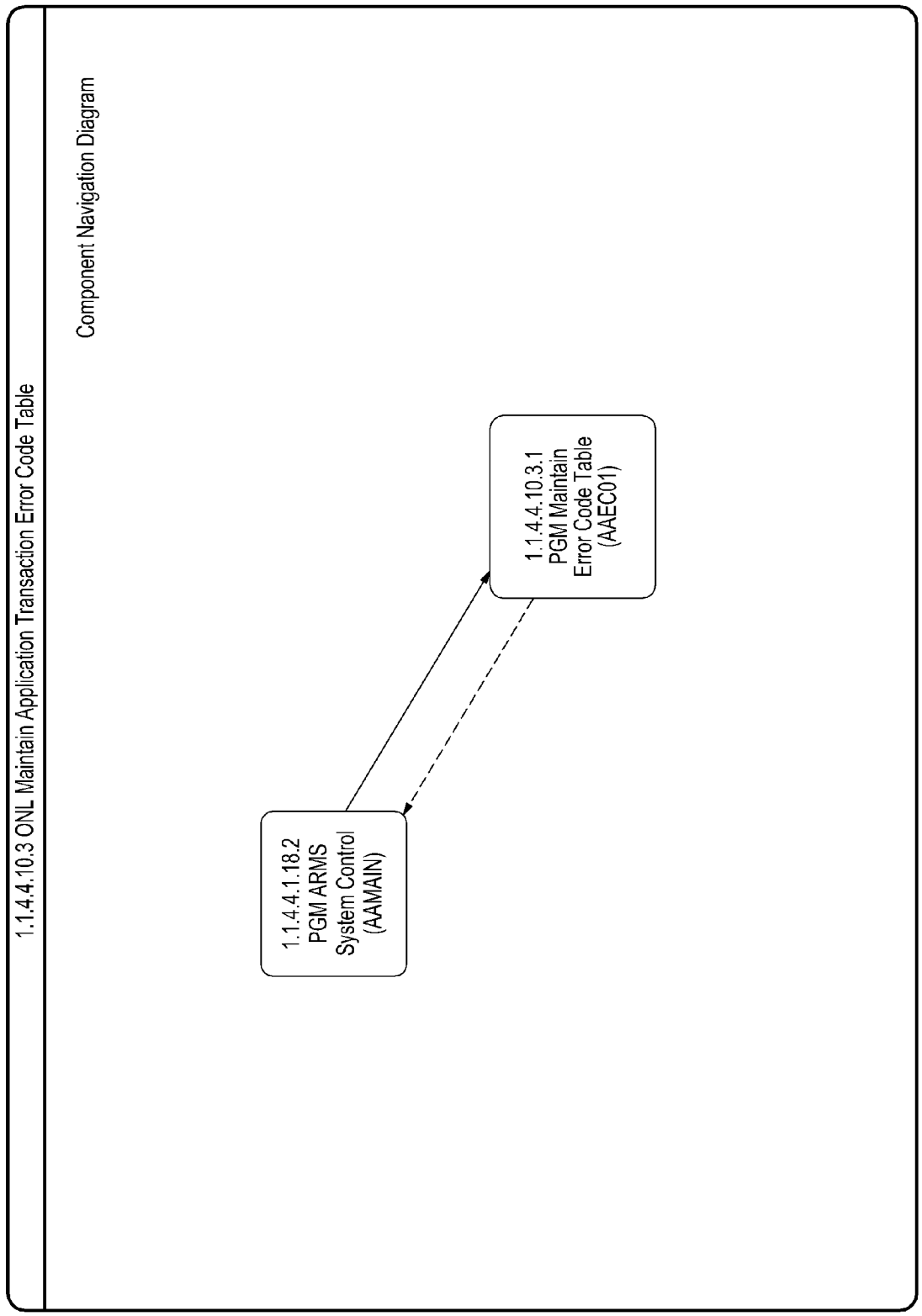
Figure 87:
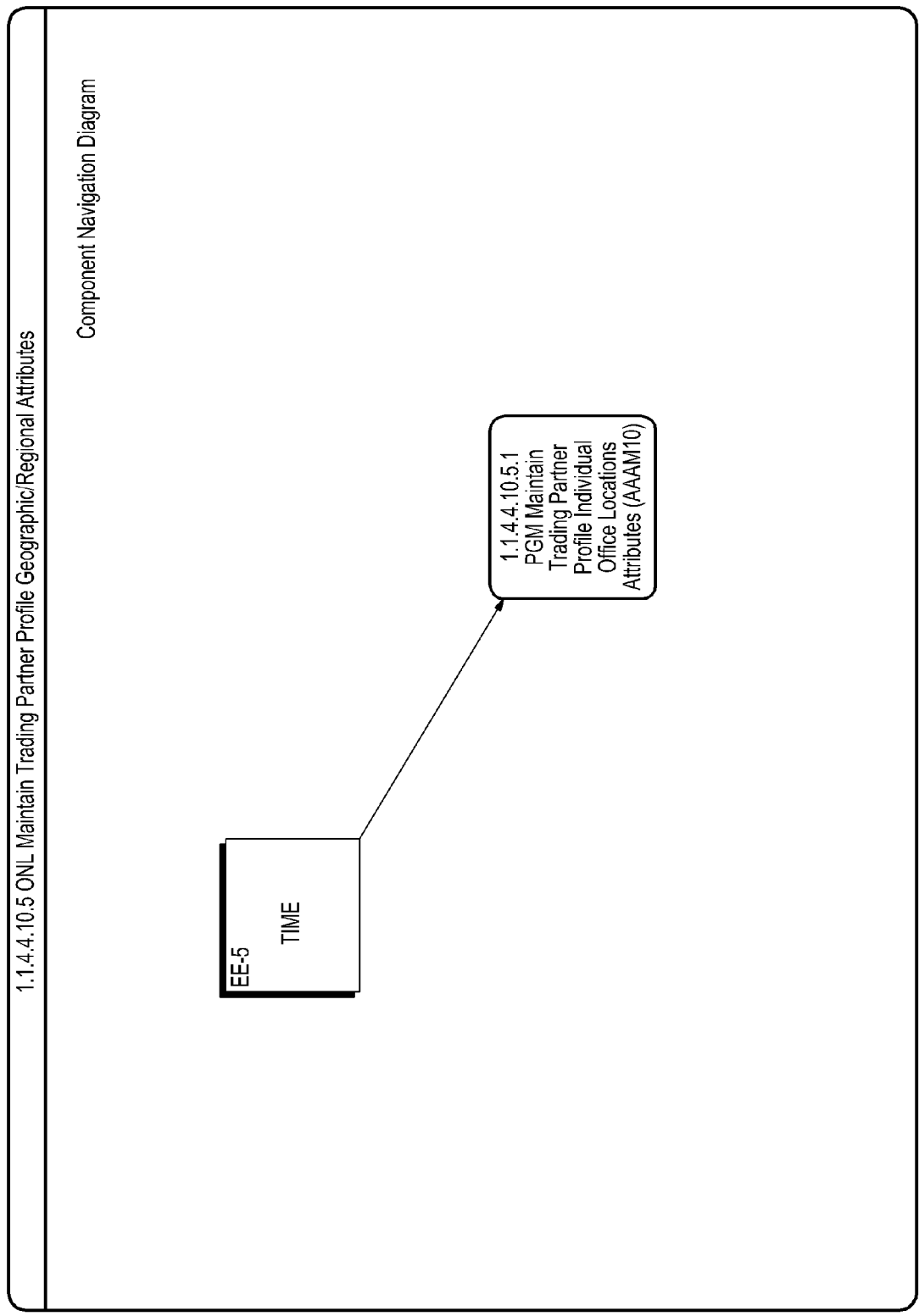
Figure 88:
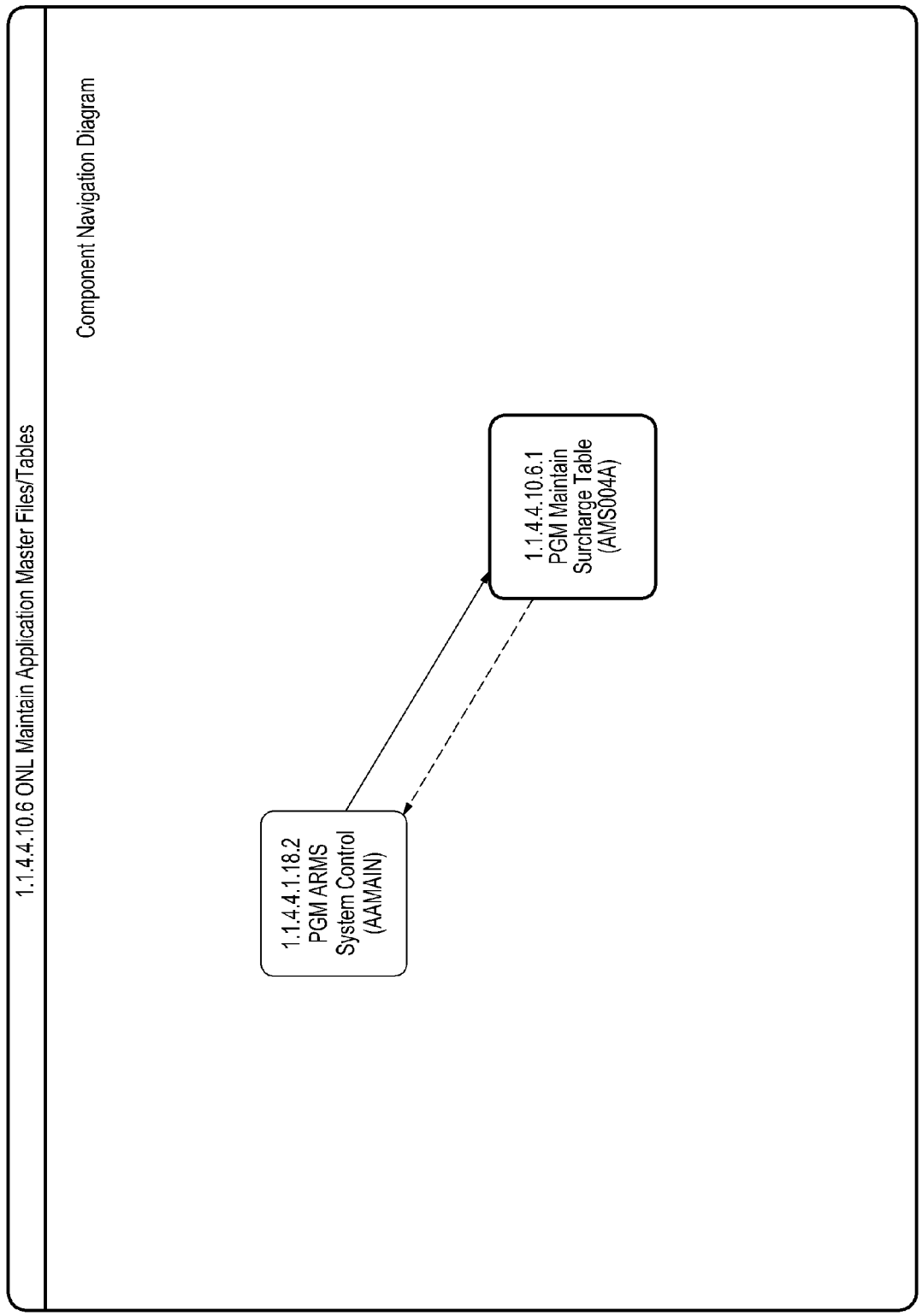
Figure 89:
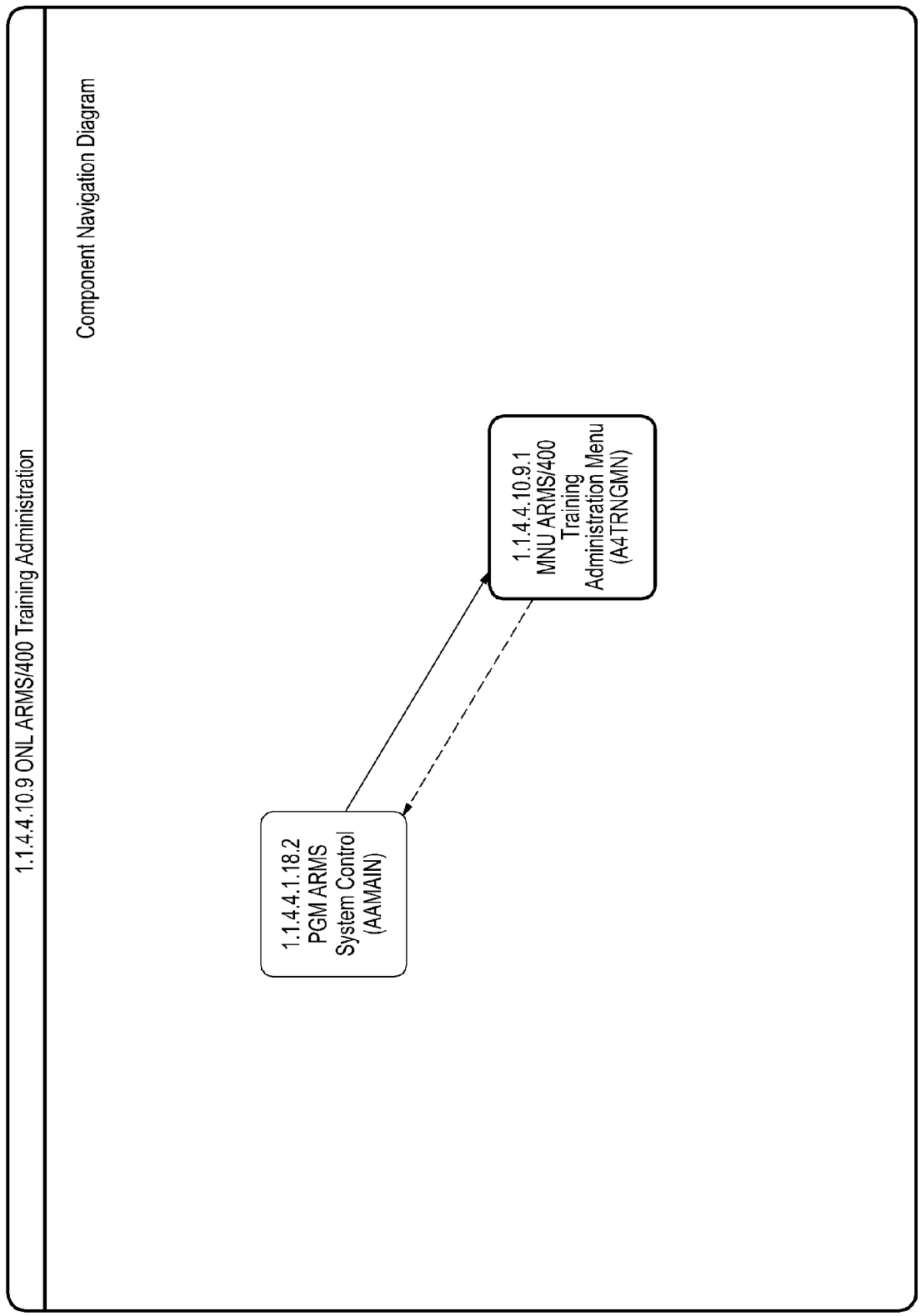
Figure 90:
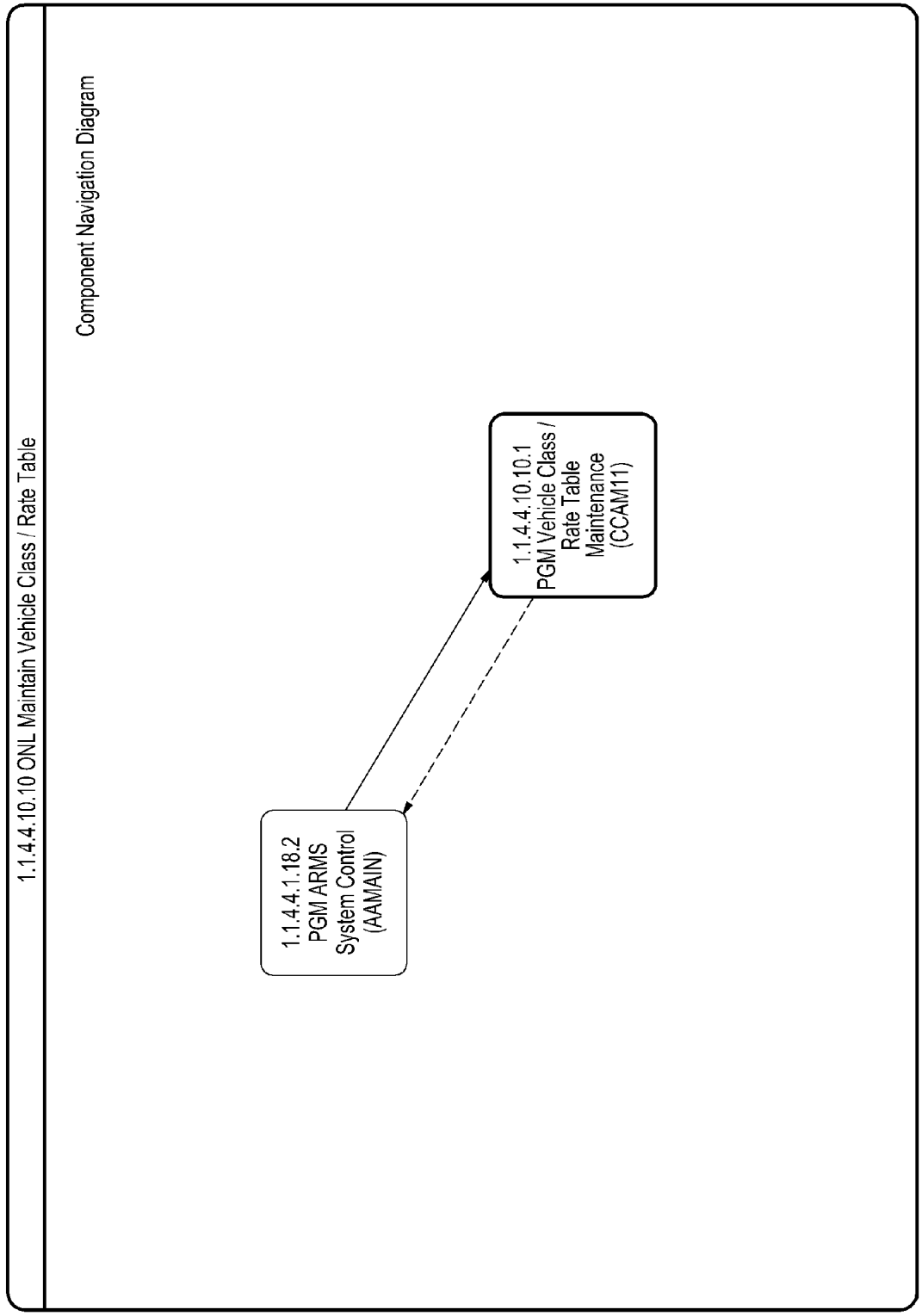
Figure 91:
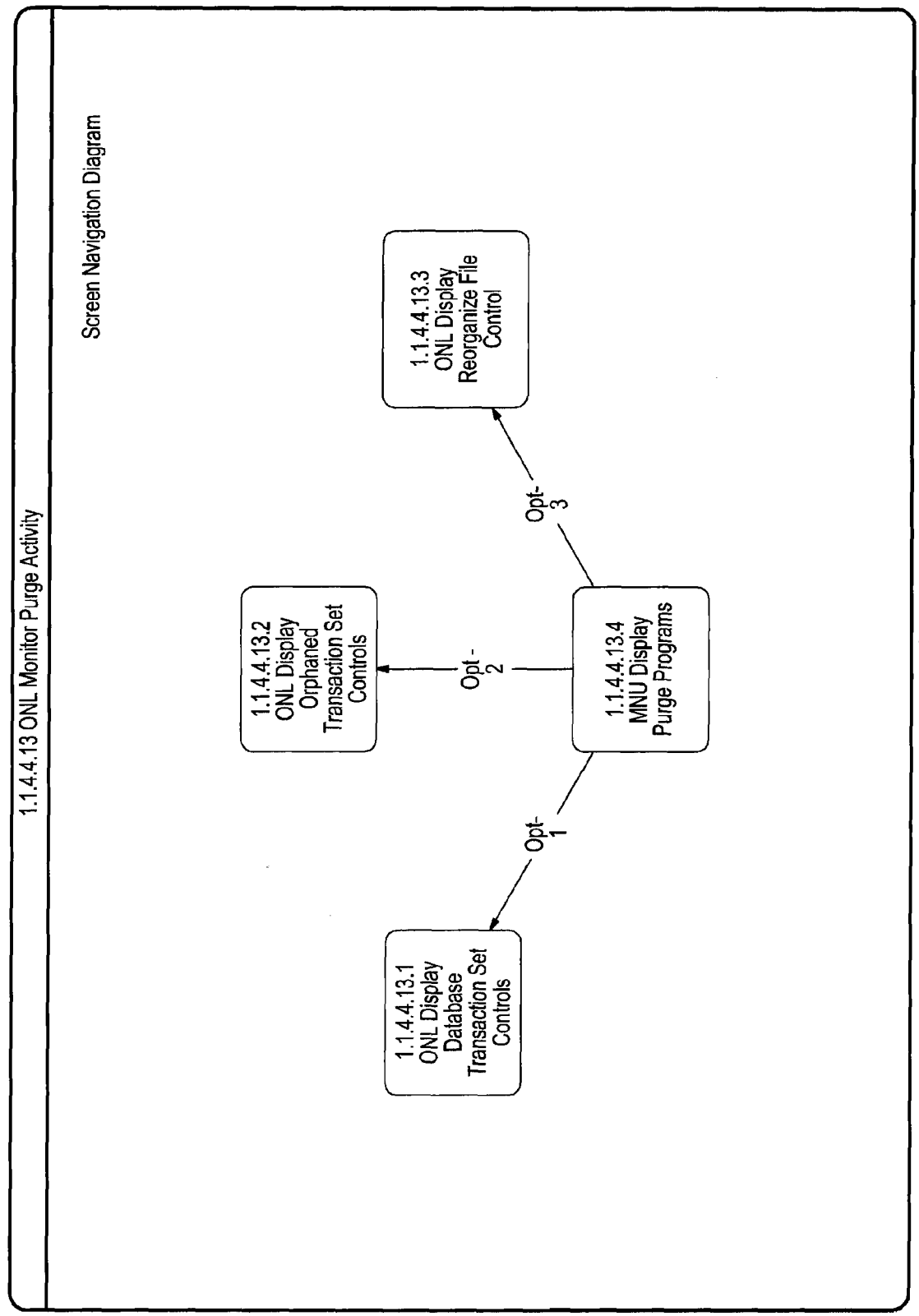
Figure 92:
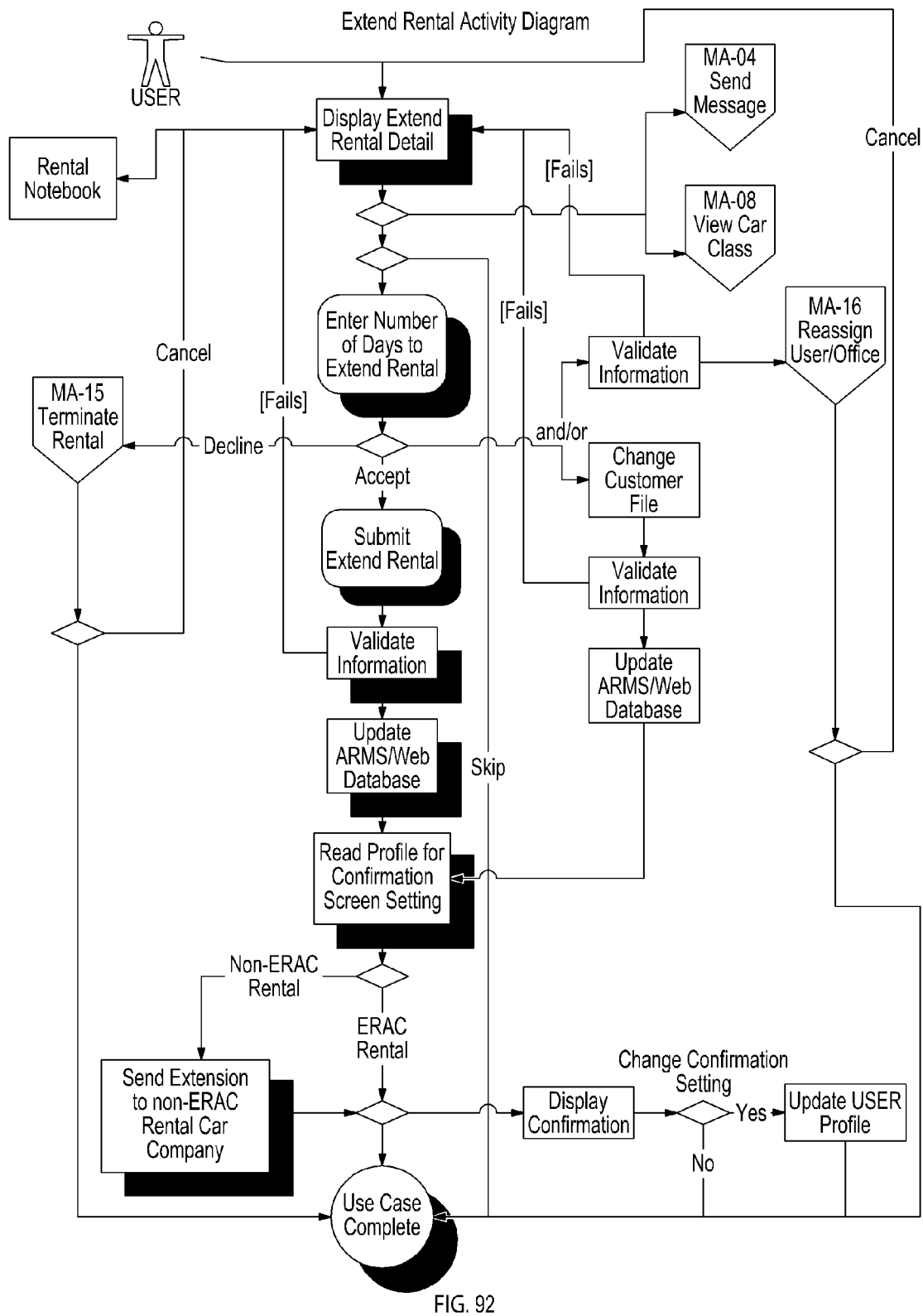
FIGS. 92-159 are a series of flow diagrams and screenshots for the ARMS/WEB application software resident on servers 70 as described in Exhibit E.
Figure 94:
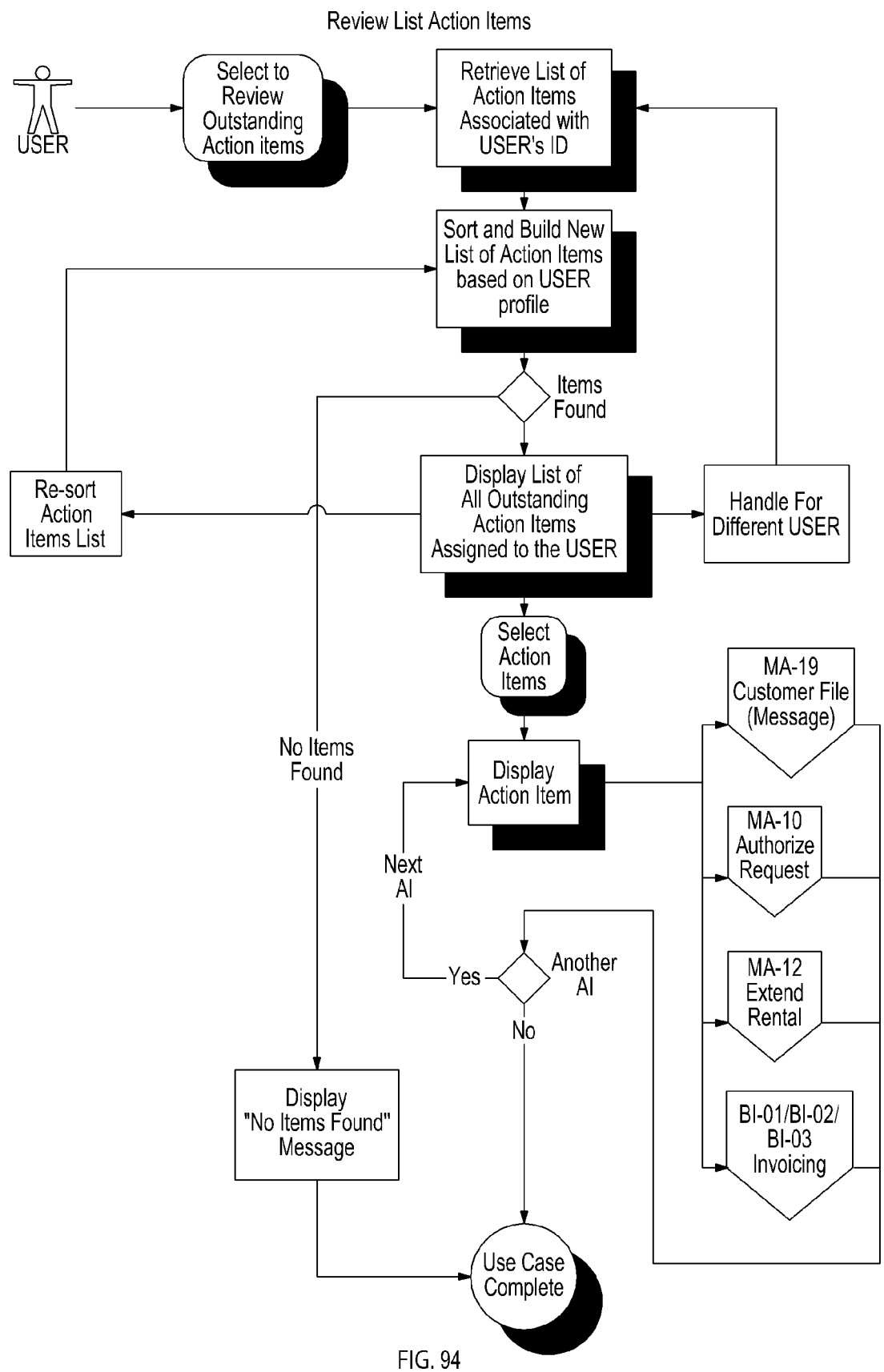
Figure 95B:
Figure 95C:
Figure 95D:
Figure 96:
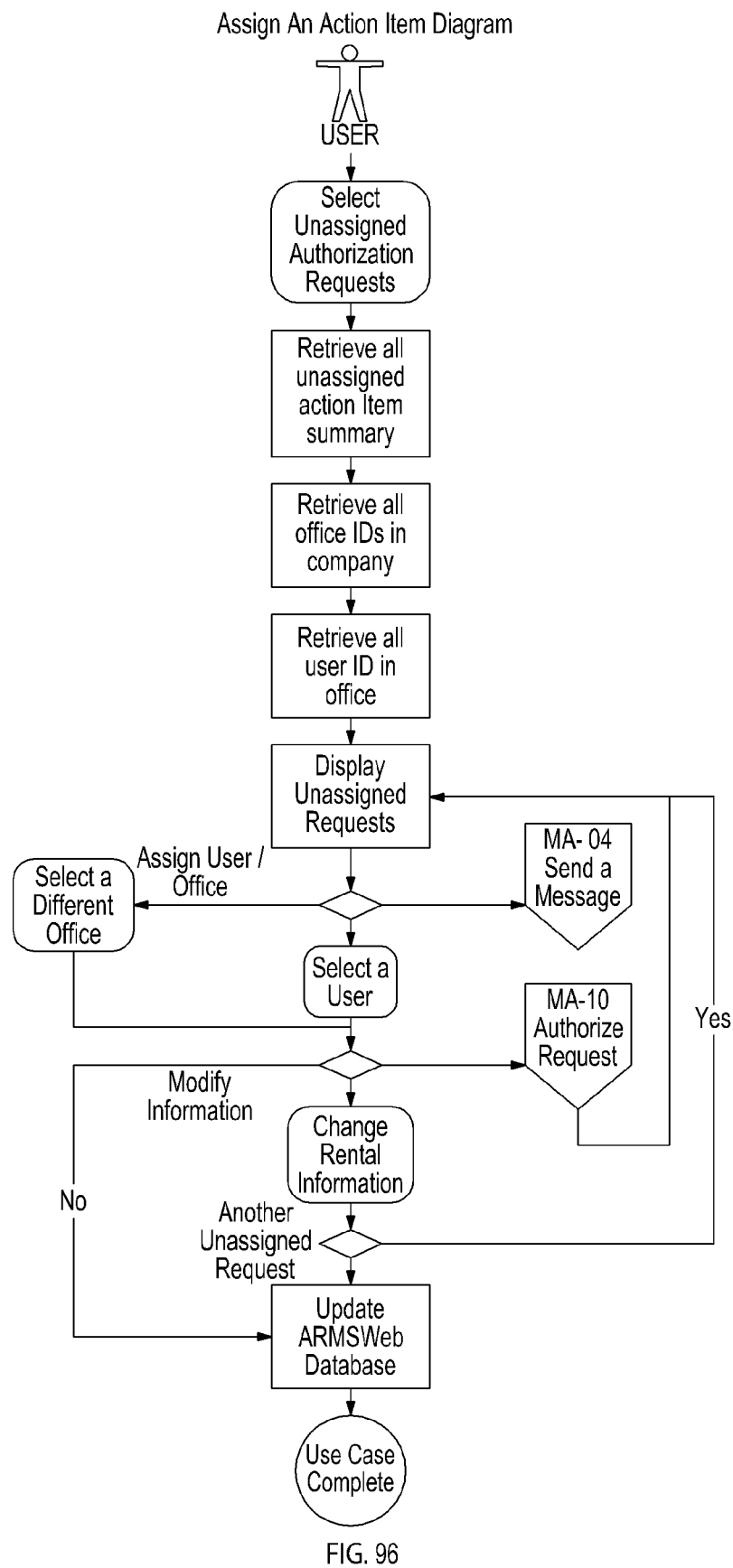
Figure 97B:
Figure 97C:
Figure 97E:
Figure 98:
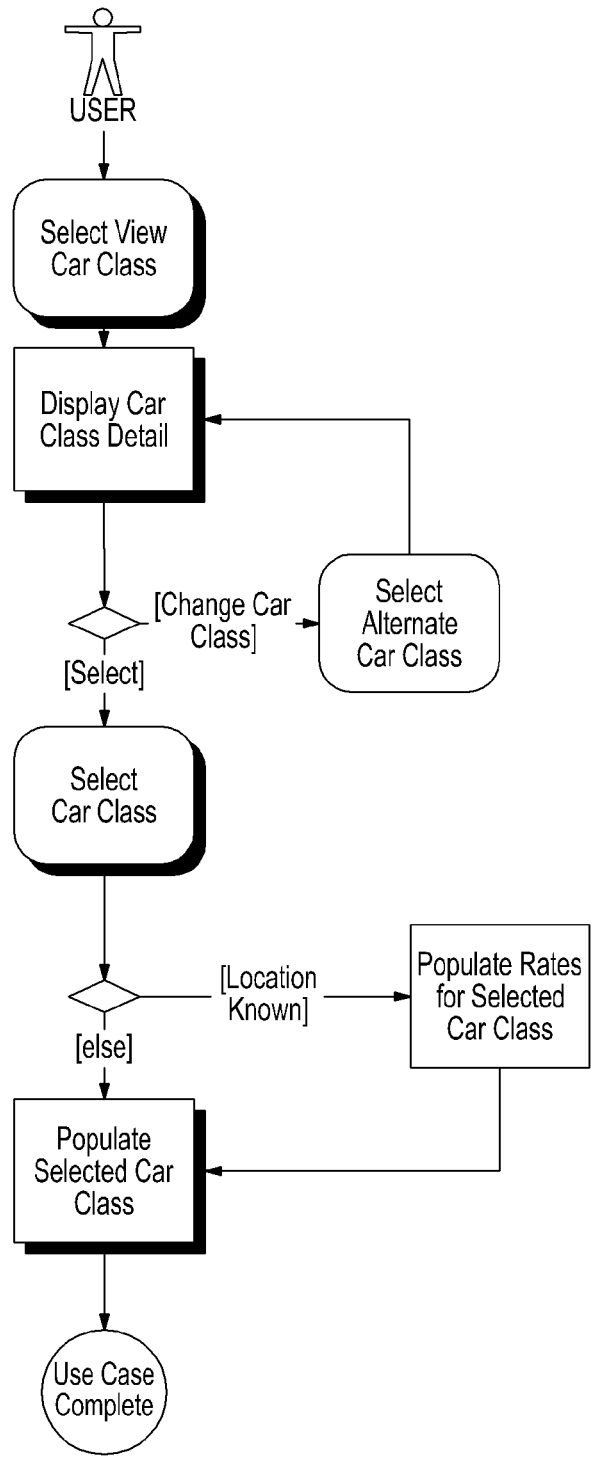
Figure 99A:
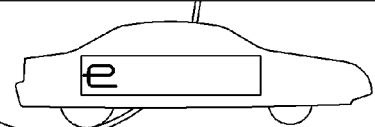
Figure 99B:
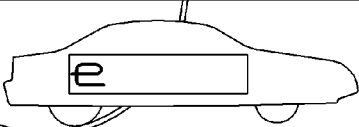
Figure 100:
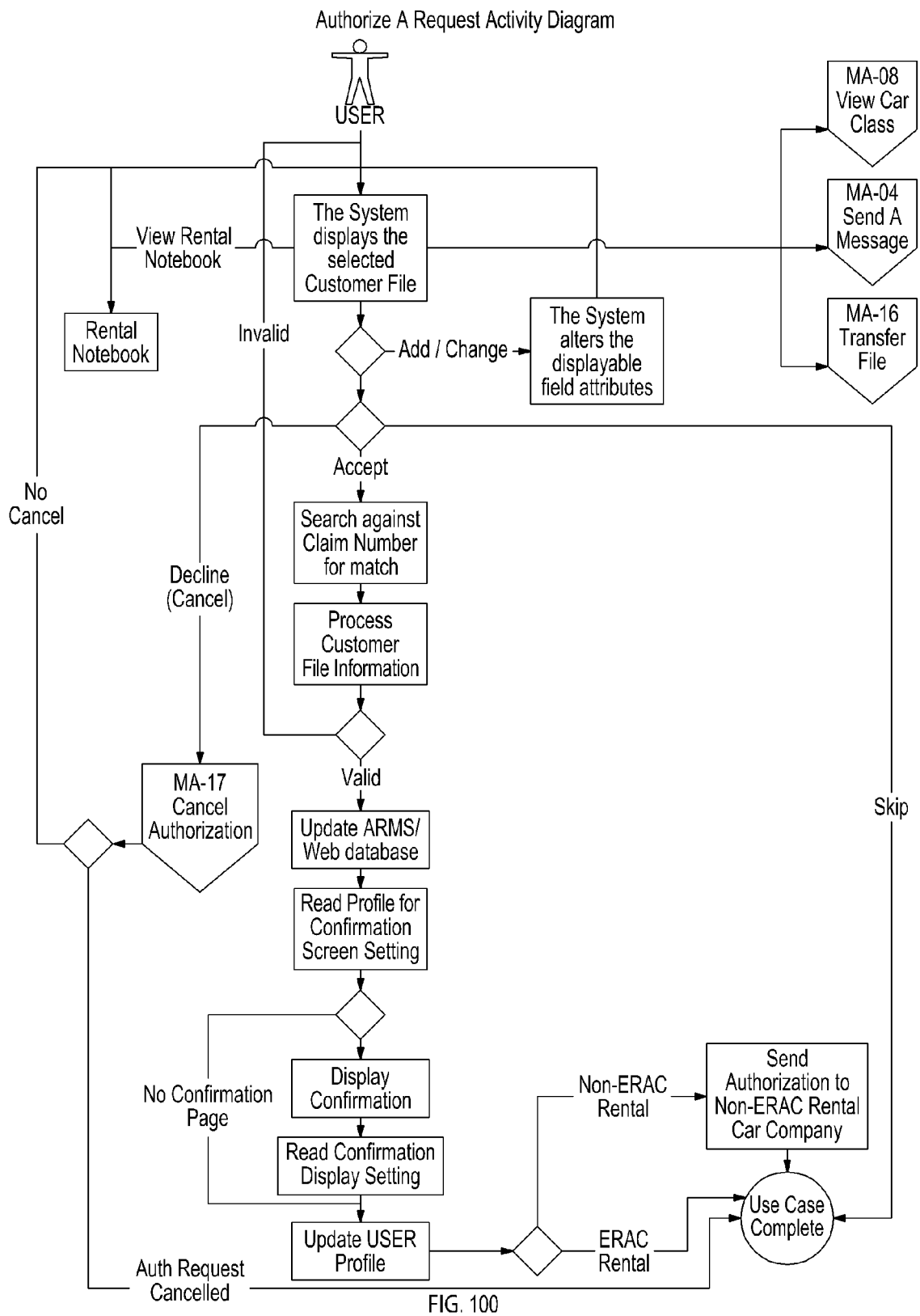
Figure 101D:
Figure 102:
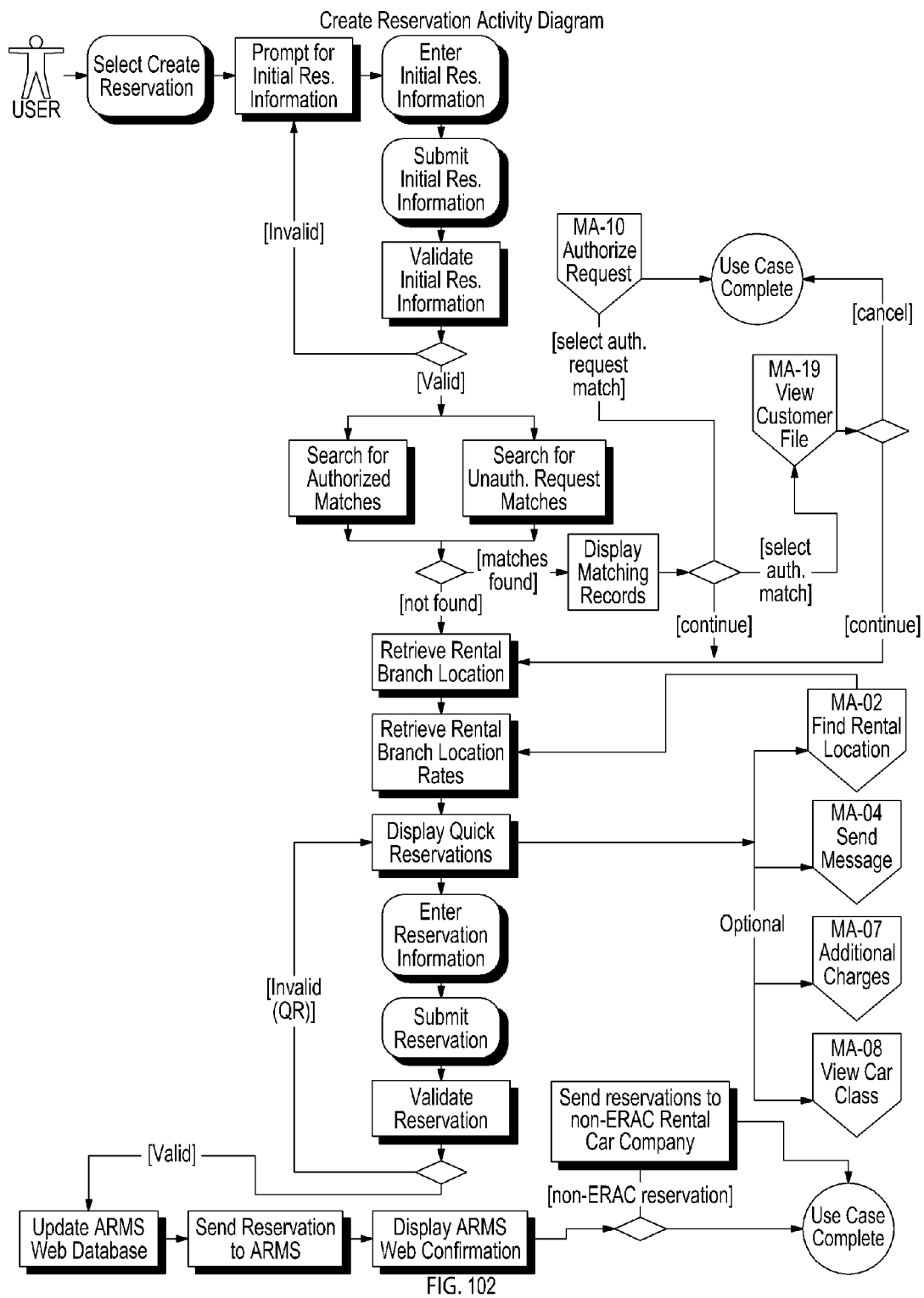
Figure 104B:
Figure 104C:
Figure 105A:
Figure 105B:
Figure 105D:
Figure 106B:
Figure 107:
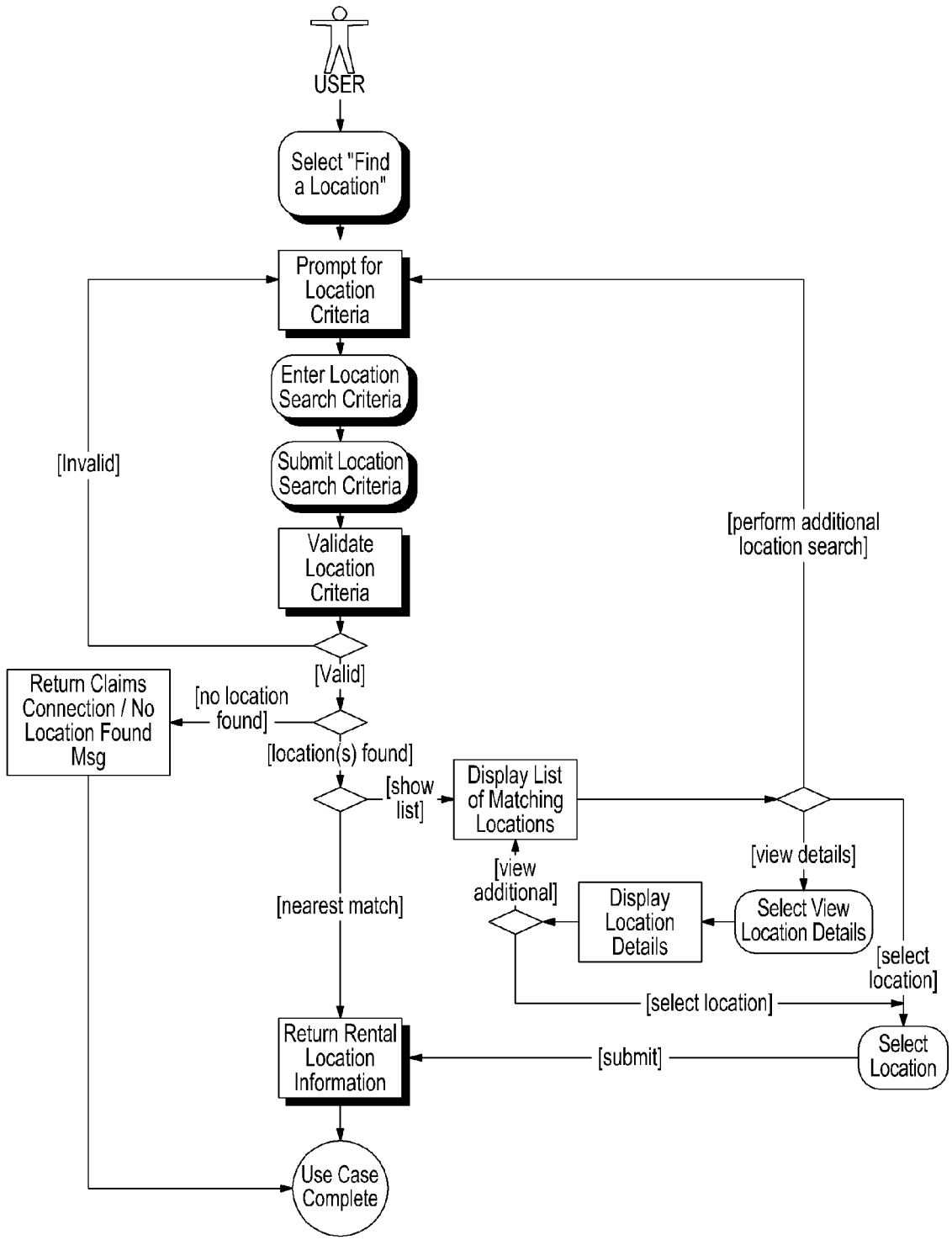
Figure 108A:
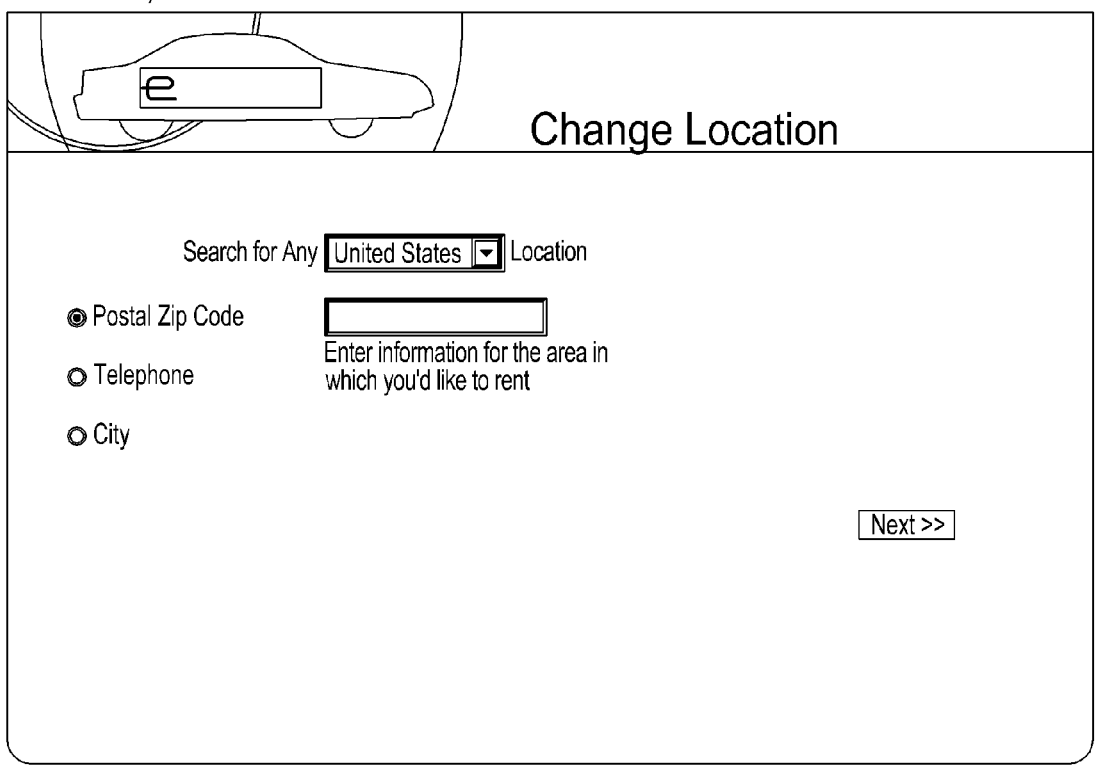
Figure 109A:
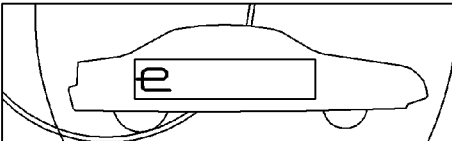
Figure 109B:
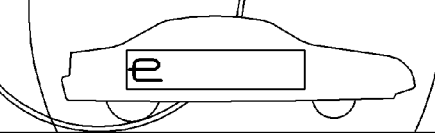
Figure 110A:
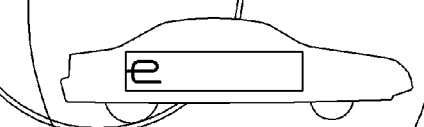
Figure 110B:
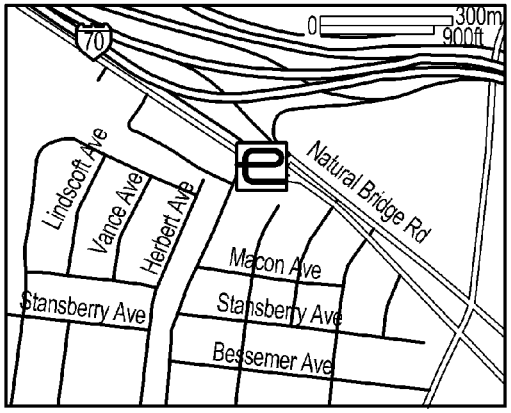
Figure 111:
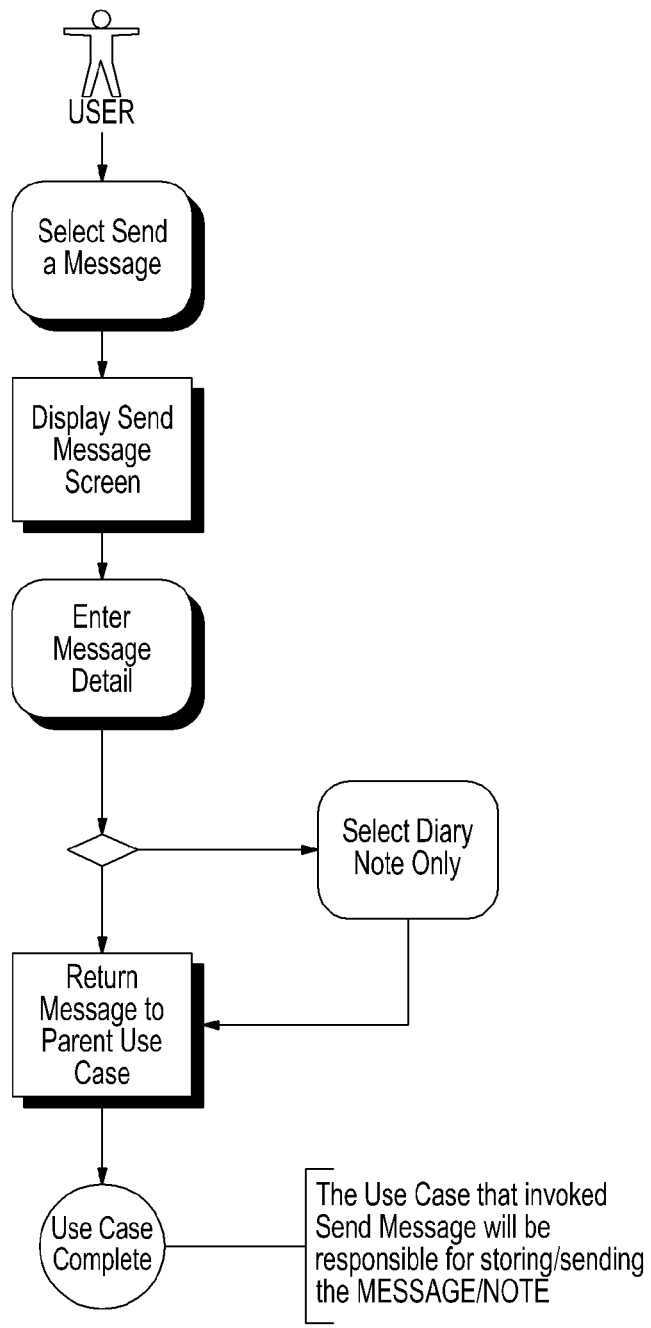
Figure 112:
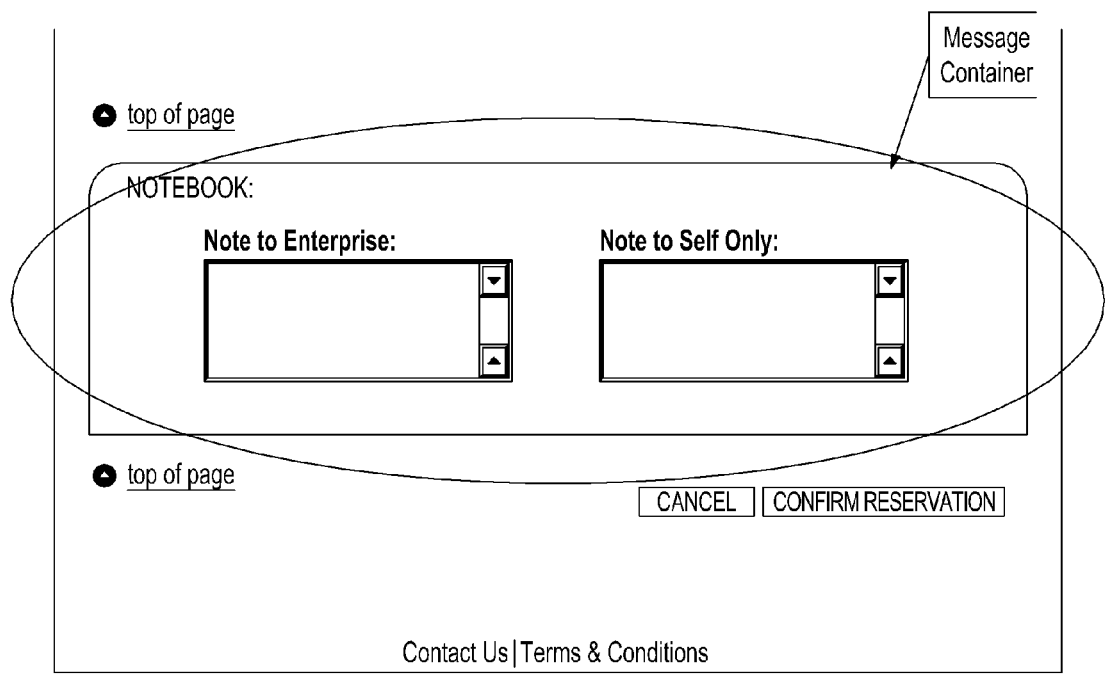
Figure 113:
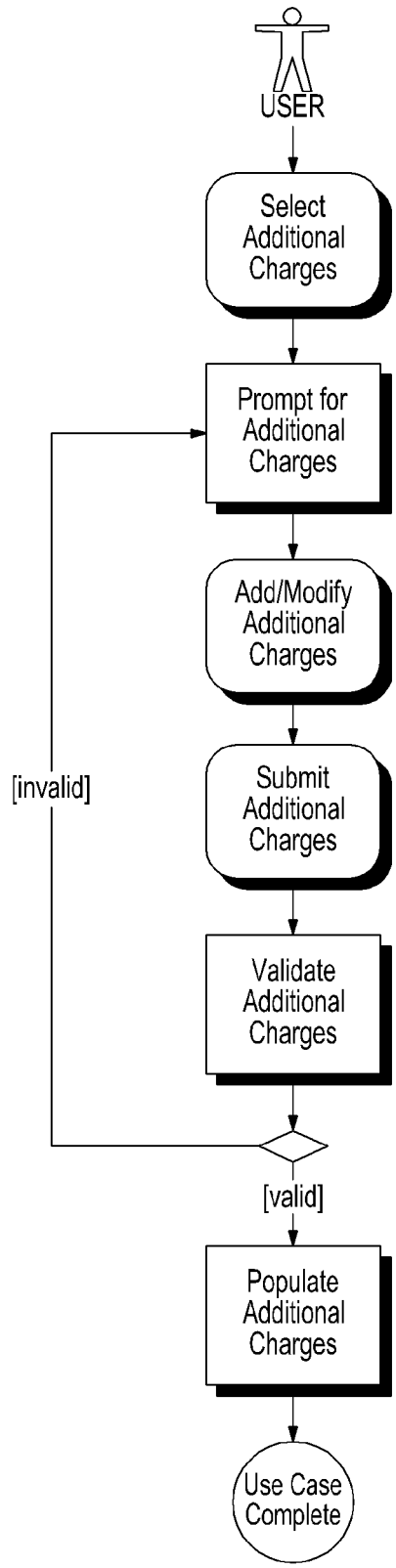
Figure 114:
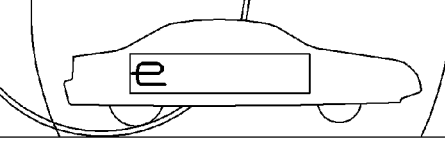
Figure 115:
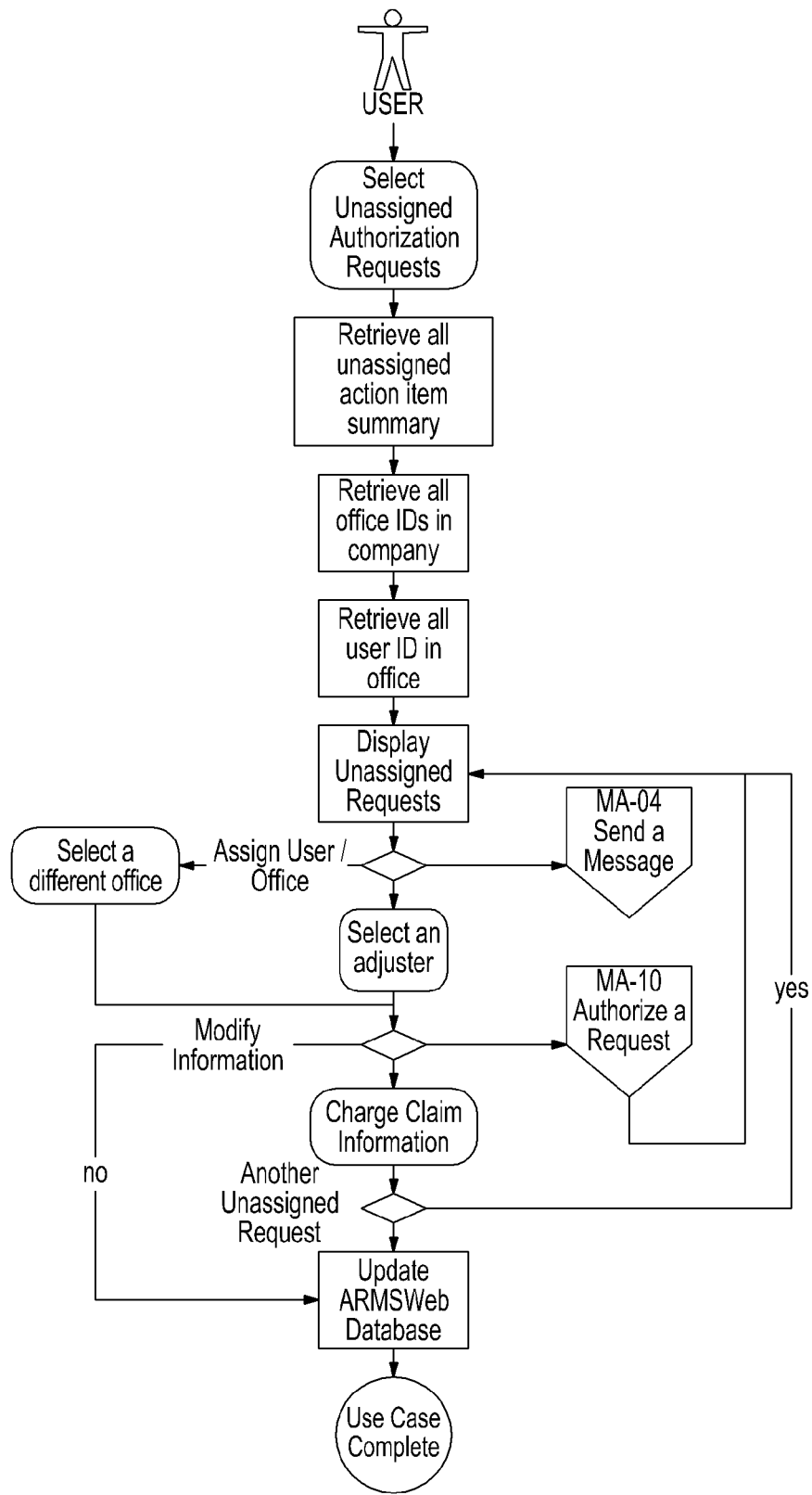
Figure 116:
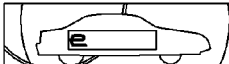
Figure 117:
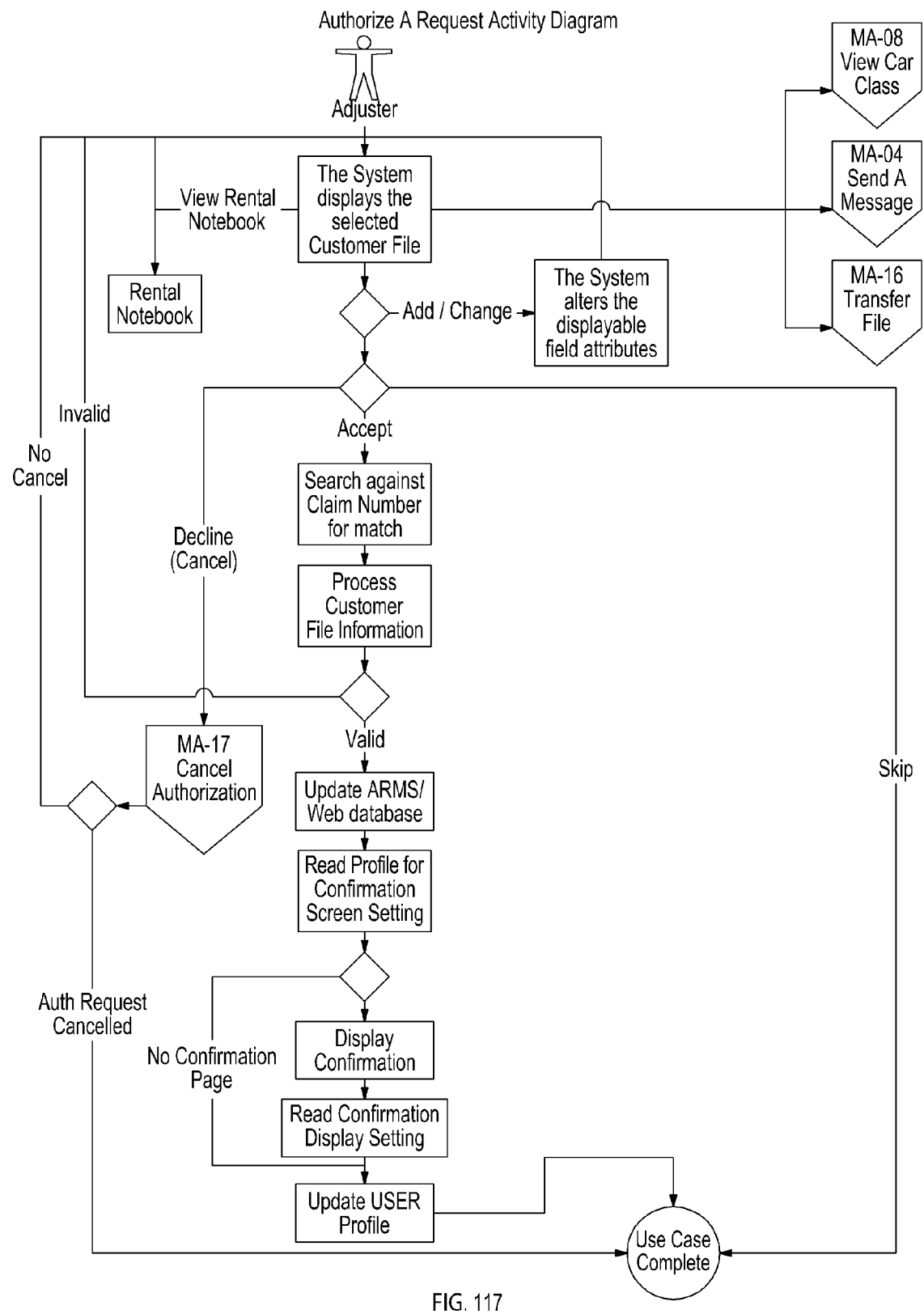
Figure 119:
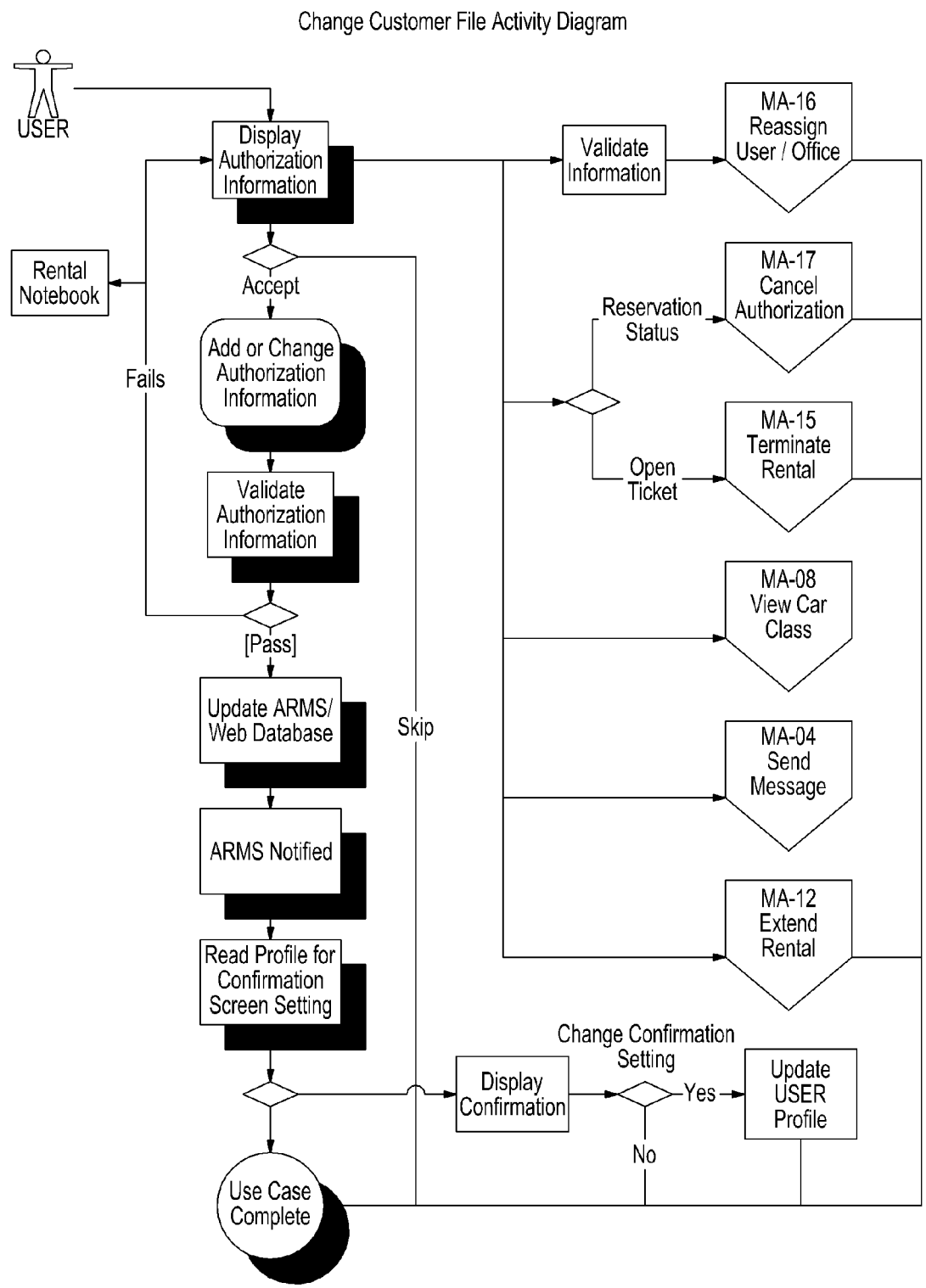
Figure 120A:
Figure 120B:
Figure 121:
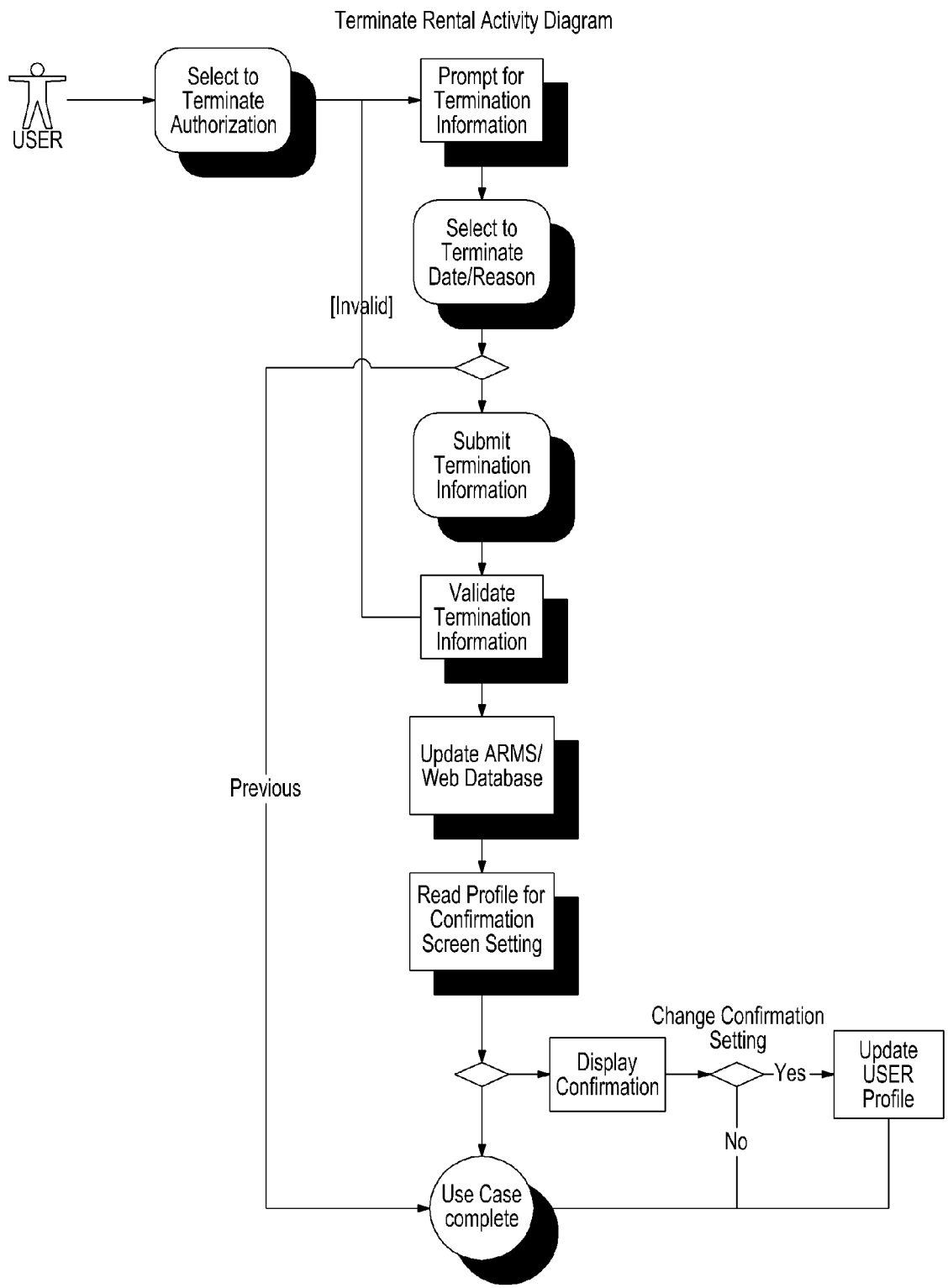
Figure 122:
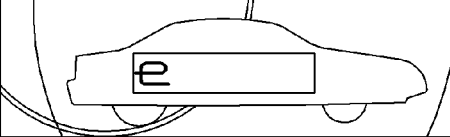
Figure 123:
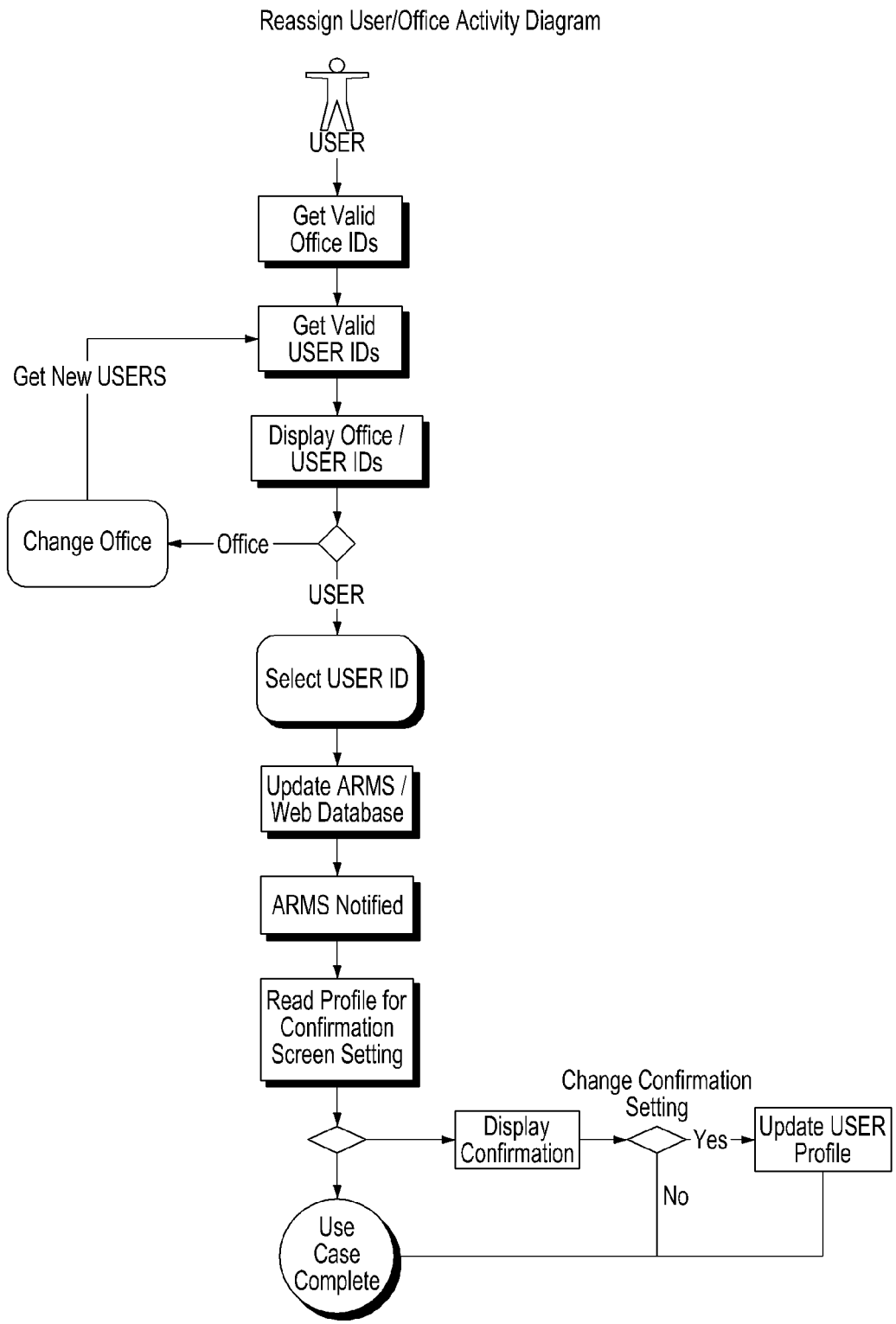
Figure 124:
Figure 125:
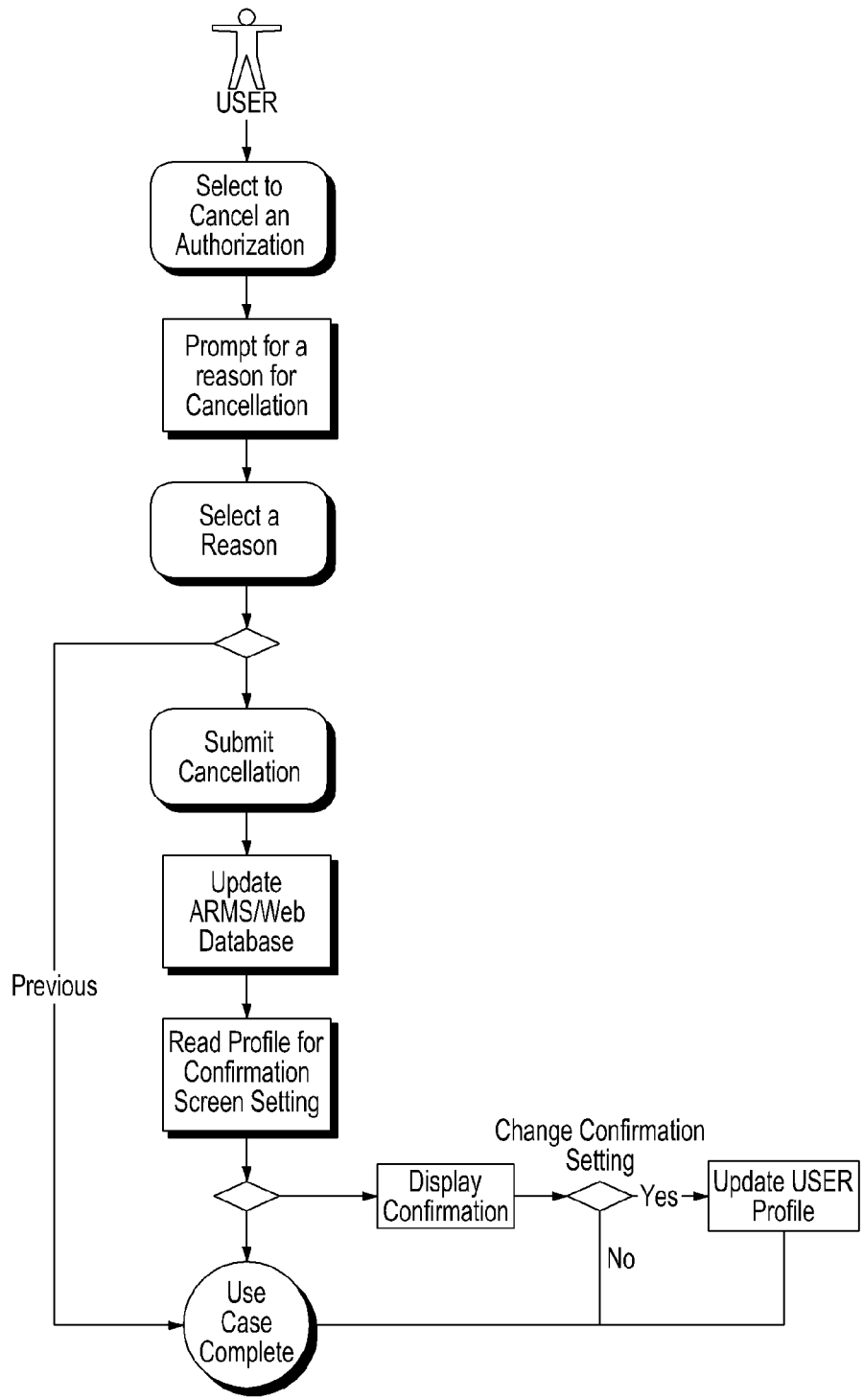
Figure 126:
Figure 127:
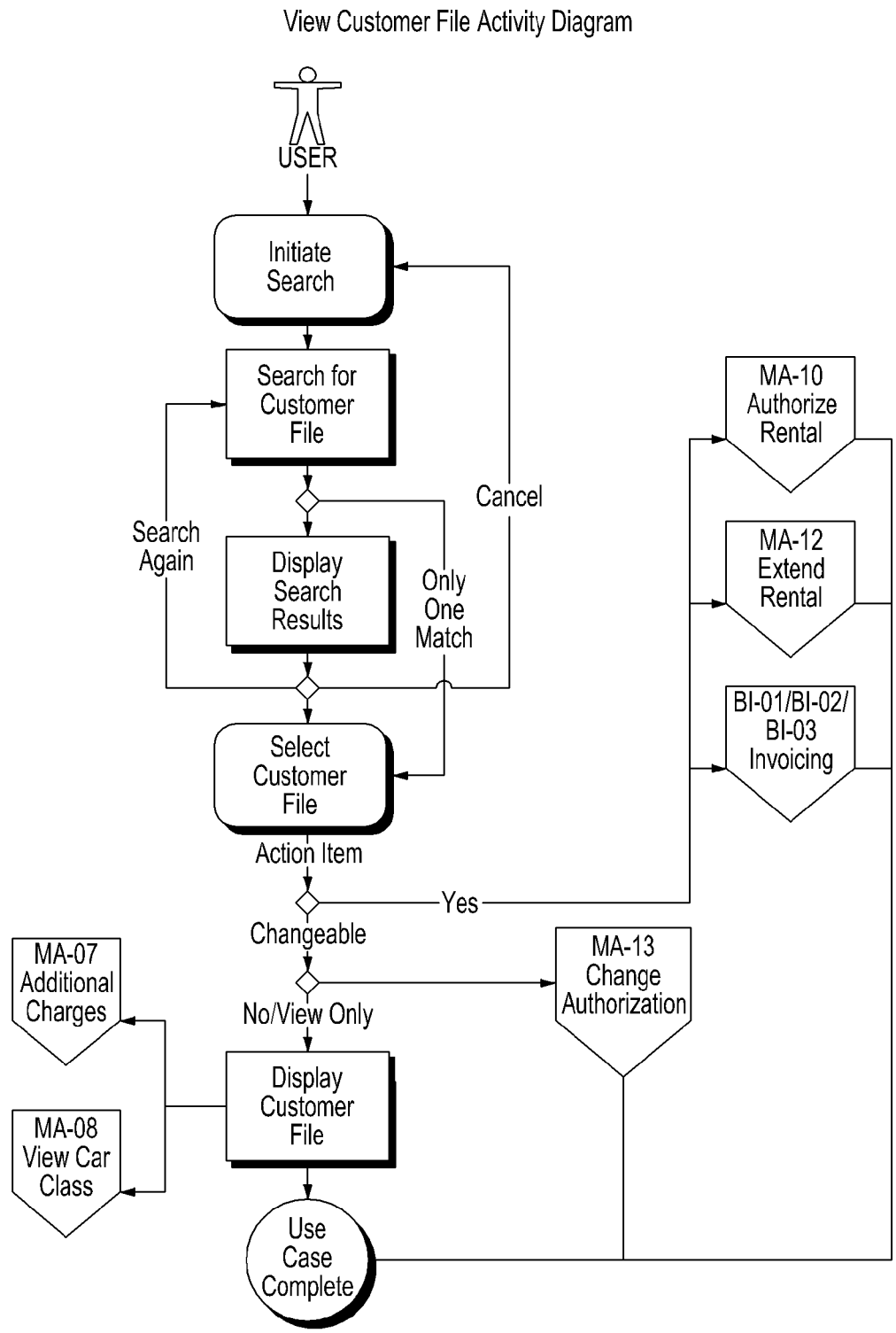
Figure 129A:
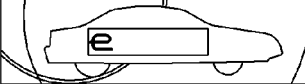
Figure 130:
Figure 131A:
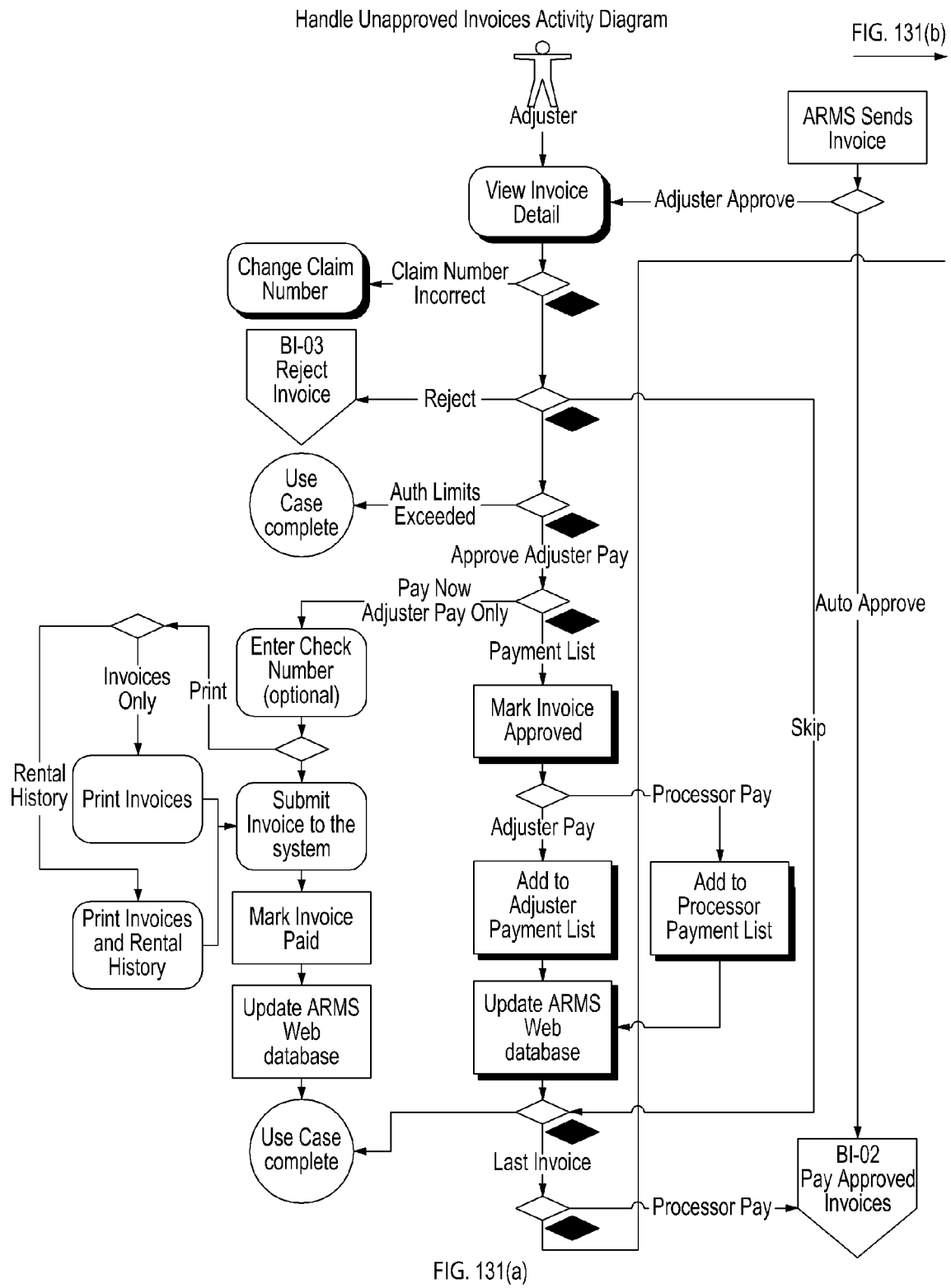
Figures 131A, 131B:
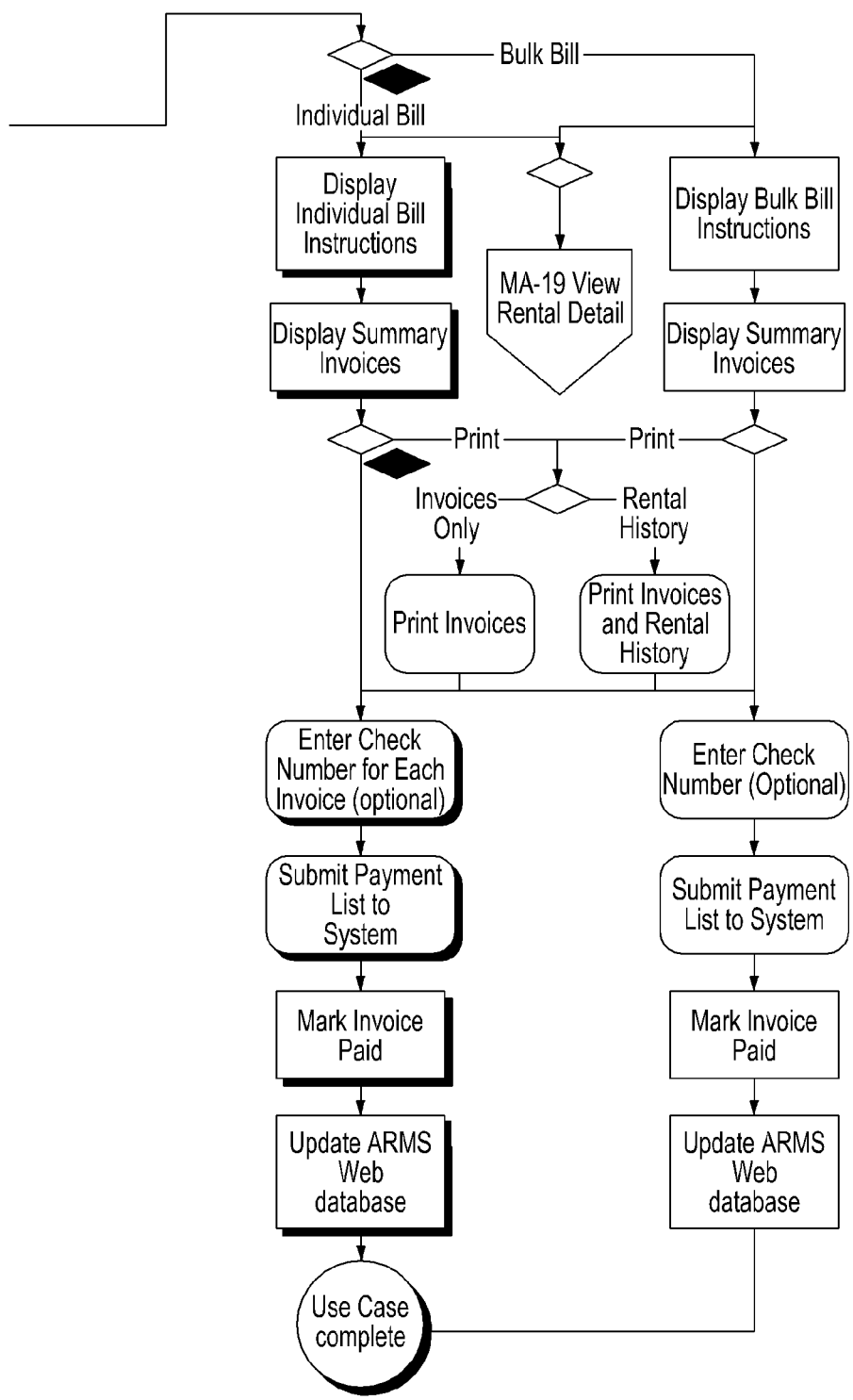
Figure 132:
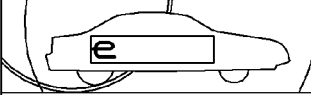
Figure 133:
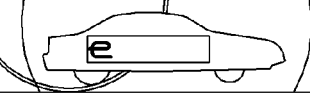
Figure 134:
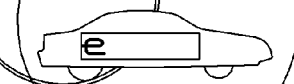
Figure 135:
Figure 136:
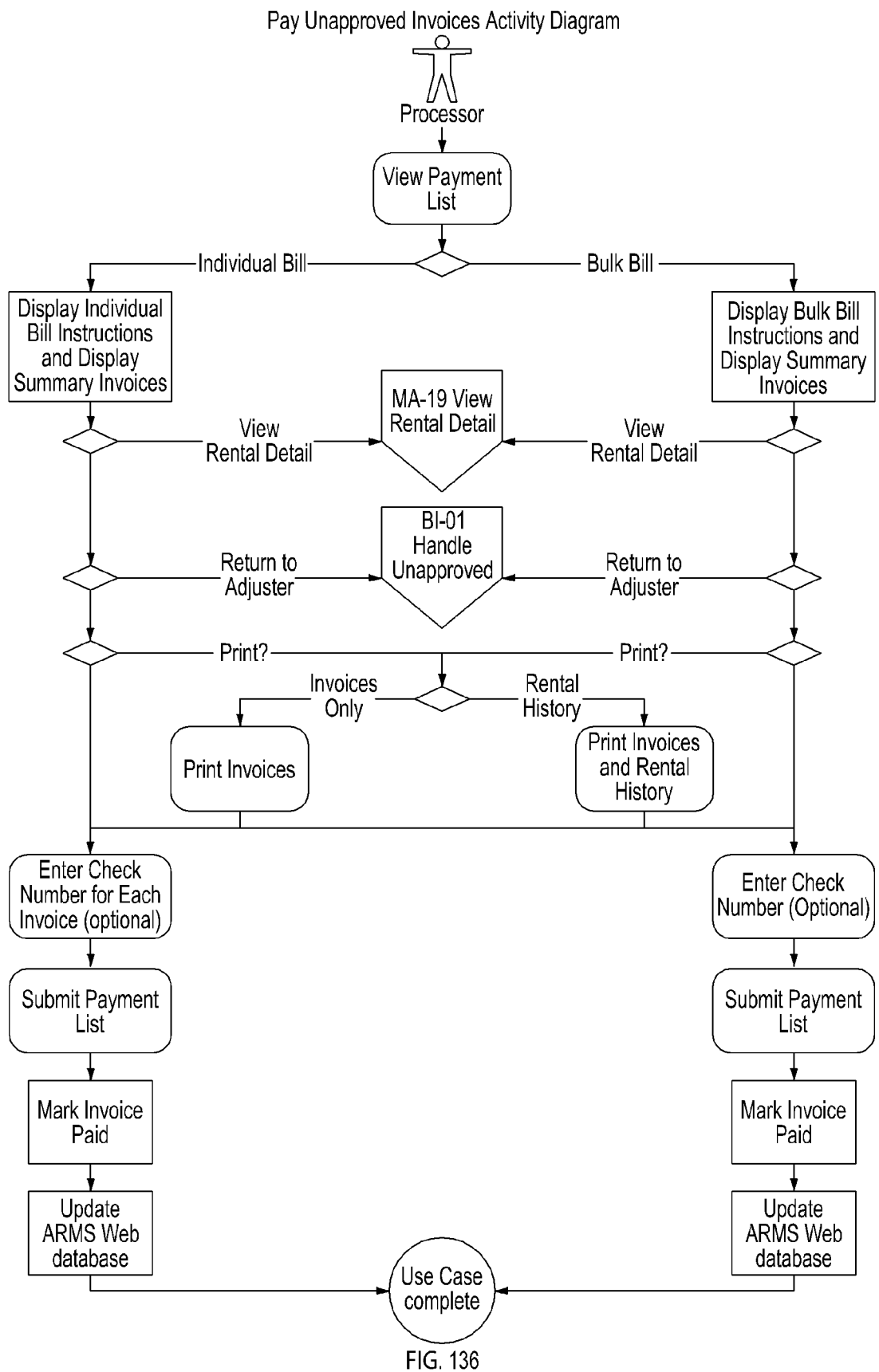
Figure 137:
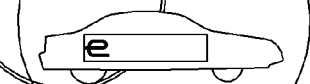
Figure 138:
Figure 139:
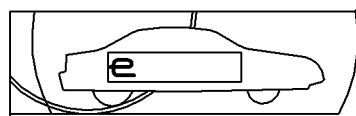
Figure 140:
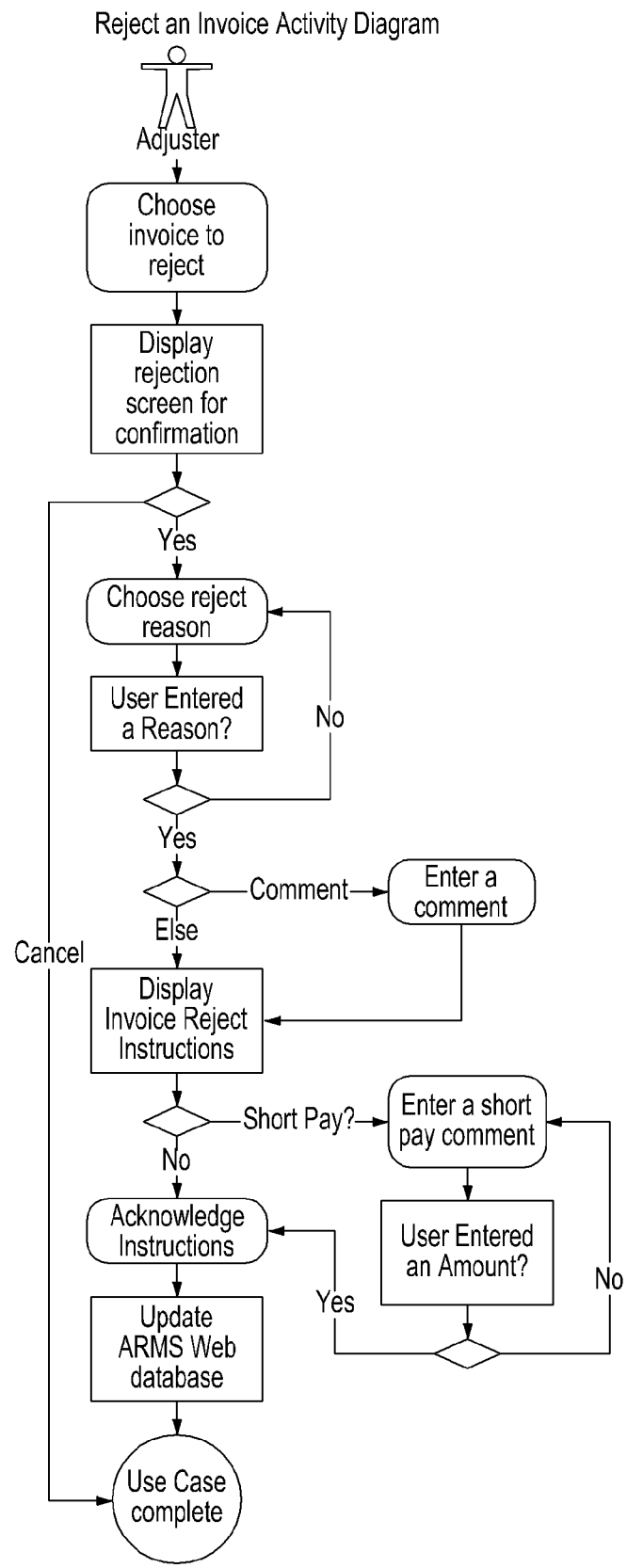
Figure 141:
Figure 142:
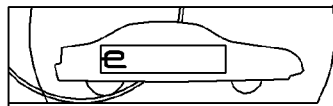
Figure 143:
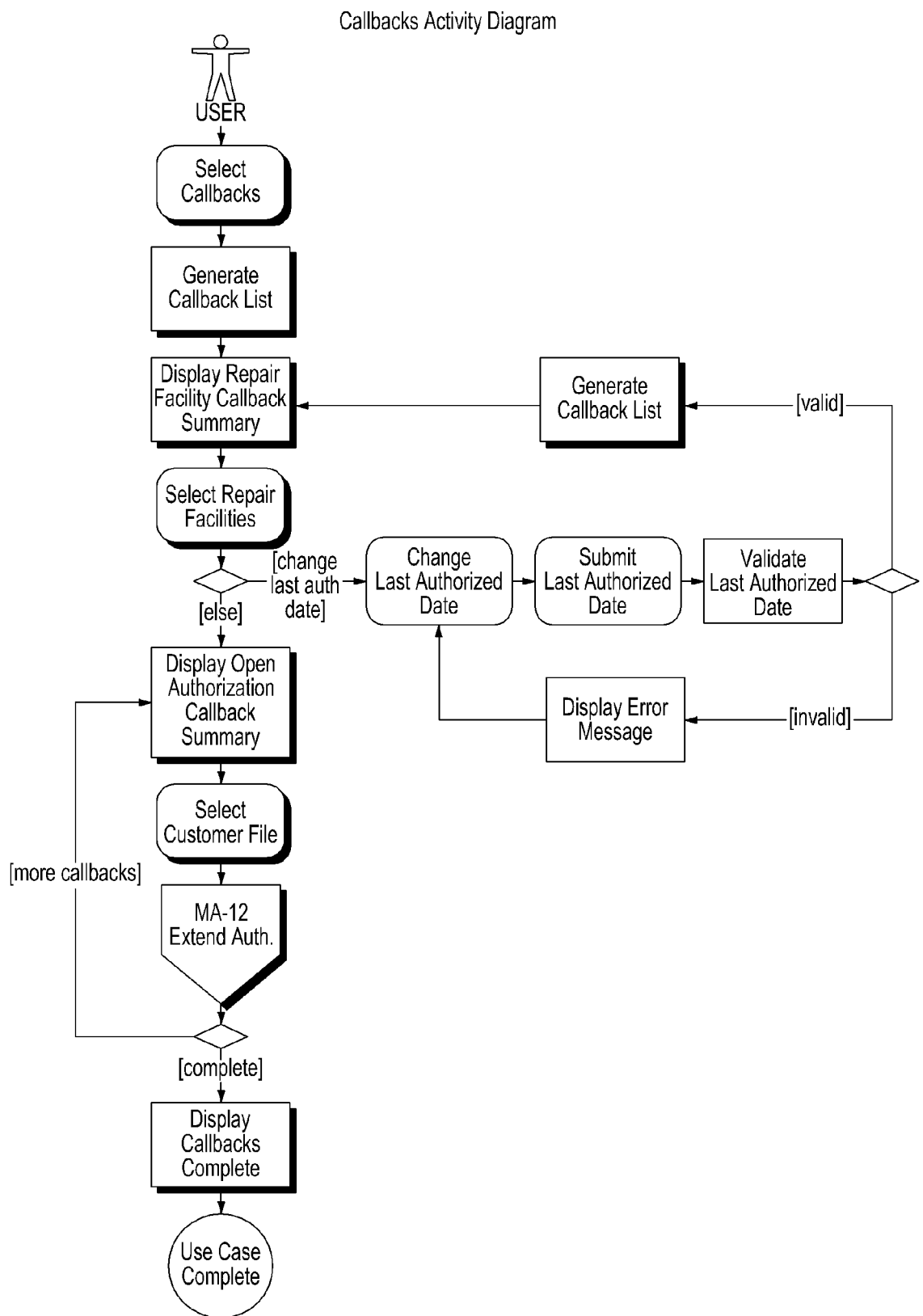
Figure 145:
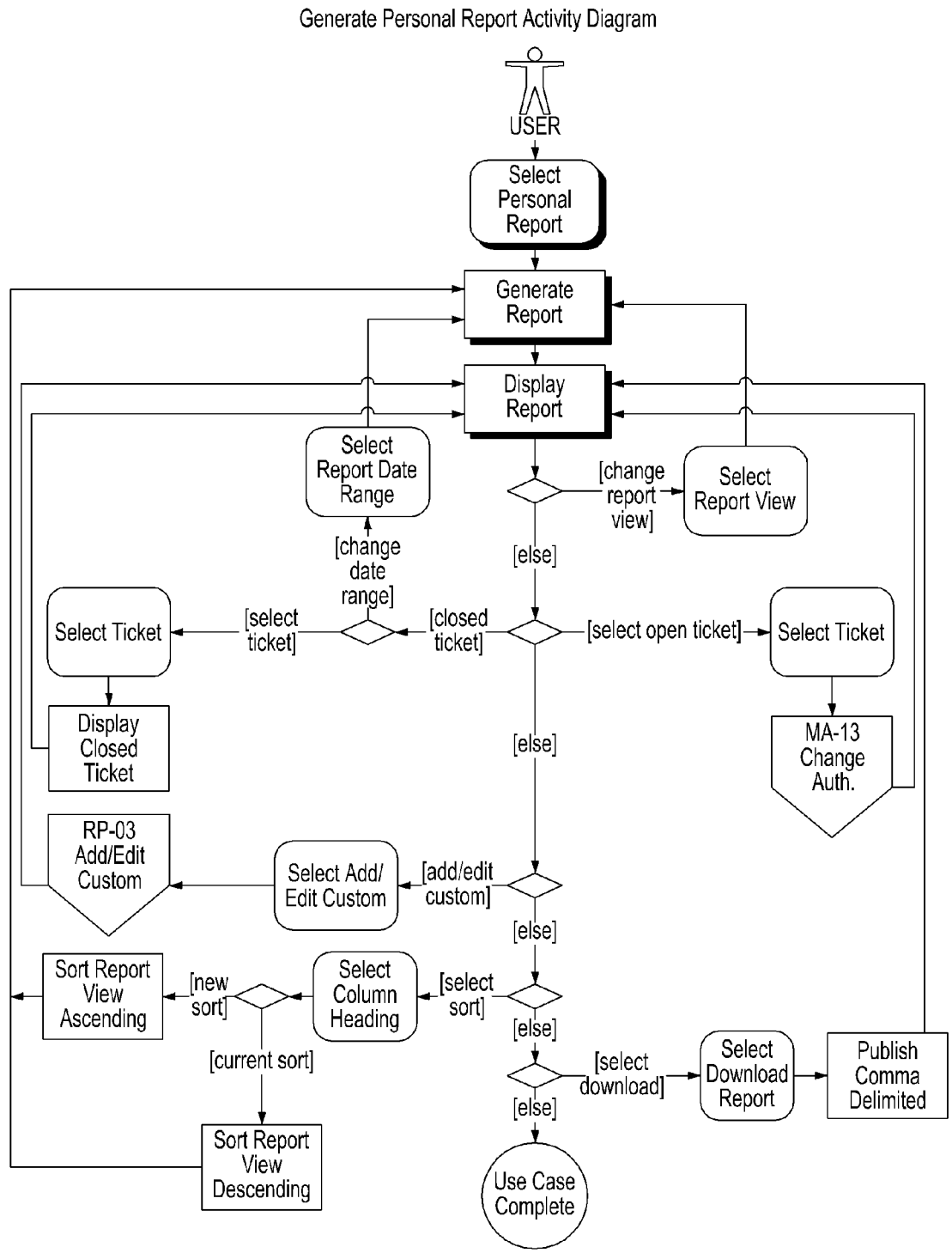
Figure 146:
Figure 147B:
Figure 147C:
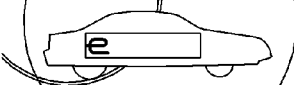
Figure 148:
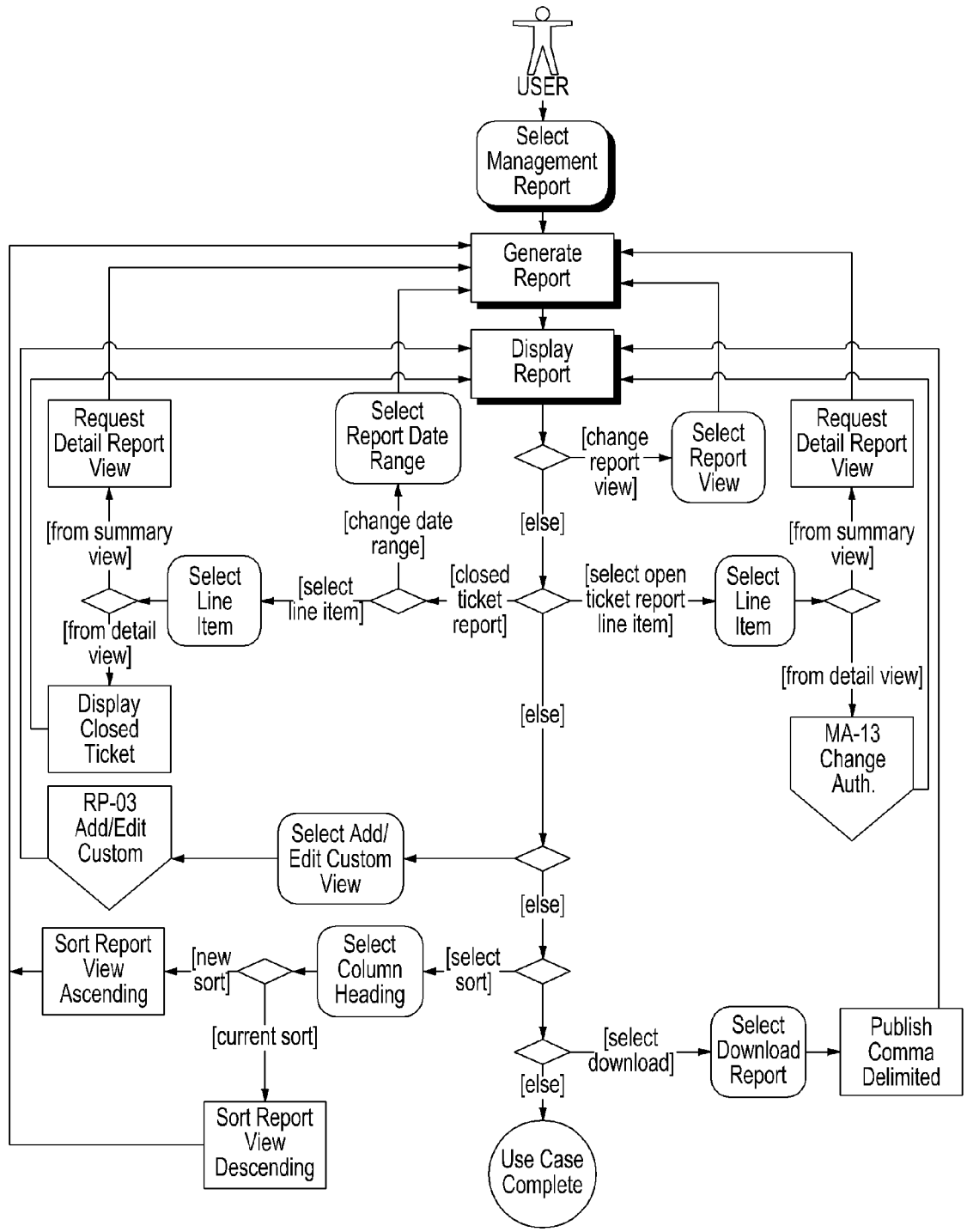
Figure 150:
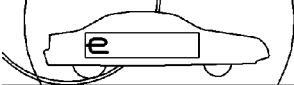
Figure 151:
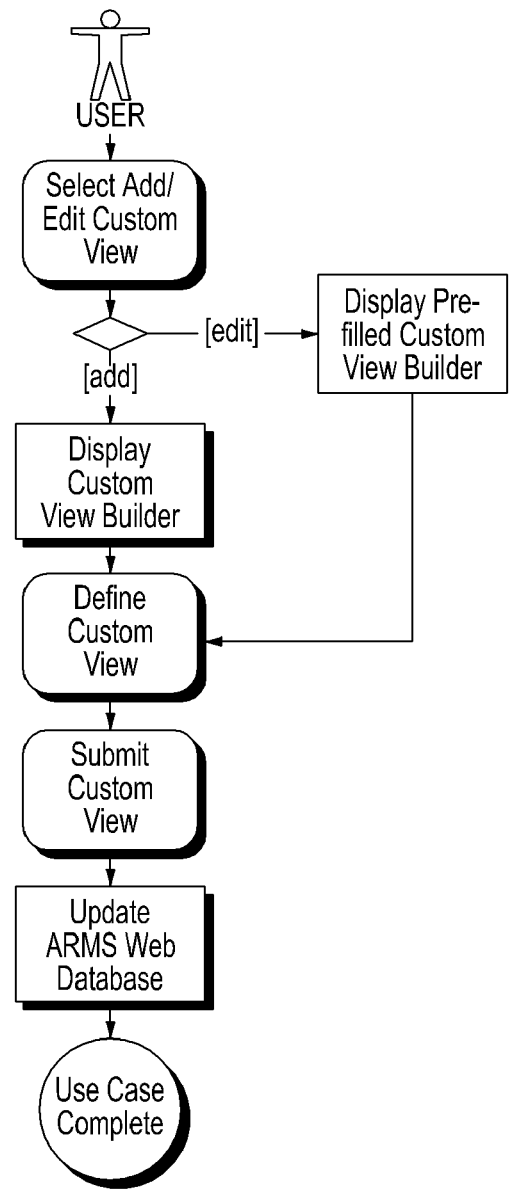
Figure 153:
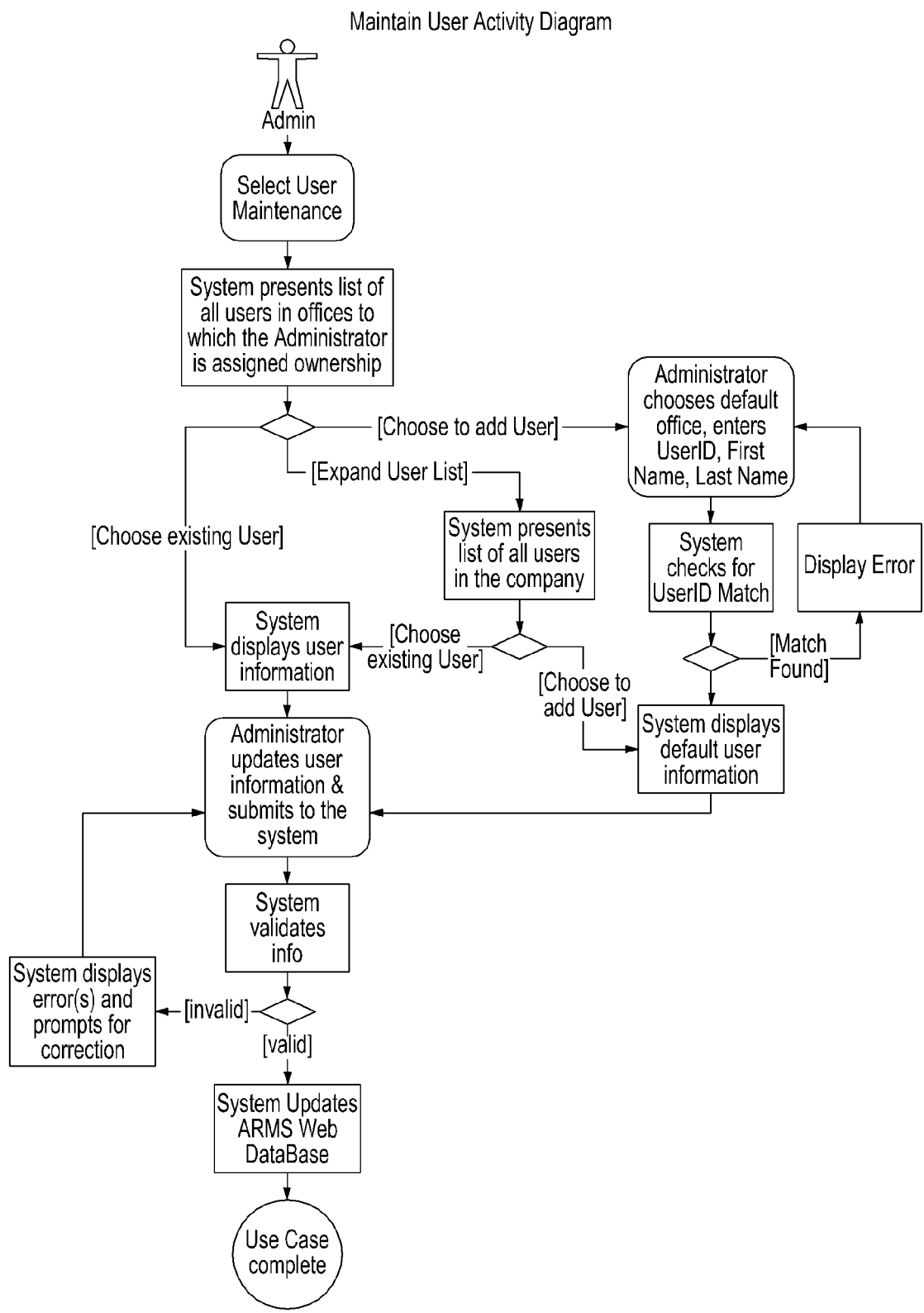
Figure 155:
Figure 158:
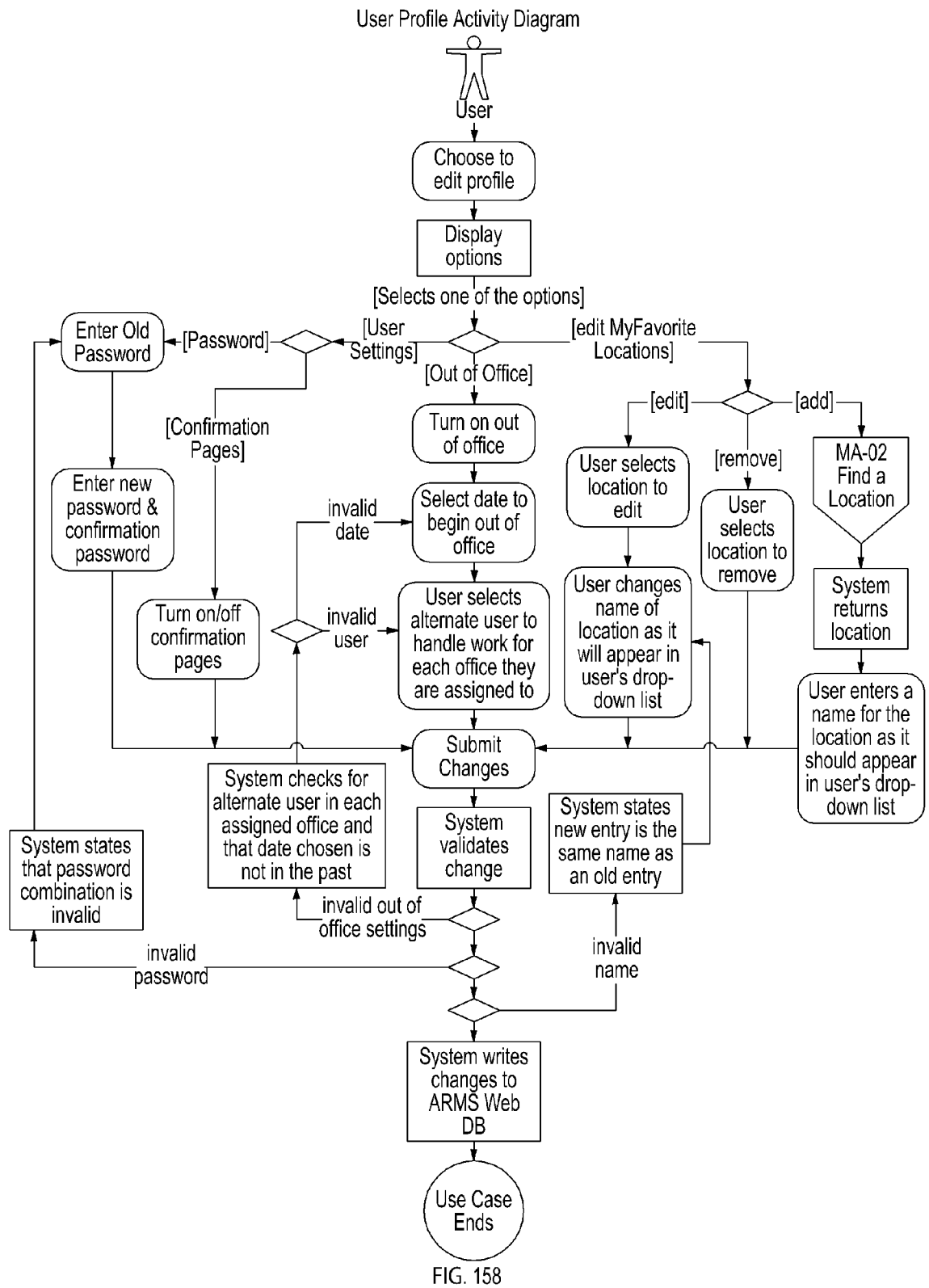
Figure 159:
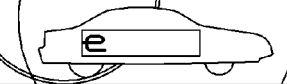

EXHIBIT B
   See FIGS. 4-91.

EXHIBIT C
   See the file "Exhibit C.txt" submitted on the incorporated compact disc.

EXHIBIT D
   See the file "Exhibit D.txt" submitted on the incorporated compact disc.

EXHIBIT E

What is claimed is:

1. An Internet-enabled rental vehicle reservation management system, the system comprising:
an Internet web portal in communication with the Internet, wherein the Internet web portal is configured for access by an authorized purchaser computer via the Internet to provide a user of the authorized purchaser computer with an ability to book a rental vehicle reservation with any of a plurality of competitive rental vehicle service providers, wherein the Internet web portal is further configured to provide a plurality of graphical user interface (GUI) menus to the authorized purchaser computer for display thereon, wherein at least one of the GUI menus is configured to accept a selection by the user as to which one of the plurality of competitive rental vehicle service providers that a rental vehicle reservation is to be booked with, and wherein the Internet web portal is further configured to transmit the rental vehicle reservation to the selected one of the competitive rental vehicle service providers;

a computer network operated by one of the competitive rental vehicle service providers, the computer network being in communication with the Internet web portal, the computer network comprising a mainframe that is configured to execute a rental vehicle software program;

wherein at least one of the GUI menus is configured to interface a user of the authorized purchaser computer with the rental vehicle software program; and wherein the rental vehicle software program is configured to (1) automatically book, in response to input from the user, a rental vehicle reservation with the competitive rental vehicle service provider that operates the computer network without human intervention on the part of personnel of the competitive rental vehicle service provider that operates the computer network and (2) manage the booked rental vehicle reservation in response to input from the user.

2. The system of claim 1 wherein the mainframe comprises a first mainframe, and wherein the computer network further comprises:

a second mainframe in communication with the first mainframe;

a database in which rental vehicle reservation data is stored, wherein the database is in communication with the second mainframe; and a plurality of branch office computers of the competitive rental vehicle service provider that operates the computer network, wherein the plurality of branch office computers are in communication with the second mainframe; and wherein the second mainframe is configured to execute a software program for access by the branch office computers to fulfill rental vehicle reservations that are stored within the database and that were booked and managed by the rental vehicle software program in response to input from the user.

3. The system of claim 2 wherein the Internet web portal is further configured to transmit a rental vehicle reservation to a different one of the selected competitive rental vehicle service providers via email over the Internet.

4. The system of claim 2 wherein the Internet web portal is further configured to transmit a rental vehicle reservation to a different one of the selected competitive rental vehicle service providers via phone.

5. The system of claim 2 wherein the Internet web portal is further configured to transmit a rental vehicle reservation to a different one of the selected competitive rental vehicle service providers via facsimile.

6. The system of claim 2 further comprising a second one of the computer networks, wherein the second one of the computer networks is operated by a different one of the competitive rental vehicle service providers.

7. The system of claim 2 wherein the Internet web portal is configured for access by a plurality of authorized purchaser computers, and wherein the Internet web portal is further configured to customize the GUI menus on a per authorized purchaser computer user basis.

8. The system of claim 2 wherein the Internet web portal is configured to provide a user of the authorized purchaser computer with a single set of GUI menus for booking a rental vehicle reservation with all of the competitive rental vehicle service providers.

9. The system of claim 8 wherein the Internet web portal is further configured to accommodate a plurality of varying data requirements for rental vehicle reservations with the competitive rental vehicle service providers.

10. The system of claim 2 wherein the rental vehicle software program is further configured to support a plurality of management functions by the user for a rental vehicle reservation, the management functions comprising a rental vehicle reservation extension by the user, an authorization by the user of a request for a rental vehicle reservation extension requested by someone other than the user, an authorization by the user for a rental vehicle reservation booked by someone other than the user, and a change in rental vehicle reservation authorization by the user.

11. The system of claim 10 wherein the Internet web portal is configured for access by a plurality of authorized purchaser computers belonging to a common business organization, and wherein the Internet web portal is further configured to provide a GUI menu for display on the authorized purchaser computers that presents each user with an action item list that identifies a plurality of management function actions for rental vehicle reservations that have been assigned to the user, and wherein the Internet web portal is further configured to create a plurality of workgroups of users, wherein each workgroup shares a workload of management function actions.

12. The system of claim 2 wherein the Internet web portal is configured for access by a plurality of authorized purchaser computers, and wherein the Internet web portal is further configured to assign each user of the authorized purchaser computers with an authorization limit that limits an extent of functionality available to each user when managing a rental vehicle reservation through the rental vehicle software program.

13. The system of claim 12 wherein the authorization limit includes a financial commitment dollar limit that a user can make on rental vehicle reservations over a specified time period.

14. The system of claim 2 further comprising a layer of computer architecture that interconnects the Internet web portal with the Internet, the computer architecture layer comprising a plurality of networked servers and a firewall, wherein the firewall connects the Internet web portal with the plurality of networked servers, and wherein the plurality of networked servers are configured to provide order to data communications to and from the Internet.

15. The system of claim 14 wherein the firewall comprises a first firewall, and wherein the first architecture layer comprises a second firewall that connects the plurality of networked servers to the Internet.

16. The system of claim 15 wherein the Internet web portal comprises a plurality of networked web servers within a second computer architecture layer.

17. The system of claim 1 further comprising a second one of the computer networks, wherein the second one of the computer networks is operated by a different one of the competitive rental vehicle service providers.

18. A method for creating and managing a plurality of rental vehicle reservations, the method comprising:

providing an Internet web portal in communication with an authorized purchaser computer via the Internet;

providing a user of the authorized purchaser computer with an option through the Internet web portal to select a rental vehicle service provider with which to book a rental vehicle reservation from among a plurality of competitive rental vehicle service providers, wherein at least one of the competitive rental vehicle service providers maintains a computer network in communication with the Internet web portal, wherein the computer network comprises a rental vehicle software program;

in response to a selection by the user of a competitive rental vehicle service provider that maintains the computer network, (1) interfacing the user with the rental vehicle software program via a plurality of graphical user interface (GUI) menus that are displayed on the authorized purchaser computer, (2) receiving input at the Internet web portal from the user through the GUI menus, (3) in response to the received input, providing a series of commands to the rental vehicle software program, and (4) executing the rental vehicle software program in response to the series of commands to thereby (a) automatically book a rental vehicle reservation with the competitive rental vehicle service provider that maintains the computer network without human intervention on the part of personnel of the competitive rental vehicle service provider that maintains the computer network and (b) manage the booked rental vehicle reservation; and in response to a selection by the user of a different competitive rental vehicle service provider, transmitting a rental vehicle reservation from the user to the selected different competitive rental vehicle service provider through the Internet web portal.

19. The method of claim 18 wherein the rental vehicle reservation comprises a replacement rental vehicle reservation.

20. The method of claim 19 wherein the authorized purchaser comprises business organization that books and manages replacement rental vehicle reservations on behalf of a plurality of third party renters.

21. The method of claim 20 wherein the business organization comprises an insurance company.

22. The method of claim 21 wherein the user comprises an insurance adjuster.

23. The method of claim 21 wherein the computer network further comprises a first mainframe that executes the rental vehicle reservation software program, a second mainframe in communication with the first mainframe, and a plurality of branch office computers within a plurality of branch offices of the competitive rental vehicle service provider that maintains the computer network, wherein the plurality of branch office computers are in communication with the second mainframe; the method further comprising:

executing software resident on the second mainframe to (1) retrieve a rental vehicle reservation booked and managed through the rental vehicle software program and (2) process the retrieved rental vehicle reservation for fulfillment at one of the branch offices when the third party picks up a rental vehicle in accordance with the rental vehicle reservation.

24. The method of claim 23 wherein the transmitting step comprises transmitting a rental vehicle reservation from the user to the selected different competitive rental vehicle service provider through the Internet web portal via email over the Internet.

25. The method of claim 23 wherein the transmitting step comprises transmitting a rental vehicle reservation from the user to the selected different competitive rental vehicle service provider through the Internet web portal via phone.

26. The method of claim 23 wherein the transmitting step comprises transmitting a rental vehicle reservation from the user to the selected different competitive rental vehicle service provider through the Internet web portal via facsimile.

27. The method of claim 23 wherein computer network comprises a first computer network, and wherein the selected different competitive rental vehicle service provider also maintains its own computer network with the same functionality as the first computer network such that the user can also book and manage a rental vehicle reservation with the selected different competitive rental vehicle service provider through a rental vehicle software program maintained by the selected different competitive rental vehicle service provider.

28. The method of claim 23 wherein the Internet web portal is in communication with a plurality of different authorized purchaser computers, wherein the option providing step comprises providing the option to the users of the different authorized purchaser computers, and wherein the method further comprises:

customizing the GUI menus on a per user basis.

29. The method of claim 28 wherein the users comprise users from different insurance companies.

30. The method of claim 23 further comprising:

providing the user with a single set of GUI menus through the Internet web portal for booking a rental vehicle reservation with all of the competitive rental vehicle service providers.

31. The method of claim 30 further comprising:

accommodating through the Internet web portal a plurality of varying data requirements for rental vehicle reservations with the competitive rental vehicle service providers.

32. The method of claim 23 wherein the rental vehicle software program executing step comprises performing a plurality of user-specified management functions for a plurality of rental vehicle reservations, the user-specified management functions comprising a rental vehicle reservation extension by the user, an authorization by the user of a request for a rental vehicle reservation extension requested by someone other than the user, an authorization by the user for a rental vehicle reservation booked by someone other than the user, and a change in rental vehicle reservation authorization by the user.

33. The method of claim 32 wherein the Internet web portal is configured for access by a plurality of authorized purchaser computers belonging to a common business organization, the method further comprising:

creating and administering a plurality of workgroups, wherein each workgroup comprises a plurality of users, and wherein each workgroup shares a workload of management functions for rental vehicle reservations among its users; and providing a GUI menu for display on the authorized purchaser computers through the Internet web portal that presents each user with an action item list that identifies a plurality of management function actions for rental vehicle reservations that have been assigned to the user's workgroup.

34. The method of claim 23 wherein the Internet web portal is configured for access by a plurality of authorized purchaser computers, the method further comprising:

assigning each user of the authorized purchaser computers with an authorization limit that limits an extent of functionality available to each user when managing a rental vehicle reservation through the rental vehicle software program.

35. The method of claim 34 wherein the authorization limit assigning step comprises imposing a financial commitment dollar limit that a user can make on rental vehicle reservations over a specified time period.

36. The method of claim 23 wherein the Internet web portal is maintained by the same competitive rental vehicle service provider that maintains the computer network.

37. The method of claim 36 further comprising:

positioning the Internet web portal behind a firewall maintained by the same competitive rental vehicle service provider that maintains the computer network, wherein the Internet web portal is in communication with the Internet via the firewall.

38. The method of claim 23 further comprising:

providing a layer of computer architecture that interconnects the Internet web portal with the Internet, the computer architecture layer comprising a plurality of networked servers and a firewall, wherein the firewall connects the Internet web portal with the plurality of networked servers, and wherein the plurality of networked servers are configured to provide order to data communications to and from the Internet.

39. The method of claim 38 wherein the computer architecture layer and the Internet web portal are maintained by the same competitive rental vehicle service provider that maintains the computer network.

40. The method of claim 39 wherein computer architecture layer providing step further comprises providing another firewall, the another firewall connecting the plurality of networked servers to the Internet.

41. The method of claim 39 wherein the Internet web portal providing step comprises a configuring a plurality of networked web servers to serve as the Internet web portal.

* * * * *